(12) United States Patent　　　　(10) Patent No.:　US 12,647,593 B2
Iguchi et al.　　　　　　　　　　　　(45) Date of Patent:　Jun. 2, 2026

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 163 days.

(21) Appl. No.: 17/858,473

(22) Filed: Jul. 6, 2022

(65) Prior Publication Data

US 2022/0337859 A1　　Oct. 20, 2022

Related U.S. Application Data

(63) Continuation of application No. PCT/JP2021/000406, filed on Jan. 7, 2021.

(Continued)

(51) Int. Cl.
　　*H04N 19/46*　　　(2014.01)
　　*H04N 19/136*　　　(2014.01)
　　*H04N 19/423*　　　(2014.01)
(52) U.S. Cl.
　　CPC ........... *H04N 19/46* (2014.11); *H04N 19/136* (2014.11); *H04N 19/423* (2014.11)

(58) Field of Classification Search
　　CPC ..... H04N 19/46; H04N 19/423; H04N 19/136
　　See application file for complete search history.

(56) References Cited

U.S. PATENT DOCUMENTS

2014/0375638 A1　12/2014　Tomaru et al.
2016/0323590 A1*　11/2016　Li ........................ H04N 19/172
(Continued)

FOREIGN PATENT DOCUMENTS

WO　　　2014/020663　　　2/2014

OTHER PUBLICATIONS

International Search Report (ISR) issued on Mar. 16, 2021 in International (PCT) Application No. PCT/JP2021/000406.

*Primary Examiner* — Christopher S Kelley
(74) *Attorney, Agent, or Firm* — Wenderoth, Lind & Ponack, L.L.P.

(57)　　　　　　ABSTRACT

A three-dimensional data encoding method includes: obtaining an item of geometry information and one or more items of attribute information of each of one or more encoded three-dimensional points; and storing an item of control information and any one of the item of geometry information and the one or more items of attribute information of the encoded three-dimensional points into each of one or more data units. The item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

9 Claims, 87 Drawing Sheets

```
pcc_nal_unit_header(){
  pcc_nal_unit_type if(pcc_nal_unit_type == Attri. PS){
    attribute_type  //0~3
    instance_id
  }
  if(pcc_nal_unit_type == Attri. Slice){
    attribute_type  //0~2
    instance_id
  }
}

0: color
      1: refletrance
      2: frameindex
      3: color + reflectance
      4~: reserved for future use
```

Related U.S. Application Data

(60) Provisional application No. 62/958,470, filed on Jan. 8, 2020.

(56)                    References Cited

U.S. PATENT DOCUMENTS

| 2017/0347120 A1* | 11/2017 | Chou | H04N 19/89 |
|---|---|---|---|
| 2019/0087979 A1* | 3/2019 | Mammou | H04N 19/597 |
| 2019/0197739 A1* | 6/2019 | Sinharoy | G06T 9/00 |
| 2019/0313110 A1* | 10/2019 | Mammou | G06T 7/248 |
| 2020/0364904 A1* | 11/2020 | Najaf-Zadeh | H04N 19/597 |
| 2021/0006837 A1* | 1/2021 | Yea | H04N 19/62 |
| 2021/0104074 A1* | 4/2021 | Joshi | G06T 9/001 |
| 2021/0209806 A1* | 7/2021 | Oh | H04N 13/161 |
| 2022/0051444 A1* | 2/2022 | Iguchi | H04N 19/70 |
| 2022/0198719 A1* | 6/2022 | Han | G06T 9/00 |
| 2022/0327744 A1* | 10/2022 | Park | G06T 9/40 |
| 2024/0155142 A1* | 5/2024 | Sugio | H04N 19/597 |

* cited by examiner

|        | GEOMETRY INFORMATION | ATTRIBUTE INFORMATION |
|--------|----------------------|-----------------------|
| $n = 1$ | $G(1) = (x_1, y_1, z_1)$ | $A(1) = (R_1, G_1, B_1)$ |
| $n = 2$ | $G(2) = (x_2, y_2, z_2)$ | $A(2) = (R_2, G_2, B_2)$ |
| $\vdots$ | $\vdots$ | $\vdots$ |
| $n = N$ | $G(N) = (x_N, y_N, z_N)$ | $A(N) = (R_N, G_N, B_N)$ |

FIG. 4

STATIC OBJECT

FRAME #1

DYNAMIC OBJECT

FRAME #1

FRAME #2

FRAME #3

TIME

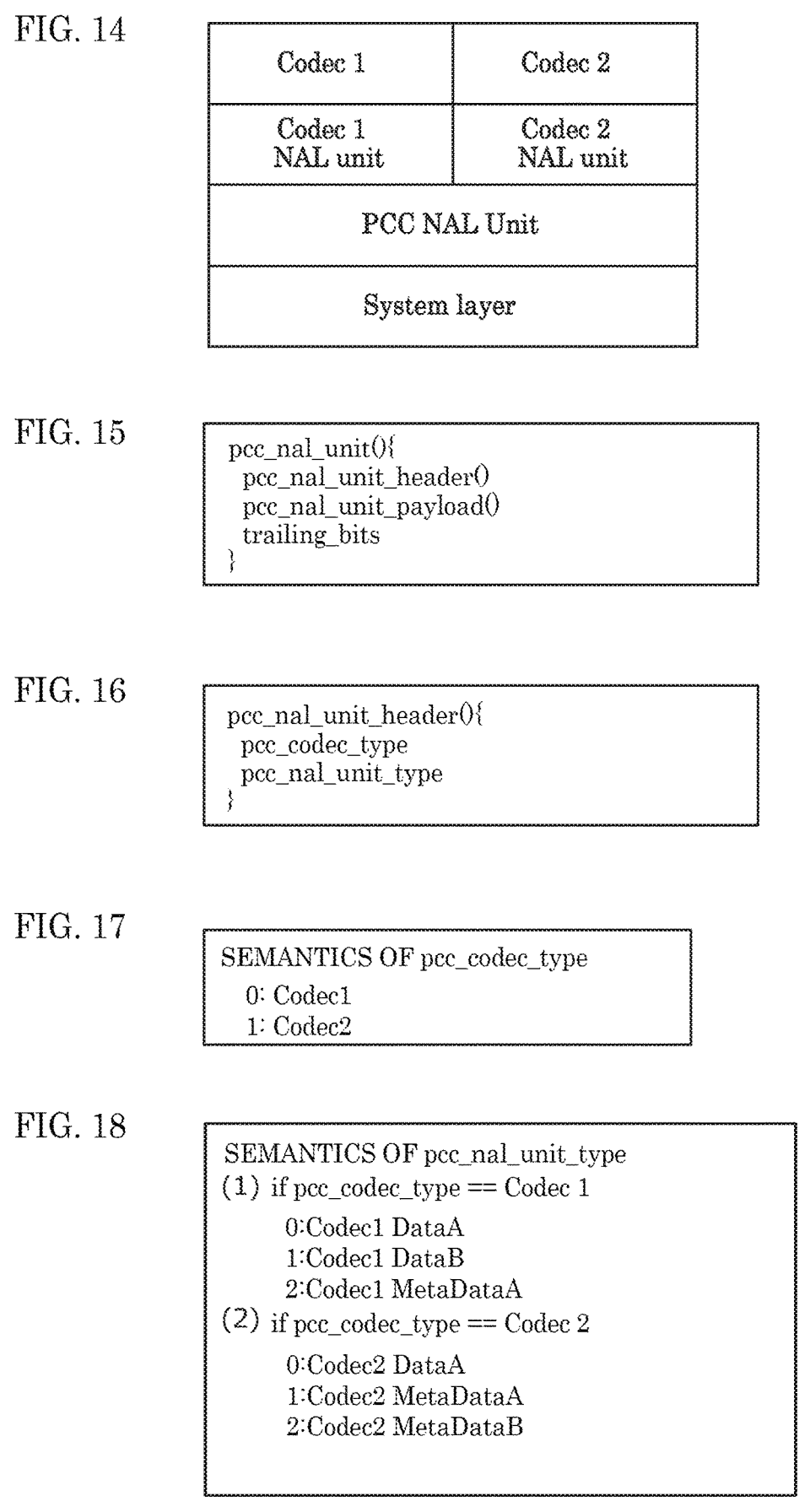

| Codec 1 | Codec 2 |
|---------|---------|
| Codec 1 NAL unit | Codec 2 NAL unit |
| PCC NAL Unit | |
| System layer | |

FIG. 15

```
pcc_nal_unit(){
  pcc_nal_unit_header()
  pcc_nal_unit_payload()
  trailing_bits
}
```

FIG. 16

```
pcc_nal_unit_header(){
  pcc_codec_type
  pcc_nal_unit_type
}
```

FIG. 17

```
SEMANTICS OF pcc_codec_type
  0: Codec1
  1: Codec2
```

FIG. 18

```
SEMANTICS OF pcc_nal_unit_type
(1) if pcc_codec_type == Codec 1

0:Codec1 DataA
      1:Codec1 DataB
      2:Codec1 MetaDataA
(2) if pcc_codec_type == Codec 2

0:Codec2 DataA
      1:Codec2 MetaDataA
      2:Codec2 MetaDataB
```

FIG. 22

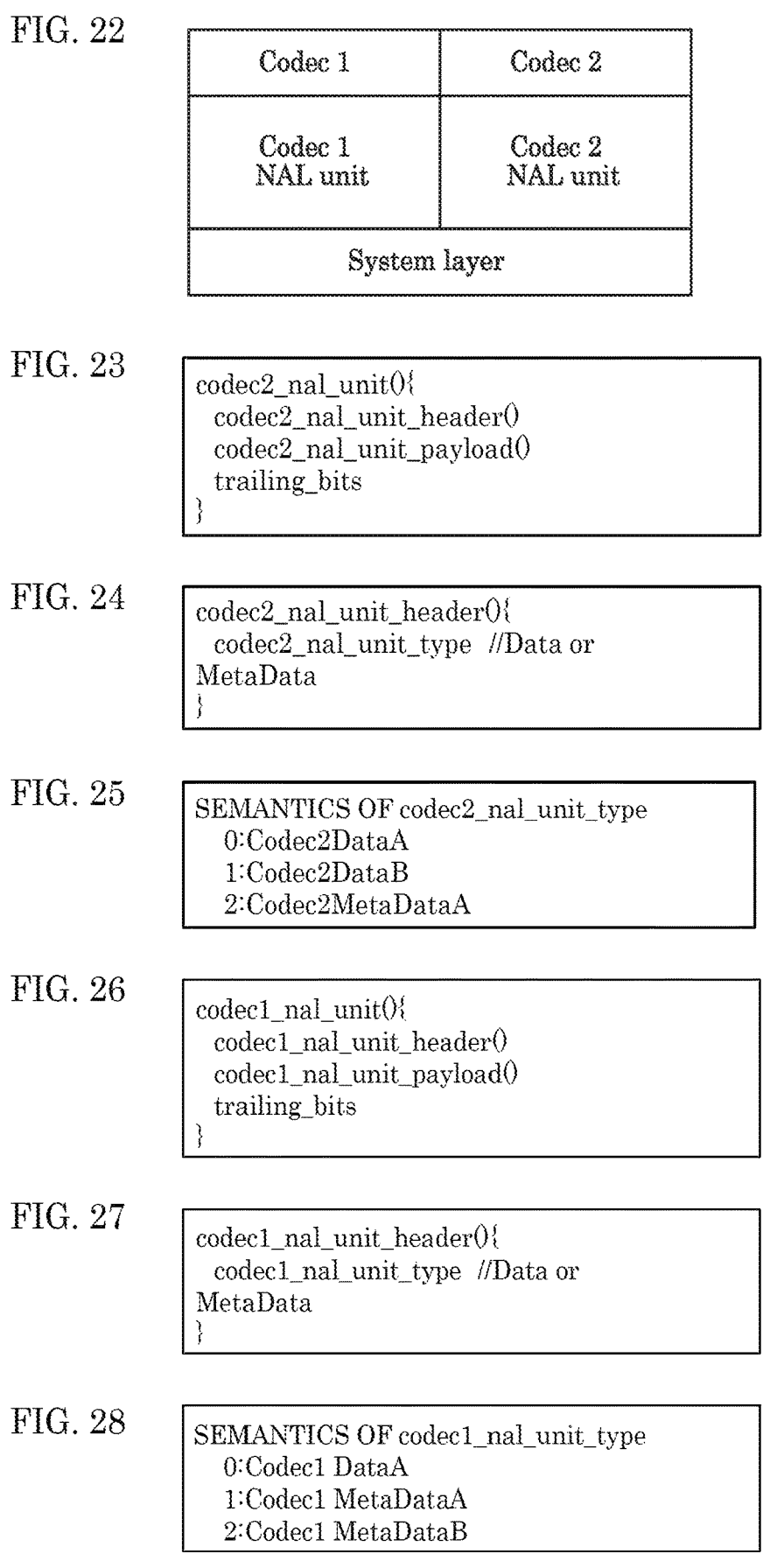

| Codec 1 | Codec 2 |
|---|---|
| Codec 1 NAL unit | Codec 2 NAL unit |
| System layer | |

FIG. 23

```
codec2_nal_unit(){
  codec2_nal_unit_header()
  codec2_nal_unit_payload()
  trailing_bits
}
```

FIG. 24

```
codec2_nal_unit_header(){
  codec2_nal_unit_type  //Data or
MetaData
}
```

FIG. 25

```
SEMANTICS OF codec2_nal_unit_type
    0:Codec2DataA
    1:Codec2DataB
    2:Codec2MetaDataA
```

FIG. 26

```
codec1_nal_unit(){
  codec1_nal_unit_header()
  codec1_nal_unit_payload()
  trailing_bits
}
```

FIG. 27

```
codec1_nal_unit_header(){
  codec1_nal_unit_type  //Data or
MetaData
}
```

FIG. 28

```
SEMANTICS OF codec1_nal_unit_type
    0:Codec1 DataA
    1:Codec1 MetaDataA
    2:Codec1 MetaDataB
```

FIG. 31

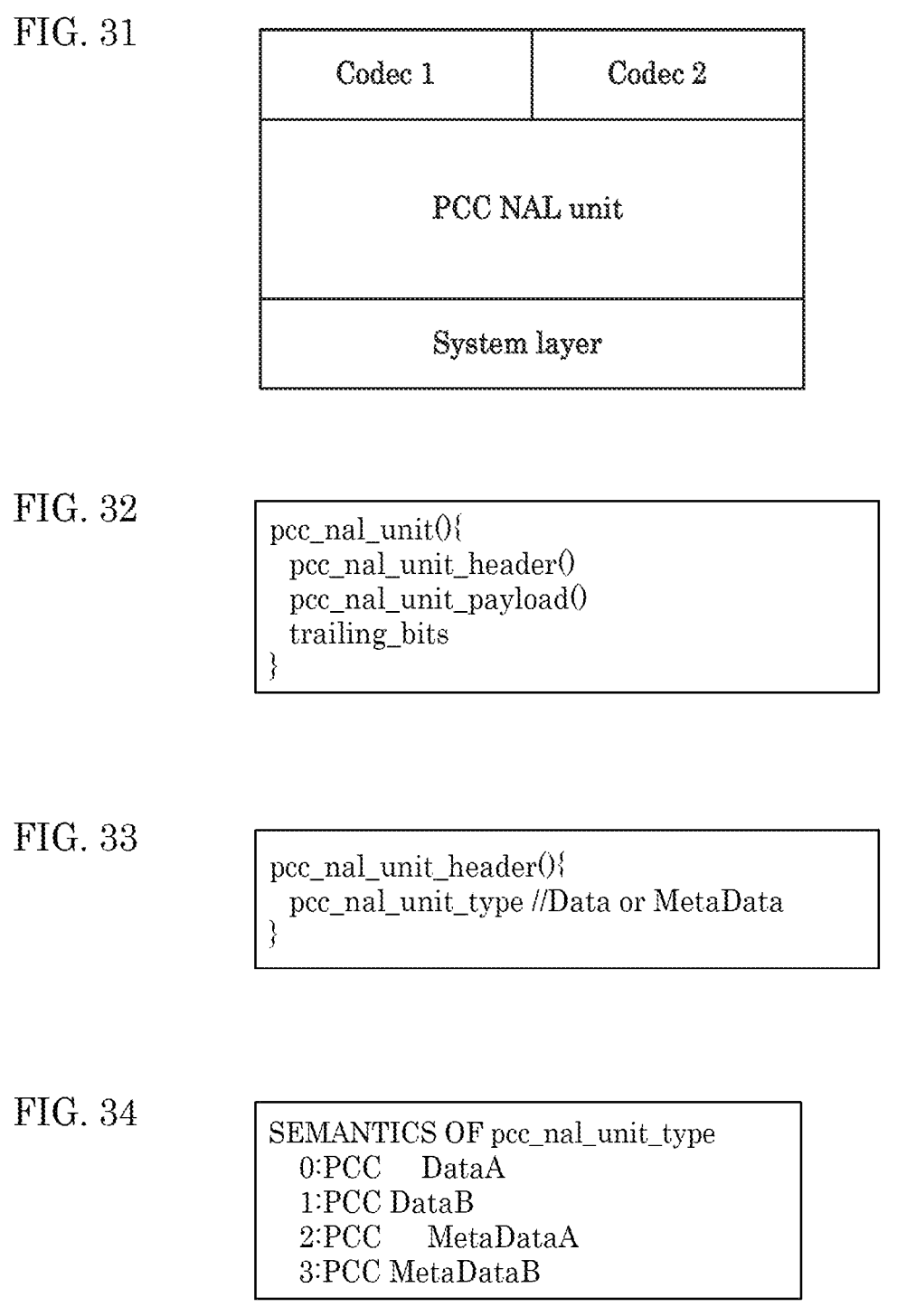

| Codec 1 | Codec 2 |
|---------|---------|
| PCC NAL unit | |
| System layer | |

FIG. 32

```
pcc_nal_unit(){
    pcc_nal_unit_header()
    pcc_nal_unit_payload()
    trailing_bits
}
```

FIG. 33

```
pcc_nal_unit_header(){
    pcc_nal_unit_type //Data or MetaData
}
```

FIG. 34

```
SEMANTICS OF pcc_nal_unit_type
    0:PCC    DataA
    1:PCC DataB
    2:PCC    MetaDataA
    3:PCC MetaDataB
```

FIG. 35

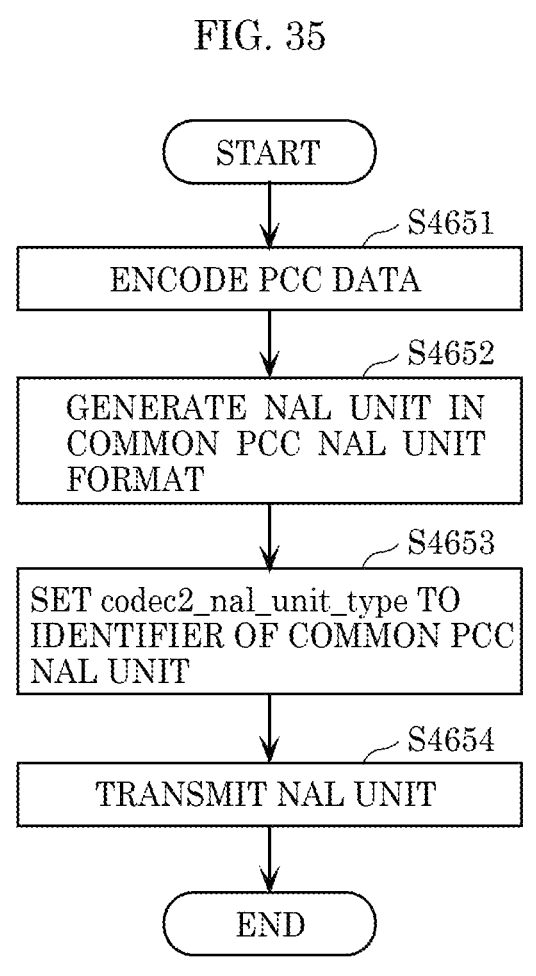

```
         ┌─────────────┐
         │    START    │
         └─────────────┘
                │
                ▼           ⟋ S4651
    ┌───────────────────────────┐
    │     ENCODE PCC DATA       │
    └───────────────────────────┘
                │
                ▼           ⟋ S4652
    ┌───────────────────────────┐
    │  GENERATE NAL UNIT IN     │
    │  COMMON PCC NAL UNIT      │
    │  FORMAT                   │
    └───────────────────────────┘
                │
                ▼           ⟋ S4653
    ┌───────────────────────────┐
    │ SET codec2_nal_unit_type  │
    │ TO IDENTIFIER OF COMMON   │
    │ PCC NAL UNIT              │
    └───────────────────────────┘
                │
                ▼           ⟋ S4654
    ┌───────────────────────────┐
    │    TRANSMIT NAL UNIT      │
    └───────────────────────────┘
                │
                ▼
         ┌─────────────┐
         │     END     │
         └─────────────┘
```

FIG. 37

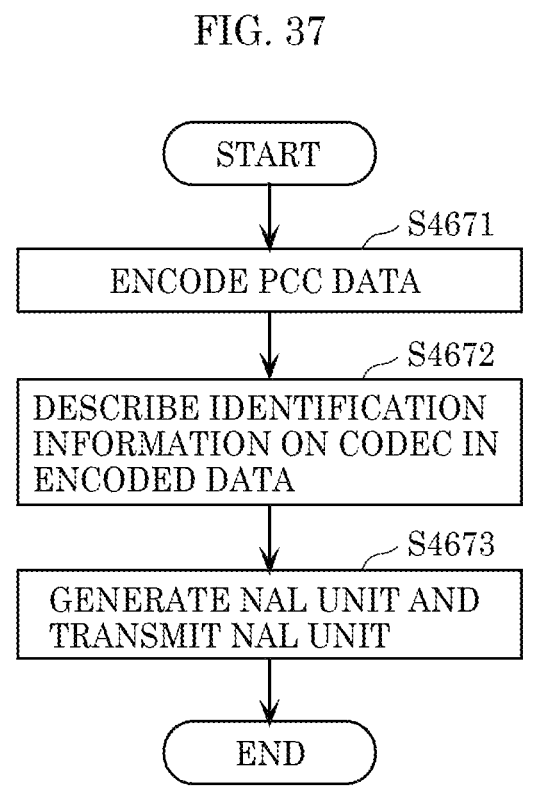

```
        ┌─────────────┐
        │    START    │
        └──────┬──────┘
               │        ⌐ S4671
        ┌──────▼──────────────┐
        │  ENCODE PCC DATA    │
        └──────┬──────────────┘
               │        ⌐ S4672
        ┌──────▼──────────────┐
        │ DESCRIBE IDENTIFICATION
        │ INFORMATION ON CODEC IN
        │ ENCODED DATA        │
        └──────┬──────────────┘
               │        ⌐ S4673
        ┌──────▼──────────────┐
        │ GENERATE NAL UNIT AND
        │ TRANSMIT NAL UNIT   │
        └──────┬──────────────┘
               │
        ┌──────▼──────┐
        │     END     │
        └─────────────┘
```

FIG. 38

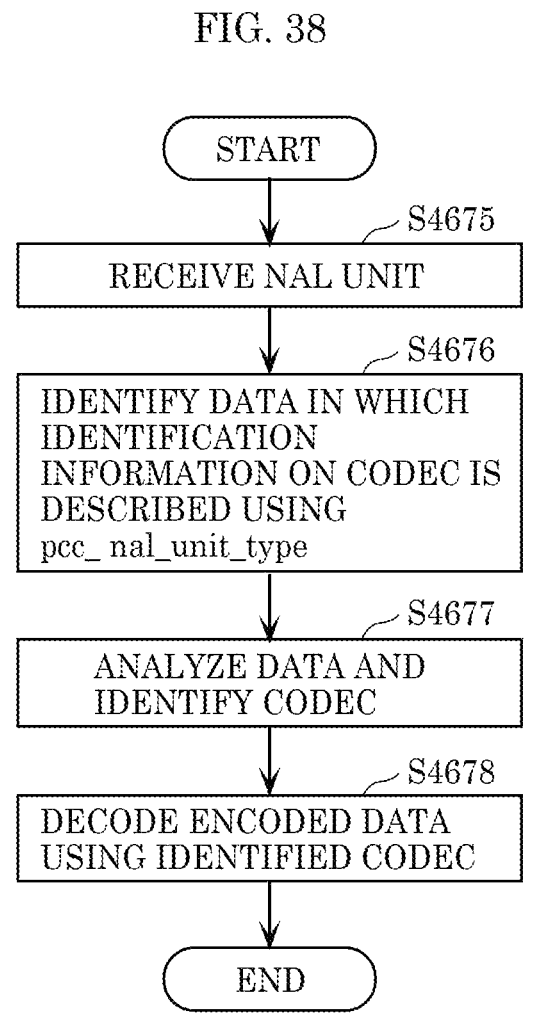

START

S4675

RECEIVE NAL UNIT

S4676

IDENTIFY DATA IN WHICH
IDENTIFICATION
INFORMATION ON CODEC IS
DESCRIBED USING
pcc_ nal_unit_type

S4677

ANALYZE DATA AND
IDENTIFY CODEC

S4678

DECODE ENCODED DATA
USING IDENTIFIED CODEC

END

FIG. 43

| ftyp | moov | mdat |
|------|------|------|

FIG. 44

| Codec 1 | Codec 2 |
|---------|---------|
| Codec 1 NAL unit | Codec 2 NAL unit |
| PCC NAL Unit | |
| Carriage of Codec 1 | Carriage of Codec 2 |
| ISOBMFF | |

FIG. 45

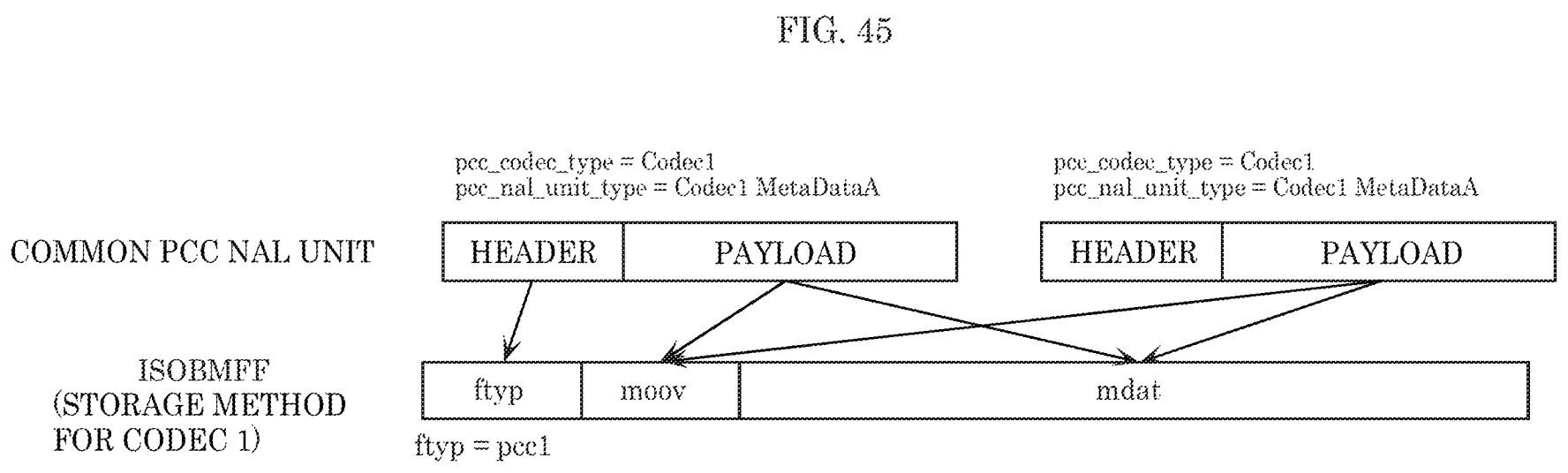

COMMON PCC NAL UNIT pcc_codec_type = Codec1
pcc_nal_unit_type = Codec1 MetaDataA

HEADER    PAYLOAD pcc_codec_type = Codec1
pcc_nal_unit_type = Codec1 MetaDataA

HEADER    PAYLOAD

ISOBMFF
(STORAGE METHOD
FOR CODEC 1)

ftyp    moov    mdat ftyp = pcc1

FIG. 46

COMMON PCC NAL UNIT pcc_codec_type = Codec2
pcc_nal_unit_type = Codec2 MetaDataA

| HEADER | PAYLOAD | pcc_codec_type = Codec2
pcc_nal_unit_type = Codec2 MetaDataA

| HEADER | PAYLOAD |

ISOBMFF
(STORAGE METHOD
FOR CODEC 2)

| ftyp | moov | mdat ftyp = pcc2

Figure 64:
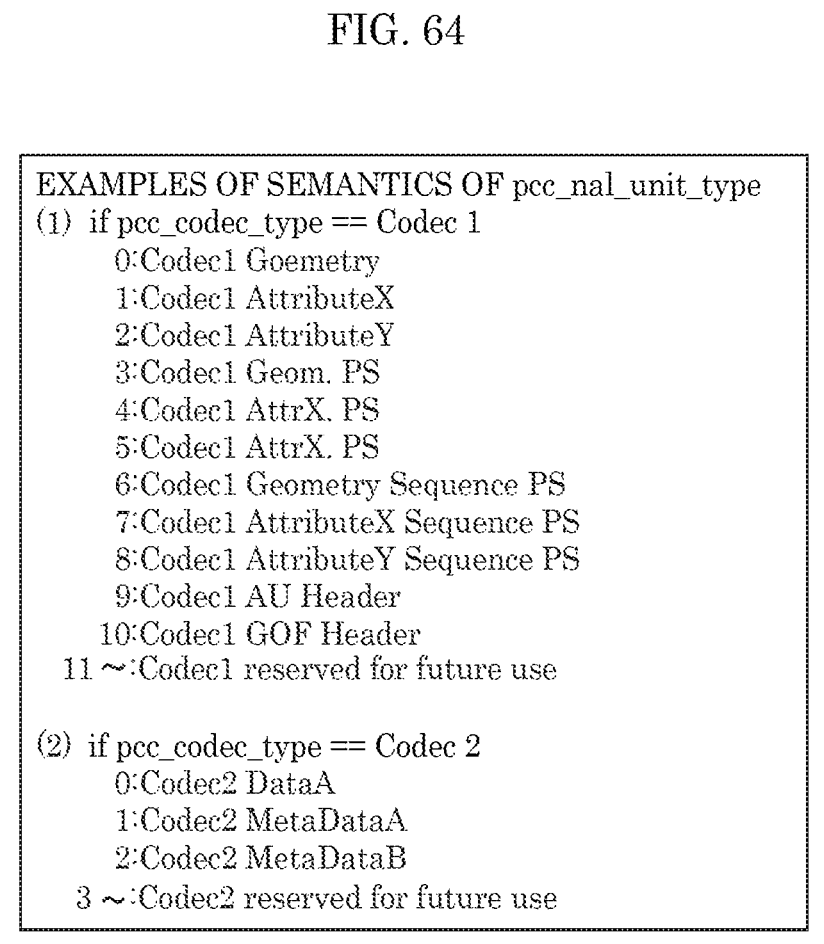

EXAMPLES OF SEMANTICS OF pcc_nal_unit_type
(1) if pcc_codec_type == Codec 1
    0:Codec1 Goemetry
    1:Codec1 AttributeX
    2:Codec1 AttributeY
    3:Codec1 Geom. PS
    4:Codec1 AttrX. PS
    5:Codec1 AttrX. PS
    6:Codec1 Geometry Sequence PS
    7:Codec1 AttributeX Sequence PS
    8:Codec1 AttributeY Sequence PS
    9:Codec1 AU Header
   10:Codec1 GOF Header
 11 ~:Codec1 reserved for future use (2) if pcc_codec_type == Codec 2
    0:Codec2 DataA
    1:Codec2 MetaDataA
    2:Codec2 MetaDataB
  3 ~:Codec2 reserved for future use

START

ENCODE GEOMETRY INFORMATION — S4841

ENCODE ATTRIBUTE INFORMATION TO BE PROCESSED USING GEOMETRY INFORMATION ASSOCIATED WITH SAME TIME POINTAS ATTRIBUTE INFORMATION — S4842

END

START

DECODE GEOMETRY INFORMATION — S4851

DECODE ATTRIBUTE INFORMATION TO BE PROCESSED USING GEOMETRY INFORMATION ASSOCIATED WITH SAME TIME POINT AS ATTRIBUTE INFORMATION — S4852

END

Figure 77:
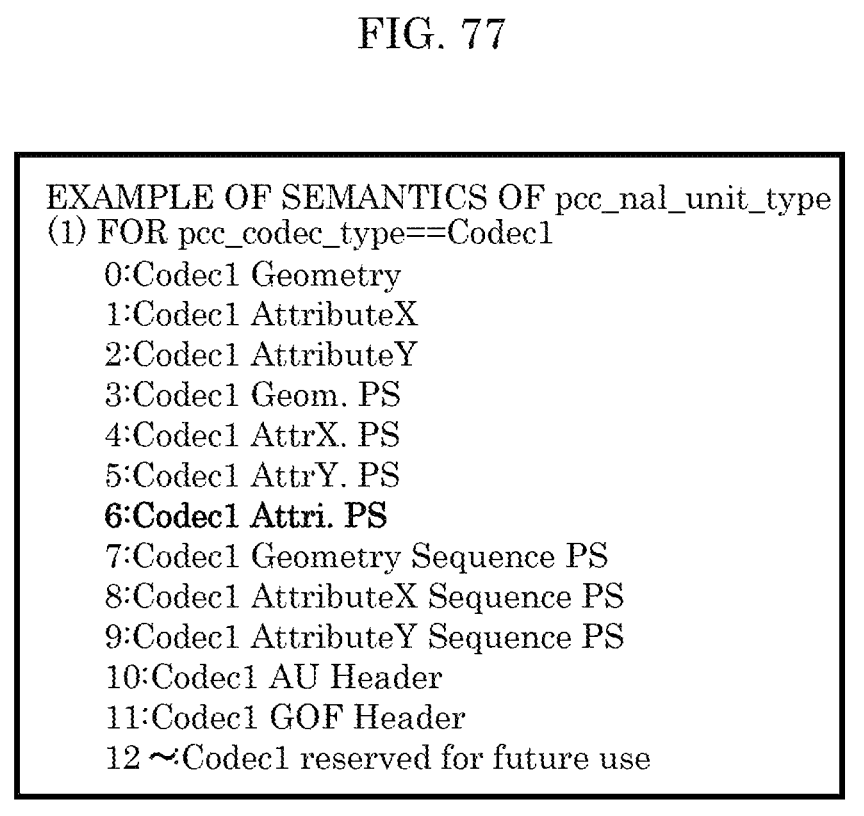

EXAMPLE OF SEMANTICS OF pcc_nal_unit_type
(1) FOR pcc_codec_type==Codec1
　　0:Codec1 Geometry
　　1:Codec1 AttributeX
　　2:Codec1 AttributeY
　　3:Codec1 Geom. PS
　　4:Codec1 AttrX. PS
　　5:Codec1 AttrY. PS
　　6:Codec1 Attri. PS
　　7:Codec1 Geometry Sequence PS
　　8:Codec1 AttributeX Sequence PS
　　9:Codec1 AttributeY Sequence PS
　　10:Codec1 AU Header
　　11:Codec1 GOF Header
　　12 ~:Codec1 reserved for future use

FIG. 78

```
pcc_nal_unit_header(){
  pcc_nal_unit_type if(pcc_nal_unit_type == 6:Codec1 Attri. PS){
    attribute_type
  }
}

0: color
      1: refletrance
      2: frameindex
      3: color + reflectance
      4~: reserved for future use
```

FIG. 79

```
pcc_nal_unit_header(){
  pcc_nal_unit_type if(pcc_nal_unit_type == 6:Codec1 Attri. PS){
     color_flag
     reflectance_flag
     frame_index_flag
     flag  (reserved for future use)
     flag  (reserved for future use)
     flag  (reserved for future use)
     flag  (reserved for future use)
  }
}
```

FIG. 88

```
pcc_nal_unit_header(){
  pcc_nal_unit_type if(pcc_nal_unit_type == Attri. PS){
    attribute_type  //0~3
      instance_id
  }
  if(pcc_nal_unit_type == Attri. Slice){
      attribute_type  //0~2
      instance_id
  }
}
        0: color
        1: refletrance
        2: frameindex
        3: color + reflectance
        4~: reserved for future use
```

Figure 95:
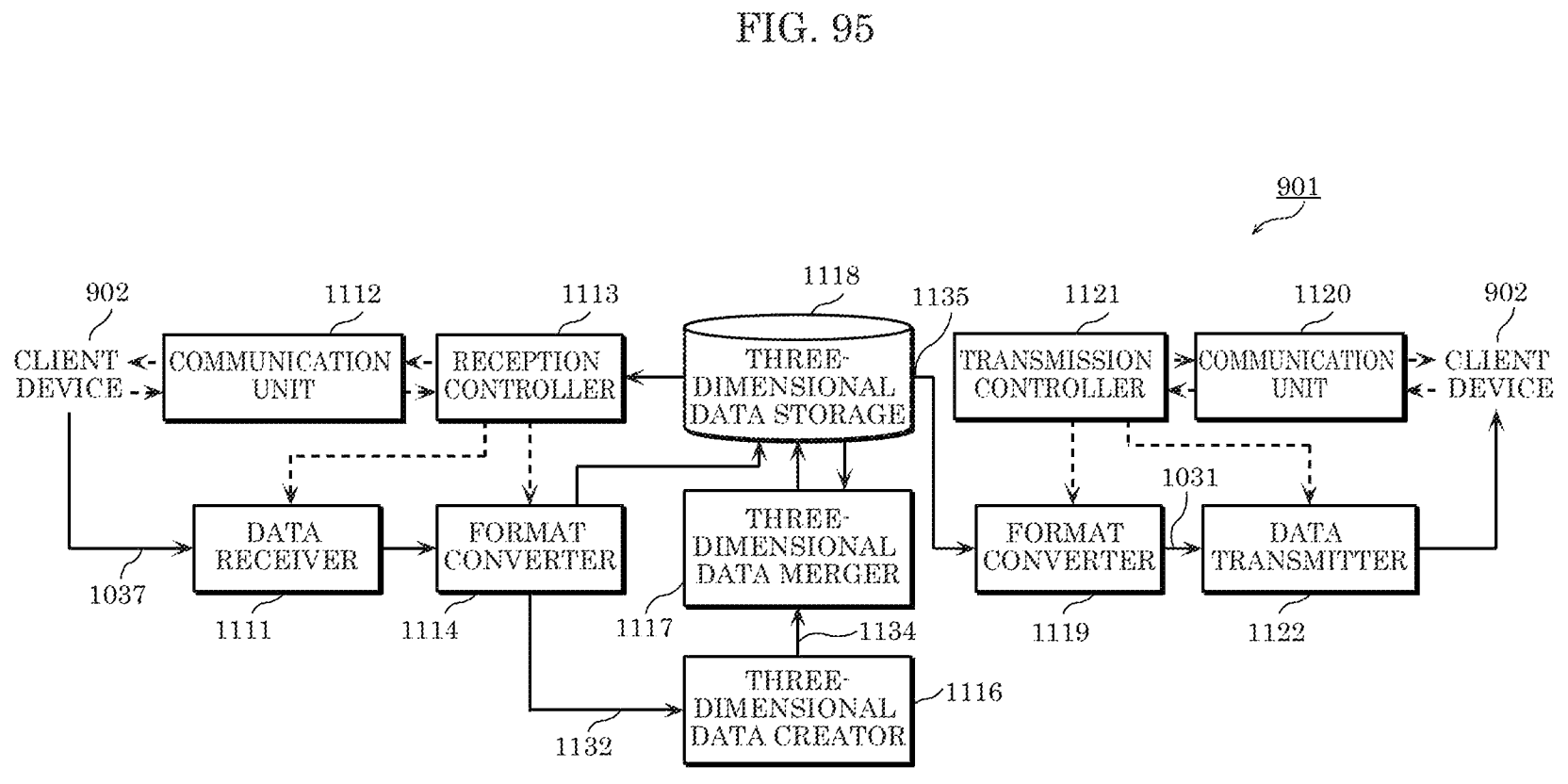

902 CLIENT DEVICE

1120 COMMUNICATION UNIT

1121 TRANSMISSION CONTROLLER

1135

1118 THREE-DIMENSIONAL DATA STORAGE

1031

1122 DATA TRANSMITTER

1119 FORMAT CONVERTER

1117 THREE-DIMENSIONAL DATA MERGER

1134

1116 THREE-DIMENSIONAL DATA CREATOR

1132

1113 RECEPTION CONTROLLER

1114 FORMAT CONVERTER

1112 COMMUNICATION UNIT

1111 DATA RECEIVER

902 CLIENT DEVICE

1037

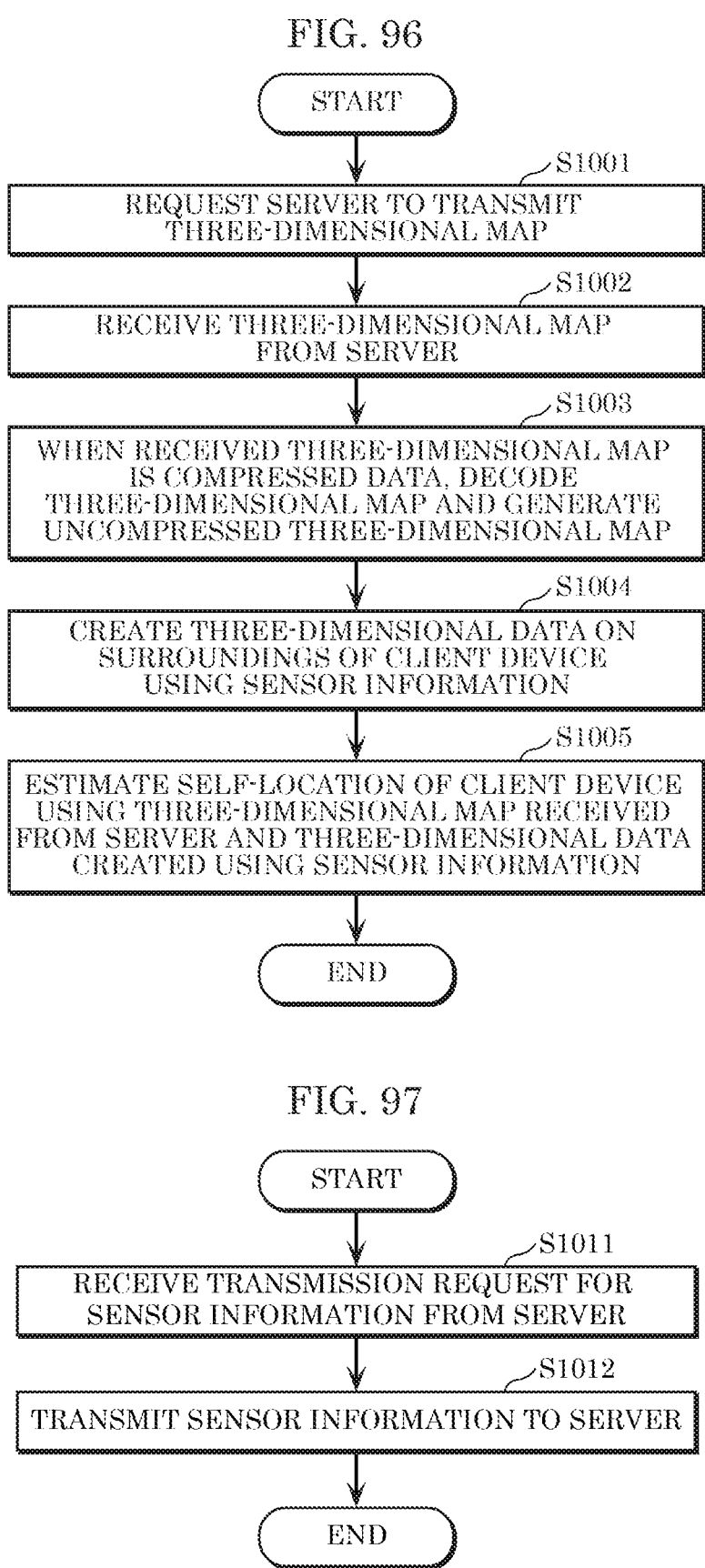

FIG. 96

START

S1001
REQUEST SERVER TO TRANSMIT
THREE-DIMENSIONAL MAP

S1002
RECEIVE THREE-DIMENSIONAL MAP
FROM SERVER

S1003
WHEN RECEIVED THREE-DIMENSIONAL MAP
IS COMPRESSED DATA, DECODE
THREE-DIMENSIONAL MAP AND GENERATE
UNCOMPRESSED THREE-DIMENSIONAL MAP

S1004
CREATE THREE-DIMENSIONAL DATA ON
SURROUNDINGS OF CLIENT DEVICE
USING SENSOR INFORMATION

S1005
ESTIMATE SELF-LOCATION OF CLIENT DEVICE
USING THREE-DIMENSIONAL MAP RECEIVED
FROM SERVER AND THREE-DIMENSIONAL DATA
CREATED USING SENSOR INFORMATION

END

FIG. 97

START

S1011
RECEIVE TRANSMISSION REQUEST FOR
SENSOR INFORMATION FROM SERVER

S1012
TRANSMIT SENSOR INFORMATION TO SERVER

END

FIG. 98

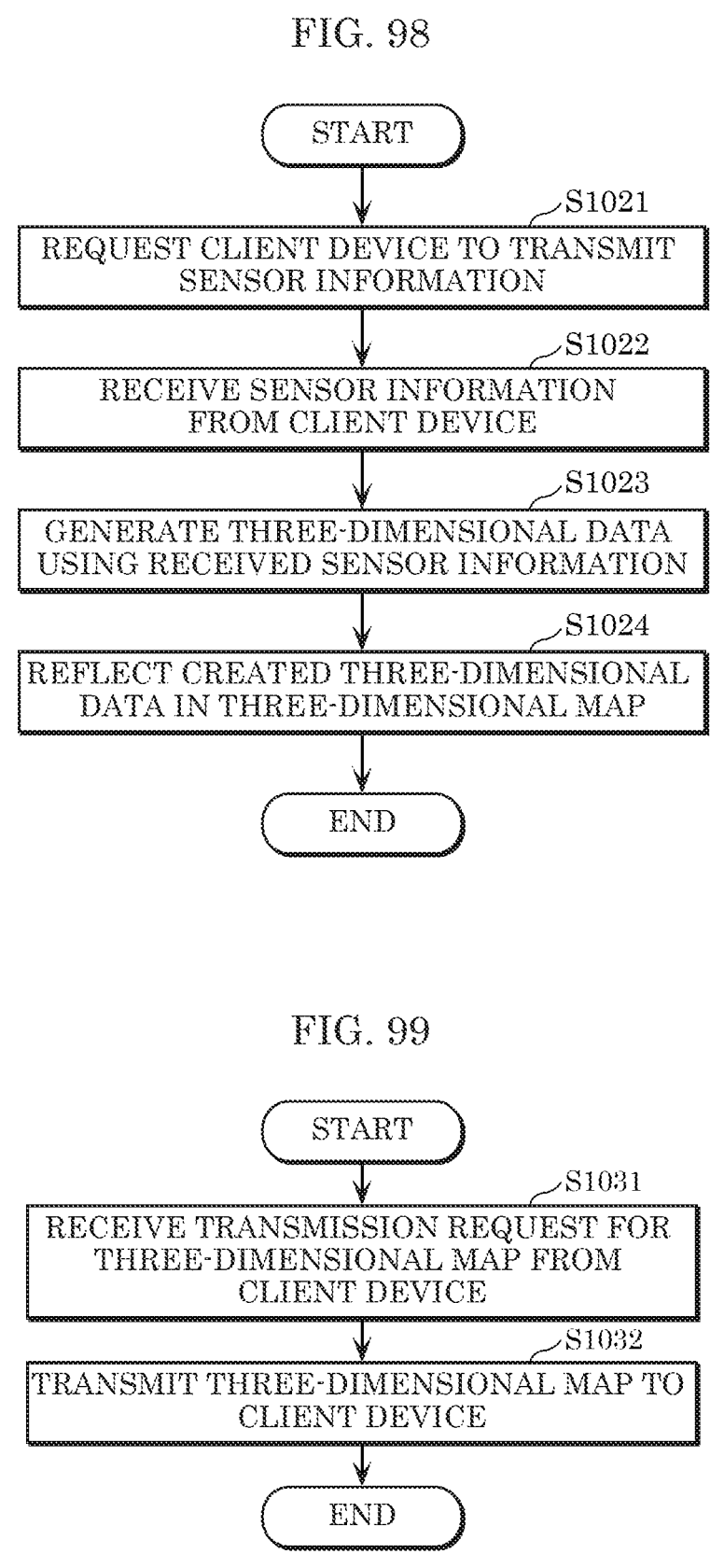

START

S1021

REQUEST CLIENT DEVICE TO TRANSMIT
SENSOR INFORMATION

S1022

RECEIVE SENSOR INFORMATION
FROM CLIENT DEVICE

S1023

GENERATE THREE-DIMENSIONAL DATA
USING RECEIVED SENSOR INFORMATION

S1024

REFLECT CREATED THREE-DIMENSIONAL
DATA IN THREE-DIMENSIONAL MAP

END

FIG. 99

START

S1031

RECEIVE TRANSMISSION REQUEST FOR
THREE-DIMENSIONAL MAP FROM
CLIENT DEVICE

S1032

TRANSMIT THREE-DIMENSIONAL MAP TO
CLIENT DEVICE

END

FIG. 102

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2021/000406 filed on Jan. 7, 2021, claiming the benefit of priority of U.S. Provisional Patent Application No. 62/958,470 filed on Jan. 8, 2020, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (for example, see Patent Literature (PTL) 1).

CITATION LIST

Patent Literature

PTL 1: International Publication WO 2014/020663

SUMMARY

There is a demand for reducing the processing amount in devices that process three-dimensional data.

The present disclosure provides a three-dimensional data encoding method, a three-dimensional data decoding method, a three-dimensional data encoding device, or a three-dimensional data decoding device that can reduce the processing amount.

A three-dimensional data encoding method according to an aspect of the present disclosure includes: obtaining an item of geometry information and one or more items of attribute information of each of one or more encoded three-dimensional points; and storing an item of control information and any one of the item of geometry information and the one or more items of attribute information of the one or more encoded three-dimensional points into each of one or more data units, wherein the item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

A three-dimensional data decoding method according to an aspect of the present disclosure includes: obtaining a bitstream in which an item of control information and any one of an item of geometry information and one or more items of attribute information of each of one or more encoded three-dimensional points are stored in each of one or more data units; and obtaining the item of geometry information and the one or more items of attribute information of each of the one or more encoded three-dimensional points from the bitstream, wherein the item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

The present disclosure can provide a three-dimensional data encoding method, a three-dimensional data decoding method, a three-dimensional data encoding device, or a three-dimensional data decoding device that can reduce the processing amount.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating types of the point cloud data according to Embodiment 1;

FIG. 6 is a block diagram illustrating the first encoder according to Embodiment 1;

FIG. 8 is a block diagram illustrating the first decoder according to Embodiment 1;

FIG. 10 is a block diagram illustrating the second encoder according to Embodiment 1;

FIG. 12 is a block diagram illustrating the second decoder according to Embodiment 1;

FIG. 14 is a diagram illustrating the protocol stack according to Embodiment 1;

FIG. 15 is a diagram illustrating a syntax example of a NAL unit according to Embodiment 1;

FIG. 16 is a diagram illustrating a syntax example of a NAL unit header according to Embodiment 1;

FIG. 17 is a diagram illustrating a semantics example of pcc_codec_type according to Embodiment 1;

FIG. 18 is a diagram illustrating a semantics example of pcc_nal_unit_type according to Embodiment 1;

FIG. 22 is a diagram illustrating a protocol stack according to Embodiment 2;

FIG. 23 is a diagram illustrating a syntax example of a NAL unit for codec 2 according to Embodiment 2;

FIG. 24 is a diagram illustrating a syntax example of a NAL unit header for codec 2 according to Embodiment 2;

FIG. 25 is a diagram illustrating a semantics example of codec2_nal_unit_type according to Embodiment 2;

FIG. 26 is a diagram illustrating a syntax example of a NAL unit for codec 1 according to Embodiment 2;

FIG. 27 is a diagram illustrating a syntax example of a NAL unit header for codec 1 according to Embodiment 2;

FIG. 28 is a diagram illustrating a semantics example of codec1_nal_unit_type according to Embodiment 2;

FIG. 31 is a diagram illustrating a protocol stack according to Embodiment 3;

FIG. 32 is a diagram illustrating a syntax example of a NAL unit according to Embodiment 3;

FIG. 33 is a diagram illustrating a syntax example of a NAL unit header according to Embodiment 3;

FIG. 34 is a diagram illustrating a semantics example of pcc_nal_unit_type according to Embodiment 3;

FIG. 35 is a flowchart of encoding processing according to Embodiment 3;

FIG. 37 is a flowchart of encoding processing according to Variation of Embodiment;

FIG. 38 is a flowchart of decoding processing according to Variation of Embodiment;

FIG. 43 is a diagram illustrating a basic structure of ISOBMFF according to Embodiment 5;

FIG. 44 is a diagram illustrating a protocol stack according to Embodiment 5;

FIG. 45 is a diagram illustrating an example where a NAL unit is stored in a file for codec 1 according to Embodiment 5;

FIG. 46 is a diagram illustrating an example where a NAL unit is stored in a file for codec 2 according to Embodiment 5;

FIG. 62 is a diagram illustrating a structure example of encoded data according to Embodiment 7;

FIG. 64 is a diagram illustrating a semantics example of pcc_nal_unit_type according to Embodiment 7;

5

Figure 70:
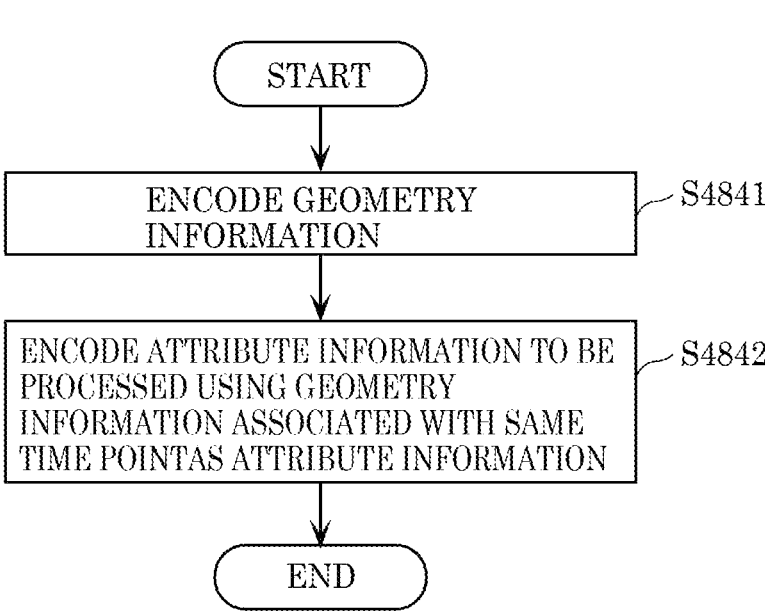
Figure 71:
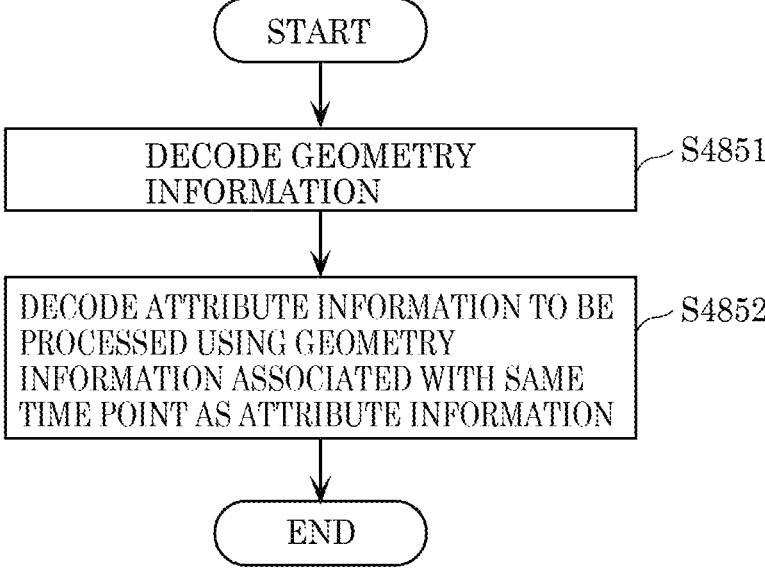
Figure 72:
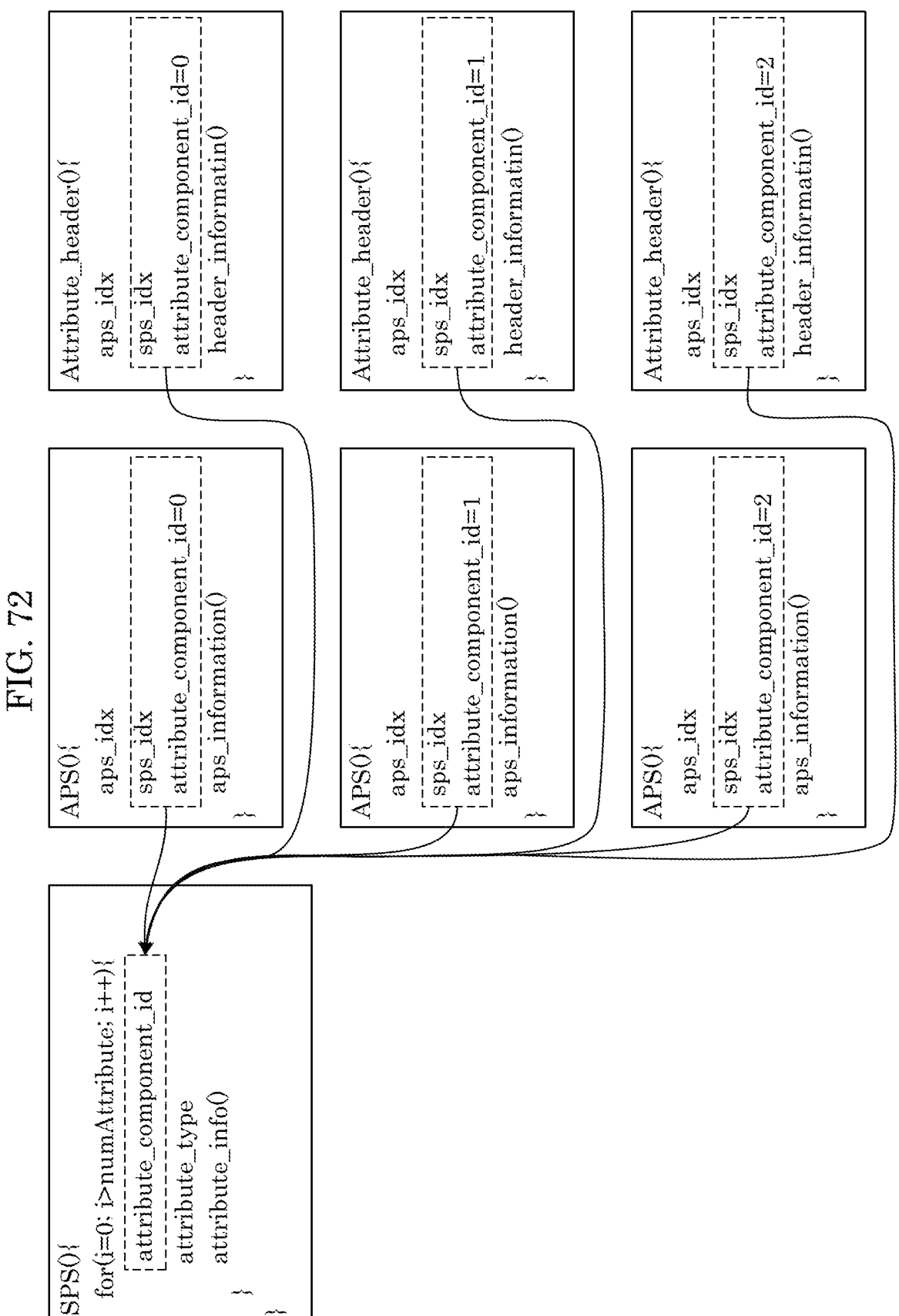
Figure 73:
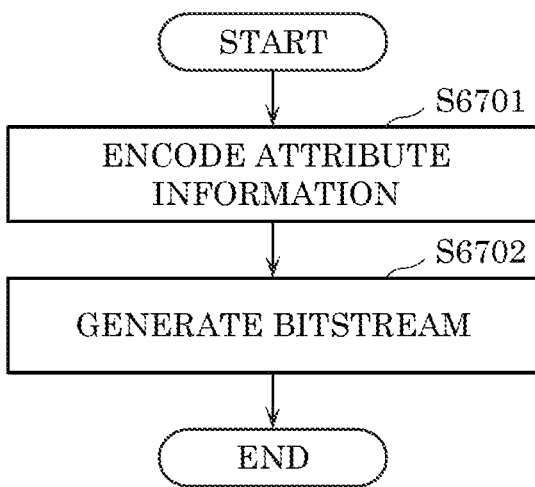
Figure 74:
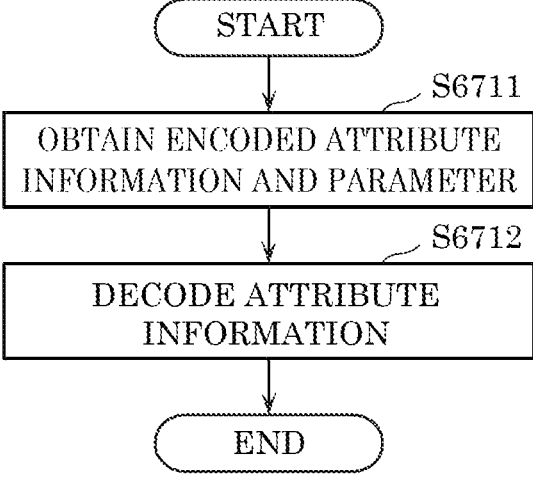
Figure 76:
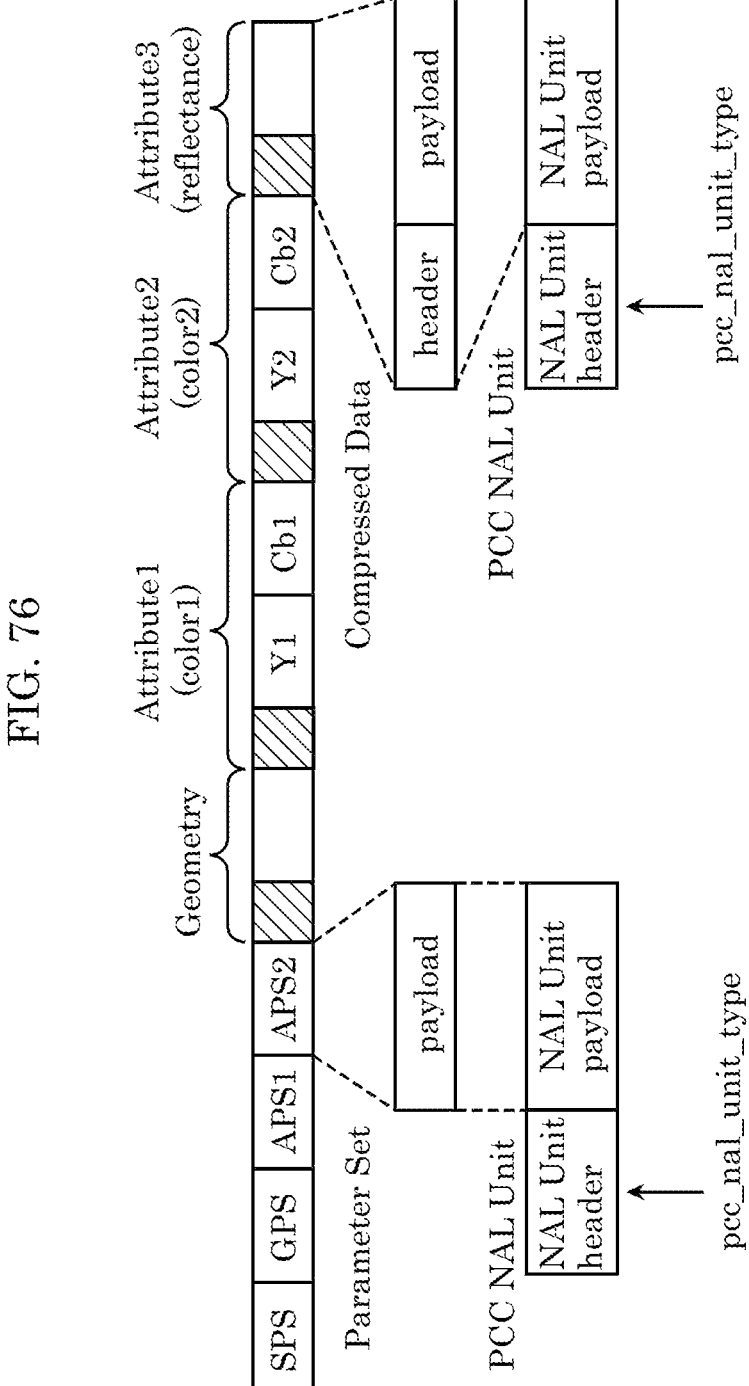
Figure 80:
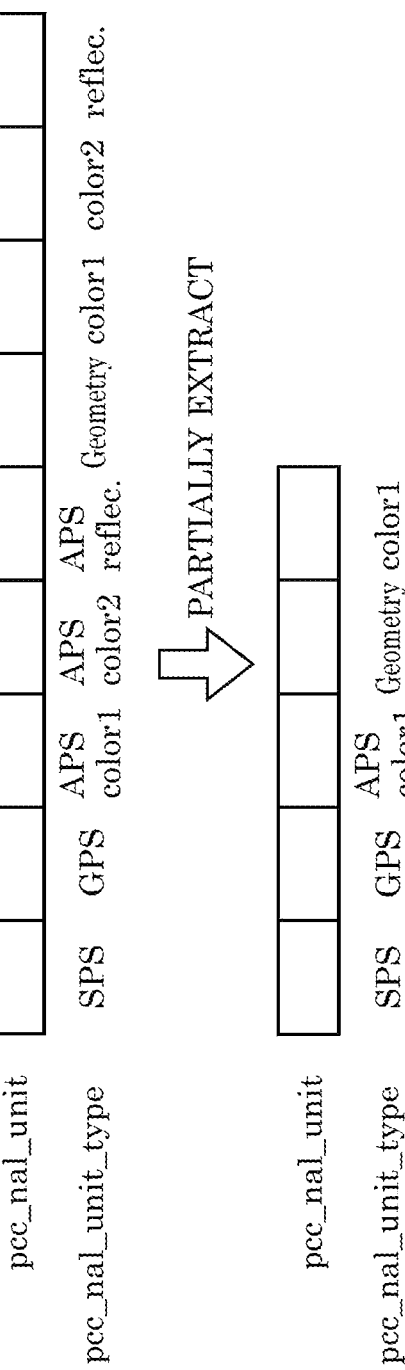
Figure 81:
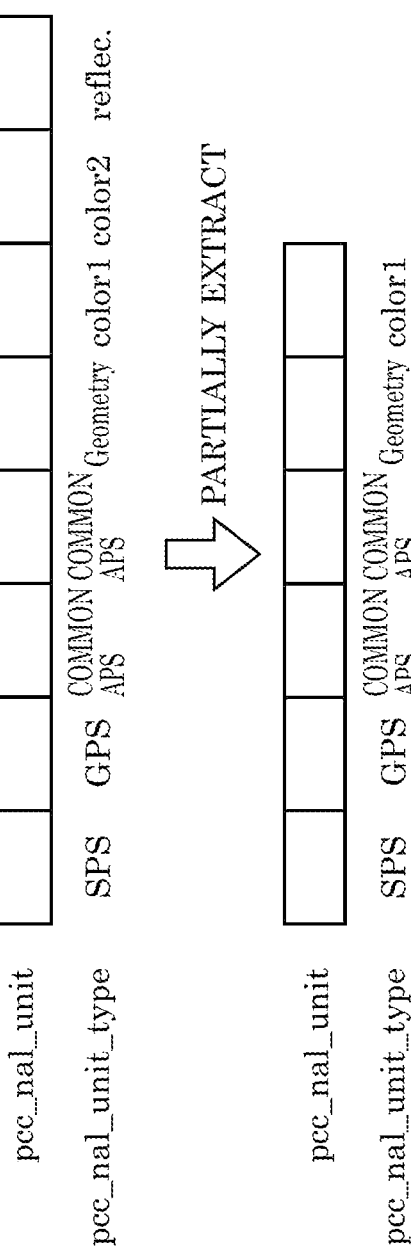
Figure 82:
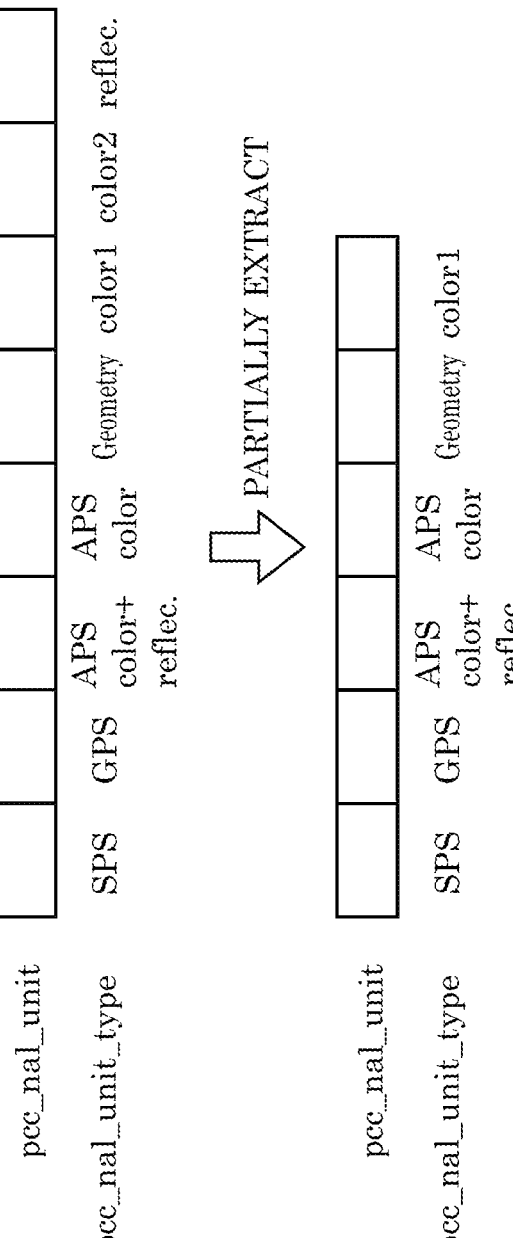
Figure 83:
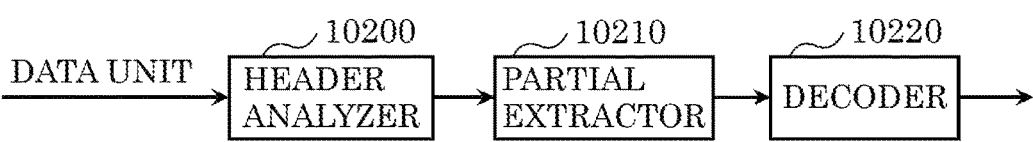
Figure 84:
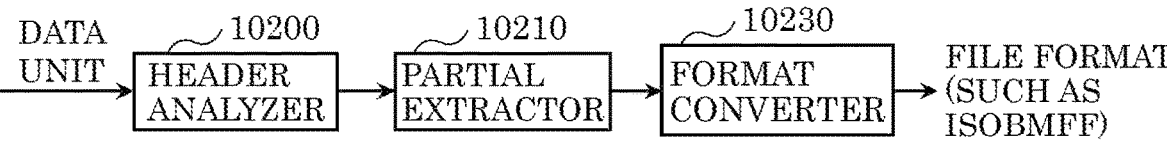
Figure 85:
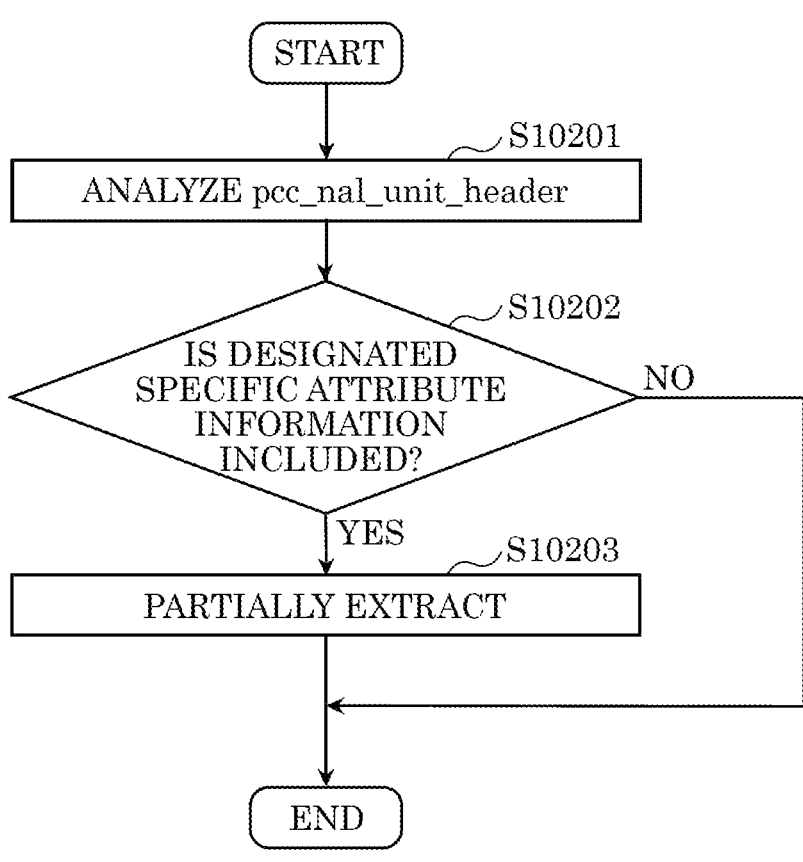
Figure 86:
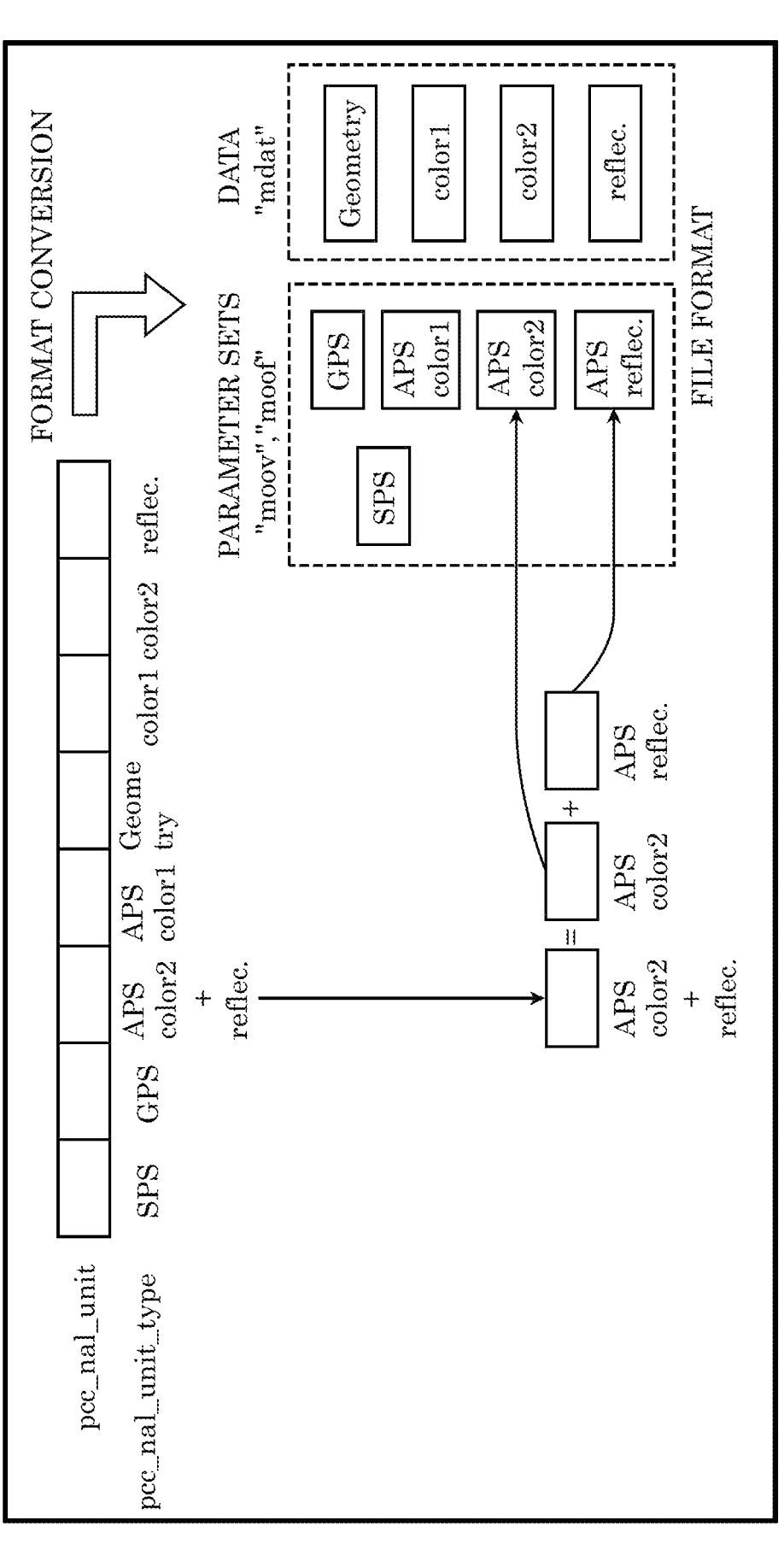
Figure 87:
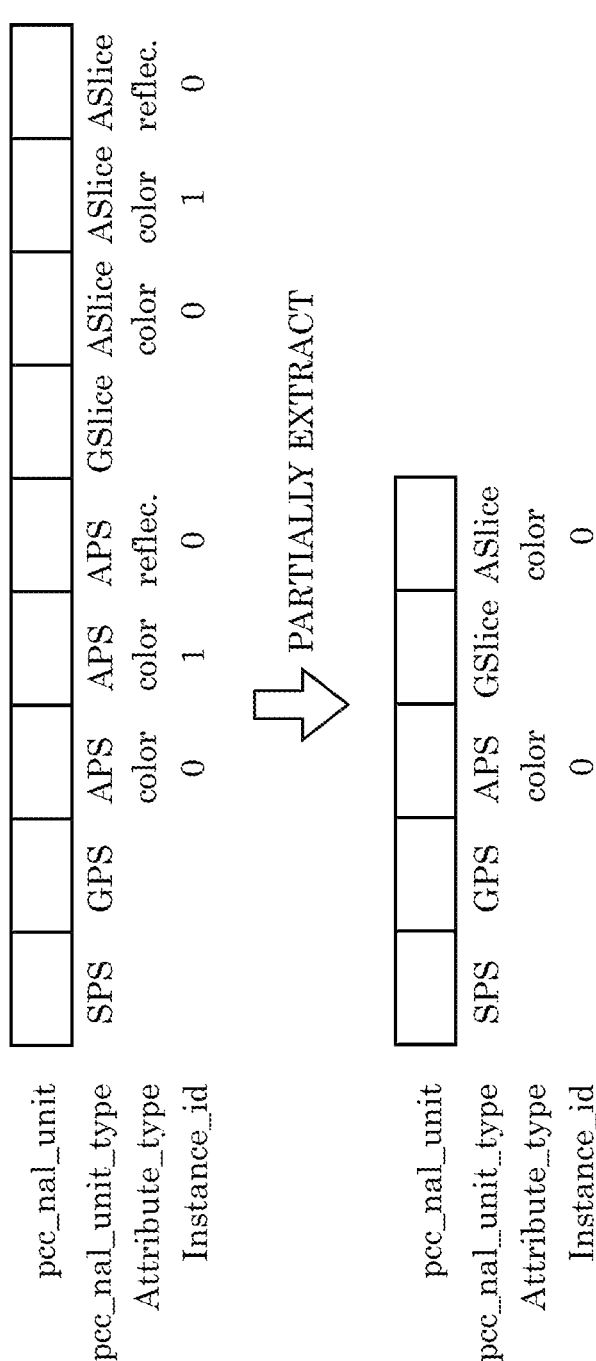
Figure 89:
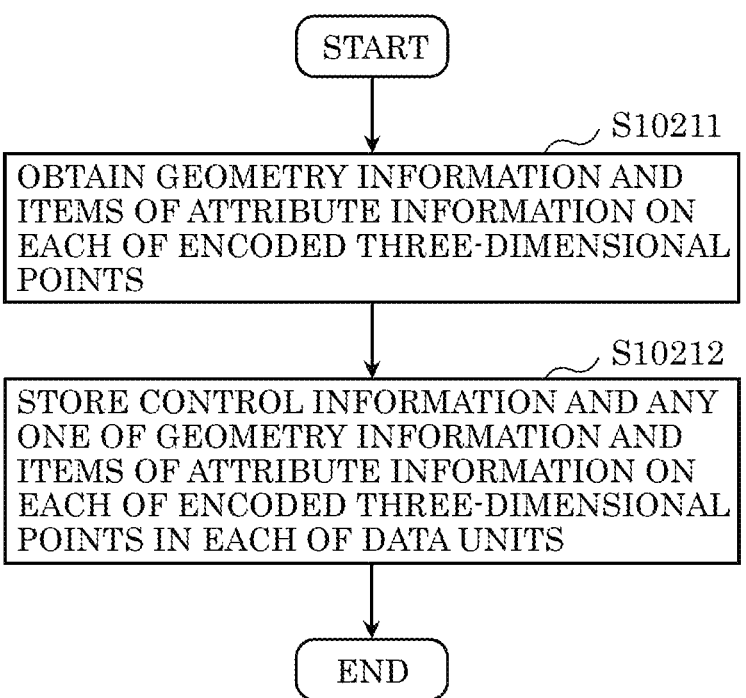
Figure 90:
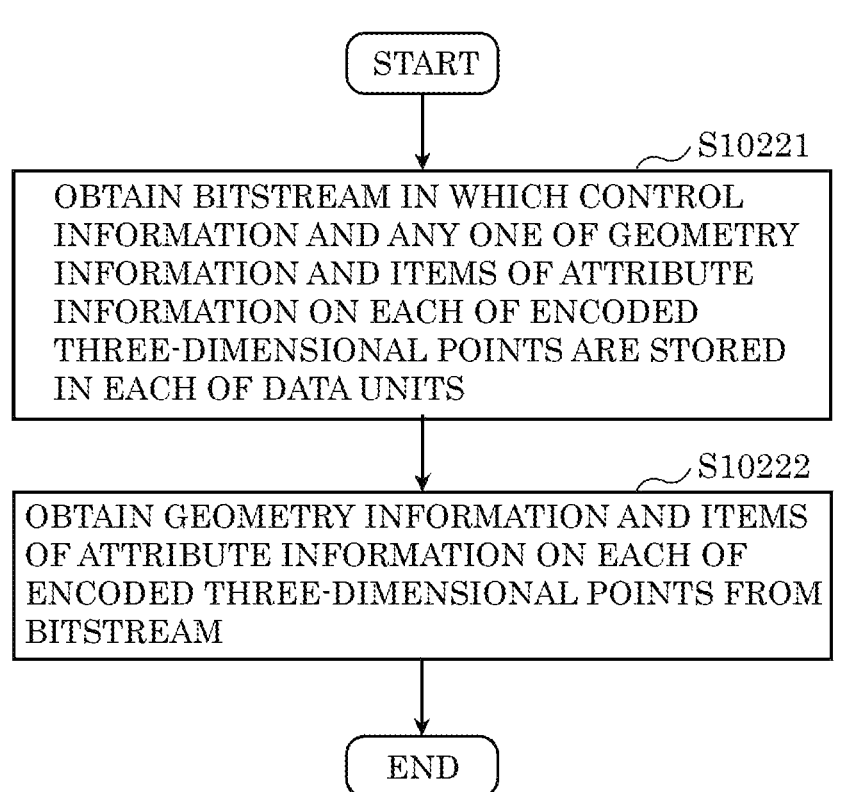
Figure 91:
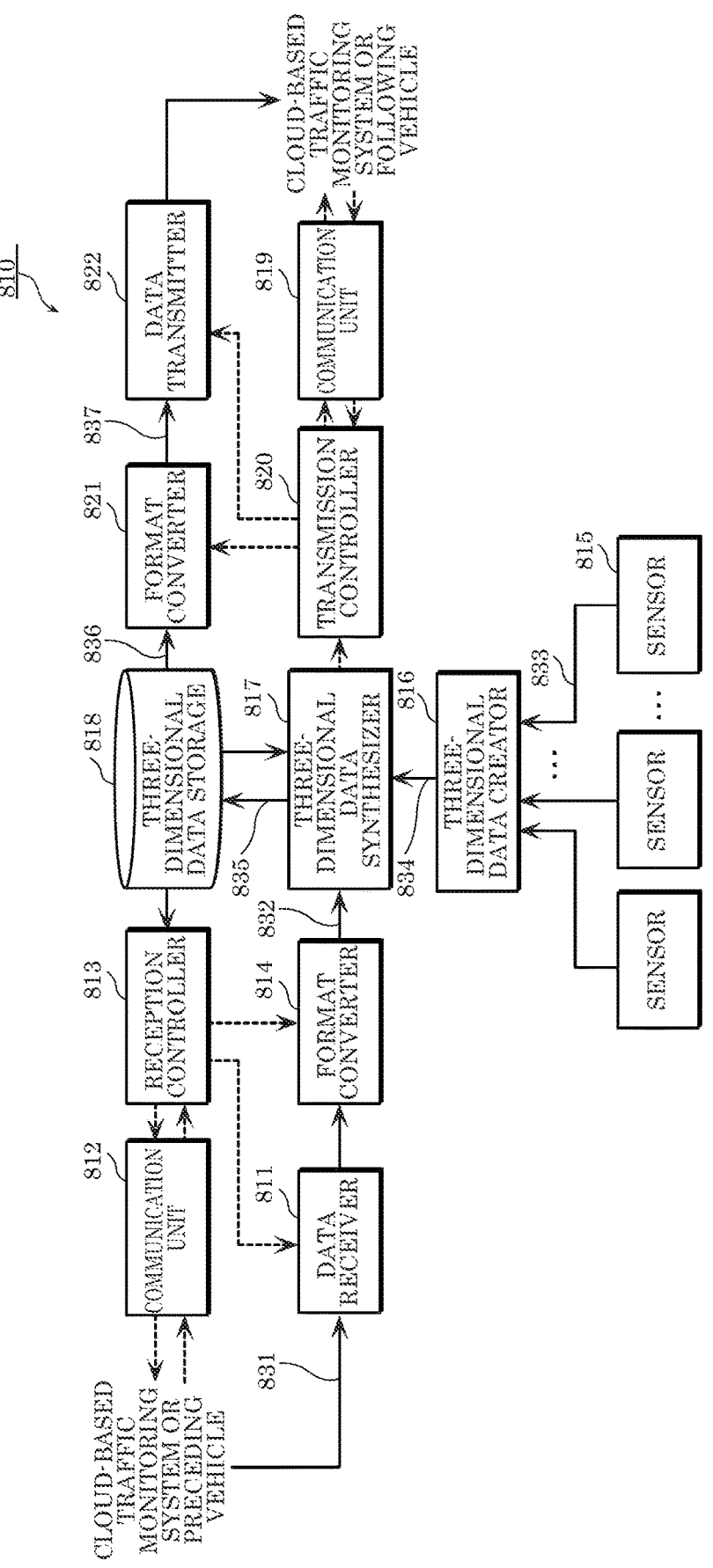
Figure 92:
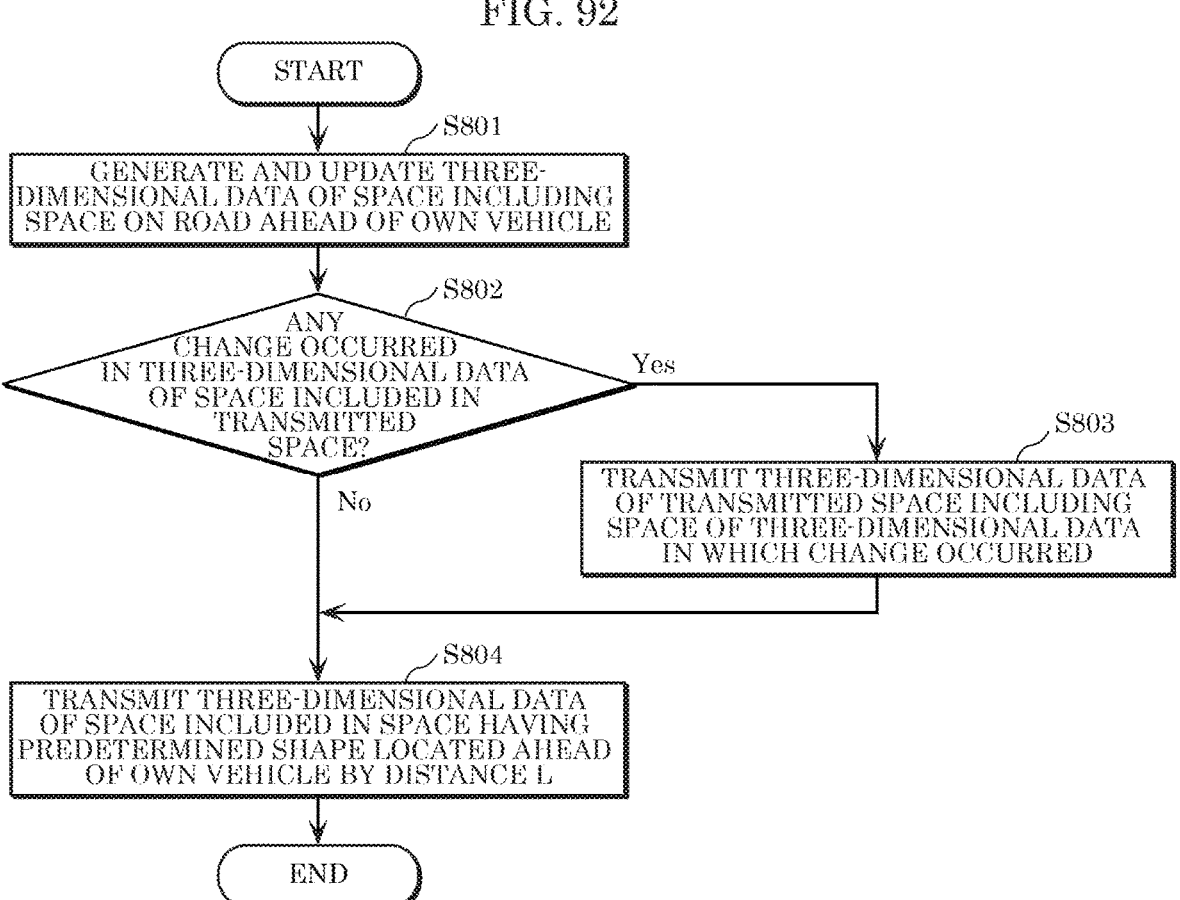
Figure 93:
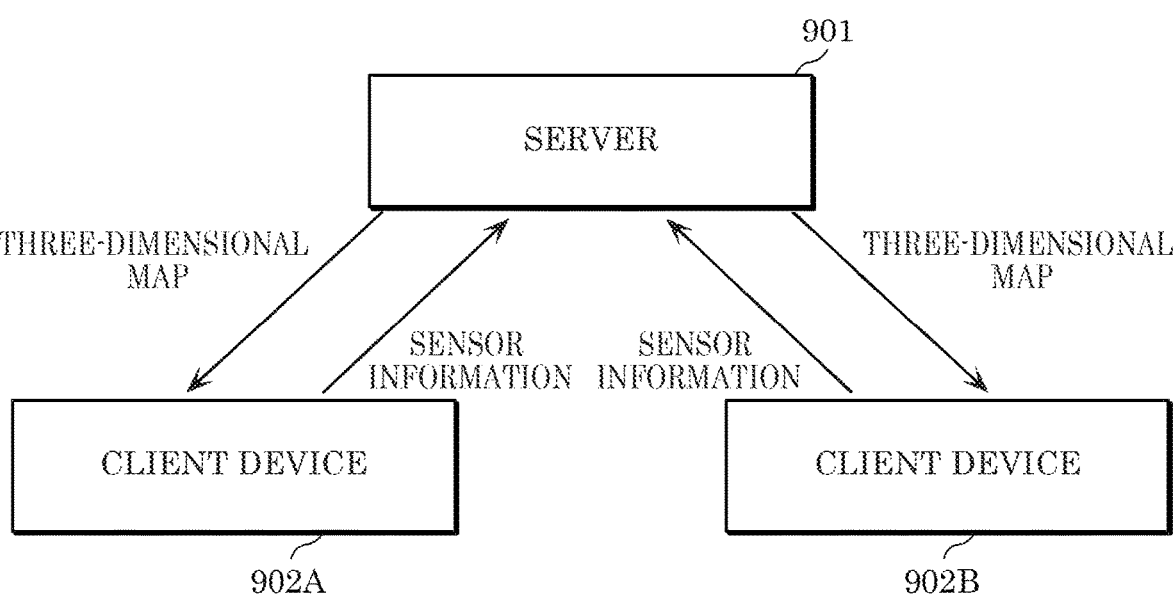

FIG. 70 is a flowchart of processing performed by a three-dimensional data encoding device according to Embodiment 7;

FIG. 71 is a flowchart of processing performed by a three-dimensional data decoding device according to Embodiment 7;

FIG. 72 is a diagram showing a relationship between SPS, APS, and the header of attribute information according to Embodiment 8;

FIG. 73 is a flowchart of an encoding process according to Embodiment 8;

FIG. 74 is a flowchart of a decoding process according to Embodiment 8;

Figure 75:
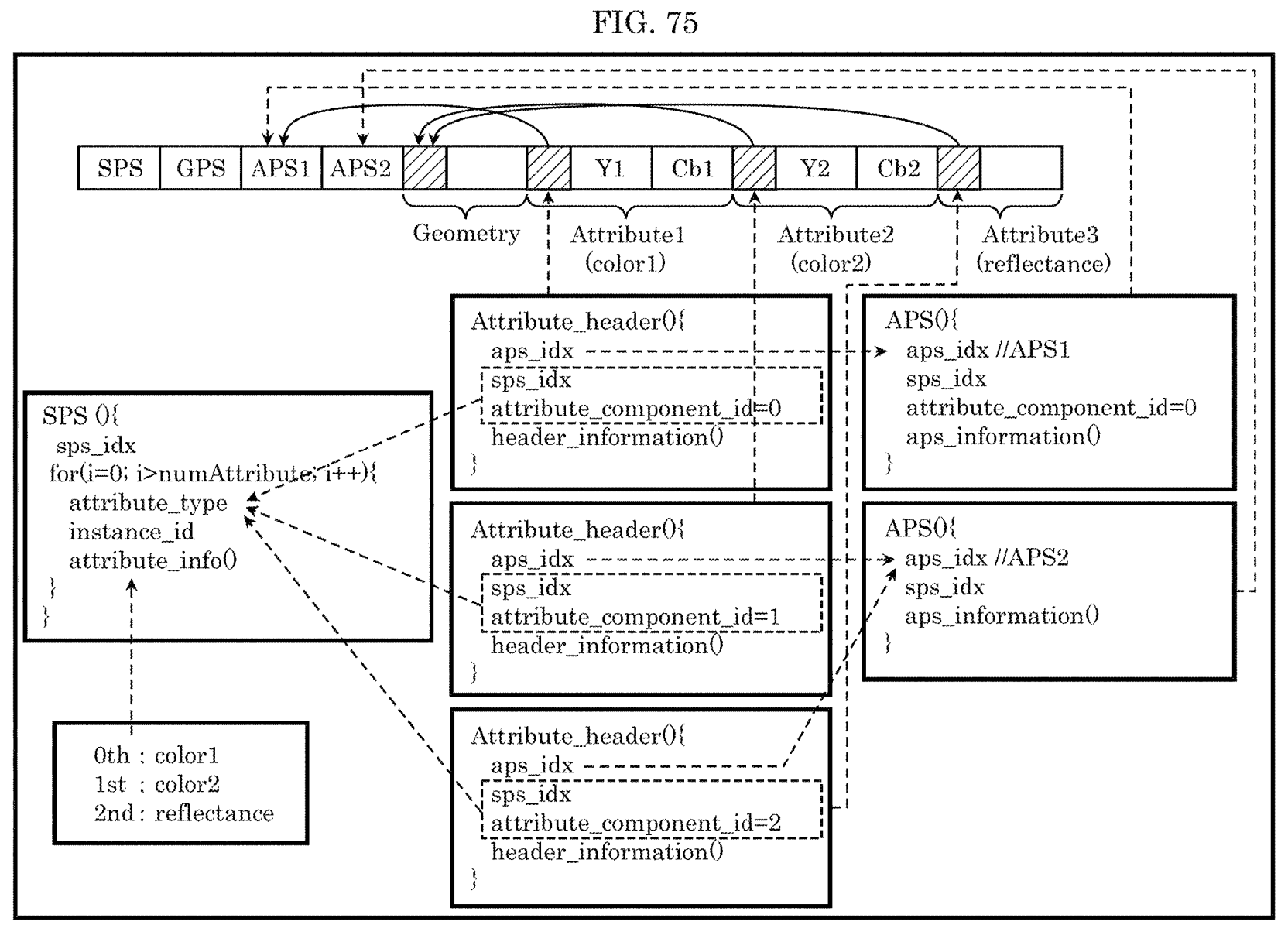

FIG. 75 is a diagram for describing the relationship among a bitstream, an SPS, APSs, and attribute information headers according to Embodiment 9;

FIG. 76 is a diagram illustrating a structure example of a bitstream according to Embodiment 9;

FIG. 77 is a diagram illustrating an example of semantics of pcc_nal_unit_type according to Embodiment 9;

FIG. 78 is a diagram illustrating a first example of a syntax in a case where pcc_nal_unit_type in pcc_nal_unit_header is a parameter set of attribute information, according to Embodiment 9;

FIG. 79 is a diagram illustrating a second example of a syntax in a case where pcc_nal_unit_type in pcc_nal_unit_header is a parameter set of attribute information, according to Embodiment 9;

FIG. 80 is a diagram for describing a first example of a partial extraction method according to Embodiment 9;

FIG. 81 is a diagram for describing a second example of the partial extraction method according to Embodiment 9;

FIG. 82 is a diagram for describing a third example of the partial extraction method according to Embodiment 9;

FIG. 83 is a block diagram illustrating an example of the configuration of a processing device according to Embodiment 9;

FIG. 84 is a block diagram illustrating another example of the configuration of the processing device according to Embodiment 9;

FIG. 85 is a flowchart illustrating an example of a process in which the processing device according to Embodiment 9 partially extracts designated specific attribute information from point-cloud encoded data including the designated specific attribute information;

FIG. 86 is a diagram for describing an example of data format conversion performed by the processing device according to Embodiment 9;

FIG. 87 is a diagram for describing instance_id according to Embodiment 9;

FIG. 88 is a diagram illustrating a syntax example of pcc_nal_unit_header according to Embodiment 9;

FIG. 89 is a flowchart illustrating a process in a three-dimensional data encoding device according to Embodiment 9;

FIG. 90 is a flowchart illustrating a process in a three-dimensional data decoding device according to Embodiment 9;

FIG. 91 is a block diagram of a three-dimensional data creation device according to Embodiment 10;

FIG. 92 is a flowchart of a three-dimensional data creation method according to Embodiment 10;

FIG. 93 is a diagram showing a structure of a system according to Embodiment 10;

Figure 94:
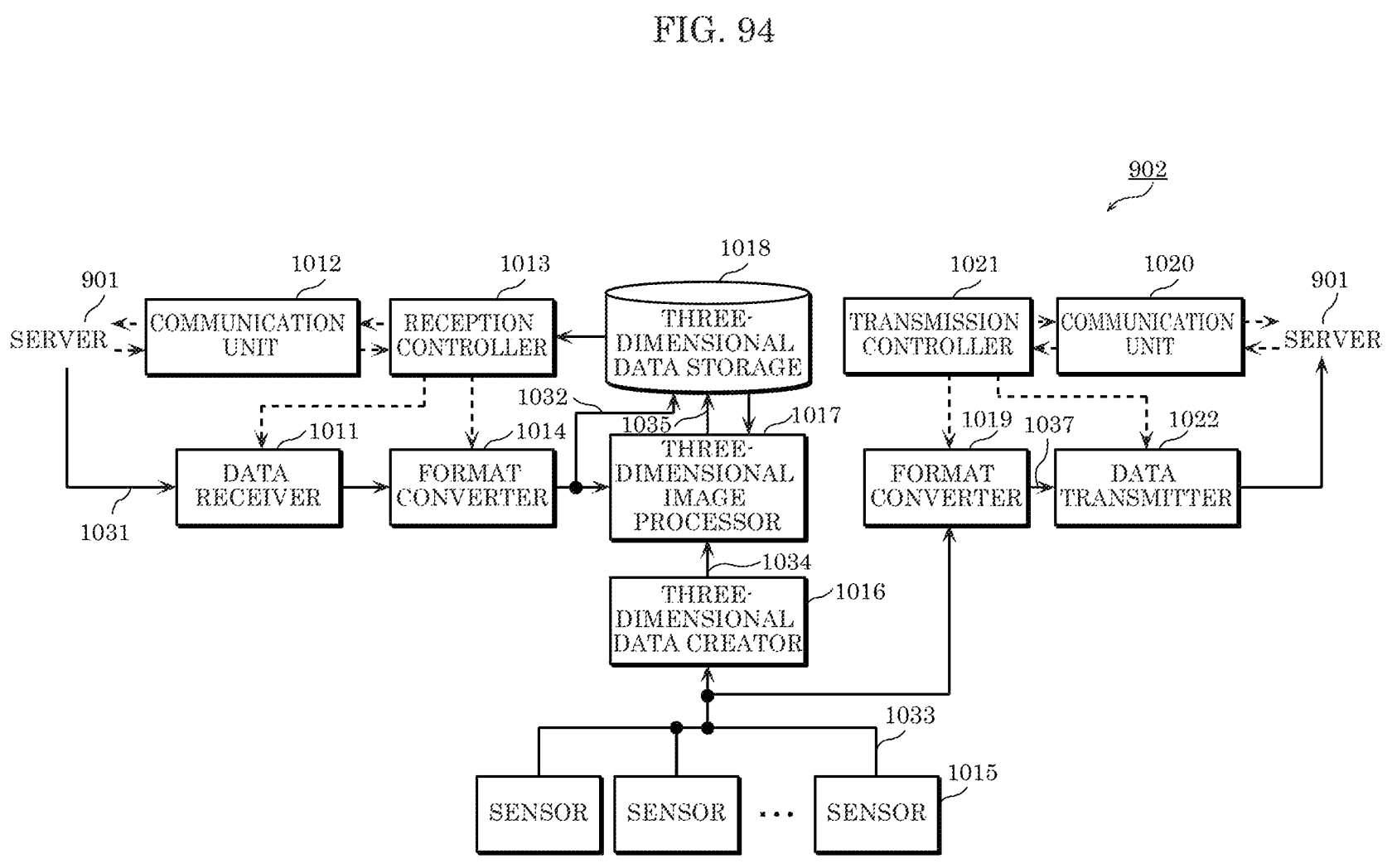

FIG. 94 is a block diagram of a client device according to Embodiment 10;

6

Figure 100:
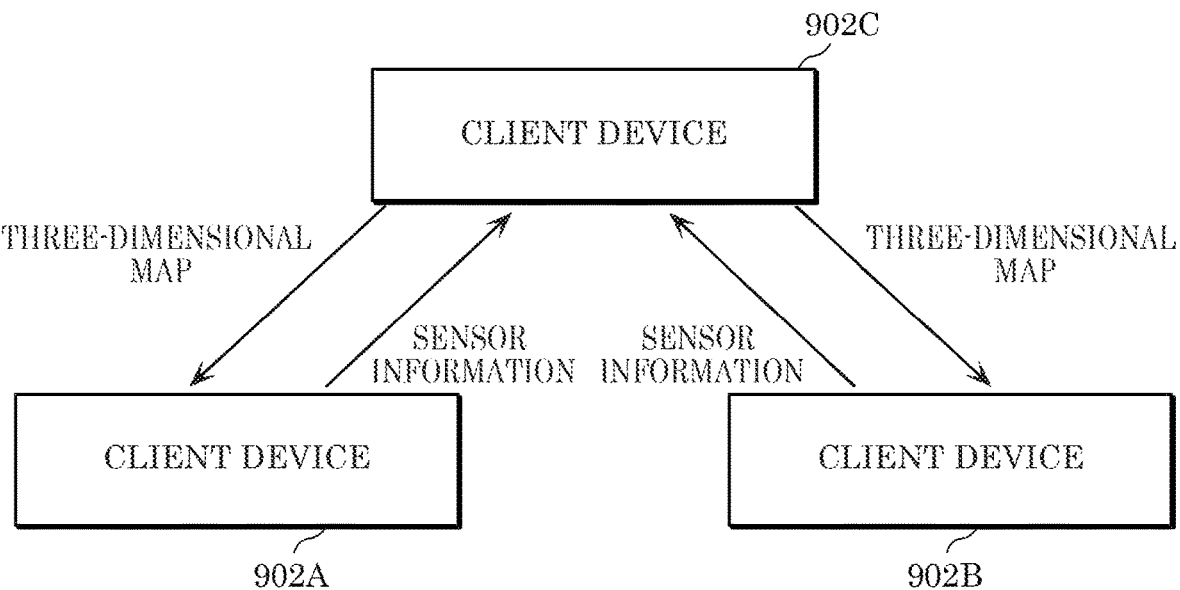
Figure 101:
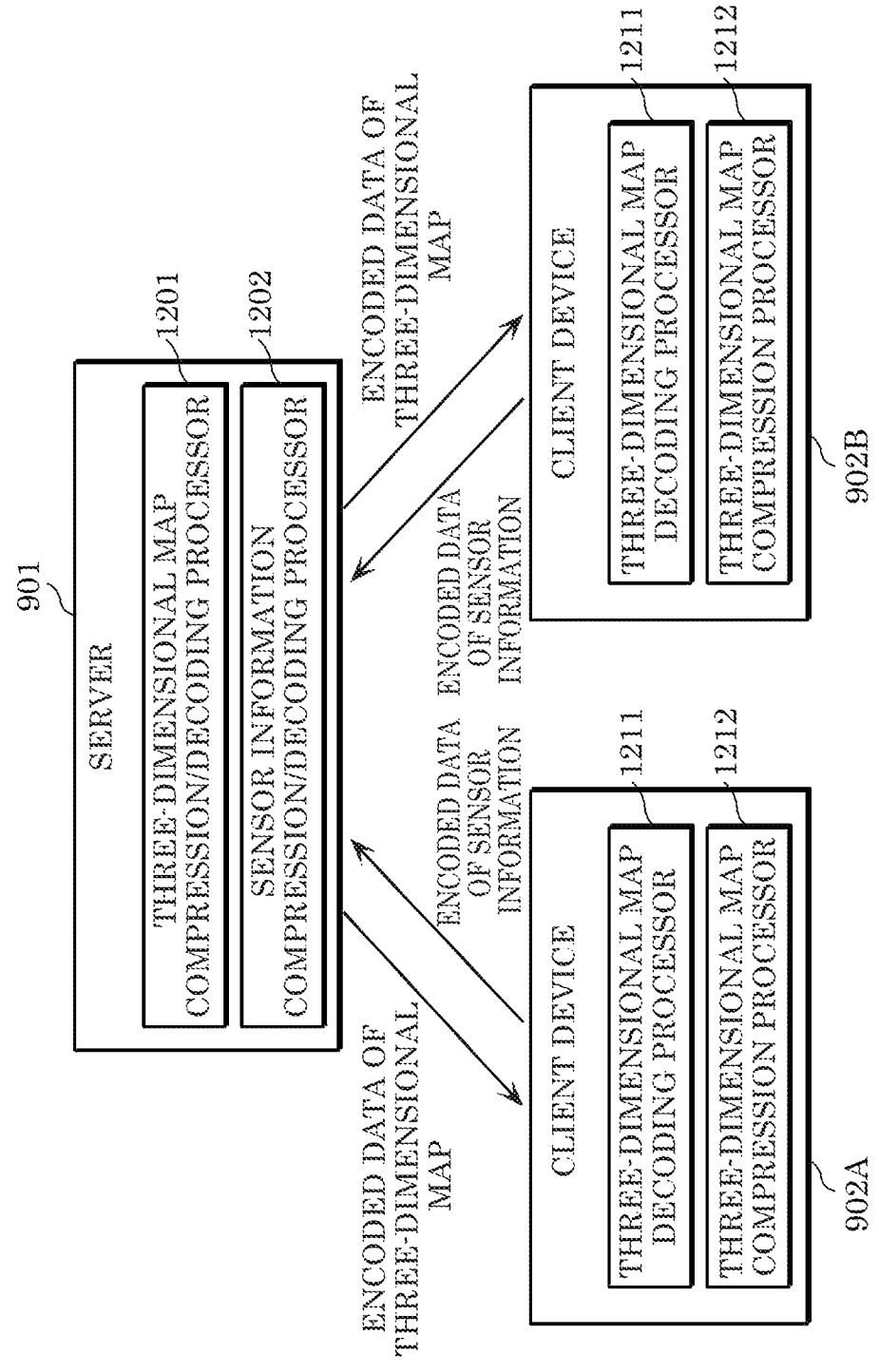
Figure 103:
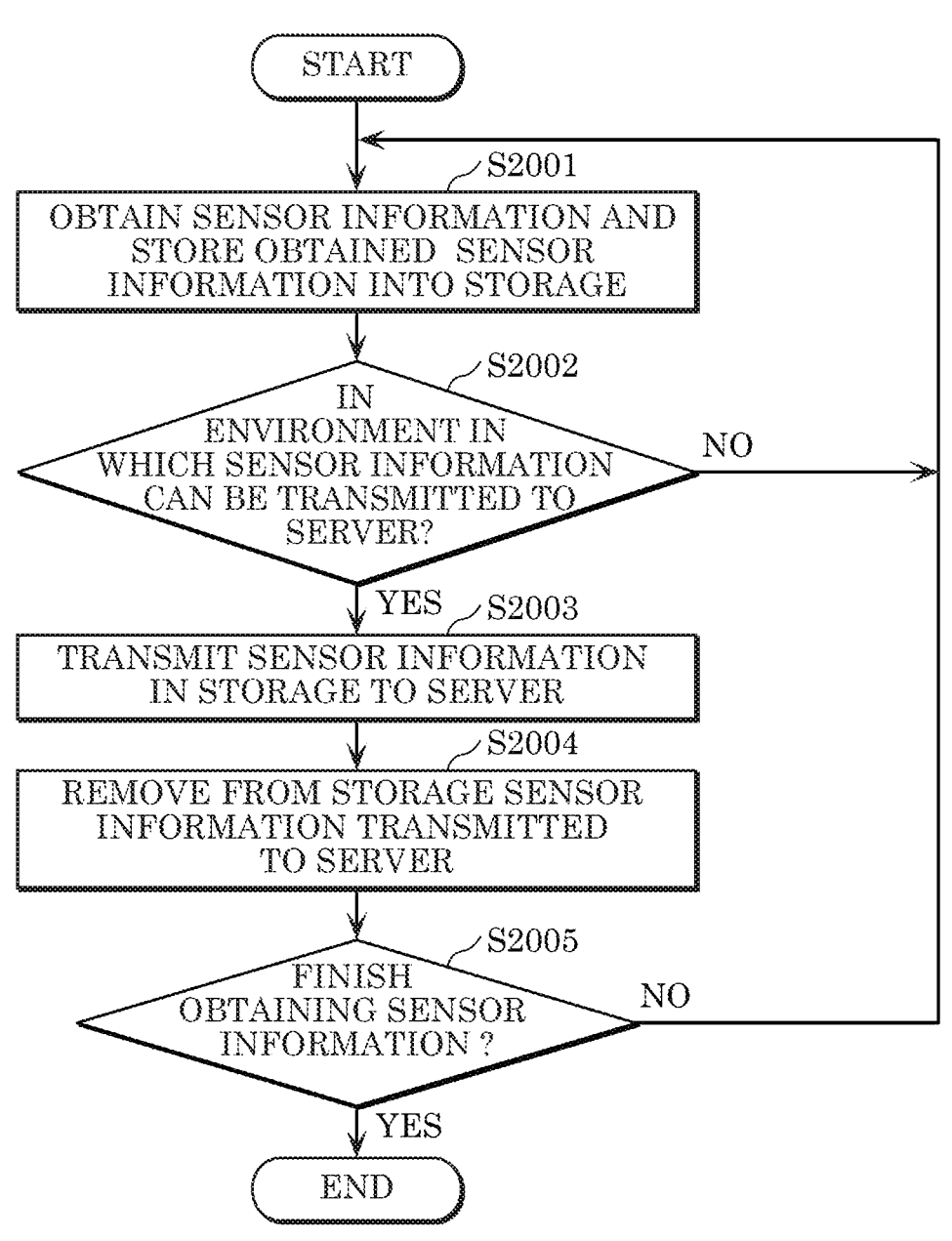
Figure 104:
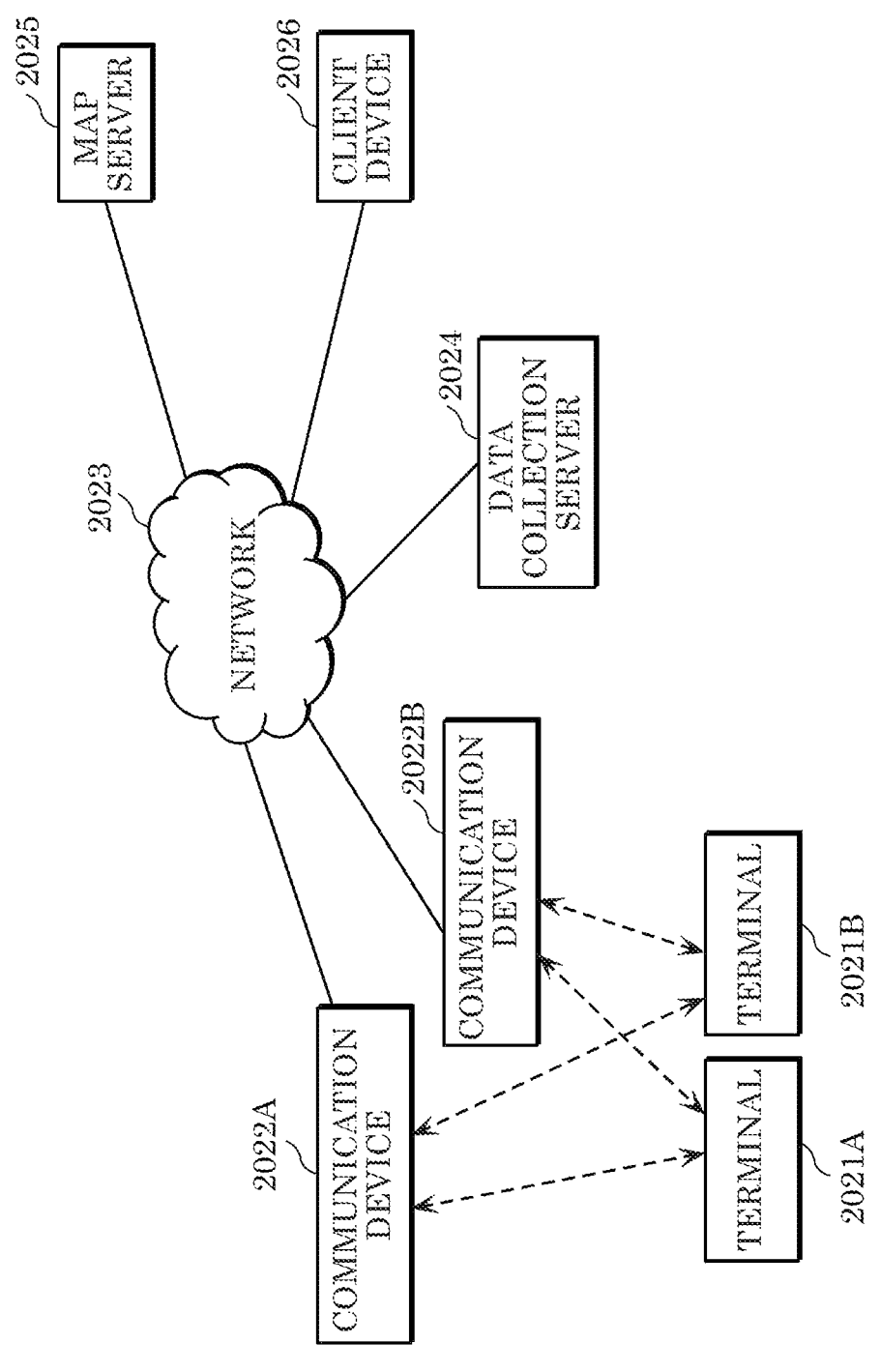
Figure 105:
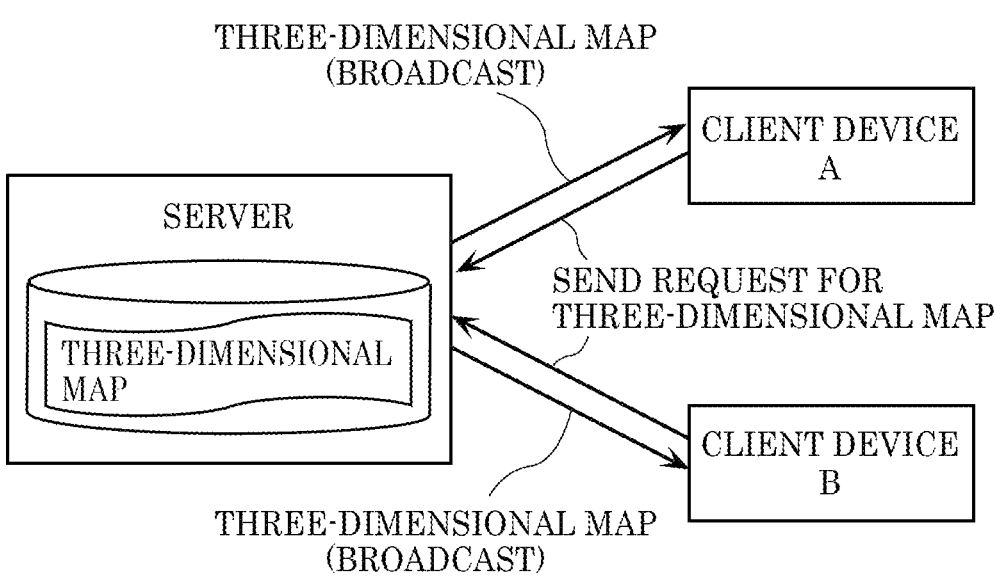
Figure 106:
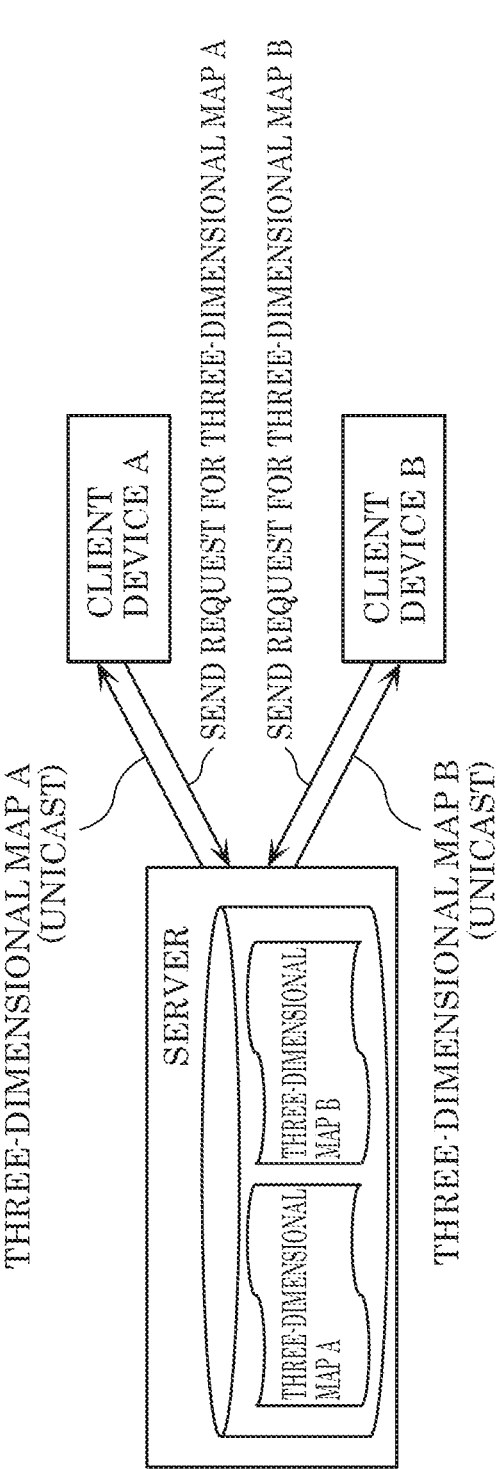
Figure 107:
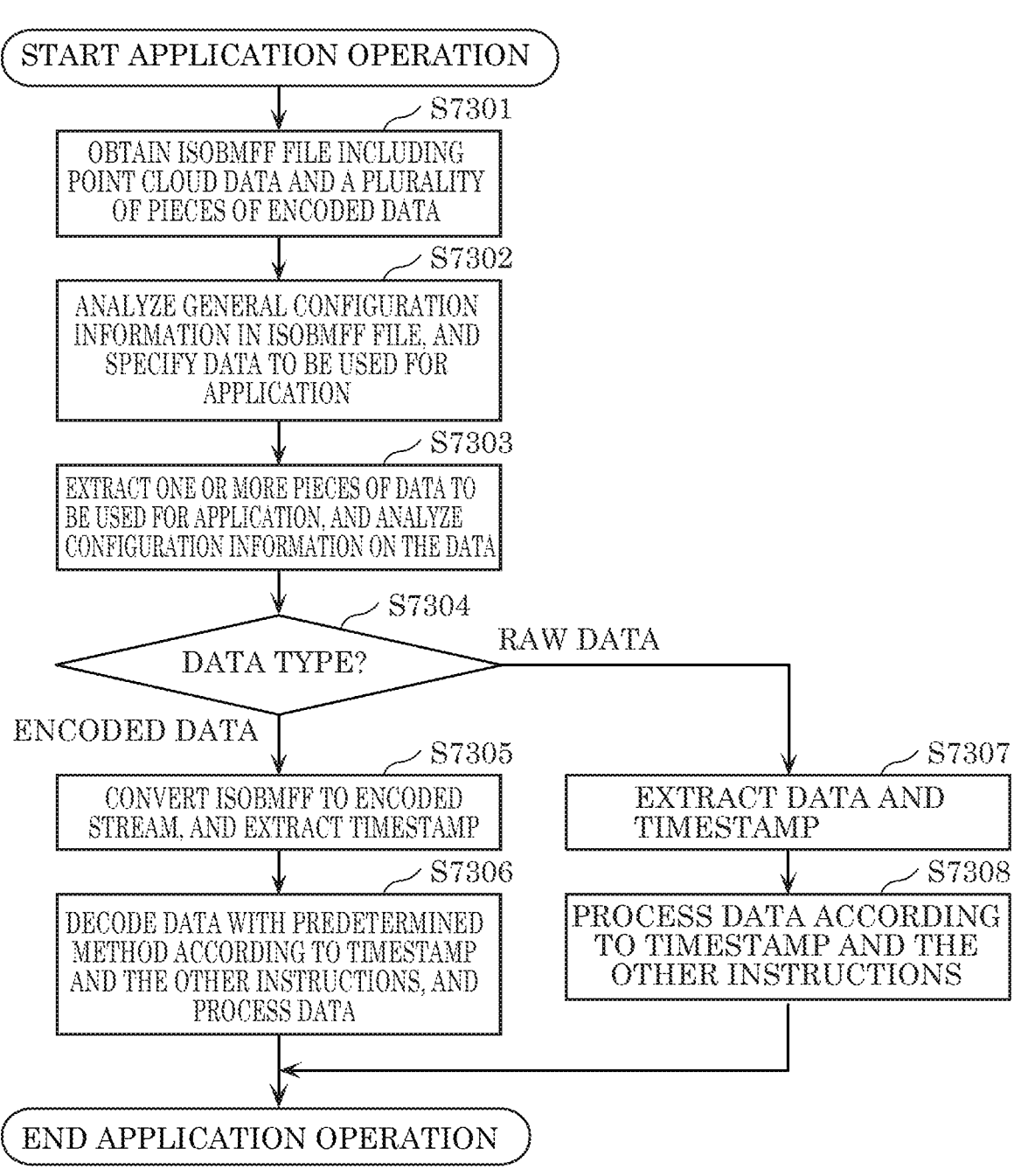
Figure 108:
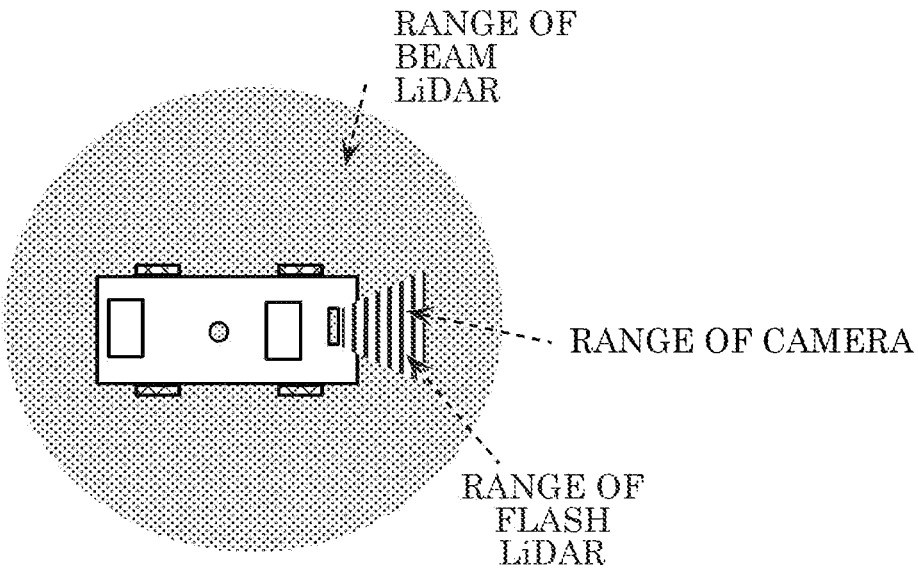
Figure 109:
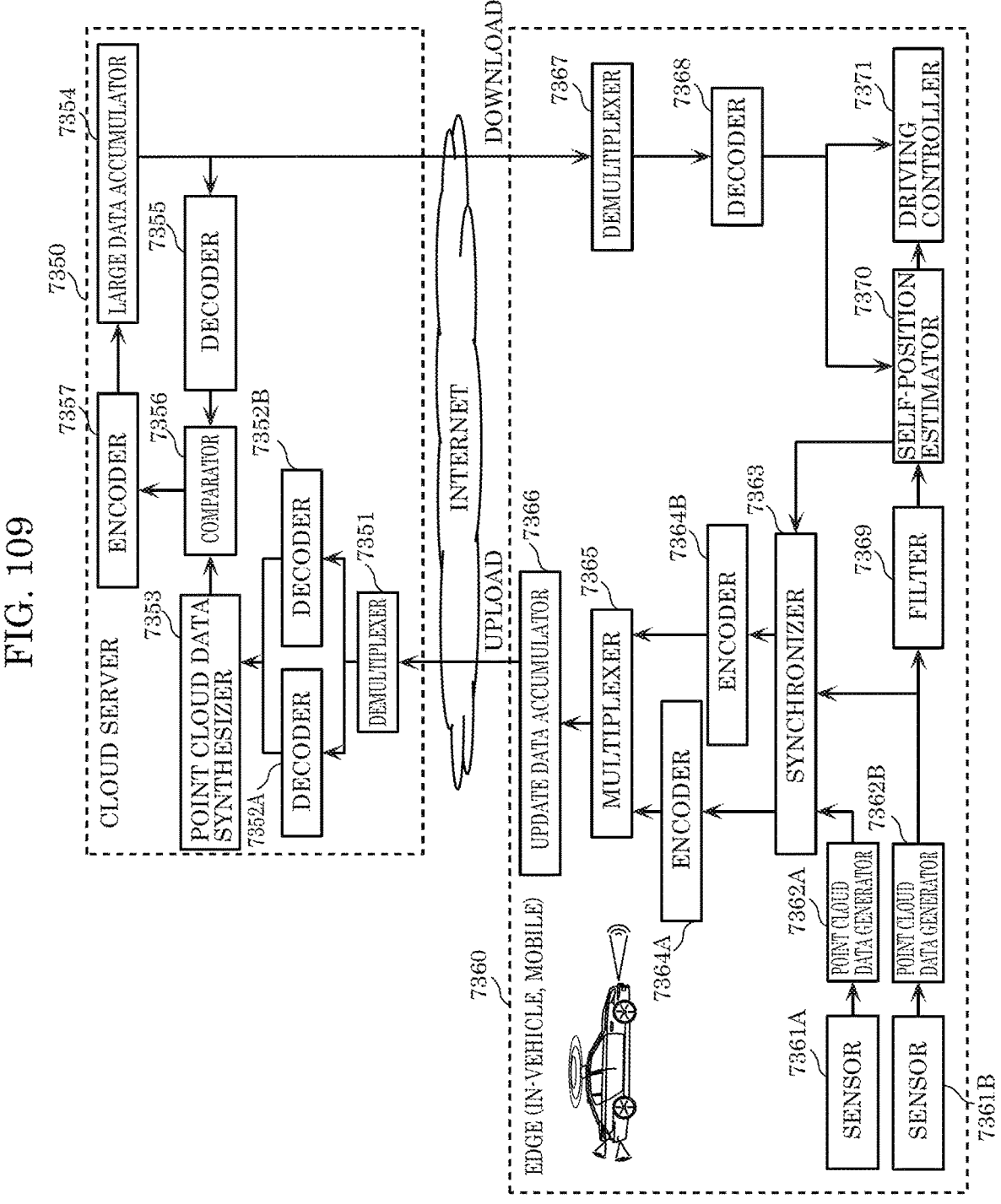
Figure 110:
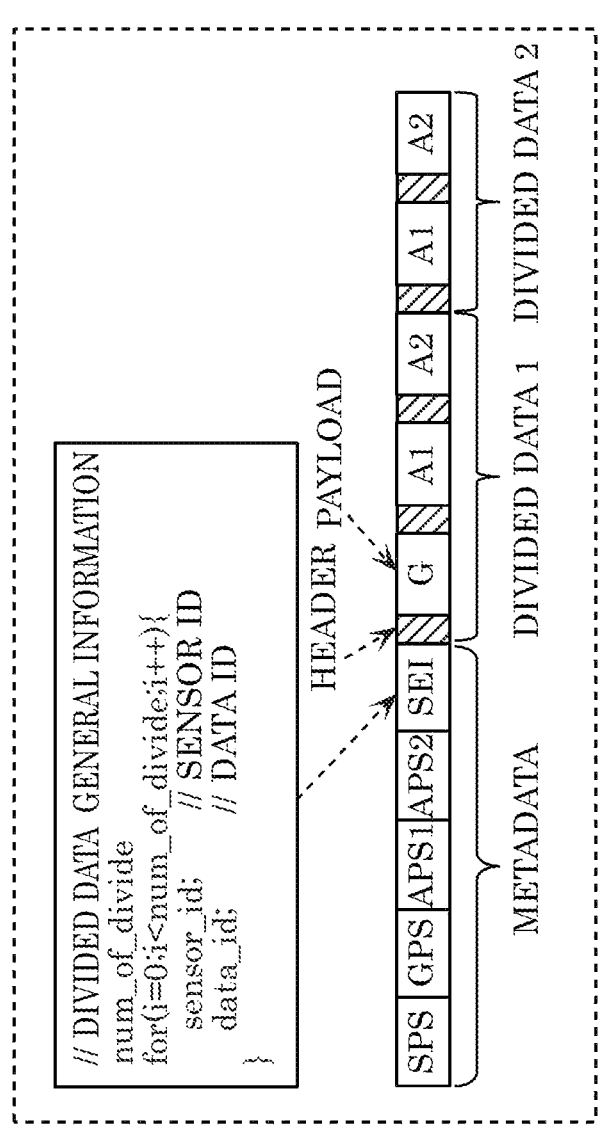
Figure 111:
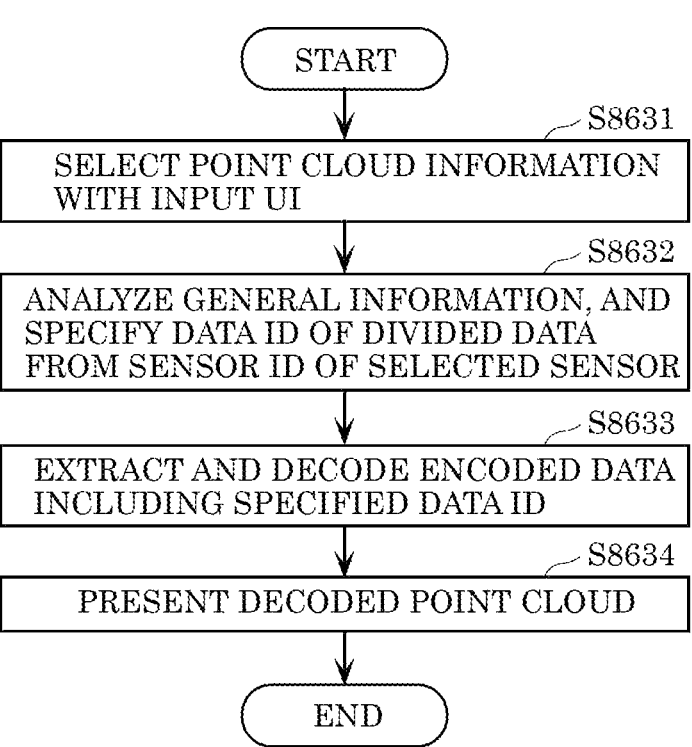
Figure 112:
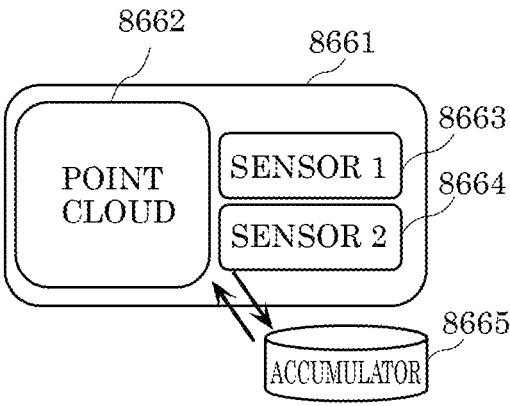
Figure 113:
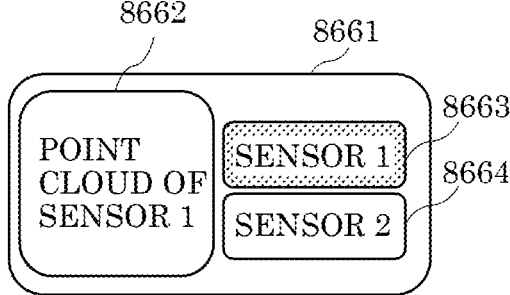
Figure 114:
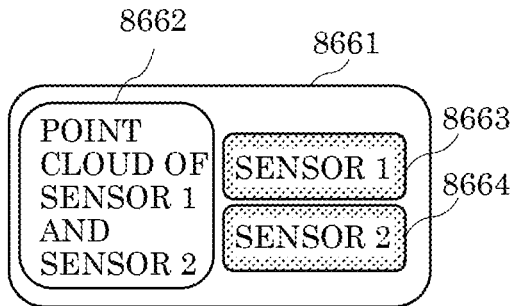

FIG. 95 is a block diagram of a server according to Embodiment 10;

FIG. 96 is a flowchart of a three-dimensional data creation process performed by the client device according to Embodiment 10;

FIG. 97 is a flowchart of a sensor information transmission process performed by the client device according to Embodiment 10;

FIG. 98 is a flowchart of a three-dimensional data creation process performed by the server according to Embodiment 10;

FIG. 99 is a flowchart of a three-dimensional map transmission process performed by the server according to Embodiment 10;

FIG. 100 is a diagram showing a structure of a variation of the system according to Embodiment 10;

FIG. 101 is a diagram showing a structure of the server and client devices according to Embodiment 10;

Figure 102:
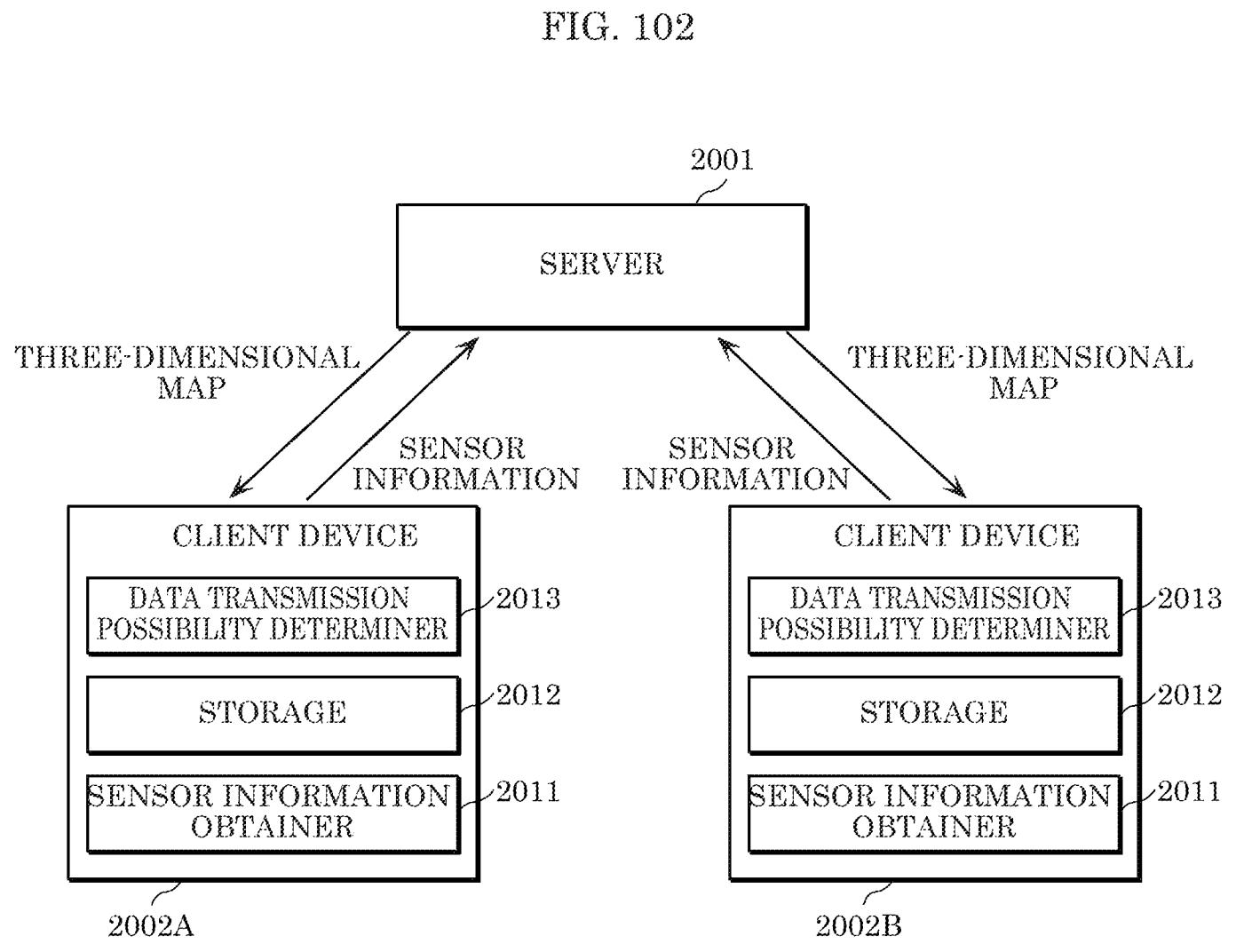

FIG. 102 is a diagram illustrating a configuration of a server and a client device according to Embodiment 10;

FIG. 103 is a flowchart of a process performed by the client device according to Embodiment 10;

FIG. 104 is a diagram illustrating a configuration of a sensor information collection system according to Embodiment 10;

FIG. 105 is a diagram illustrating an example of a system according to Embodiment 10;

FIG. 106 is a diagram illustrating a variation of the system according to Embodiment 10;

FIG. 107 is a flowchart illustrating an example of an application process according to Embodiment 10;

FIG. 108 is a diagram illustrating the sensor range of various sensors according to Embodiment 10;

FIG. 109 is a diagram illustrating a configuration example of an automated driving system according to Embodiment 10;

FIG. 110 is a diagram illustrating a configuration example of a bitstream according to Embodiment 10;

FIG. 111 is a flowchart of a point cloud selection process according to Embodiment 10;

FIG. 112 is a diagram illustrating a screen example for point cloud selection process according to Embodiment 10;

FIG. 113 is a diagram illustrating a screen example of the point cloud selection process according to Embodiment 10; and FIG. 114 is a diagram illustrating a screen example of the point cloud selection process according to Embodiment 10.

DETAILED DESCRIPTION OF THE EMBODIMENTS

A three-dimensional data encoding method according to an aspect of the present disclosure includes: obtaining an item of geometry information and items of attribute information of each of encoded three-dimensional points; and storing an item of control information and any one of the item of geometry information and the items of attribute information of the encoded three-dimensional points into each of data units. The item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

According to the above, checking the control information enables determining whether a data unit stores geometry information or attribute information on an encoded three-dimensional point without the need for processing such as decoding the encoded three-dimensional point. Further, if the data unit stores attribute information on the encoded three-dimensional point, checking the control information enables determining the type of the attribute information without the need for processing such as decoding the encoded three-dimensional point. Thus, the processing amount for identifying the information stored in the data unit can be reduced.

Furthermore, for example, the three-dimensional data encoding method according to an aspect of the present disclosure further includes storing, into any one of the data units, attribute information identifiers which are numerical values indicating the items of attribute information of the encoded three-dimensional points. In the storing of the item of control information and any one of the item of geometry information and the items of attribute information of the encoded three-dimensional points in each of the data units, the items of attribute information of the encoded three-dimensional points are stored into each of the data units in an order corresponding to the numerical values of the attribute information identifiers.

According to the above, which item of attribute information is indicated by each attribute information identifier can be determined without information associating the items of attribute information with the attribute information identifiers.

Furthermore, for example, the data units into which item of control information is stored belong to a system layer.

That is, the control information is stored in the system layer, which is higher than a coding layer in which encoded data is stored. According to the above, it is possible to determine whether a data unit belonging to the system layer stores geometry information or attribute information on an encoded three-dimensional point without the need for processing such as decoding the encoded three-dimensional point belonging to the coding layer. Thus, the processing amount for identifying the information stored in the data unit can be further reduced.

Furthermore, for example, when a first type and a second type different from the first type are included among attribute types of the items of attribute information of the encoded three-dimensional points, the item of control information includes an item of attribute type information indicating any one of a first identifier indicating the first type, a second identifier indicating the second type, and a third identifier indicating both the first type and the second type.

According to the above, the third identifier can be used to indicate attribute information that does not need to be differentiated between the first type or the second type. For example, this may allow multiple items of attribute information to be designated with only the third identifier in extracting and using only some of the items of attribute information in the bitstream. Thus, the data amount in extracting some of the items of attribute information can be reduced.

Furthermore, for example, when the items of attribute information of the encoded three-dimensional points include items of attribute information having a same attribute type, the item of control information includes an item of instance identification information for identifying each of the items of attribute information having the same attribute type.

According to the above, checking the control information enables obtaining the details of attribute information on an encoded three-dimensional point without the need for processing such as decoding the attribute information.

Furthermore, for example, the three-dimensional data decoding method according to an aspect of the present disclosure includes: obtaining a bitstream in which an item of control information and any one of an item of geometry information and items of attribute information of each of encoded three-dimensional points are stored in each of data units; and obtaining the item of geometry information and the items of attribute information of each of the encoded three-dimensional points from the bitstream. The item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

According to the above, checking the control information enables determining whether a data unit stores geometry information or attribute information on an encoded three-dimensional point without the need for processing such as decoding the encoded three-dimensional point. Further, if the data unit stores attribute information on the encoded three-dimensional point, checking the control information enables determining the type of the attribute information without the need for processing such as decoding the encoded three-dimensional point. Thus, the processing amount for identifying the information stored in the data unit can be reduced.

Furthermore, for example, in the obtaining of the item of geometry information and the items of attribute information of each of the encoded three-dimensional points, at least one item of attribute information of an encoded three-dimensional point among the items of attribute information of each of the encoded three-dimensional points is obtained, the at least one item of attribute information satisfying a predetermined condition based on the item of control information.

According to the above, checking the control information enables extracting any appropriate one of the items of attribute information without the need for processing such as decoding an encoded three-dimensional point.

Furthermore, for example, attribute information identifiers are stored into any one of the data units, the attribute information identifiers being numerical values indicating the items of attribute information of the encoded three-dimensional points, and each of the attribute information identifiers indicates an order of a corresponding one of the items of attribute information of the encoded three-dimensional points in the data units and the item of attribute information with which the numerical value of the attribute information identifier matches.

According to the above, which item of attribute information is indicated by each attribute information identifier can be determined without information associating the items of attribute information with the attribute information identifiers.

Furthermore, for example, the data units into which item of control information is stored belong to a system layer.

That is, the control information is stored in the system layer, which is higher than a coding layer in which encoded data is stored. According to the above, it is possible to determine whether a data unit belonging to the system layer stores geometry information or attribute information on an encoded three-dimensional point without the need for processing such as decoding the encoded three-dimensional point belonging to the coding layer. Thus, the processing amount for identifying the information stored in the data unit can be further reduced.

Furthermore, for example, when a first type and a second type different from the first type are included among attribute types of the items of attribute information of the encoded three-dimensional points, the item of control information includes an item of attribute type information indicating any one of a first identifier indicating the first type, a second identifier indicating the second type, and a third identifier indicating both the first type and the second type.

According to the above, the third identifier can be used to indicate attribute information that does not need to be differentiated between the first type or the second type. For example, this may allow multiple items of attribute information to be designated with only the third identifier in extracting and using only some of the items of attribute information in the bitstream. In such a case, the data amount in extracting some of the items of attribute information can be reduced.

Furthermore, for example, when the items of attribute information of the encoded three-dimensional points include items of attribute information having a same attribute type, the item of control information includes an item of instance identification information for identifying each of the items of attribute information having the same attribute type.

According to the above, checking the control information enables obtaining the details of attribute information on an encoded three-dimensional point without the need for processing such as decoding the attribute information.

A three-dimensional data encoding device according to an aspect of the present disclosure includes: a processor; and memory. Using the memory, the processor: obtains an item of geometry information and items of attribute information of each of encoded three-dimensional points; and stores an item of control information and any one of the item of geometry information and the items of attribute information of the encoded three-dimensional points into each of data units. The item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

For example, a three-dimensional data decoding device may receive, from the three-dimensional data encoding device, a bitstream including the control information and the encoded three-dimensional points. According to the above, the three-dimensional data decoding device can check the control information to determine whether a data unit stores geometry information or attribute information on an encoded three-dimensional point without the need for processing such as decoding the encoded three-dimensional point. Further, if the data unit stores attribute information on the encoded three-dimensional point, the three-dimensional data decoding device can check the control information to determine the type of the attribute information without the need for processing such as decoding the encoded three-dimensional point. Thus, the processing amount for identifying the information stored in the data unit can be reduced.

A three-dimensional data decoding device according to an aspect of the present disclosure includes: a processor; and memory. Using the memory, the processor: obtains a bitstream in which an item of control information and any one of an item of geometry information and items of attribute information of each of encoded three-dimensional points are stored in each of data units; and obtains the item of geometry information and the items of attribute information of each of the encoded three-dimensional points from the bitstream. The item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

According to the above, for example, the three-dimensional data decoding device can check the control information to determine whether a data unit stores geometry information or attribute information on an encoded three-dimensional point without the need for processing such as decoding the encoded three-dimensional point. Further, if the data unit stores attribute information on the encoded three-dimensional point, the three-dimensional data decoding device can check the control information to determine the type of the attribute information without the need for processing such as decoding the encoded three-dimensional point. Thus, the processing amount for identifying the information stored in the data unit can be reduced.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, structural components, the arrangement and connection of the structural components, steps, the processing order of the steps, etc., indicated in the following embodiments are mere examples, and thus are not intended to limit the present disclosure. Among the structural components described in the following embodiments, structural components not recited in any one of the independent claims which show the broadest concepts will be described as optional structural components.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as Point Cloud Compression (PCC).

With regard to this embodiment, a configuration of PCC-encoded data that involves two codecs, a first encoding method and a second encoding method, and a method of storing the encoded data in a system format will be described.

Figure 1:
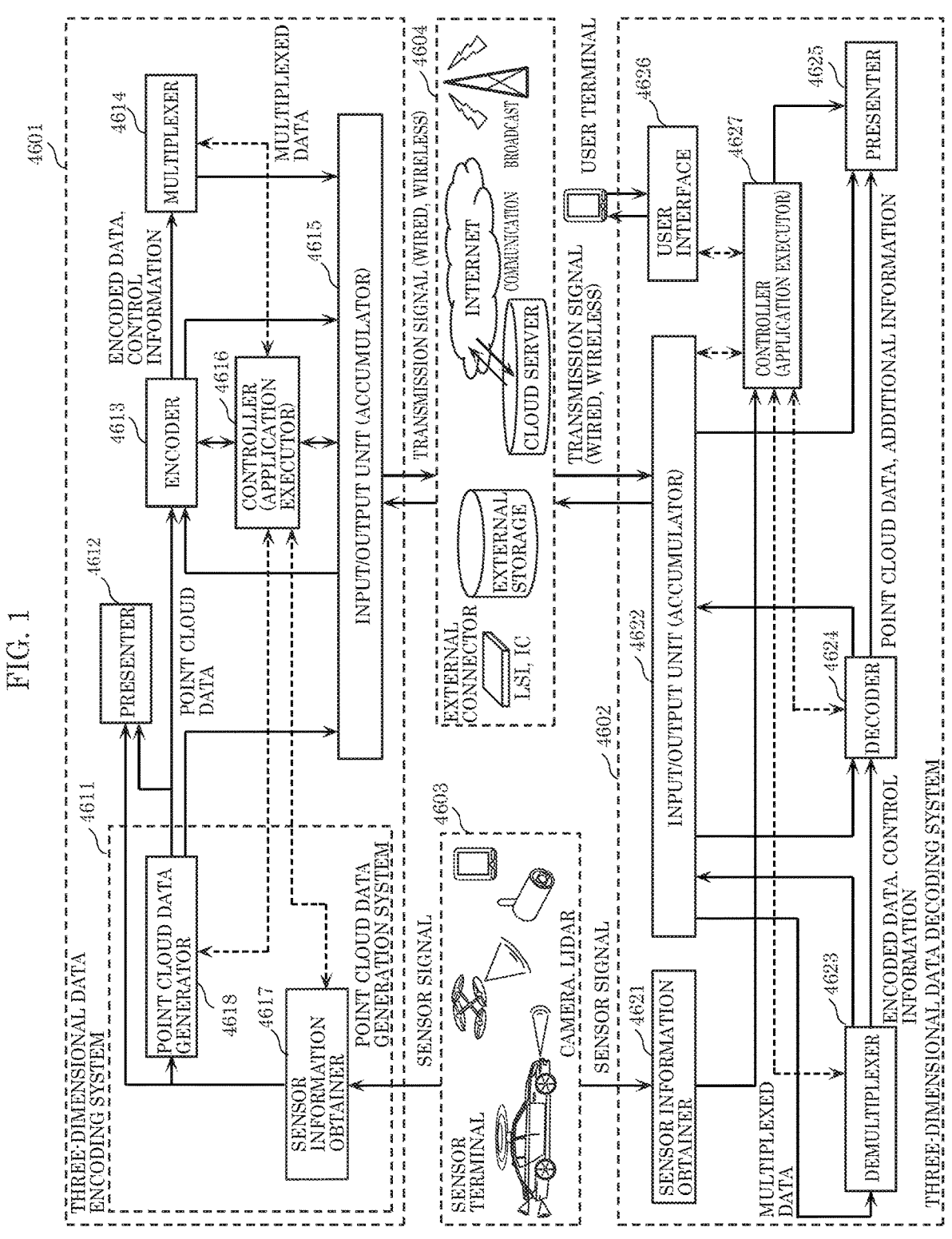
FIG. 1 is a diagram illustrating a configuration of a three-dimensional data encoding and decoding system according to Embodiment 1.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory.

Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LIDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
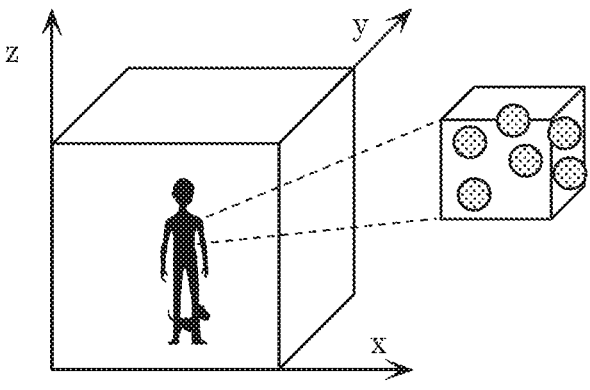
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One piece of attribute information may be associated with one piece of geometry information, or attribute information on a plurality of different types of attributes may be associated with one piece of geometry information. Alternatively, a plurality of pieces of attribute information on the same type of attribute may be associated with one piece of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
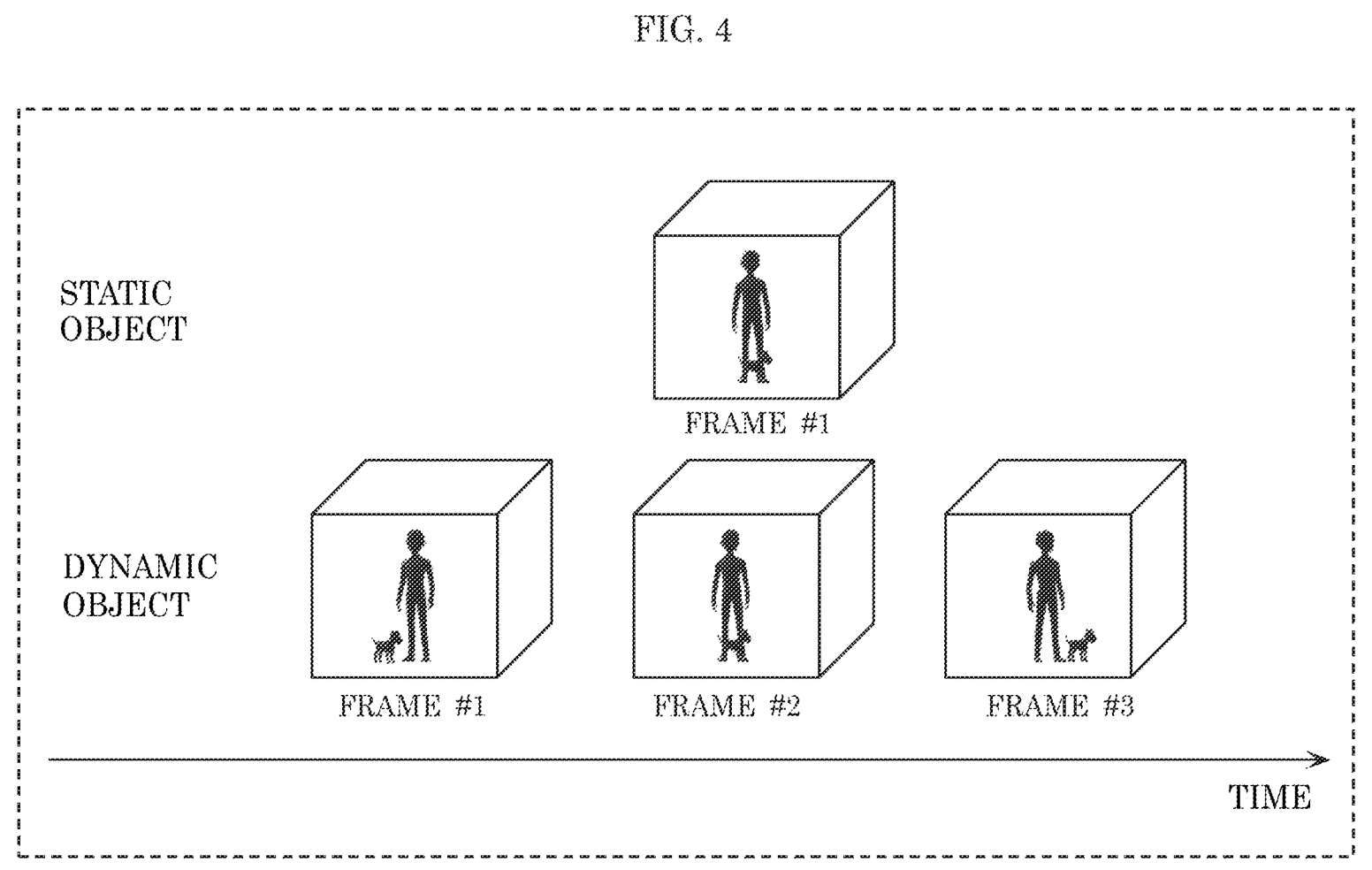

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LIDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
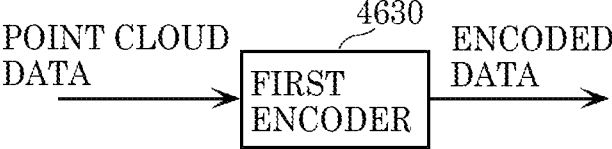
FIG. 5 is a diagram illustrating a structure of a first encoder according to Embodiment 1.
Figure 6:
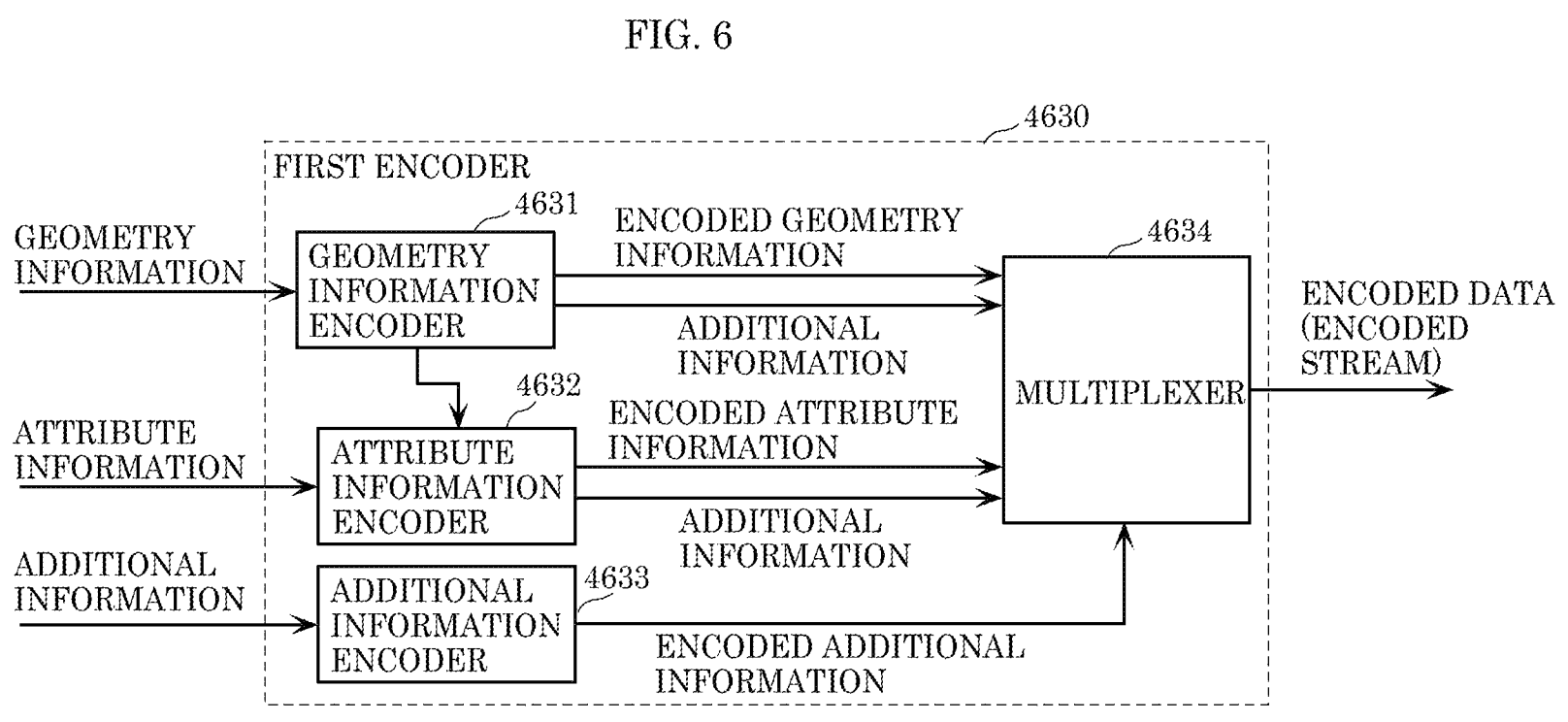

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (current node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
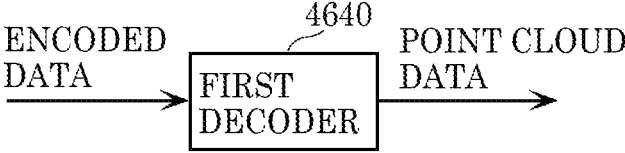
FIG. 7 is a diagram illustrating a structure of a first decoder according to Embodiment 1.
Figure 8:
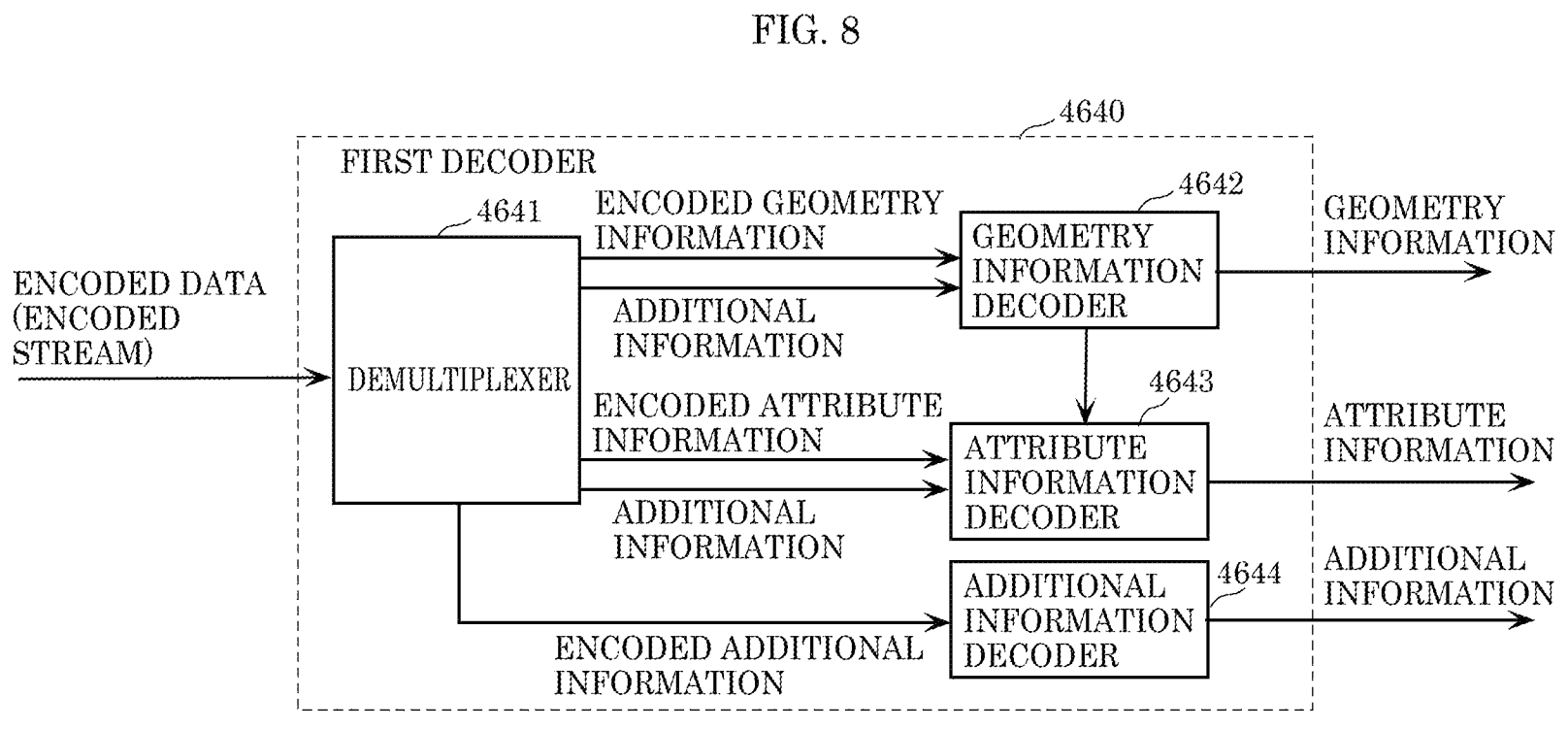

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream)

encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
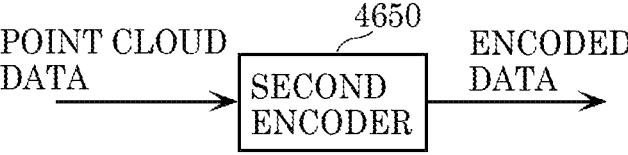
FIG. 9 is a diagram illustrating a structure of a second encoder according to Embodiment 1.
Figure 10:
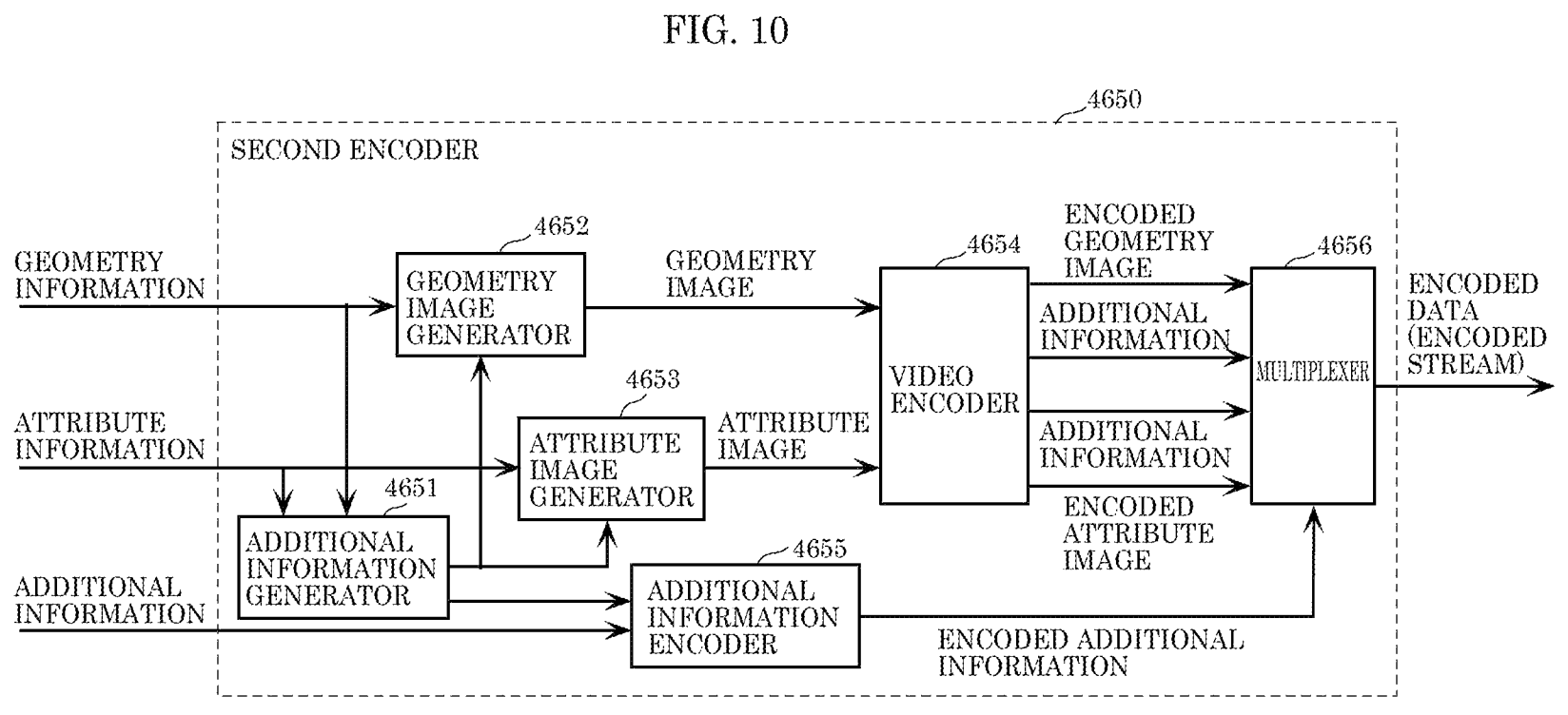

Next, second encoder 4650, which is an example of encoder 4613 that performs encoding in the second encoding method, will be described. FIG. 9 is a diagram showing a configuration of second encoder 4650. FIG. 10 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 11:
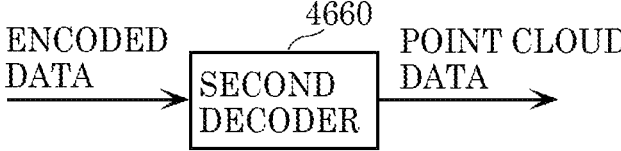
FIG. 11 is a diagram illustrating a structure of a second decoder according to Embodiment 1.
Figure 12:
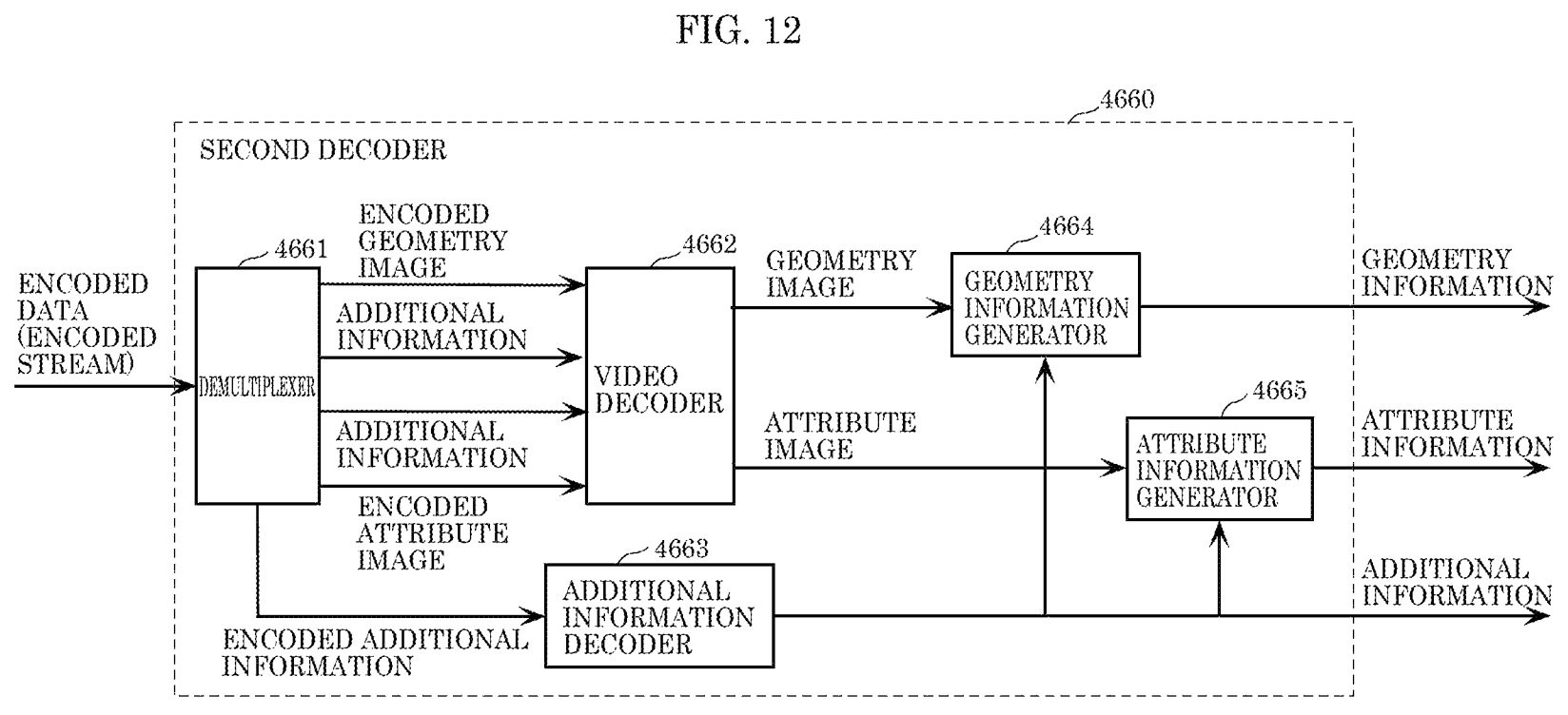

Next, second decoder 4660, which is an example of decoder 4624 that performs decoding in the second encoding method, will be described. FIG. 11 is a diagram showing a configuration of second decoder 4660. FIG. 12 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 13:
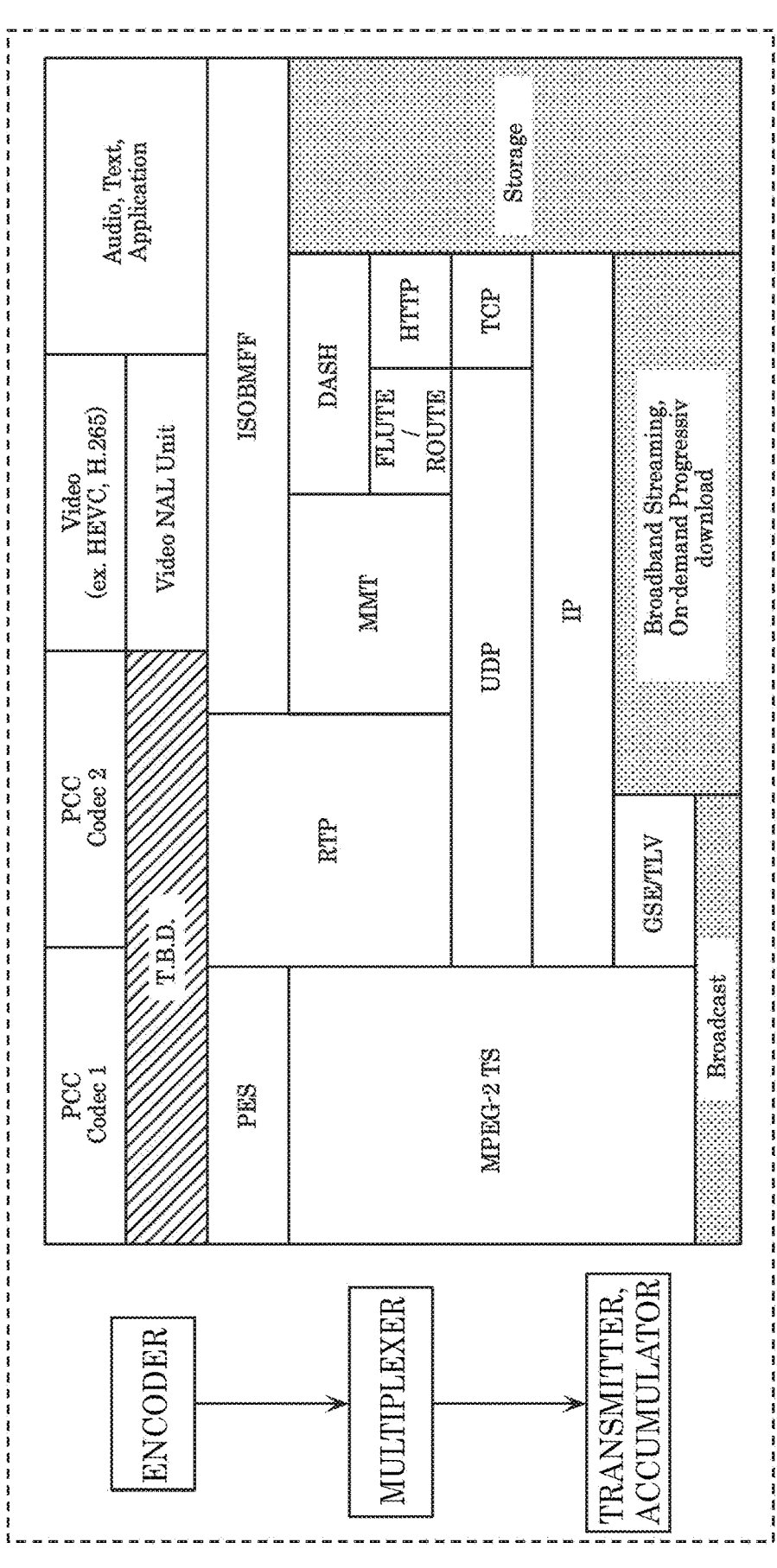
FIG. 13 is a diagram illustrating a protocol stack related to PCC encoded data according to Embodiment 1.

In the following, a problem with the PCC encoding scheme will be described. FIG. 13 is a diagram showing a protocol stack relating to PCC-encoded data. FIG. 13 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

In the following, a way of defining a NAL unit according to this embodiment will be described. For example, with a conventional codec, such as HEVC, a NAL unit in one format is defined for one codec. However, there has been no method that supports a format that involves two codecs, that is, the first encoding method and the second encoding method, such as PCC (such a codec will be referred to as a PCC codec, hereinafter).

In this embodiment, a format that is common to the PCC codecs is defined for a NAL unit, and an identifier of a NAL unit that depends on the PCC codec is also defined. FIG. 14 is a diagram showing a protocol stack in such a case. FIGS. 15 to 17 are diagrams illustrating an example of a NAL unit format common to the codecs. FIG. 15 is a diagram showing a syntax example of a common PCC NAL unit. FIG. 16 is a diagram showing a syntax example of a common PCC NAL unit header. FIG. 17 is a diagram showing a semantics example of pcc_codec_type. FIG. 18 is a diagram showing a semantics example of pcc_nal_unit_type, and shows an example of definitions of the NAL unit type that depends on the codec.

As a NAL unit format, a NAL unit format that is common to the PCC codecs is defined. A NAL unit (pcc_nal_unit)

includes a header (pcc_nal_unit_header), a payload (pcc_nal_unit_payload), and a trailing bit (trailing_bits). Regardless of the codec, that is, whether data is to be stored in the first encoding method or the second encoding method, the same format is used.

In the NAL unit header (pcc_nal_unit_header), a codec type (pcc_codec_type) and a NAL unit type (pcc_nal_unit_type) are stored. The codec type indicates whether the PCC codec of the encoded data to be stored in the NAL unit is the first encoding method or the second encoding method.

The NAL unit type indicates the type of the NAL unit that depends on the codec, and the type is defined for each codec. If the codec type is the first encoding method, the NAL unit type indicates a NAL unit type defined for the first encoding method. If the codec type is the second encoding method, the NAL unit type indicates a NAL unit type defined for the second encoding method. That is, the NAL unit type defined for the first encoding method and the NAL unit type defined for the second encoding method are associated with different meanings with the same value.

Note that, in the header, the function of the codec type may be merged with the NAL unit type. For example, a part of the information of the NAL unit type may be used to indicate the codec type.

Figure 19:
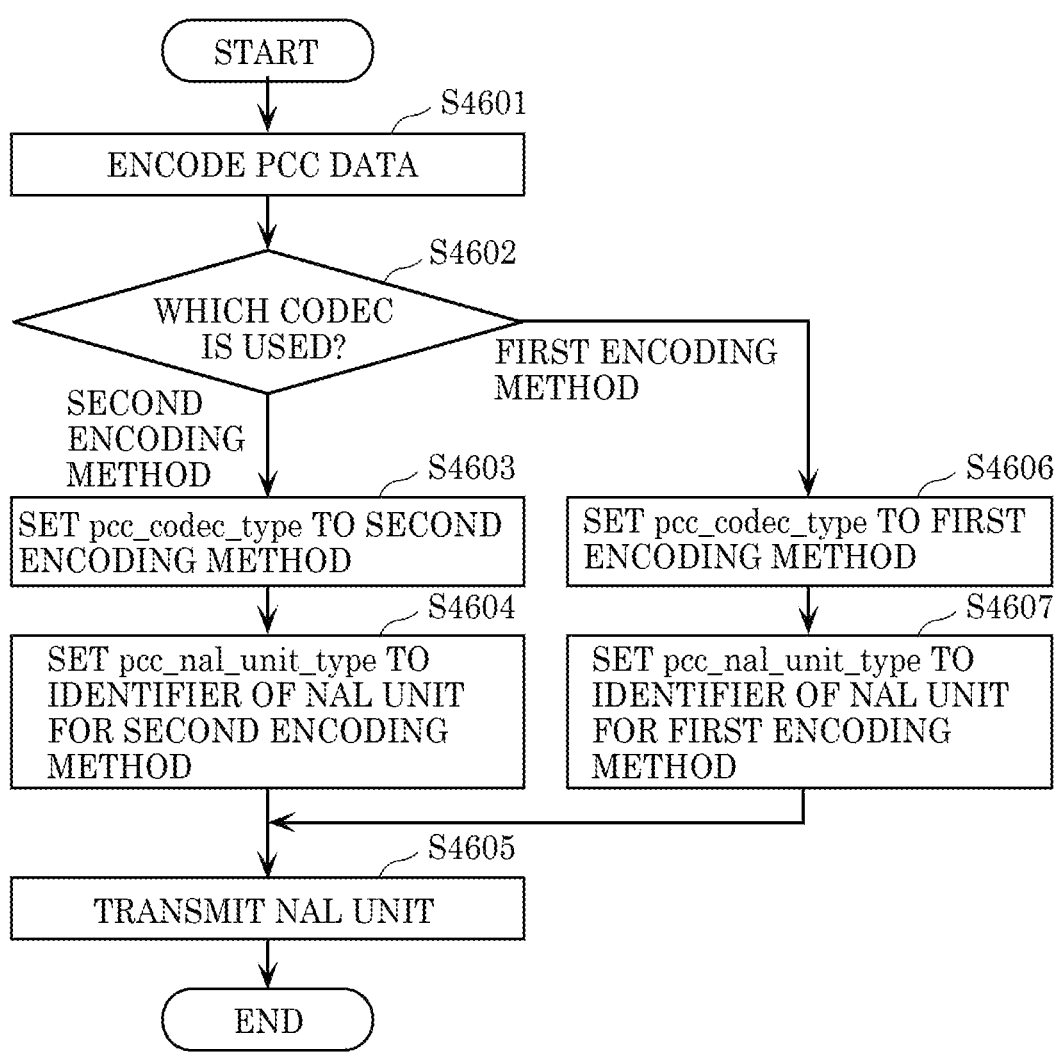
FIG. 19 is a flowchart of encoding processing according to Embodiment 1.

Next, an encoding process according to this embodiment will be described. FIG. 19 is a flowchart showing an encoding process according to this embodiment. The process in the drawing is a process performed by first encoder 4630 or second encoder 4650 defined as described above. In the following, first encoder 4630 and second encoder 4650 may not be discriminated, and the encoder may be referred to as encoder 4613. The process in the drawing is mainly performed by multiplexer 4634 shown in FIG. 6 or multiplexer 4656 shown in FIG. 10.

Note that the process in the drawing is an example in which PCC data is encoded in any one of the first encoding method and the second encoding method, and it is supposed that which PCC codec is used for the encoding is known. For example, a user, an external device or the like may specify the PCC codec to be used.

First, encoder 4613 encodes PCC data in any of the codecs, that is, the first encoding method or the second encoding method (S4601).

When the codec used is the second encoding method (if "second encoding method" in S4602), encoder 4613 sets pcc_codec_type in the NAL unit header to a value that indicates that data included in the payload of the NAL unit is data encoded in the second encoding method (S4603). Furthermore, encoder 4613 sets pcc_nal_unit_type in the NAL unit header to the identifier of the NAL unit for the second encoding method (S4604). Encoder 4613 then generates a NAL unit having the set NAL unit header and including the encoded data in the payload. Encoder 4613 then transmits the generated NAL unit (S4605).

On the other hand, when the codec used is the first encoding method (if "first encoding method" in S4602), encoder 4613 sets pcc_codec_type in the NAL unit header to a value that indicates that data included in the payload of the NAL unit is data encoded in the first encoding method (S4606). Furthermore, encoder 4613 sets pcc_nal_unit_type in the NAL unit header to the identifier of the NAL unit for the first encoding method (S4607). Encoder 4613 then generates a NAL unit having the set NAL unit header and including the encoded data in the payload. Encoder 4613 then transmits the generated NAL unit (S4605).

If the function of pcc_codec_type is included in pcc_nal_unit_type in step S4603 or S4606, encoder 4613 may set pcc_nal_unit_type to indicate whether the codec for the NAL unit is the first encoding method or the second encoding method.

Figure 20:
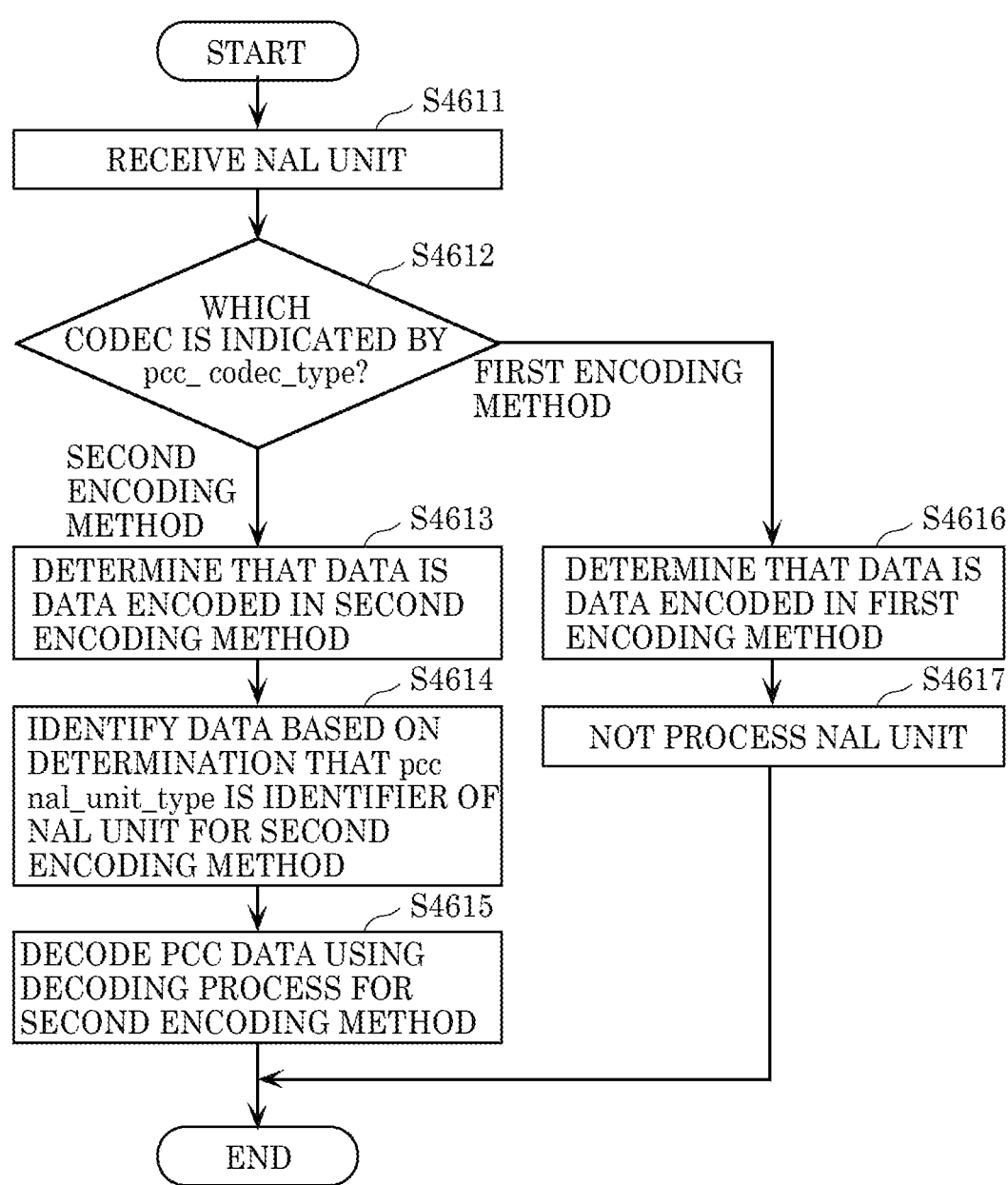
FIG. 20 is a flowchart of decoding processing by the second decoder according to Embodiment 1.

Next, a decoding process by first decoder 4640 or second decoder 4660 according to this embodiment will be described. FIG. 20 is a flowchart showing a decoding process by second decoder 4660. The process in the drawing is mainly performed by demultiplexer 4661 shown in FIG. 12.

Note that the process in the drawing is an example in which PCC data is encoded in any one of the second encoding method and the first encoding method. In this scheme, demultiplexer 4661 in second decoder 4660 can identify the codec type of the NAL unit by referring to information included in the NAL unit header. Therefore, demultiplexer 4661 can output required information to video decoder 4662 according to the codec type.

First, second decoder 4660 receives a NAL unit (S4611). For example, the NAL unit is the NAL unit generated in the process by encoder 4613 described above. That is, the header of the NAL unit includes pcc_codec_type and pcc_nal_unit_type.

Second decoder 4660 then determines whether pcc_codec_type in the NAL unit header indicates the first encoding method or the second encoding method (S4612).

When pcc_codec_type indicates the second encoding method (if "second encoding method" in S4612), second decoder 4660 determines that the data included in the payload of the NAL unit is data encoded in the second encoding method (S4613). Second decoder 4660 then identifies the data based on the determination that pcc_nal_unit_type in the NAL unit header is the identifier of the NAL unit for the second encoding method (S4614). Second decoder 4660 then decodes the PCC data in a decoding process for the second encoding method (S4615).

On the other hand, when pcc_codec_type indicates the first encoding method (if "first encoding method" in S4612), second decoder 4660 determines that the data included in the payload of the NAL unit is data encoded in the first encoding method (S4616). In this case, second decoder 4660 does not process the NAL unit (S4617).

If the function of pcc_codec_type is included in pcc_nal_unit_type in step S4612, second decoder 4660 may refer to pcc_nal_unit_type to determine whether the codec used for the data included in the NAL unit is the first encoding method or the second encoding method.

Figure 21:
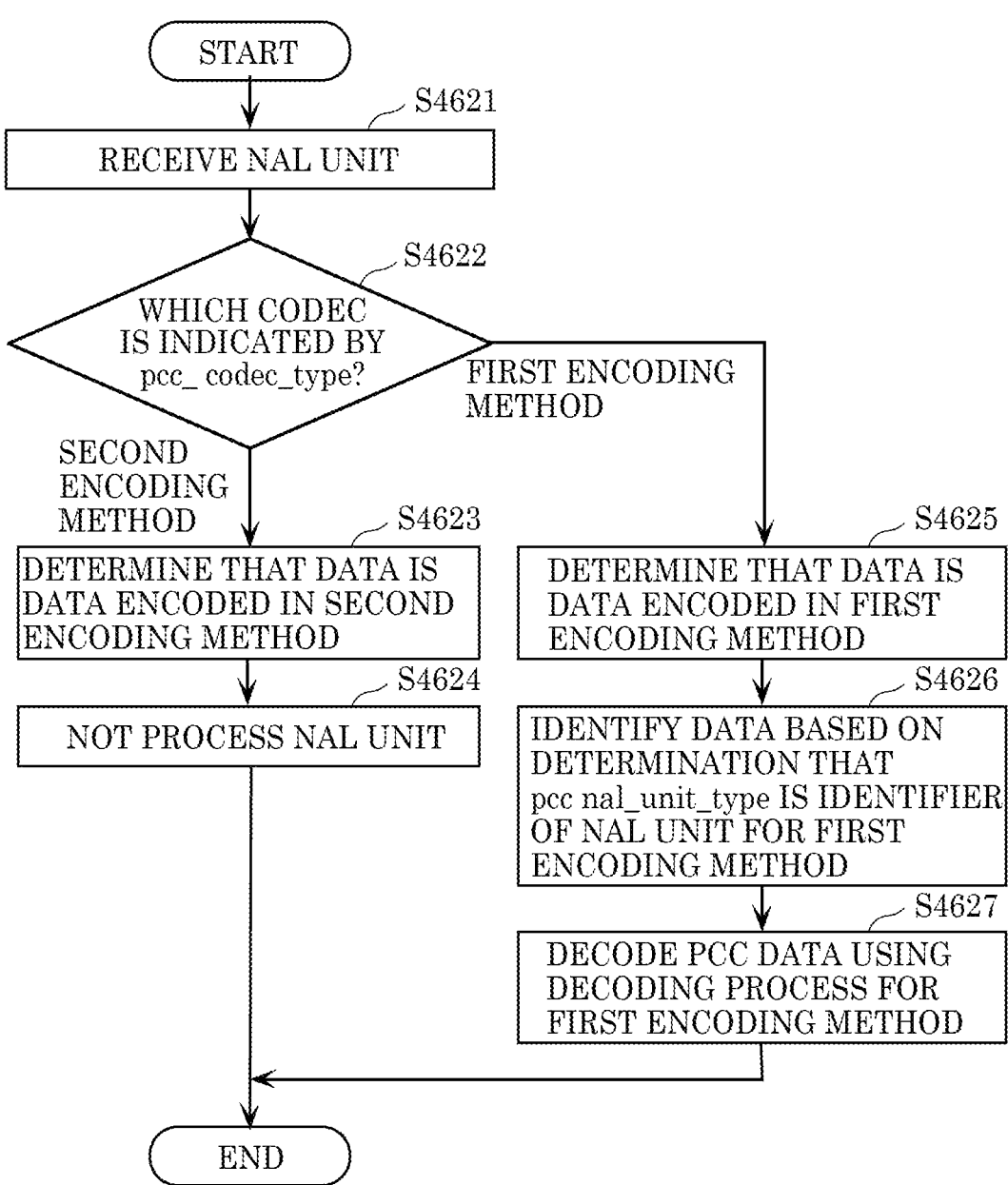
FIG. 21 is a flowchart of decoding processing by the first decoder according to Embodiment 1.

FIG. 21 is a flowchart showing a decoding process by first decoder 4640. The process in the drawing is mainly performed by demultiplexer 4641 shown in FIG. 8.

Note that the process in the drawing is an example in which PCC data is encoded in any one of the first encoding method and the second encoding method. In this scheme, demultiplexer 4641 in first decoder 4640 can identify the codec type of the NAL unit by referring to information included in the NAL unit header. Therefore, demultiplexer 4641 can output required information to geometry information decoder 4642 and attribute information decoder 4643 according to the codec type.

First, first decoder 4640 receives a NAL unit (S4621). For example, the NAL unit is the NAL unit generated in the process by encoder 4613 described above. That is, the header of the NAL unit includes pcc_codec_type and pcc_nal_unit_type.

First decoder 4640 then determines whether pcc_codec_type in the NAL unit header indicates the first encoding method or the second encoding method (S4622).

When pcc_codec_type indicates the second encoding method (if "second encoding method" in S4622), first decoder 4640 determines that the data included in the payload of the NAL unit is data encoded in the second encoding method (S4623). In this case, first decoder 4640 does not process the NAL unit (S4624).

On the other hand, when pcc_codec_type indicates the first encoding method (if "first encoding method" in S4622), first decoder 4640 determines that the data included in the payload of the NAL unit is data encoded in the first encoding method (S4625). First decoder 4640 then identifies the data based on the determination that pcc_nal_unit_type in the NAL unit header is the identifier of the NAL unit for the first encoding method (S4626). First decoder 4640 then decodes the PCC data in a decoding process for the first encoding method (S4627).

Embodiment 2

In Embodiment 2, another way of defining a NAL unit will be described. In this embodiment, for a NAL unit, different formats are defined for different PCC codecs. Furthermore, an identifier of the NAL unit is independently defined for each PCC codec.

FIG. 22 is a diagram showing a protocol stack in this case. FIG. 23 is a diagram showing a syntax example of a NAL unit (codec2_nal_unit) for codec 2. FIG. 24 is a diagram showing a syntax example of a NAL unit header (codec2_nal_unit_header) for codec 2. FIG. 25 is a diagram showing a semantics example of codec2_nal_unit_type.

FIG. 26 is a diagram showing a syntax example of a NAL unit (coded1_nal_unit) for codec 1. FIG. 27 is a diagram showing a syntax example of a NAL unit header (codec1_nal_unit_header) for codec 1. FIG. 28 is a diagram showing a semantics example of codec1_nal_unit_type.

A NAL unit format is independently defined for each PCC codec. A NAL unit (codec1_nal_unit, codec2_nal_unit) includes a header (codec1_nal_unit_header, codec2_nal_unit_ header), a payload (codec1_nal_unit_payload, codec2 nal_unit_payload), and a trailing bit (trailing_bits). The NAL unit (codec1_nal_unit) for the first encoding method and the NAL unit (codec2_nal_unit) for the second encoding method may have the same configuration or different configurations. The NAL unit for the first encoding method and the NAL unit for the second encoding method may have different sizes.

Data encoded in the first encoding method is stored in a NAL unit for the first encoding method. Data encoded in the second encoding method is stored in a NAL unit for the second encoding method.

In the NAL unit header (codec1 nal_unit_header, codec2 nal_unit_header), the NAL unit type (codec1 nal_unit_type, codec2_nal_unit_type) is stored. The NAL unit type is independent for each codec, and the type is defined for each codec. That is, in a NAL unit for the first encoding method, a NAL unit type defined for the first encoding method is described. In a NAL unit for the second encoding method, a NAL unit type defined for the second encoding method is described.

According to this scheme, the first encoding method and the second encoding method can be handled as different codecs.

Figure 29:
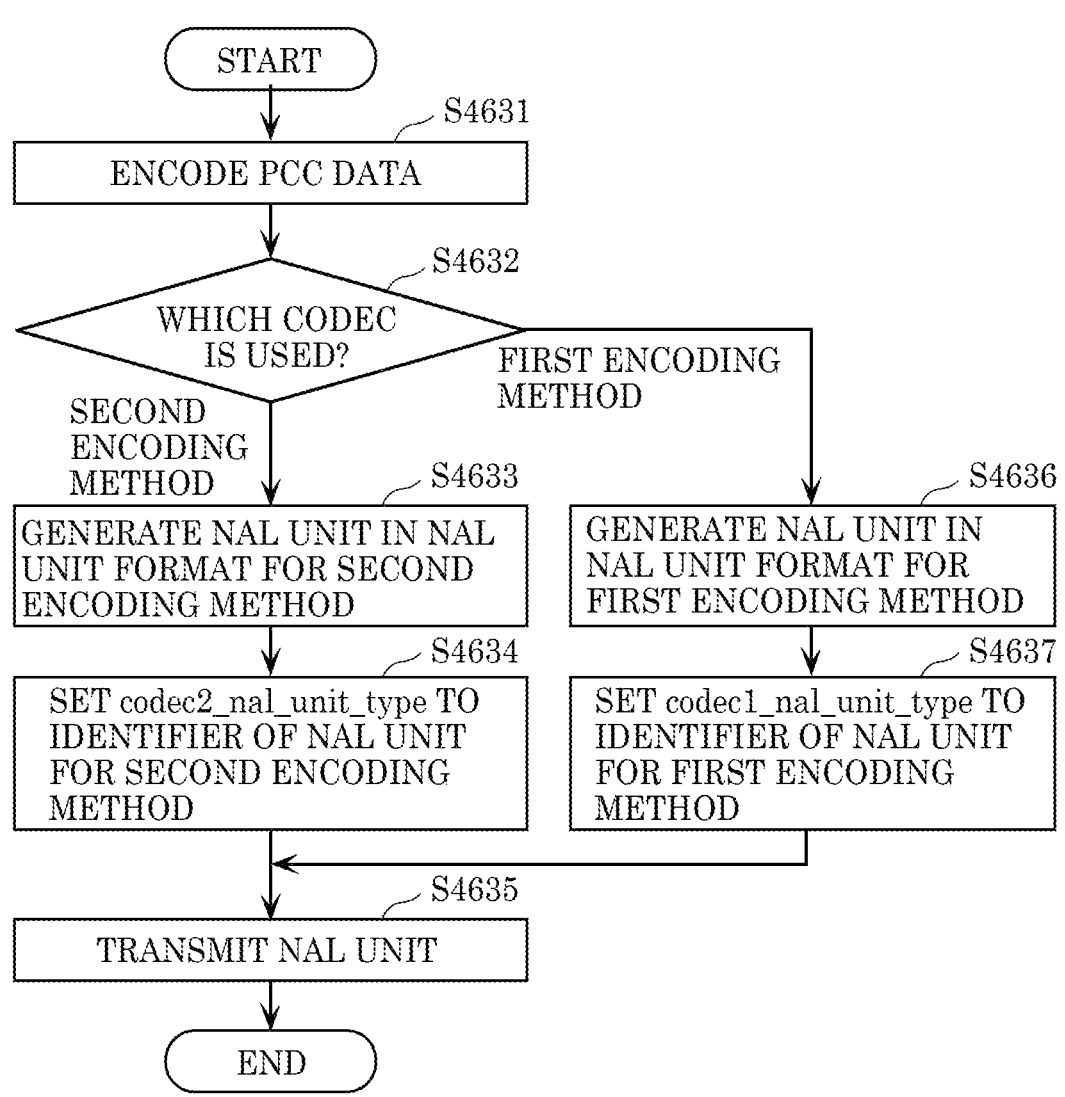
FIG. 29 is a flowchart of encoding processing according to Embodiment 2.

Next, an encoding process according to this embodiment will be described. FIG. 29 is a flowchart showing an encoding process according to this embodiment. The process in the drawing is a process performed by first encoder 4630 or second encoder 4650 defined as described above.

The process in the drawing is mainly performed by multiplexer 4634 shown in FIG. 6 or multiplexer 4656 shown in FIG. 10.

Note that the process in the drawing is an example in which PCC data is encoded in any one of the first encoding method and the second encoding method, and it is supposed that which PCC codec is used for the encoding is known. For example, a user, an external device or the like may specify the PCC codec to be used.

First, encoder 4613 encodes PCC data in any of the codecs, that is, the first encoding method or the second encoding method (S4631).

When the codec used is the second encoding method (if "second encoding method" in S4632), encoder 4613 generates a NAL unit in the NAL unit format for the second encoding method (S4633). Encoder 4613 then sets codec2_nal_unit_type in the NAL unit header to the identifier of the NAL unit for the second encoding method (S4634). In this way, encoder 4613 generates a NAL unit having the set NAL unit header and including the encoded data in the payload. Encoder 4613 transmits the generated NAL unit (S4635).

On the other hand, when the codec used is the first encoding method (if "first encoding method" in S4632), encoder 4613 generates a NAL unit in the NAL unit format for the first encoding method (S4636). Encoder 4613 then sets codec1_nal_unit_type in the NAL unit header to the identifier of the NAL unit for the first encoding method (S4637). In this way, encoder 4613 generates a NAL unit having the set NAL unit header and including the encoded data in the payload. Encoder 4613 then transmits the generated NAL unit (S4635).

Figure 30:
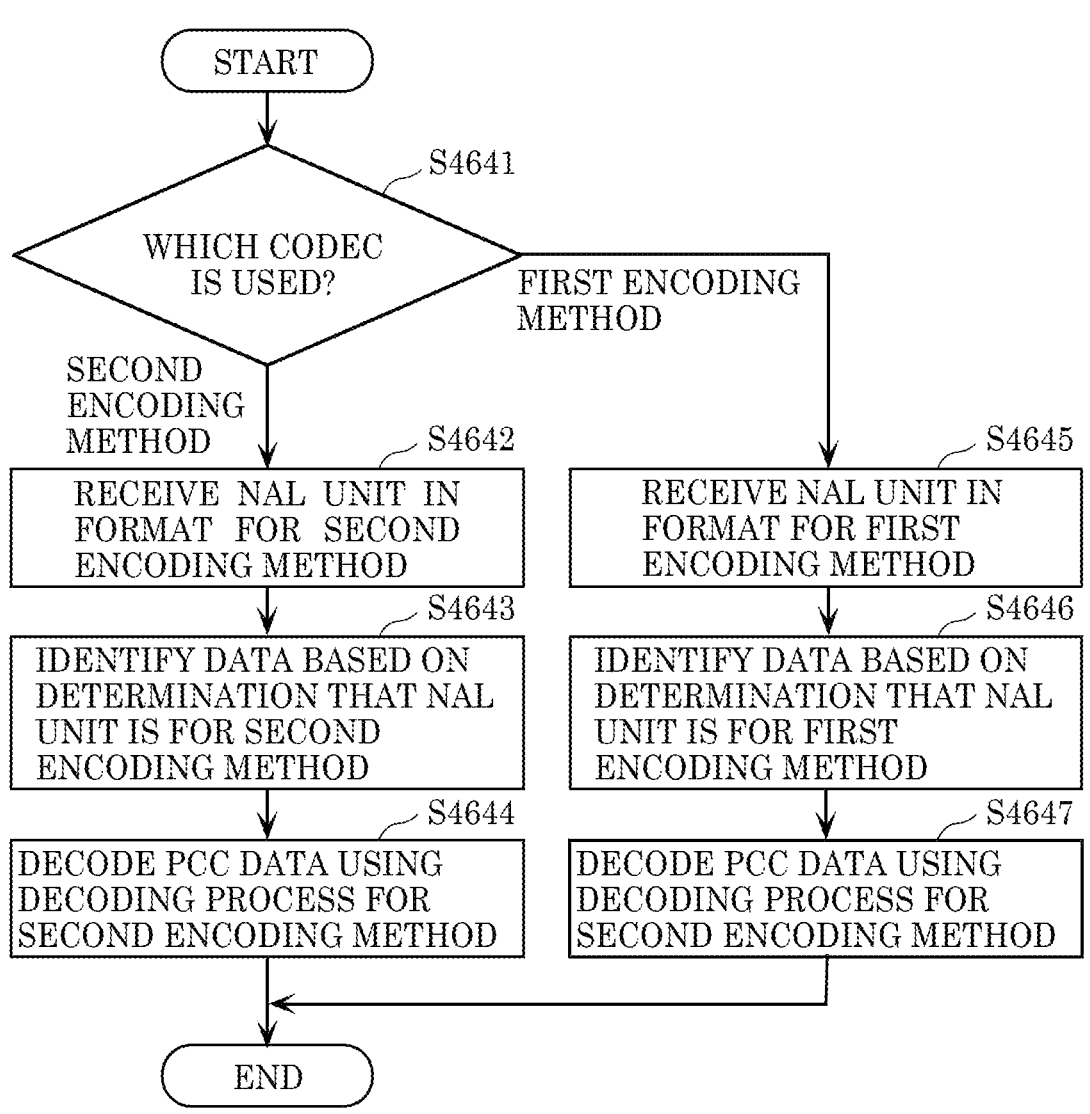
FIG. 30 is a flowchart of decoding processing according to Embodiment 2.

Next, a decoding process according to this embodiment will be described. FIG. 30 is a flowchart showing a decoding process according to this embodiment. The process in the drawing is a process performed by first decoder 4640 or second decoder 4660 defined as described above. In the following, first decoder 4640 and second decoder 4660 may not be discriminated, and the decoder may be referred to as decoder 4624. The process in the drawing is mainly performed by demultiplexer 4641 shown in FIG. 8 or demultiplexer 4661 shown in FIG. 12.

Note that the process in the drawing is an example in which PCC data is encoded in any one of the first encoding method and the second encoding method, and it is supposed that which PCC codec is used for the encoding is known. For example, information indicating the codec used is included in the transmission signal, the multiplexed data, or the encoded data, and decoder 4624 determines the codec used by referring to the information. Note that decoder 4624 may determine the codec used based on a signal obtained separately from these signals.

When the codec used is the second encoding method (if "second encoding method" in S4641), decoder 4624 receives a NAL unit in the format for the second encoding method (S4642). Decoder 4624 then identifies the data using the NAL unit format for the second encoding method and codec2_nal_unit_type for the second encoding method based on the determination that the NAL unit is for the second encoding method (S4643). Decoder 4624 then decodes the PCC data in a decoding process for the second encoding method (S4644).

On the other hand, when the codec used is the first encoding method (if "first encoding method" in S4641), decoder 4624 receives a NAL unit in the format for the first encoding method (S4645). Decoder 4624 then identifies the data using the NAL unit format for the first encoding method and codec1_nal_unit_type for the first encoding method based on the determination that the NAL unit is for the first encoding method (S4646). Decoder 4624 then decodes the PCC data in a decoding process for the first encoding method (S4647).

Embodiment 3

In Embodiment 3, another way of defining a NAL unit will be described. In this embodiment, for a NAL unit, a format that is common to PCC codecs is defined. Furthermore, an identifier of the common PCC codec NAL unit is defined.

FIG. 31 is a diagram showing a protocol stack in this case. FIGS. 32 to 34 are diagrams showing an example of a common codec NAL unit format. FIG. 32 is a diagram showing a syntax example of a common PCC NAL unit. FIG. 33 is a diagram showing a syntax example of a common PCC NAL unit header. FIG. 34 is a diagram showing a semantics example of pcc_codec_type.

As a NAL unit format, a NAL unit format that is common to the PCC codecs is defined. A NAL unit (pcc_nal_unit) includes a header (pcc_nal_unit_header), a payload (pcc_nal_unit_payload), and a trailing bit (trailing_bits). Regardless of the codec, that is, whether data is to be stored in the first encoding method or the second encoding method, the same format is used.

In the NAL unit header (pcc_nal_unit_header), a NAL unit type (pcc_nal_unit_type) is stored. The NAL unit type is common to the codecs, and a type common to the codecs is defined. That is, a common NAL unit type defined is described for both a NAL unit for the first encoding method and a NAL unit for the second encoding method. In the example shown in FIG. 34, for example, PCC DataA is encoded data in codec 1, PCC DataB is encoded data in codec 2, PCC MetaDataA is additional information in codec 1, and PCC MetaDataB is additional information in codec 2.

According to this scheme, the first encoding method and the second encoding method can be handled as the same codec.

Next, an encoding process according to this embodiment will be described. FIG. 35 is a flowchart showing an encoding process according to this embodiment. The process in the drawing is a process performed by first encoder 4630 or second encoder 4650 defined as described above. The process in the drawing is mainly performed by multiplexer 4634 shown in FIG. 6 or multiplexer 4656 shown in FIG. 10.

Note that the process in the drawing is an example in which PCC data is encoded in any one of the first encoding method and the second encoding method, and it is supposed that which PCC codec is used for the encoding is known. For example, a user, an external device or the like may specify the PCC codec to be used.

First, encoder 4613 encodes PCC data in any of the codecs, that is, the first encoding method or the second encoding method (S4651). Encoder 4613 then generates a NAL unit in the common PCC NAL unit format (S4652).

Encoder 4613 then sets pcc_nal_unit_type in the NAL unit header to the identifier of the common PCC NAL unit (S4653). Encoder 4613 then transmits the NAL unit having the set NAL unit header and including the encoded data in the payload (S4654).

Figure 36:
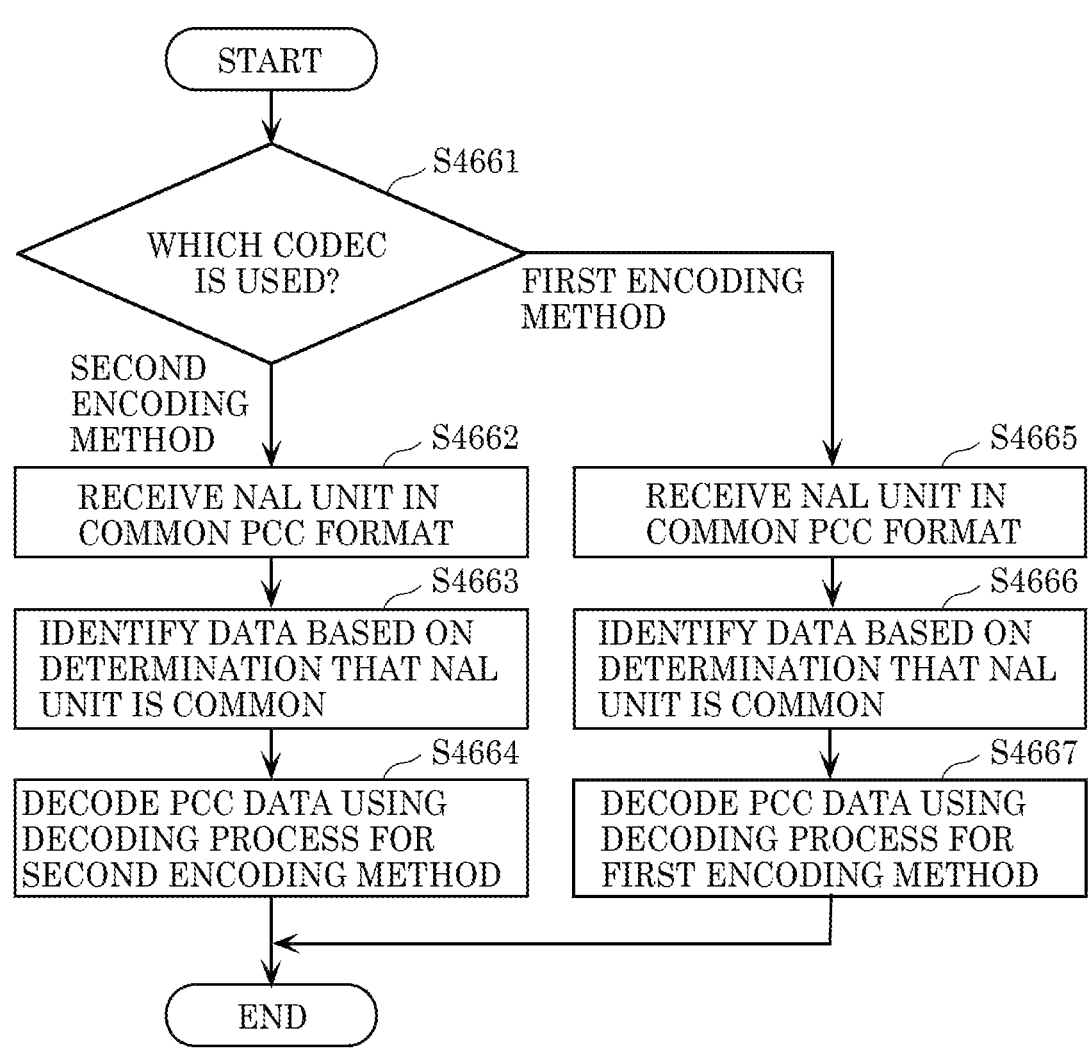
FIG. 36 is a flowchart of decoding processing according to Embodiment 3.

Next, a decoding process according to this embodiment will be described. FIG. 36 is a flowchart showing a decoding process according to this embodiment. The process in the drawing is a process performed by first decoder 4640 or second decoder 4660 defined as described above. The process in the drawing is mainly performed by demultiplexer 4641 shown in FIG. 8 or demultiplexer 4661 shown in FIG. 12.

Note that the process in the drawing is an example in which PCC data is encoded in any one of the first encoding method and the second encoding method.

First, decoder 4624 determines the codec used for the encoding of the data included in the NAL unit (S4661). For example, decoder 4624 determines the codec used by referring to pcc_nal_unit_type in the NAL unit header.

When the codec used is the second encoding method (if "second encoding method" in S4661), decoder 4624 receives a NAL unit in the common PCC format (S4662). Decoder 4624 then identifies the data using the common NAL unit format and the common pcc_nal_unit_type based on the determination that the NAL unit is a common NAL unit (S4663). Decoder 4624 then decodes the PCC data in a decoding process for the second encoding method (S4664).

On the other hand, when the codec used is the first encoding method (if "first encoding method" in S4661), decoder 4624 receives a NAL unit in the common PCC format (S4665). Decoder 4624 then identifies the data using the common NAL unit format and the common pcc_nal_unit_type based on the determination that the NAL unit is a common NAL unit (S4666). Decoder 4624 then decodes the PCC data in a decoding process for the first encoding method (S4667).

In the following, variations of Embodiments 1 to 3 described above will be described. As another method for indicating the PCC codec type, any of the following methods can also be used.

In Embodiment 1, Embodiment 2, and Embodiment 3, cases where there are two codecs, that is, the first encoding method and the second encoding method, have been described. However, the methods described above can be applied to cases where there are three or more PCC codecs.

In Embodiment 1 and Embodiment 3, identification information for the PCC codec (pcc_codec_type in Embodiment 1 or pcc_nal_unit_type in Embodiment 3) is described in the NAL unit header. However, the identification information for the codec may be stored at another location.

The first encoding method and the second encoding method are not limited to the examples described above and can be any codec. For example, the first encoding method and the second encoding method may be a plurality of codecs resulting from fragmentation of GPCC or a plurality of codecs resulting from fragmentation of VPCC. For example, both the first encoding method and the second encoding method may be VPCC, but different video encoding schemes may be used in the first encoding method and the second encoding method. The video encoding scheme may be AVC or HEVC, for example. One or both of the first encoding method and the second encoding method may be an encoding method including another encoding scheme for a video, an audio, a text application, or the like.

For example, the identification information for the codec may be included in the control information (signaling information) included in the PCC-encoded stream. Here, the control information is metadata or the like, such as a parameter set or supplemental enhancement information (SEI).

FIG. 37 is a flowchart of an encoding process by encoder 4613 in this case. First, encoder 4613 encodes PCC data (S4671), and describes the identification information for the PCC codec at a predetermined location (parameter set, for example) in the encoded data (S4672). Encoder 4613 then generates a NAL unit including the encoded data, and transmits the generated NAL unit (S4673).

The identification information for the PCC codec may be defined as profile, and indicated by metadata. When the same codec is used for the whole of a sequence, a sequence parameter set may include the identification information for the PCC codec. When a different codec is used for encoding of each PCC frame, a parameter set that describes information on each frame may include the identification information for the PCC codec. For example, when a different codec is used for each piece of PCC data, such as when different codecs are used for the geometry information and the attribute information, a parameter set that describes information on each piece of data may include the identification information for the PCC codec. That is, information indicating the codec for the geometry information may be included in control information (a parameter set or the like) for the geometry information, and information indicating the codec for the attribute information may be included in control information (a parameter set or the like) for the attribute information.

Note that the identification information for the codec may be stored at any of the locations described above or may be stored at a plurality of locations. For example, the identification information for the codec may be stored in both the encoded stream and the NAL unit header. When the identification information for the codec is stored at a plurality of locations, the same information may be stored at the plurality of locations, or different information may be stored at the plurality of locations. The "different information" are information indicating GPCC or VPCC and information indicating any of a plurality of codecs resulting from fragmentation of GPCC or VPCC.

When a NAL unit includes a parameter set, demultiplexer 4641 or 4661 included in decoder 4624 can determine whether the data included in the payload of the NAL unit is data encoded in the first encoding method or data encoded in the second encoding method by analyzing what is described in the parameter set. Therefore, decoder 4624 can quickly filter a NAL unit that is not required for decoding.

FIG. 38 is a flowchart of a decoding process by decoder 4624 in this case. First, decoder 4624 receives a NAL unit (S4675), and identifies a predetermined data that describes the identification information for the PCC codec (the parameter set described above, for example) using pcc_nal_unit_type in the NAL unit header (S4676). Decoder 4624 then identifies the PCC codec indicated in the predetermined data by analyzing predetermined data (the parameter set, for example) (S4677). Decoder 4624 then decodes the encoded data using the identified PCC codec (S4678).

Although an example in which the encoded stream is stored in a NAL unit has been shown above, any unit according to a predetermined scheme can be used instead of the NAL unit.

Embodiment 4

In Embodiment 4, encoder 4670 having the functions of both first encoder 4630 and second encoder 4650 described above and decoder 4680 having the functions of both first decoder 4640 and second decoder 4660 described above will be described.

Figure 39:
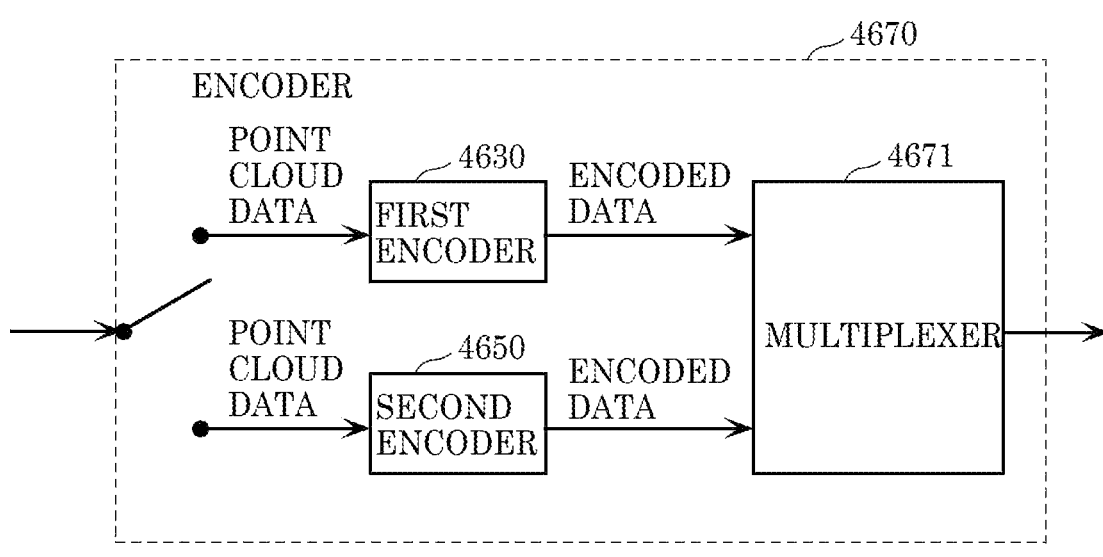
FIG. 39 is a block diagram of an encoder according to Embodiment 4.

FIG. 39 is a block diagram showing encoder 4670 according to this embodiment. Encoder 4670 includes first encoder 4630 and second encoder 4650 described above and multiplexer 4671. Multiplexer 4671 multiplexes encoded data generated by first encoder 4630 and encoded data generated by second encoder 4650, and outputs the resulting encoded data.

Figure 40:
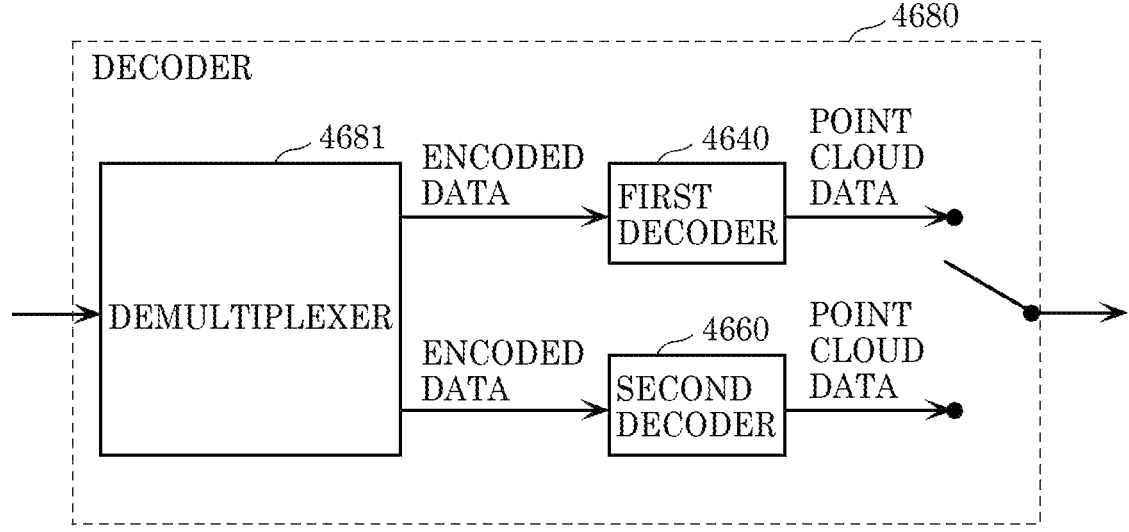
FIG. 40 is a block diagram of a decoder according to Embodiment 4.

FIG. 40 is a block diagram showing decoder 4680 according to this embodiment. Decoder 4680 includes first decoder 4640 and second decoder 4660 described above and demultiplexer 4681. Demultiplexer 4681 extracts encoded data generated using the first encoding method and encoded data generated using second encoding method from the input encoded data. Demultiplexer 4681 outputs the encoded data generated using the first encoding method to first decoder 4640, and outputs the encoded data generated using the second encoding method to second decoder 4660.

With the configuration described above, encoder 4670 can encode point cloud data by selectively using the first encoding method or the second encoding method. Decoder 4680 can decode encoded data encoded using the first encoding method, encoded data using the second encoding method, and encoded data encoded using both the first encoding method and the second encoding method.

For example, encoder 4670 may change the encoding method (between the first encoding method and the second encoding method) on a point-cloud-data basis or on a frame basis. Alternatively, encoder 4670 may change the encoding method on the basis of an encodable unit.

For example, encoder 4670 generates encoded data (encoded stream) including the identification information for the PCC codec described above with regard to Embodiment 1 or Embodiment 3.

Demultiplexer 4681 in decoder 4680 identifies data using the identification information for the PCC codec described above with regard to Embodiment 1 or Embodiment 3, for example. When the data is data encoded in the first encoding method, demultiplexer 4681 outputs the data to first decoder 4640. When the data is data encoded in the second encoding method, demultiplexer 4681 outputs the data to second decoder 4660.

Encoder 4670 may transmit, as the control information (signaling information), information indicating whether both the encoding methods are used or any one of the encoding methods is used, in addition to the identification information for the PCC codec.

Figure 41:
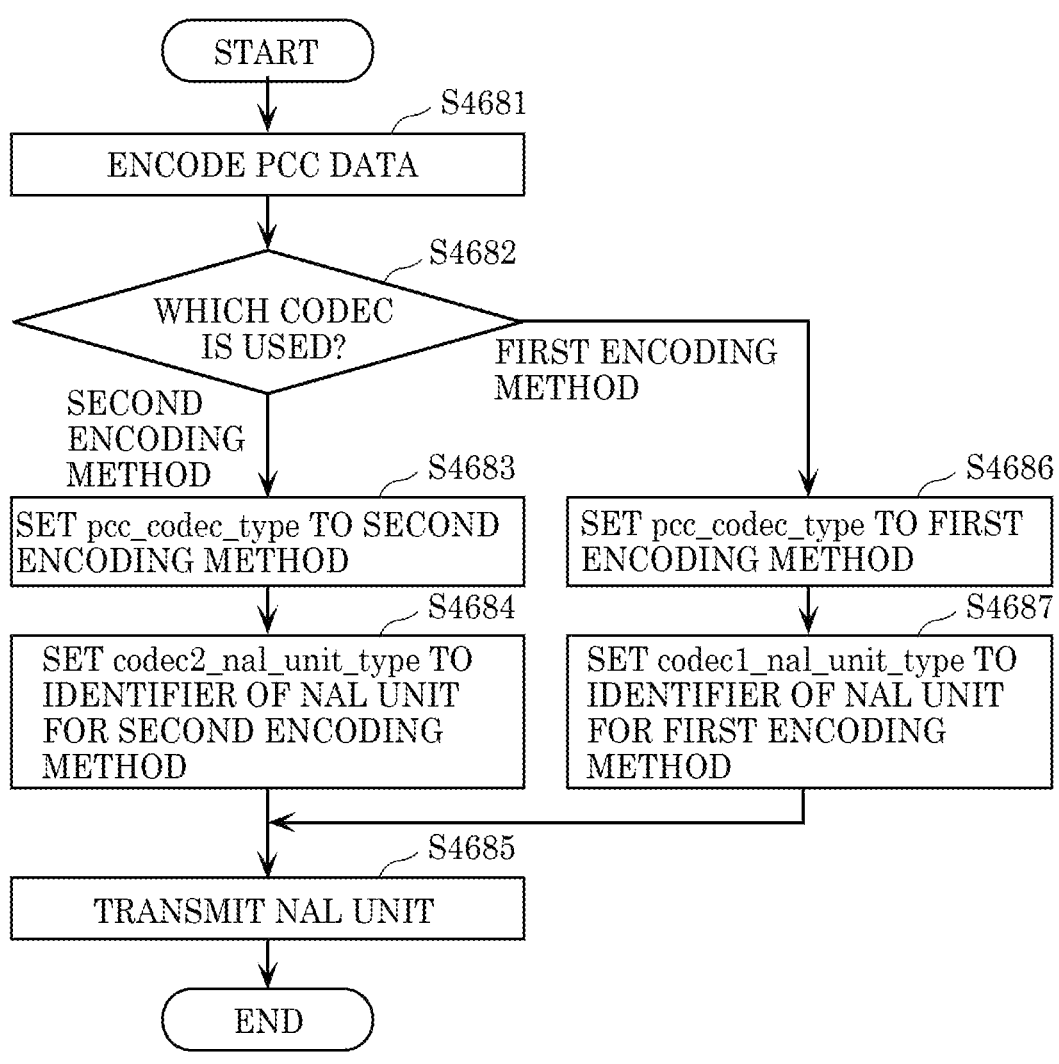
FIG. 41 is a flowchart of encoding processing according to Embodiment 4.

Next, an encoding process according to this embodiment will be described. FIG. 41 is a flowchart showing an encoding process according to this embodiment. Using the identification information for the PCC codec described above with regard to Embodiment 1, Embodiment 2, Embodiment 3, and variations thereof allows an encoding process ready for a plurality of codecs. Note that although FIG. 41 shows an example in which the scheme according to Embodiment 1 is used, the same process can be applied to the other schemes.

First, encoder 4670 encodes PCC data in both or one of the codecs, that is, the first encoding method and the second encoding method (S4681).

When the codec used is the second encoding method (if "second encoding method" in S4682), encoder 4670 sets pcc_codec_type in the NAL unit header to a value that indicates that data included in the payload of the NAL unit is data encoded in the second encoding method (S4683). Encoder 4670 then sets pcc_nal_unit_type in the NAL unit header to the identifier of the NAL unit for the second encoding method (S4684). Encoder 4670 then generates a NAL unit having the set NAL unit header and including the encoded data in the payload. Encoder 4670 then transmits the generated NAL unit (S4685).

On the other hand, when the codec used is the first encoding method (if "first encoding method" in S4682), encoder 4670 sets pcc_codec_type in the NAL unit header to a value that indicates that data included in the payload of the NAL unit is data encoded in the first encoding method (S4686). Encoder 4670 then sets pcc_nal_unit_type in the NAL unit header to the identifier of the NAL unit for the first encoding method (S4687). Encoder 4670 then generates a NAL unit having the set NAL unit header and including the encoded data in the payload. Encoder 4670 then transmits the generated NAL unit (S4685).

Figure 42:
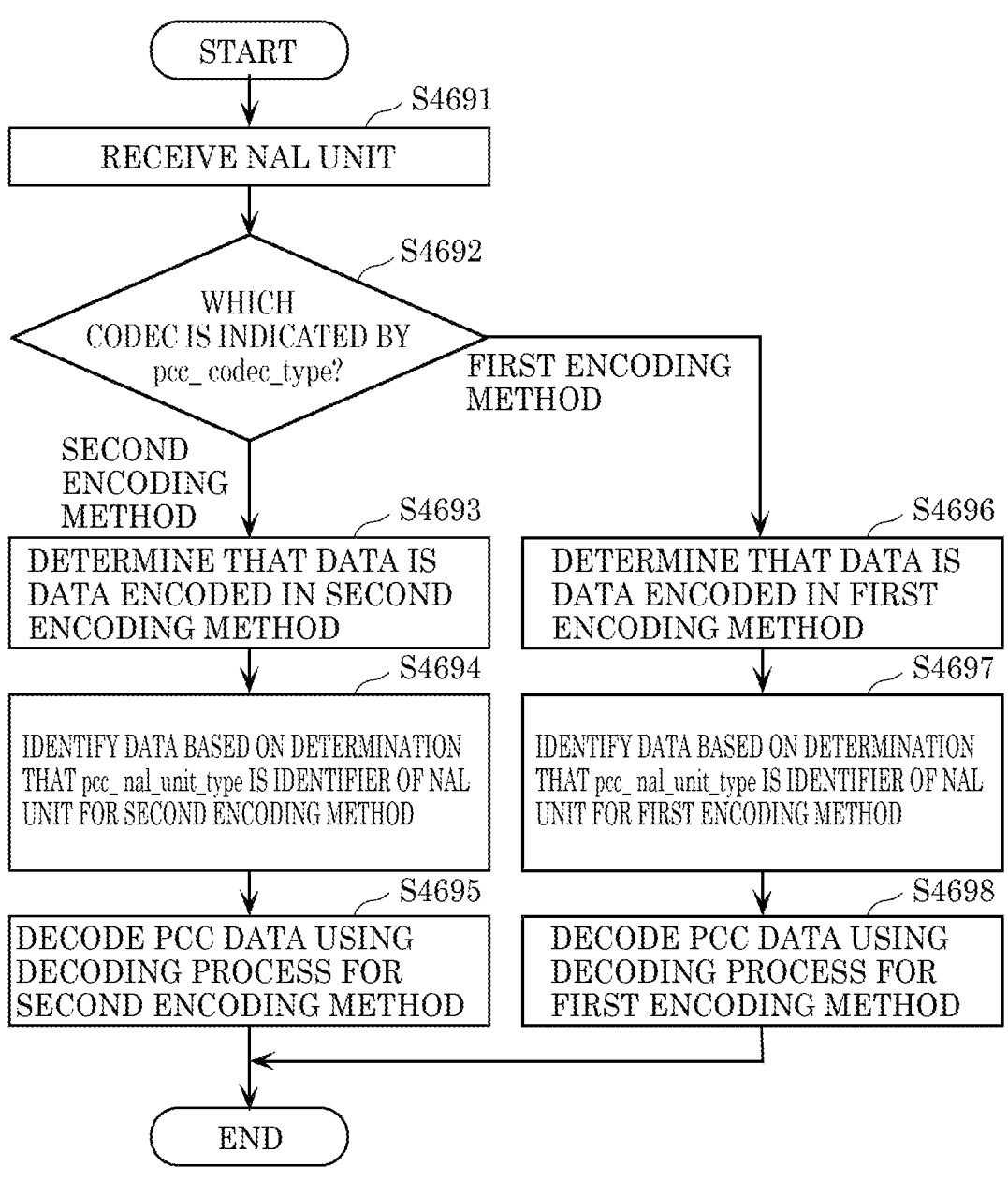
FIG. 42 is a flowchart of decoding processing according to Embodiment 4.

Next, a decoding process according to this embodiment will be described. FIG. 42 is a flowchart showing a decoding process according to this embodiment. Using the identification information for the PCC codec described above with regard to Embodiment 1, Embodiment 2, Embodiment 3, and variations thereof allows a decoding process ready for a plurality of codecs. Note that although FIG. 42 shows an example in which the scheme according to Embodiment 1 is used, the same process can be applied to the other schemes.

First, decoder 4680 receives a NAL unit (S4691). For example, the NAL unit is the NAL unit generated in the process by encoder 4670 described above. Decoder 4680 then determines whether pcc_codec_type in the NAL unit header indicates the first encoding method or the second encoding method (S4692).

When pcc_codec_type indicates the second encoding method (if "second encoding method" in S4692), decoder 4680 determines that the data included in the payload of the NAL unit is data encoded in the second encoding method (S4693). Decoder 4680 then identifies the data based on the determination that pcc_nal_unit_type in the NAL unit header is the identifier of the NAL unit for the second encoding method (S4694). Decoder 4680 then decodes the PCC data in a decoding process for the second encoding method (S4695).

On the other hand, when pcc_codec_type indicates the first encoding method (if "first encoding method" in S4692), decoder 4680 determines that the data included in the payload of the NAL unit is data encoded in the first encoding method (S4696). Decoder 4680 then identifies the data based on the determination that pcc_nal_unit_type in the NAL unit header is the identifier of the NAL unit for the first encoding method (S4697). Decoder 4680 then decodes the PCC data in a decoding process for the first encoding method (S4698).

As described above, the three-dimensional data encoding device according to an aspect of the present disclosure generates an encoded stream by encoding three-dimensional data (point cloud data, for example) (in S4671 in FIG. 37, for example), and stores information indicating the encoding method used for the encoding among the first encoding method and the second encoding method (identification information for the codec, for example) in the control information (a parameter set, for example) for the encoded stream (in S4672 in FIG. 37, for example).

With such a configuration, the three-dimensional data decoding device can determine the encoding method used for the encoding from the information stored in the control information, when decoding the encoded stream generated by the three-dimensional data encoding device. Therefore, the three-dimensional data decoding device can correctly decode the encoded stream even when a plurality of encoding methods are used.

The three-dimensional data includes geometry information, for example. In the encoding described above, the three-dimensional data encoding device encodes the geom-etry information. In the storage described above, the three-dimensional data encoding device stores the information indicating the encoding method used for the encoding of the geometry information among the first encoding method and the second encoding method in the control information for the geometry information.

The three-dimensional data includes geometry information and attribute information, for example. In the encoding described above, the three-dimensional data encoding device encodes the geometry information and the attribute information. In the storage described above, the three-dimensional data encoding device stores the information indicating the encoding method used for the encoding of the geometry information among the first encoding method and the second encoding method in the control information for the geometry information, and stores the information indicating the encoding method used for the encoding of the attribute information among the first encoding method and the second encoding method in the control information for the attribute information.

With such a configuration, different encoding methods can be used for the geometry information and the attribute information, and therefore, the coding efficiency can be improved.

For example, the three-dimensional data encoding method further includes storing the encoded stream in one or more units (NAL units, for example) (in S4673 in FIG. 37, for example).

For example, as described above with reference to FIGS. 15 to 18 illustrating Embodiment 1, the unit includes information (pcc_nal_unit_type, for example) indicating the type of data included in the unit that has a format that is common to the first encoding method and the second encoding method and is independently defined for the first encoding method and the second encoding method.

For example, as described above with reference to FIGS. 23 to 28 illustrating Embodiment 2, the unit includes information (codec1 nal_unit_type or codec2_nal_unit_type, for example) indicating the type of data included in the unit that has different formats for the first encoding method and the second encoding method and is independently defined for the first encoding method and the second encoding method.

For example, as described above with reference to FIGS. 32 to 34 illustrating Embodiment 3, the unit includes information (pcc_nal_unit_type, for example) indicating the type of data included in the unit that has a format that is common to the first encoding method and the second encoding method and is commonly defined for the first encoding method and the second encoding method.

For example, the three-dimensional data encoding device includes a processor and a memory, and the processor performs the processes described above using the memory.

The three-dimensional data decoding device according to this embodiment determines the encoding method used for encoding of an encoded stream generated by encoding of three-dimensional data based on the information indicating the encoding method used for the encoding of the three-dimensional data among the first encoding method and the second encoding method (identification information for the codec, for example) included in the control information (a parameter set, for example) for the encoded stream (in S4677 in FIG. 38, for example), and decodes the encoded stream using the determined encoding method (in S4678 in FIG. 38, for example).

With such a configuration, the three-dimensional data decoding device can determine the encoding method used for the encoding from the information stored in the control information, when decoding the encoded stream. Therefore, the three-dimensional data decoding device can correctly decode the encoded stream even when a plurality of encoding methods are used.

The three-dimensional data includes geometry information, and the encoded stream includes encoded data of the geometry information, for example. In the determination described above, the three-dimensional data decoding device determines the encoding method used for the encoding of the geometry information based on the information indicating the encoding method used for the encoding of the geometry information among the first encoding method and the second encoding method included in the control information for the geometry information included in the encoded stream. In the decoding described above, the three-dimensional data decoding device decodes the encoded data of the geometry information using the determined encoding method used for the encoding of the geometry information.

The three-dimensional data includes geometry information and attribute information, and the encoded stream includes encoded data of the geometry information and encoded data of the attribute information, for example. In the determination described above, the three-dimensional data decoding device determines the encoding method based on the information indicating the encoding method used for the encoding of the geometry information among the first encoding method and the second encoding method included in the control information for the geometry information included in the encoded stream, and determines the encoding method used for the encoding of the attribute information based on the information indicating the encoding method used for the encoding of the attribute information among the first encoding method and the second encoding method included in the control information for the attribute information included in the encoded stream. In the decoding described above, the three-dimensional data decoding device decodes the encoded data of the geometry information using the determined encoding method used for the encoding of the geometry information, and decodes the encoded data of the attribute information using the determined encoding method used for the encoding of the attribute information.

With such a configuration, different encoding methods can be used for the geometry information and the attribute information, and therefore, the coding efficiency can be improved.

For example, the encoded stream is stored in one or more units (NAL units, for example), and the three-dimensional data decoding device further obtains the encoded stream from the one or more units.

For example, as described above with reference to FIGS. 15 to 18 illustrating Embodiment 1, the unit includes information (pcc_nal_unit_type, for example) indicating the type of data included in the unit that has a format that is common to the first encoding method and the second encoding method and is independently defined for the first encoding method and the second encoding method.

For example, as described above with reference to FIGS. 23 to 28 illustrating Embodiment 2, the unit includes information (codec1_nal_unit_type or codec2_nal_unit_type, for example) indicating the type of data included in the unit that has different formats for the first encoding method and the second encoding method and is independently defined for the first encoding method and the second encoding method.

For example, as described above with reference to FIGS. 32 to 34 illustrating Embodiment 3, the unit includes information (pcc_nal_unit_type, for example) indicating the type of data included in the unit that has a format that is common to the first encoding method and the second encoding method and is commonly defined for the first encoding method and the second encoding method.

For example, the three-dimensional data decoding device includes a processor and a memory, and the processor performs the processes described above using the memory.

Embodiment 5

In Embodiment 5, a method of storing the NAL unit described above with regard to Embodiment 1 in an ISOBMFF file will be described.

ISOBMFF is a file format standard prescribed in ISO/IEC14496-12. ISOBMFF is a standard that does not depend on any medium, and prescribes a format that allows various media, such as a video, an audio, and a text, to be multiplexed and stored.

A basic structure (file) of ISOBMFF will be described. A basic unit of ISOBMFF is a box. A box is formed by type, length, and data, and a file is a set of various types of boxes.

Figures 43, 44:
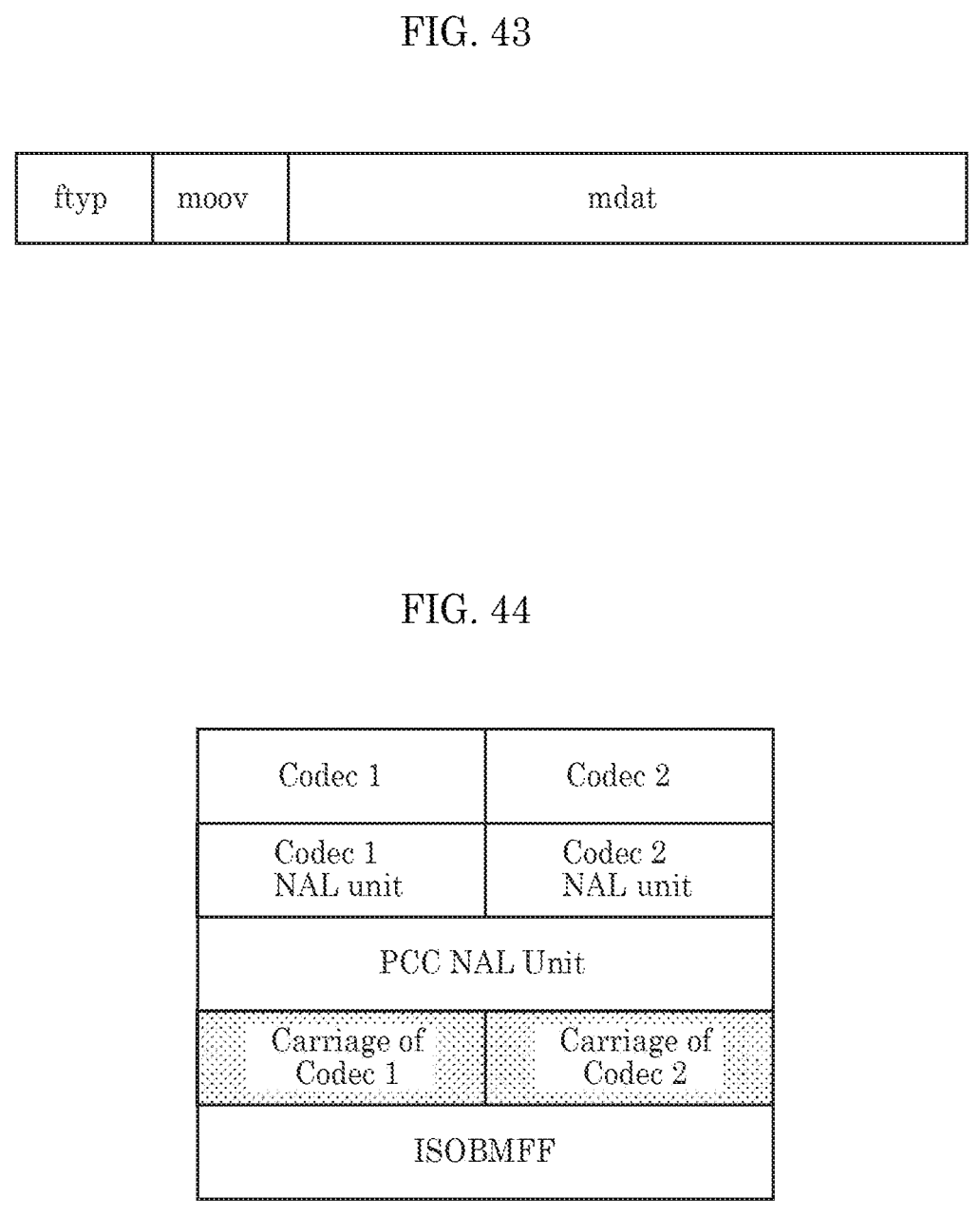

FIG. 43 is a diagram showing a basic structure (file) of ISOBMFF. A file in ISOBMFF includes boxes, such as ftyp that indicates the brand of the file by four-character code (4CC), moov that stores metadata, such as control information (signaling information), and mdat that stores data.

A method for storing each medium in the ISOBMFF file is separately prescribed. For example, a method of storing an AVC video or an HEVC video is prescribed in ISO/IEC14496-15. Here, it can be contemplated to expand the functionality of ISOBMFF and use ISOBMFF to accumulate or transmit PCC-encoded data. However, there has been no convention for storing PCC-encoded data in an ISOBMFF file. In this embodiment, a method of storing PCC-encoded data in an ISOBMFF file will be described.

FIG. 44 is a diagram showing a protocol stack in a case where a common PCC codec NAL unit in an ISOBMFF file. Here, the common PCC codec NAL unit described above with regard to Embodiment 1 is stored in an ISOBMFF file. Although the NAL unit is common to PCC codecs, a storage method for each codec (Carriage of Codec1, Carriage of Codec2) is desirably prescribed, since a plurality of PCC codecs are stored in the NAL unit.

Next, a method of storing a common PCC NAL unit that supports a plurality of PCC codecs in an ISOBMFF file will be described. FIG. 45 is a diagram showing an example in which a common PCC NAL unit is stored in an ISOBMFF file for the storage method for codec 1 (Carriage of Codec1). FIG. 46 is a diagram showing an example in which a common PCC NAL unit is stored in an ISOBMFF file for the storage method for codec 2 (Carriage of Codec2).

Here, ftyp is information that is important for identification of the file format, and a different identifier of ftyp is defined for each codec. When PCC-encoded data encoded in the first encoding method (encoding scheme) is stored in the file, ftyp is set to pcc1. When PCC-encoded data encoded in the second encoding method is stored in the file, ftyp is set to pcc2.

Here, pcc1 indicates that PCC codec 1 (first encoding method) is used. pcc2 indicates that PCC codec2 (second encoding method) is used. That is, pcc1 and pcc2 indicate that the data is PCC (encoded three-dimensional data (point cloud data)), and indicate the PCC codec (first encoding method or second encoding method).

In the following, a method of storing a NAL unit in an ISOBMFF file will be described. The multiplexer analyzes the NAL unit header, and describes pcc1 in ftyp of ISOBMFF if pcc_codec_type=Coded1.

The multiplexer analyzes the NAL unit header, and describes pcc2 in ftyp of ISOBMFF if pcc_codec_type=Codec2.

If pcc_nal_unit_type is metadata, the multiplexer stores the NAL unit in moov or mdat in a predetermined manner, for example. If pcc_nal_unit_type is data, the multiplexer stores the NAL unit in moov or mdat in a predetermined manner, for example.

For example, the multiplexer may store the NAL unit size in the NAL unit, as with HEVC.

According to this storage method, the demultiplexer (a system layer) can determine whether the PCC-encoded data is encoded in the first encoding method or the second encoding method by analyzing ftyp included in the file. Furthermore, as described above, by determining whether the PCC-encoded data is encoded in the first encoding method or the second encoding method, the encoded data encoded in any one of the encoding methods can be extracted from the data including both the encoded data encoded in the encoding methods. Therefore, when transmitting the encoded data, the amount of data transmitted can be reduced. In addition, according to this storage method, different data (file) formats do not need to be set for the first encoding method and the second encoding method, and a common data format can be used for the first encoding method and the second encoding method.

Note that, when the identification information for the codec, such as ftyp of ISOBMFF, is indicated in the metadata of the system layer, the multiplexer can store a NAL unit without pcc_nal_unit_type in the ISOBMFF file.

Next, configurations and operations of the multiplexer of the three-dimensional data encoding system (three-dimensional data encoding device) according to this embodiment and the demultiplexer of the three-dimensional data decoding system (three-dimensional data decoding device) according to this embodiment will be described.

Figure 47:
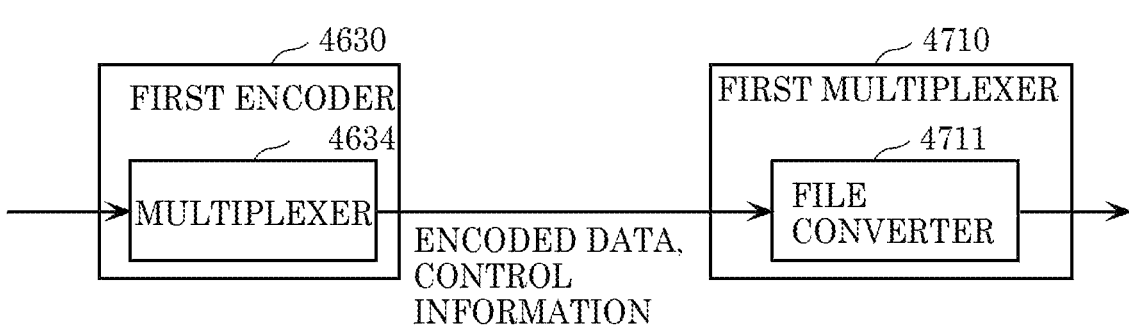
FIG. 47 is a diagram illustrating a structure of a first multiplexer according to Embodiment 5.

FIG. 47 is a diagram showing a configuration of first multiplexer 4710. First multiplexer 4710 includes file converter 4711 that generates multiplexed data (file) by storing encoded data generated by first encoder 4630 and control information (NAL unit) in an ISOBMFF file. First multiplexer 4710 is included in multiplexer 4614 shown in FIG. 1, for example.

Figure 48:
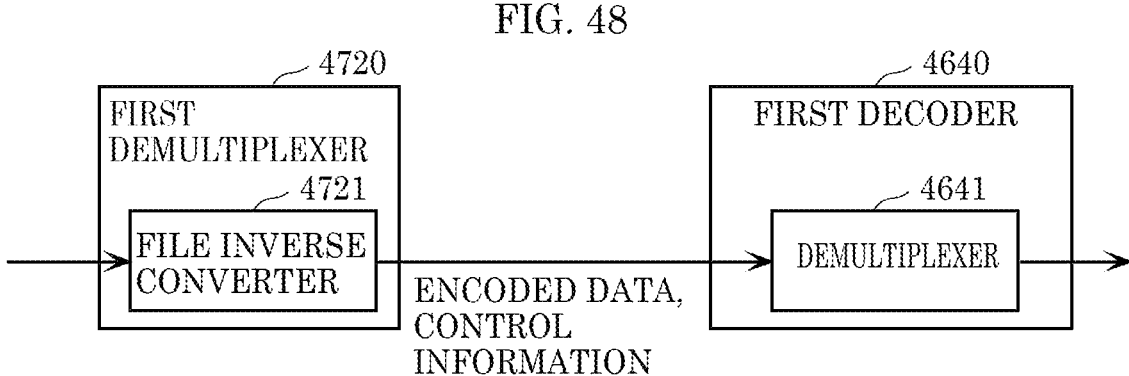
FIG. 48 is a diagram illustrating a structure of a first demultiplexer according to Embodiment 5.

FIG. 48 is a diagram showing a configuration of first demultiplexer 4720. First demultiplexer 4720 includes file inverse converter 4721 that obtains encoded data and control information (NAL unit) from multiplexed data (file) and outputs the obtained encoded data and control information to first decoder 4640. First demultiplexer 4720 is included in demultiplexer 4623 shown in FIG. 1, for example.

Figure 49:
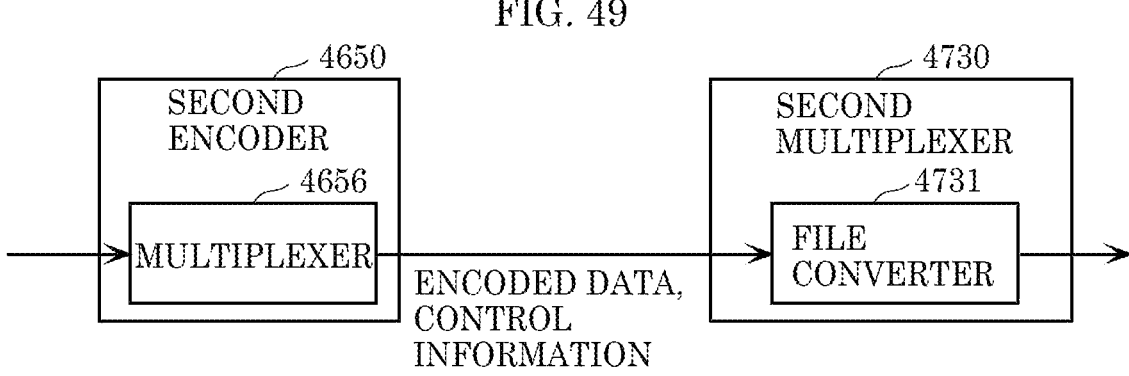
FIG. 49 is a diagram illustrating a structure of a second multiplexer according to Embodiment 5.

FIG. 49 is a diagram showing a configuration of second multiplexer 4730. Second multiplexer 4730 includes file converter 4731 that generates multiplexed data (file) by storing encoded data generated by second encoder 4650 and control information (NAL unit) in an ISOBMFF file. Second multiplexer 4730 is included in multiplexer 4614 shown in FIG. 1, for example.

Figure 50:
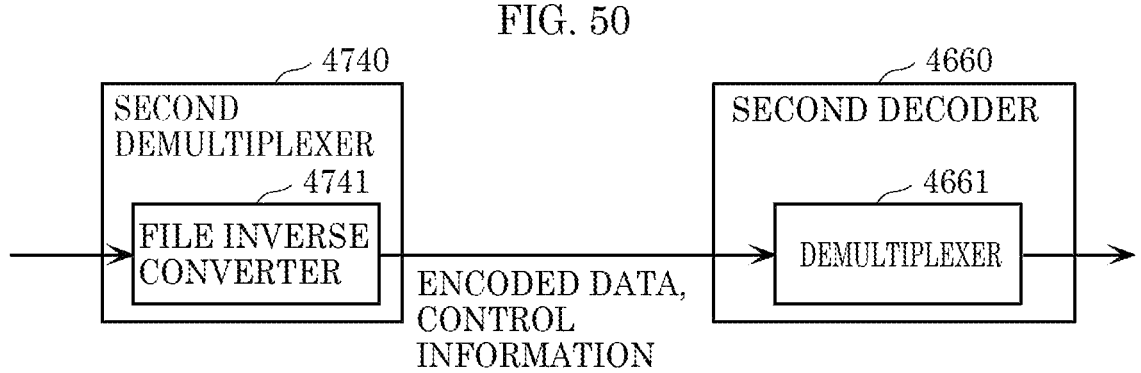
FIG. 50 is a diagram illustrating a structure of a second demultiplexer according to Embodiment 5.

FIG. 50 is a diagram showing a configuration of second demultiplexer 4740. Second demultiplexer 4740 includes file inverse converter 4741 that obtains encoded data and control information (NAL unit) from multiplexed data (file) and outputs the obtained encoded data and control information to second decoder 4660. Second demultiplexer 4740 is included in demultiplexer 4623 shown in FIG. 1, for example.

Figure 51:
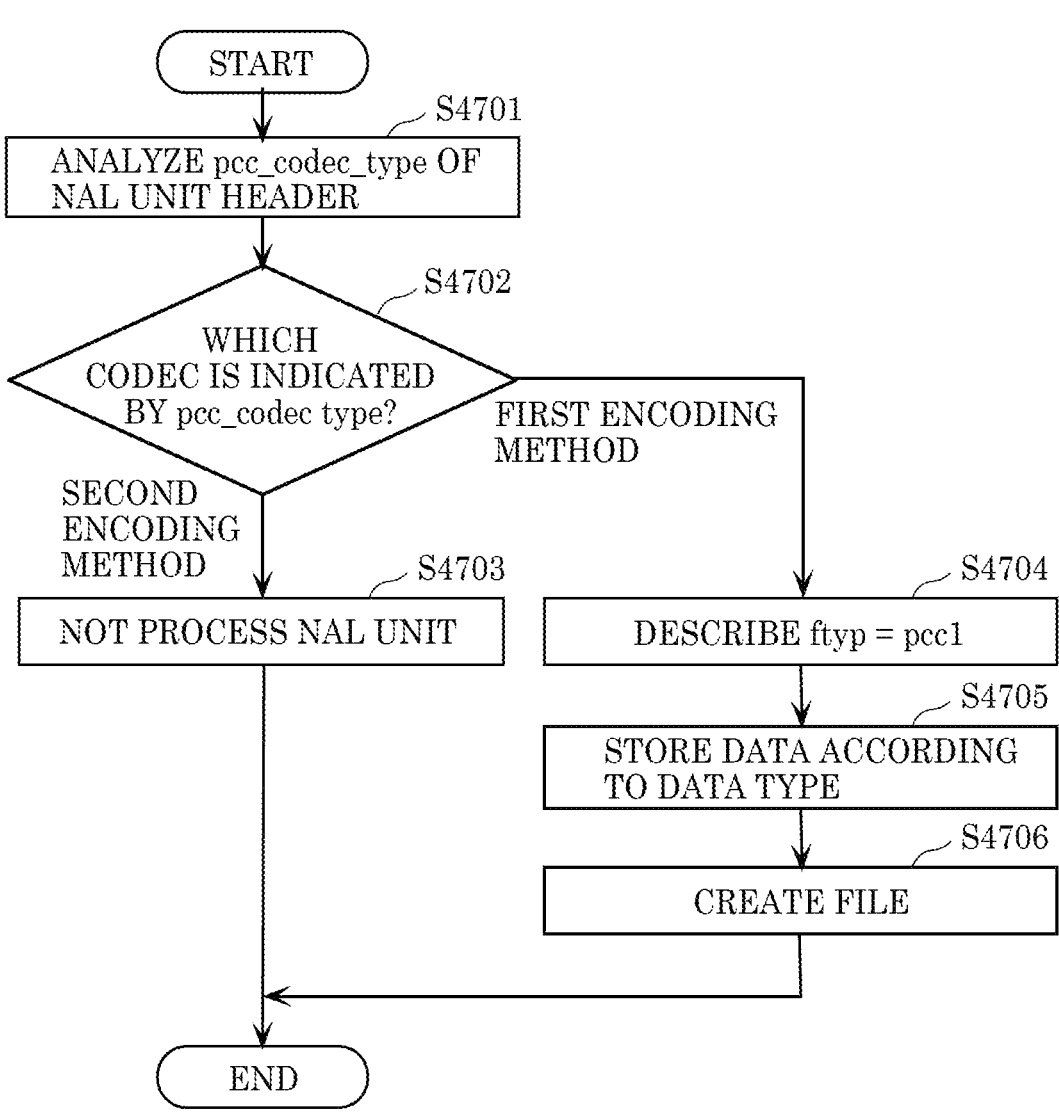
FIG. 51 is a flowchart of processing performed by the first multiplexer according to Embodiment 5.

FIG. 51 is a flowchart showing a multiplexing process by first multiplexer 4710. First, first multiplexer 4710 analyzes pcc_codec_type in the NAL unit header, thereby determining whether the codec used is the first encoding method or the second encoding method (S4701).

When pcc_codec_type represents the second encoding method (if "second encoding method" in S4702), first multiplexer 4710 does not process the NAL unit (S4703).

On the other hand, when pcc_codec_type represents the first encoding method (if "first encoding method" in S4702), first multiplexer 4710 describes pcc1 in ftyp (S4704). That is, first multiplexer 4710 describes information indicating that data encoded in the first encoding method is stored in the file in ftyp.

First multiplexer 4710 then analyzes pcc_nal_unit_type in the NAL unit header, and stores the data in a box (moov or mdat, for example) in a predetermined manner suitable for the data type represented by pcc_nal_unit_type (S4705). First multiplexer 4710 then creates an ISOBMFF file including the ftyp described above and the box described above (S4706).

Figure 52:
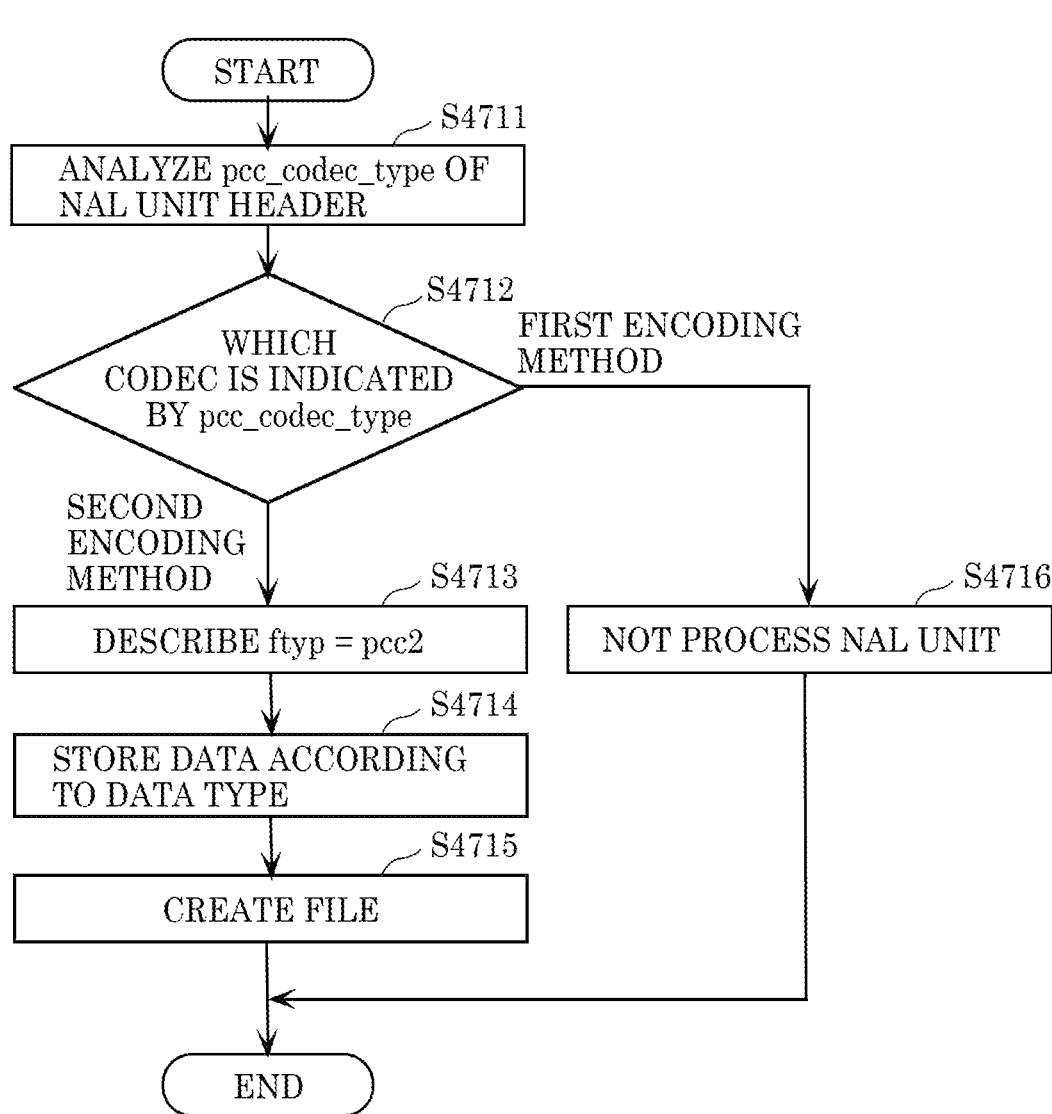
FIG. 52 is a flowchart of processing performed by the second multiplexer according to Embodiment 5.

FIG. 52 is a flowchart showing a multiplexing process by second multiplexer 4730. First, second multiplexer 4730 analyzes pcc_codec_type in the NAL unit header, thereby determining whether the codec used is the first encoding method or the second encoding method (S4711).

When pcc_codec_type represents the second encoding method (if "second encoding method" in S4712), second multiplexer 4730 describes pcc2 in ftyp (S4713). That is, second multiplexer 4730 describes information indicating that data encoded in the second encoding method is stored in the file in ftyp.

Second multiplexer 4730 then analyzes pcc_nal_unit_type in the NAL unit header, and stores the data in a box (moov or mdat, for example) in a predetermined manner suitable for the data type represented by pcc_nal_unit_type (S4714). Second multiplexer 4730 then creates an ISOBMFF file including the ftyp described above and the box described above (S4715).

On the other hand, when pcc_codec_type represents the first encoding method (if "first encoding method" in S4712), second multiplexer 4730 does not process the NAL unit (S4716).

Note that the process described above is an example in which PCC data is encoded in any one of the first encoding method and the second encoding method. First multiplexer 4710 and second multiplexer 4730 store a desired NAL unit in a file by identifying the codec type of the NAL unit. Note that, when the identification information for the PCC codec is included in a location other than the NAL unit header, first multiplexer 4710 and second multiplexer 4730 may identify the codec type (first encoding method or second encoding method) based on the identification information for the PCC codec included in the location other than the NAL unit header in step S4701 or S4711.

When storing data in a file in step S4706 or S4714, first multiplexer 4710 and second multiplexer 4730 may store the data in the file after deleting pcc_nal_unit_type from the NAL unit header.

Figure 53:
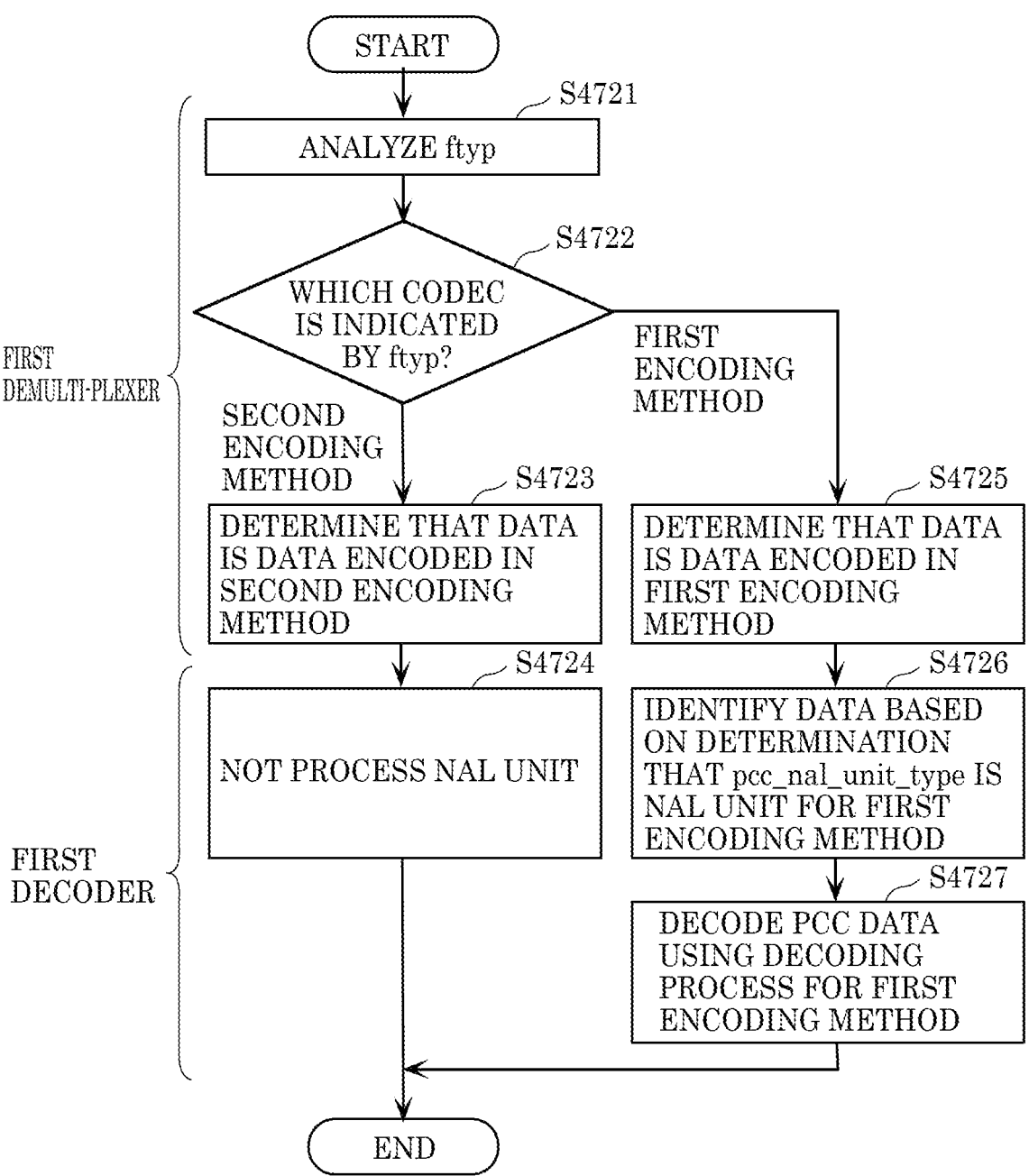
FIG. 53 is a flowchart of processing performed by the first demultiplexer and the first decoder according to Embodiment 5.

FIG. 53 is a flowchart showing a process performed by first demultiplexer 4720 and first decoder 4640. First, first demultiplexer 4720 analyzes ftyp in an ISOBMFF file (S4721). When the codec represented by ftyp is the second encoding method (pcc2) (if "second encoding method" in S4722), first demultiplexer 4720 determines that the data included in the payload of the NAL unit is data encoded in the second encoding method (S4723). First demultiplexer 4720 also transmits the result of the determination to first decoder 4640. First decoder 4640 does not process the NAL unit (S4724).

On the other hand, when the codec represented by ftyp is the first encoding method (pcc1) (if "first encoding method" in S4722), first demultiplexer 4720 determines that the data included in the payload of the NAL unit is data encoded in the first encoding method (S4725). First demultiplexer 4720 also transmits the result of the determination to first decoder 4640.

First decoder 4640 identifies the data based on the determination that pcc_nal_unit_type in the NAL unit header is the identifier of the NAL unit for the first encoding method (S4726). First decoder 4640 then decodes the PCC data using a decoding process for the first encoding method (S4727).

Figure 54:
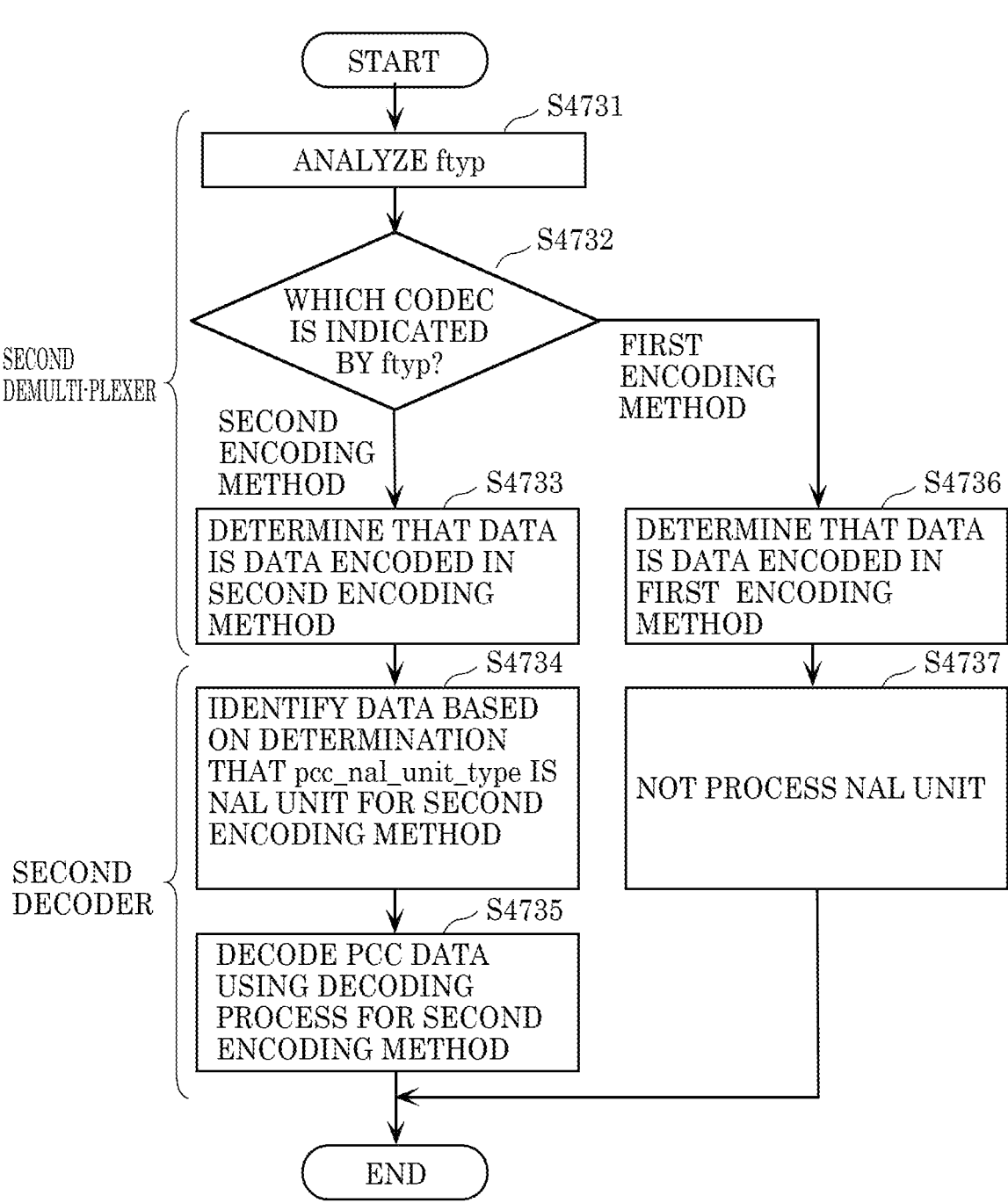
FIG. 54 is a flowchart of processing performed by the second demultiplexer and the second decoder according to Embodiment 5.

FIG. 54 is a flowchart showing a process performed by second demultiplexer 4740 and second decoder 4660. First, second demultiplexer 4740 analyzes ftyp in an ISOBMFF file (S4731). When the codec represented by ftyp is the second encoding method (pcc2) (if "second encoding method" in S4732), second demultiplexer 4740 determines that the data included in the payload of the NAL unit is data encoded in the second encoding method (S4733). Second demultiplexer 4740 also transmits the result of the determination to second decoder 4660.

Second decoder 4660 identifies the data based on the determination that pcc_nal_unit_type in the NAL unit header is the identifier of the NAL unit for the second encoding method (S4734). Second decoder 4660 then decodes the PCC data using a decoding process for the second encoding method (S4735).

On the other hand, when the codec represented by ftyp is the first encoding method (pcc1) (if "first encoding method" in S4732), second demultiplexer 4740 determines that the data included in the payload of the NAL unit is data encoded in the first encoding method (S4736). Second demultiplexer 4740 also transmits the result of the determination to second decoder 4660. Second decoder 4660 does not process the NAL unit (S4737).

As described above, for example, since the codec type of the NAL unit is identified in first demultiplexer 4720 or second demultiplexer 4740, the codec type can be identified in an early stage. Furthermore, a desired NAL unit can be input to first decoder 4640 or second decoder 4660, and an unwanted NAL unit can be removed. In this case, the process of first decoder 4640 or second decoder 4660 analyzing the identification information for the codec may be unnecessary. Note that a process of referring to the NAL unit type again and analyzing the identification information for the codec may be performed by first decoder 4640 or second decoder 4660.

Furthermore, if pcc_nal_unit_type is deleted from the NAL unit header by first multiplexer 4710 or second multiplexer 4730, first demultiplexer 4720 or second demultiplexer 4740 can output the NAL unit to first decoder 4640 or second decoder 4660 after adding pcc_nal_unit_type to the NAL unit.

Embodiment 6

Figure 55:
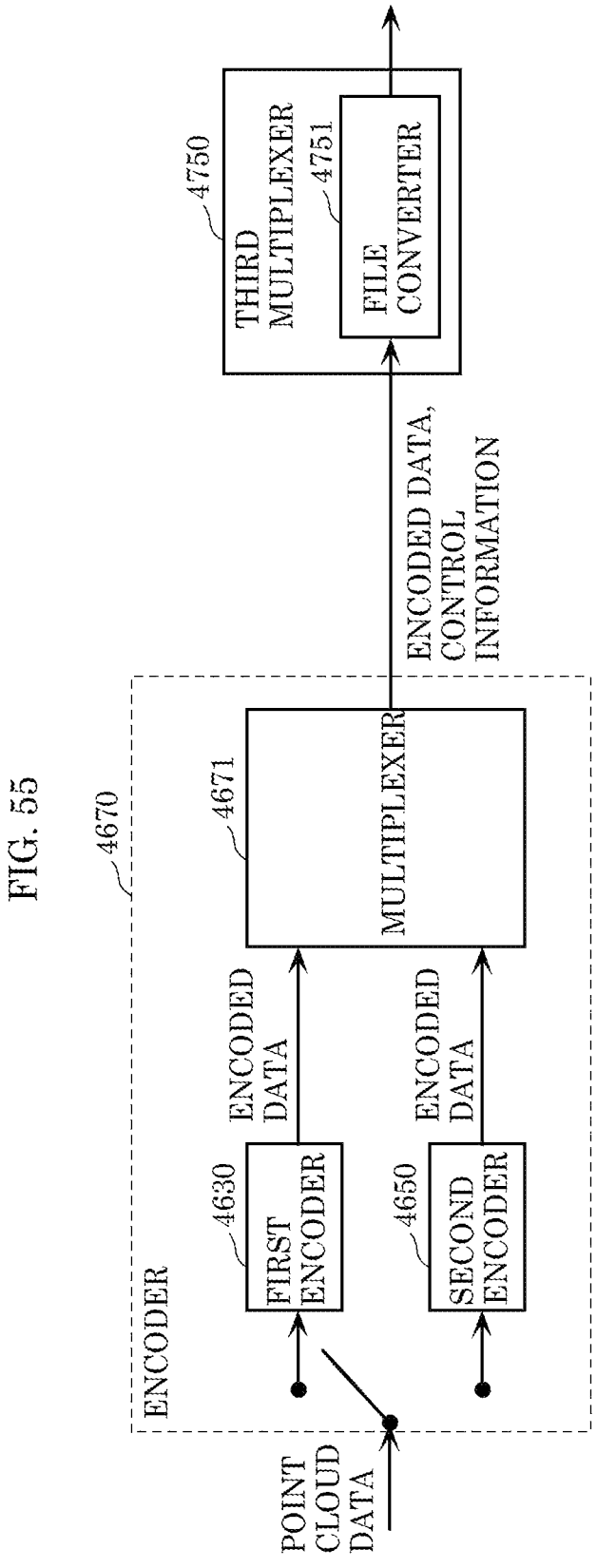
FIG. 55 is a diagram illustrating structures of an encoder and a third multiplexer according to Embodiment 6.

In Embodiment 6, a multiplexer and a demultiplexer that correspond to encoder 4670 and decoder 4680 ready for a plurality of codecs described above with regard to Embodiment 4 will be described. FIG. 55 is a diagram showing configurations of encoder 4670 and third multiplexer 4750 according to this embodiment.

Encoder 4670 encodes point cloud data in both or one of the first encoding method and the second encoding method. Encoder 4670 may change the encoding method (between the first encoding method and the second encoding method) on a point-cloud-data basis or on a frame basis. Alternatively, encoder 4670 may change the encoding method on the basis of an encodable unit.

Encoder 4670 generates encoded data (encoded stream) including the identification information for the PCC codec described above with regard to Embodiments 1 to 4.

Third multiplexer 4750 includes file converter 4751. File converter 4751 converts a NAL unit output from encoder 4670 into a PCC data file. File converter 4751 analyzes the codec identification information included in the NAL unit header, and determines whether the PCC-encoded data is data encoded in the first encoding method, data encoded in the second encoding method, or data encoded in both the encoding methods. File converter 4751 describes a brand name that allows codec identification in ftyp. For example, when indicating the data is encoded in both the encoding methods, pcc3 is described in ftyp.

Note that, when encoder 4670 describes the PCC codec identification information in a location other than the NAL unit, file converter 4751 may determine the PCC codec (encoding method) based on the identification information.

Figure 56:
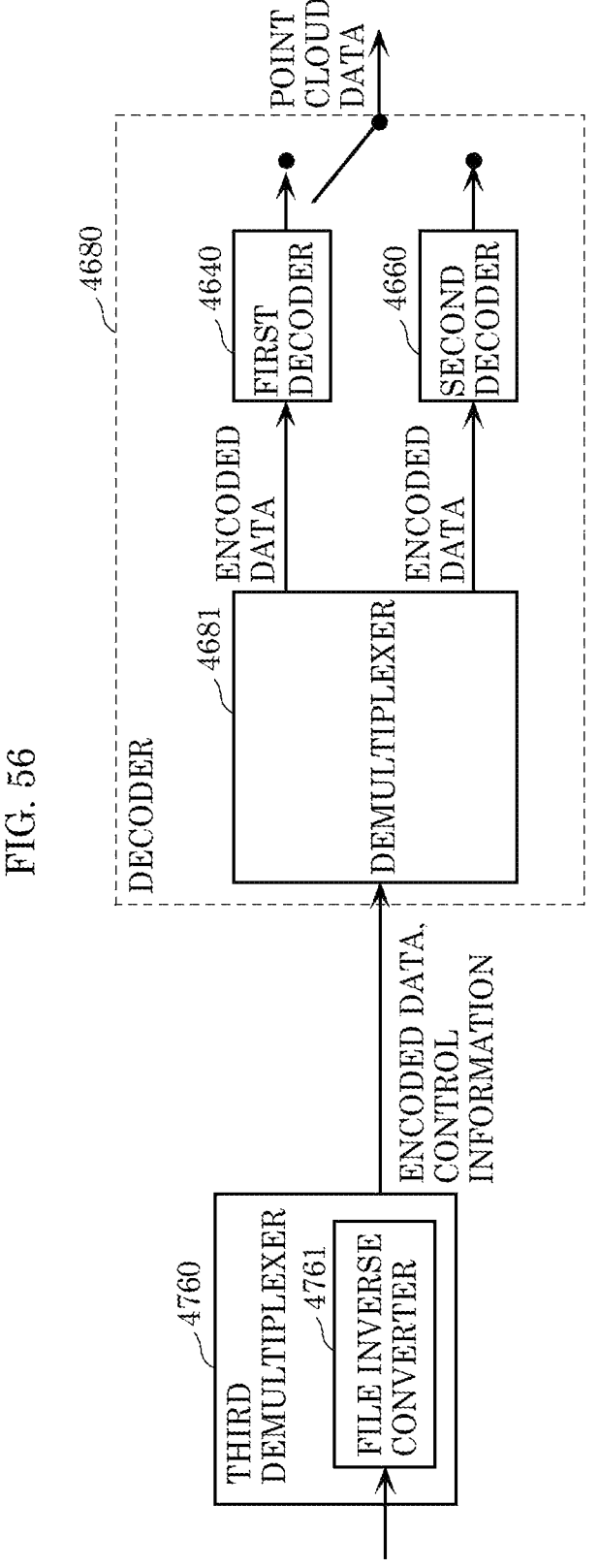
FIG. 56 is a diagram illustrating structures of a third demultiplexer and a decoder according to Embodiment 6.

FIG. 56 is a diagram showing configurations of third demultiplexer 4760 and decoder 4680 according to this embodiment.

Third demultiplexer 4760 includes file inverse converter 4761. File inverse converter 4761 analyzes ftyp included in a file, and determines whether the PCC-encoded data is data encoded in the first encoding method, data encoded in the second encoding method, or data encoded in both the encoding methods.

When the PCC-encoded data is data encoded in any one of the encoding methods, the data is input to an appropriate one of first decoder 4640 and second decoder 4660, and is not input to the other decoder. When the PCC-encoded data is data encoded in both the encoding methods, the data is input to decoder 4680 ready for both the encoding methods.

Decoder 4680 decodes the PCC-encoded data in both or one of the first encoding method and the second encoding method.

Figure 57:
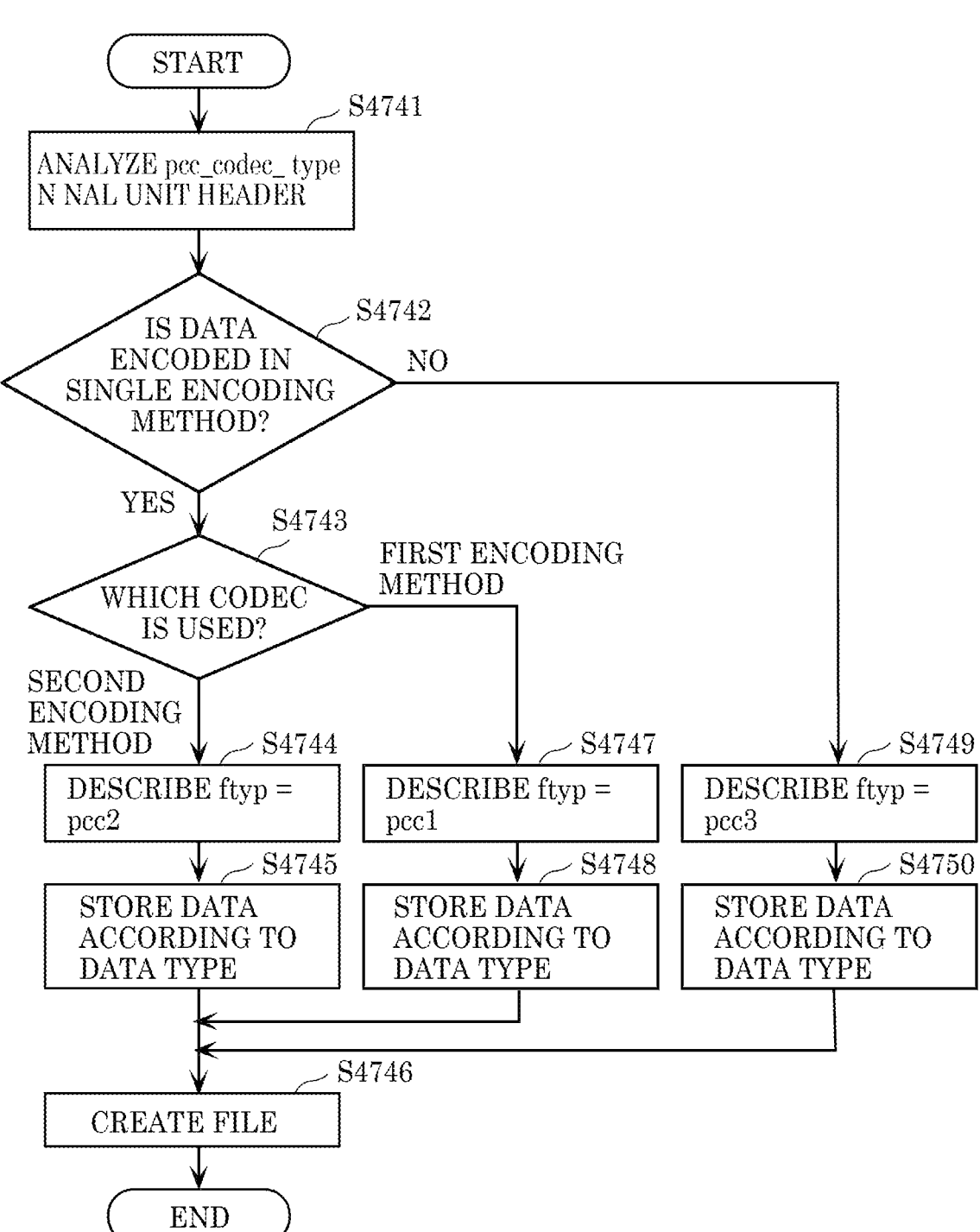
FIG. 57 is a flowchart of processing performed by the third multiplexer according to Embodiment 6.

FIG. 57 is a flowchart showing a process performed by third multiplexer 4750 according to this embodiment.

First, third multiplexer 4750 analyzes pcc_codec_type in the NAL unit header, thereby determining whether the codec(s) used is the first encoding method, the second encoding method, or both the first encoding method and the second encoding method (S4741).

When the second encoding method is used (Yes in S4742 and "second encoding method" in S4743), third multiplexer 4750 describes pcc2 in ftyp (S4744). That is, third multiplexer 4750 describes information indicating that data encoded in the second encoding method is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4745). Third multiplexer 4750 then creates an ISOBMFF file including the ftyp described above and the box described above (S4746).

When the first encoding method is used (Yes in S4742 and "first encoding method" in S4743), third multiplexer 4750 describes pcc1 in ftyp (S4747). That is, third multiplexer 4750 describes information indicating that data encoded in the first encoding method is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4748). Third multiplexer 4750 then creates an ISOBMFF file including the ftyp described above and the box described above (S4746).

When both the first encoding method and the second encoding method are used (No in S4742), third multiplexer 4750 describes pcc3 in ftyp (S4749). That is, third multiplexer 4750 describes information indicating that data encoded in both the encoding methods is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4750). Third multiplexer 4750 then creates an ISOBMFF file including the ftyp described above and the box described above (S4746).

Figure 58:
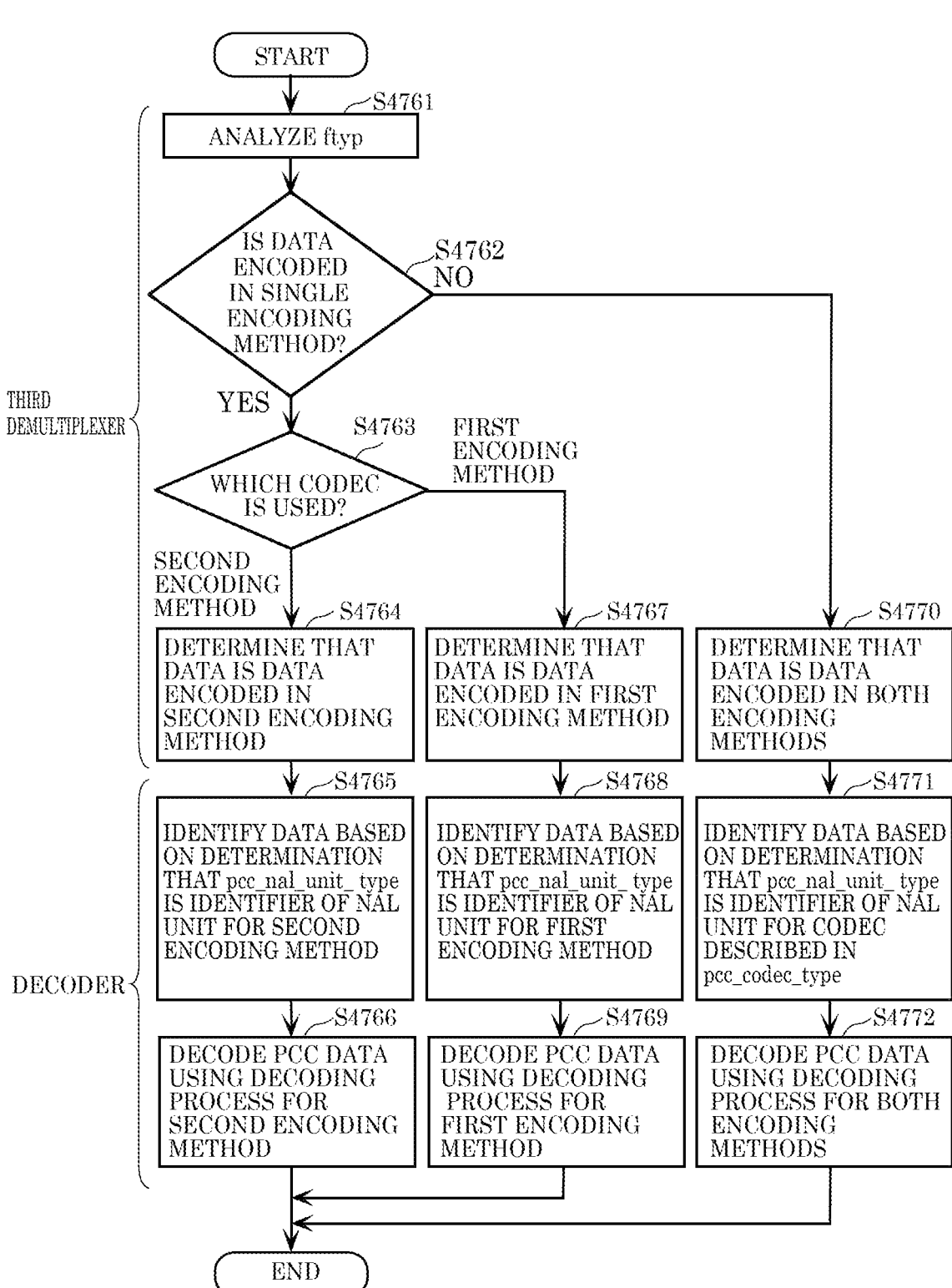
FIG. 58 is a flowchart of processing performed by the third demultiplexer and the decoder according to Embodiment 6.

FIG. 58 is a flowchart showing a process performed by third demultiplexer 4760 and decoder 4680. First, third demultiplexer 4760 analyzes ftyp included in an ISOBMFF file (S4761). When the codec represented by ftyp is the second encoding method (pcc2) (Yes in S4762 and "second encoding method" in S4763), third demultiplexer 4760 determines that the data included in the payload of the NAL unit is data encoded in the second encoding method (S4764). Third demultiplexer 4760 also transmits the result of the determination to decoder 4680.

Decoder 4680 identifies the data based on the determination that pcc_nal_unit_type in the NAL unit header is the identifier of the NAL unit for the second encoding method (S4765). Decoder 4680 then decodes the PCC data using a decoding process for the second encoding method (S4766).

When the codec represented by ftyp is the first encoding method (pcc1) (Yes in S4762 and "first encoding method" in S4763), third demultiplexer 4760 determines that the data included in the payload of the NAL unit is data encoded in the first encoding method (S4767). Third demultiplexer 4760 also transmits the result of the determination to decoder 4680.

Decoder 4680 identifies the data based on the determination that pcc_nal_unit_type in the NAL unit header is the identifier of the NAL unit for the first encoding method (S4768). Decoder 4680 then decodes the PCC data using a decoding process for the first encoding method (S4769).

When ftyp indicates that both the encoding methods are used (pcc3) (No in S4762), third demultiplexer 4760 determines that the data included in the payload of the NAL unit is data encoded in both the first encoding method and the second encoding method (S4770). Third demultiplexer 4760 also transmits the result of the determination to decoder 4680.

Decoder 4680 identifies the data based on the determination that pcc_nal_unit_type in the NAL unit header is the identifier of the NAL unit for the codecs described in pcc_codec_type (S4771). Decoder 4680 then decodes the PCC data using decoding processes for both the encoding methods (S4772). That is, decoder 4680 decodes the data encoded in the first encoding method using a decoding process for the first encoding method, and decodes the data encoded in the second encoding method using a decoding process for the second encoding method.

In the following, variations of this embodiment will be described. As types of brands represented by ftyp, the types described below can be indicated by the identification information. Furthermore, a combination of a plurality of the types described below can also be indicated by the identification information.

The identification information may indicate whether the original data object yet to be PCC-encoded is a point cloud whose range is limited or a large point cloud whose range is not limited, such as map information.

The identification information may indicate whether the original data yet to be PCC-encoded is a static object or a dynamic object.

As described above, the identification information may indicate whether the PCC-encoded data is data encoded in the first encoding method or data encoded in the second encoding method.

The identification information may indicate an algorithm used in the PCC encoding. Here, the "algorithm" means an encoding method that can be used in the first encoding method or the second encoding method, for example.

The identification information may indicate a differentiation between methods of storing the PCC-encoded data into an ISOBMFF file. For example, the identification information may indicate whether the storage method used is a storage method for accumulation or a storage method for real-time transmission, such as dynamic streaming.

Although the method of storing a NAL unit described in Embodiment 1 has been described in Embodiment 5, and the method of storing a NAL unit described in Embodiment 4 has been described in Embodiment 6, the same storage methods can be applied to the NAL unit described in Embodiments 2 and 3 to store the identification information for the PCC codec into an ISOBMFF file.

Although an example in which ISOBMFF is used as a file format has been described in Embodiments 5 and 6, other formats can also be used. For example, the method according to this embodiment can also be used when PCC-encoded data is stored in MPEG-2 TS Systems, MPEG-DASH, MMT, or RMP.

Although an example in which metadata, such as the identification information, is stored in ftyp has been shown above, metadata can also be stored in a location other than ftyp. For example, the metadata may be stored in moov.

Figure 59:
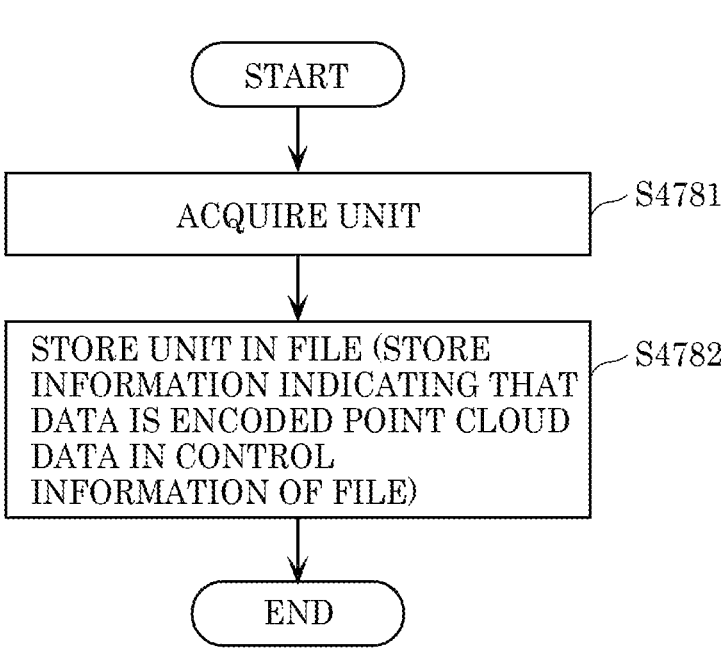
FIG. 59 is a flowchart of processing performed by a three-dimensional data storage device according to Embodiment 6.

As described above, a three-dimensional data storing device (or three-dimensional data multiplexing device or three-dimensional data encoding device) performs the process shown in FIG. 59.

First, the three-dimensional data storing device (which includes first multiplexer 4710, second multiplexer 4730 or third multiplexer 4750, for example) acquires one or more units (NAL units, for example) that store an encoded stream, which is encoded point cloud data (S4781). The three-dimensional data storing device then stores the one or more units in a file (an ISOBMFF file, for example) (S4782). In the storage (S4782), the three-dimensional data storing device also stores information indicating that the data stored in the file is encoded point cloud data (pcc1, pcc2, or pcc3, for example) in the control information (ftyp, for example) (referred to also as signaling information) for the file.

With such a configuration, a device that processes the file generated by the three-dimensional data storing device can quickly determine whether the data stored in the file is encoded point cloud data or not by referring to the control information for the file. Therefore, the processing amount of the device can be reduced, or the processing speed of the device can be increased.

For example, the information indicates the encoding method used for the encoding of the point cloud data among the first encoding method and the second encoding method. Note that the fact that the data stored in the file is encoded point cloud data and the encoding method used for the encoding of the point cloud data among the first encoding method and the second encoding method may be indicated by a single piece of information or different pieces of information.

With such a configuration, a device that processes the file generated by the three-dimensional data storing device can quickly determine the codec used for the data stored in the file by referring to the control information for the file. Therefore, the processing amount of the device can be reduced, or the processing speed of the device can be increased.

For example, the first encoding method is a method (GPCC) that encodes geometry information that represents the position of point cloud data as an N-ary tree (N represents an integer equal to or greater than 2) and encodes attribute information using the geometry information, and the second encoding method is a method (VPCC) that generates a two-dimensional image from point cloud data and encodes the two-dimensional image in a video encoding method.

For example, the file described above is in conformity with ISOBMFF (ISO-based media file format).

For example, the three-dimensional data storing device includes a processor and a memory, and the processor performs the processes described above using the memory.

Figure 60:
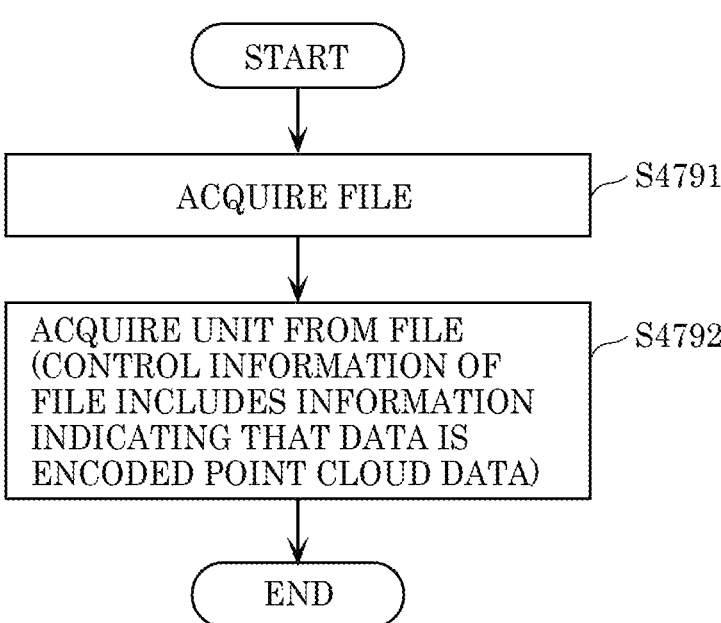
FIG. 60 is a flowchart of processing performed by a three-dimensional data acquisition device according to Embodiment 6.

As described above, a three-dimensional data acquisition device (or three-dimensional data demultiplexing device or three-dimensional data decoding device) performs the process shown in FIG. 60.

The three-dimensional data acquisition device (which includes first demultiplexer 4720, second demultiplexer 4740, or third demultiplexer 4760, for example) acquires a file (an ISOBMFF file, for example) that stores one or more units (NAL units, for example) that store an encoded stream, which is encoded point cloud data (S4791). The three-dimensional data acquisition device acquires the one or more units from the file (S4792). The control information (ftyp, for example) for the file includes information indicating that the data stored in the file is encoded point cloud data (pcc1, pcc2, or pcc3, for example).

For example, the three-dimensional data acquisition device determines whether the data stored in the file is encoded point cloud data or not by referring to the information. When the three-dimensional data acquisition device determines that the data stored in the file is encoded point cloud data, the three-dimensional data acquisition device generates point cloud data by decoding the encoded point cloud data included in the one or more units. Alternatively, when the three-dimensional data acquisition device determines that the data stored in the file is encoded point cloud data, the three-dimensional data acquisition device outputs information indicating that the data included in the one or more units is encoded point cloud data to a processor in a subsequent stage (first decoder 4640, second decoder 4660, or decoder 4680, for example) (or notifies a processor in a subsequent stage that the data included in the one or more units is encoded point cloud data).

With such a configuration, the three-dimensional data acquisition device can quickly determine whether the data stored in the file is encoded point cloud data or not by referring to the control information for the file. Therefore, the processing amount of the three-dimensional data acquisition device or a device in a subsequent stage can be reduced, or the processing speed of the three-dimensional data acquisition device or a device in a subsequent stage can be increased.

For example, the information represents the encoding method used for the encoding among the first encoding method and the second encoding method. Note that the fact that the data stored in the file is encoded point cloud data and the encoding method used for the encoding of the point cloud data among the first encoding method and the second encoding method may be indicated by a single piece of information or different pieces of information.

With such a configuration, the three-dimensional data acquisition device can quickly determine the codec used for the data stored in the file by referring to the control information for the file. Therefore, the processing amount of the three-dimensional data acquisition device or a device in a subsequent stage can be reduced, or the processing speed of the three-dimensional data acquisition device or a device in a subsequent stage can be increased.

For example, based on the information, the three-dimensional data acquisition device acquires the data encoded in any one of the first encoding method and the second encoding method from the encoded point cloud data including the data encoded in the first encoding method and the data encoded in the second encoding method.

For example, the first encoding method is a method (GPCC) that encodes geometry information that represents the position of point cloud data as an N-ary tree (N represents an integer equal to or greater than 2) and encodes attribute information using the geometry information, and the second encoding method is a method (VPCC) that generates a two-dimensional image from point cloud data and encodes the two-dimensional image in a video encoding method.

For example, the file described above is in conformity with ISOBMFF (ISO-based media file format).

For example, the three-dimensional data acquisition device includes a processor and a memory, and the processor performs the processes described above using the memory.

Embodiment 7

In Embodiment 7, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 61:
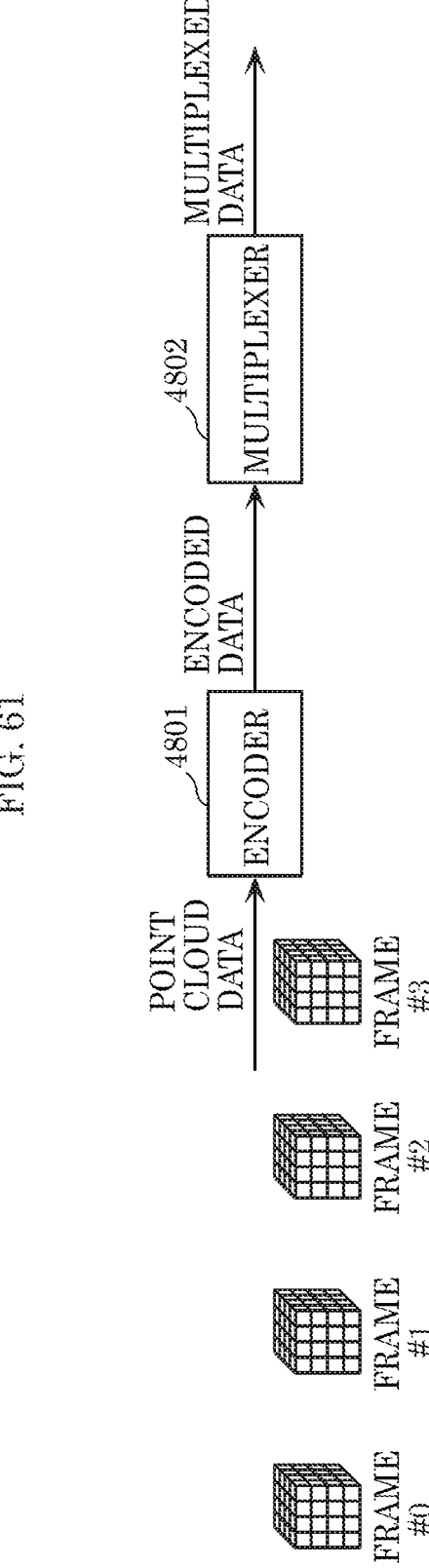
FIG. 61 is a diagram illustrating structures of an encoder and a multiplexer according to Embodiment 7.

FIG. 61 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 62:
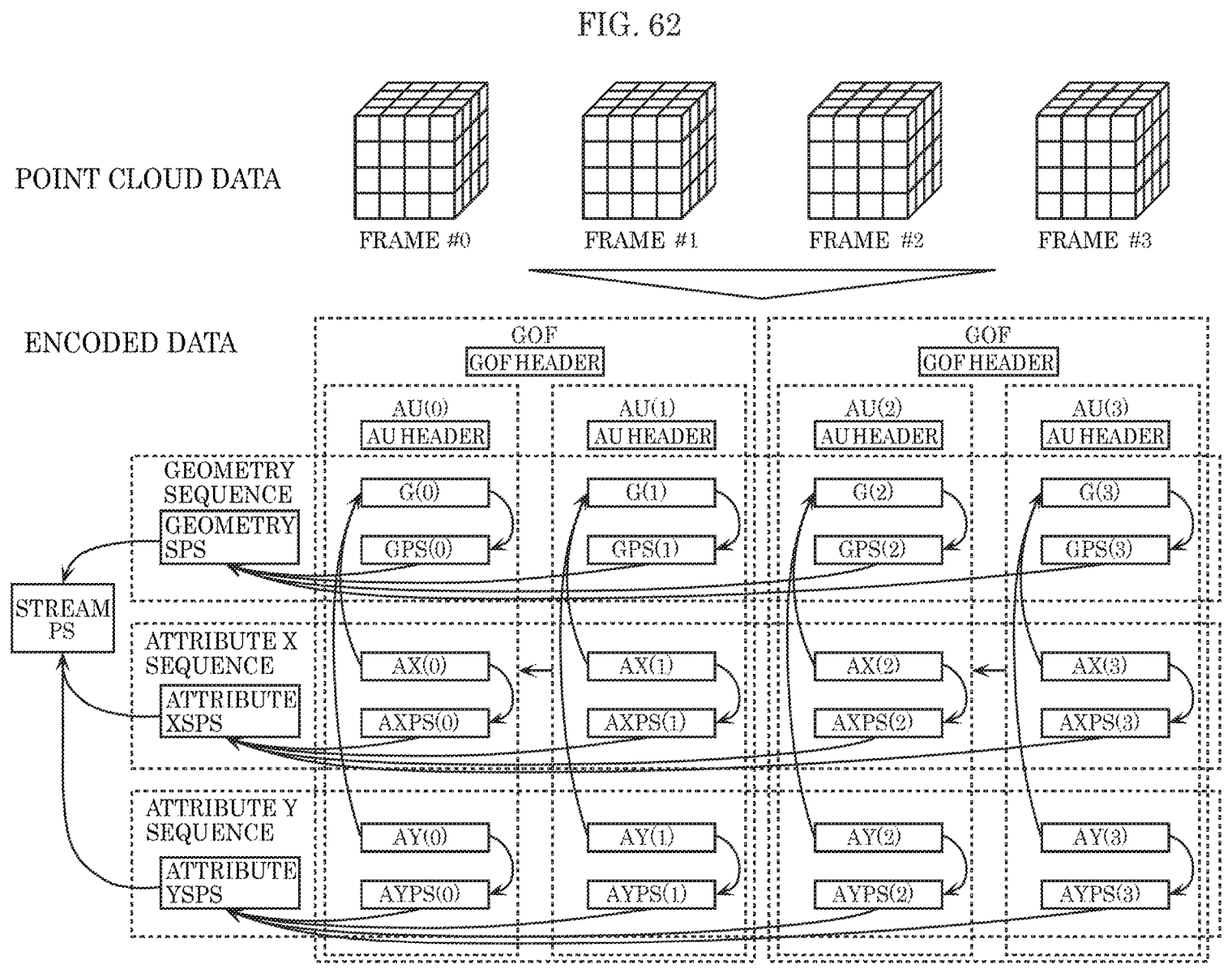

FIG. 62 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 62 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 62 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 62 shows an example in which there is one type of geometry information, and there are two types of attribute information, the present invention is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 63:
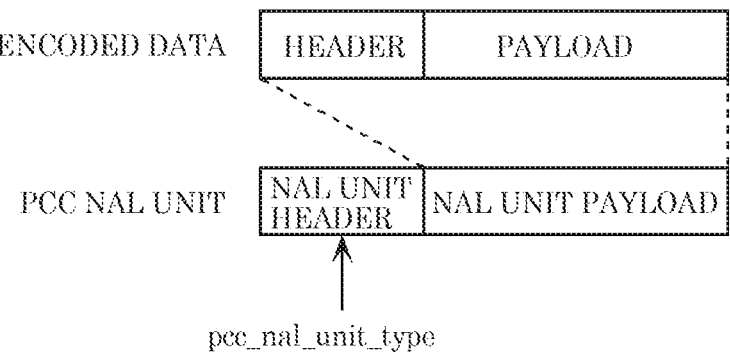
FIG. 63 is a diagram illustrating a structure example of encoded data and a NAL unit according to Embodiment 7.

For example, a data format is defined for each type of encoded data. FIG. 63 is a diagram showing an example of encoded data and a NAL unit.

For example, as shown in FIG. 63, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 64 is a diagram showing a semantics example of pcc_nal_unit_type.

As shown in FIG. 64, when pcc_codec_type is codec 1 (Coded 1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described. Multiplexer 4802 transmits NAL units on a GOF basis or on an AU basis.

Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 65:
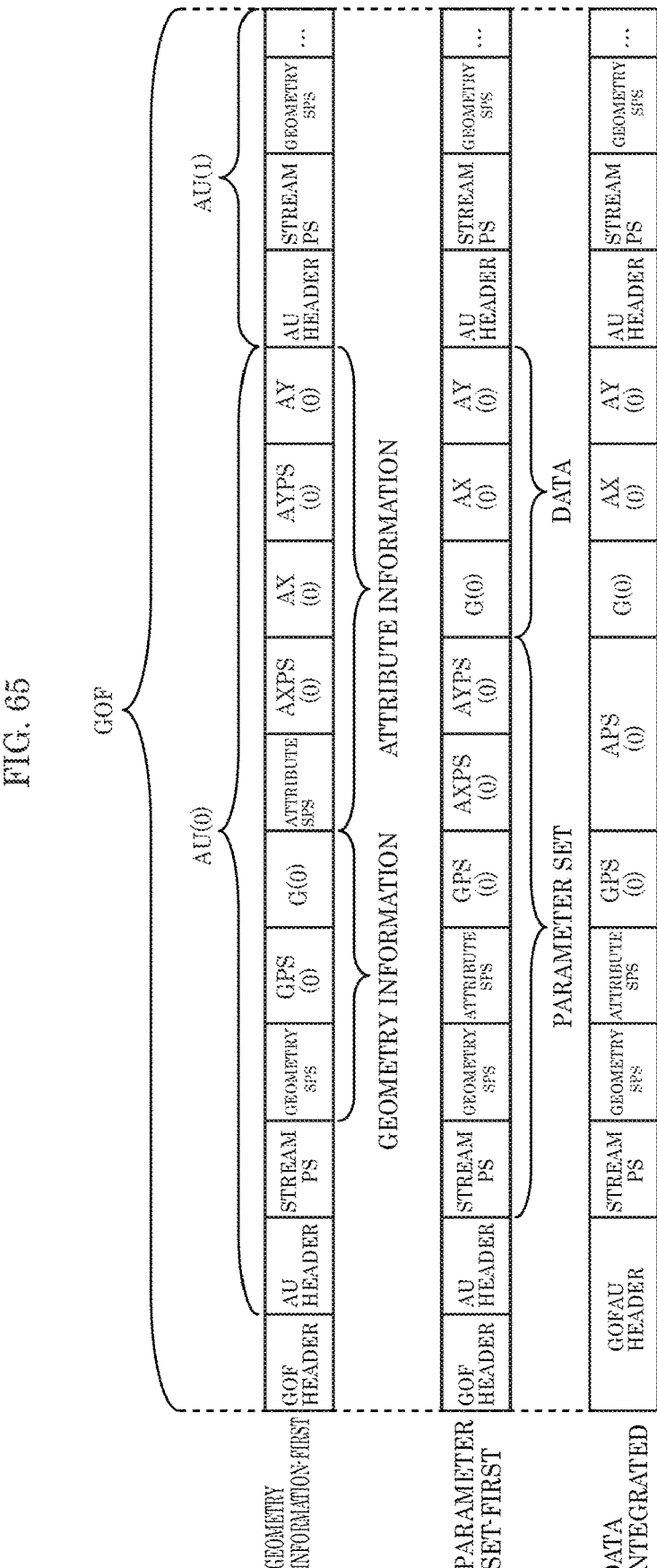
FIG. 65 is a diagram illustrating an example of a transmitting order of NAL units according to Embodiment 7.

FIG. 65 is a diagram showing examples of the order of transmission of NAL units. FIG. 65 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 65 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 65, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Figure 66:
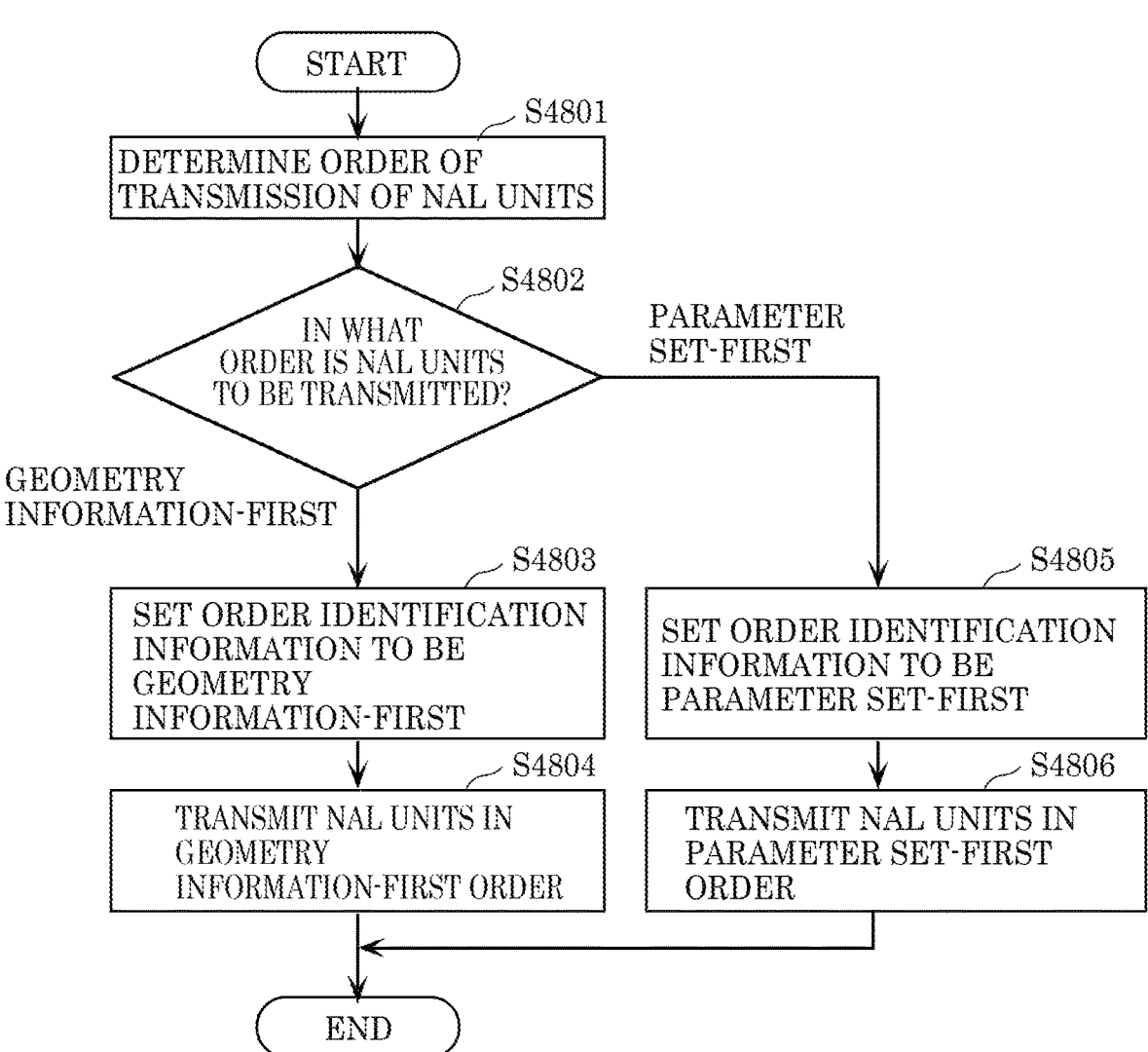
FIG. 66 is a flowchart of processing performed by a three-dimensional data encoding device according to Embodiment 7.

In the following, a process relating to order identification information will be described. FIG. 66 is a flowchart showing a process performed by the three-dimensional data encoding device (encoder 4801 and multiplexer 4802) that involves the order of transmission of NAL units.

First, the three-dimensional data encoding device determines the order of transmission of NAL units (geometry information-first or parameter set-first) (S4801). For example, the three-dimensional data encoding device determines the order of transmission based on a specification from a user or an external device (the three-dimensional data decoding device, for example).

If the determined order of transmission is geometry information-first (if "geometry information-first" in S4802), the three-dimensional data encoding device sets the order identification information included in the stream PS to geometry information-first (S4803). That is, in this case, the order identification information indicates that the NAL units are transmitted in the geometry information-first order. The three-dimensional data encoding device then transmits the NAL units in the geometry information-first order (S4804).

On the other hand, if the determined order of transmission is parameter set-first (if "parameter set-first" in S4802), the three-dimensional data encoding device sets the order identification information included in the stream PS to parameter set-first (S4805). That is, in this case, the order identification information indicates that the NAL units are transmitted in the parameter set-first order. The three-dimensional data encoding device then transmits the NAL units in the parameter set-first order (S4806).

Figure 67:
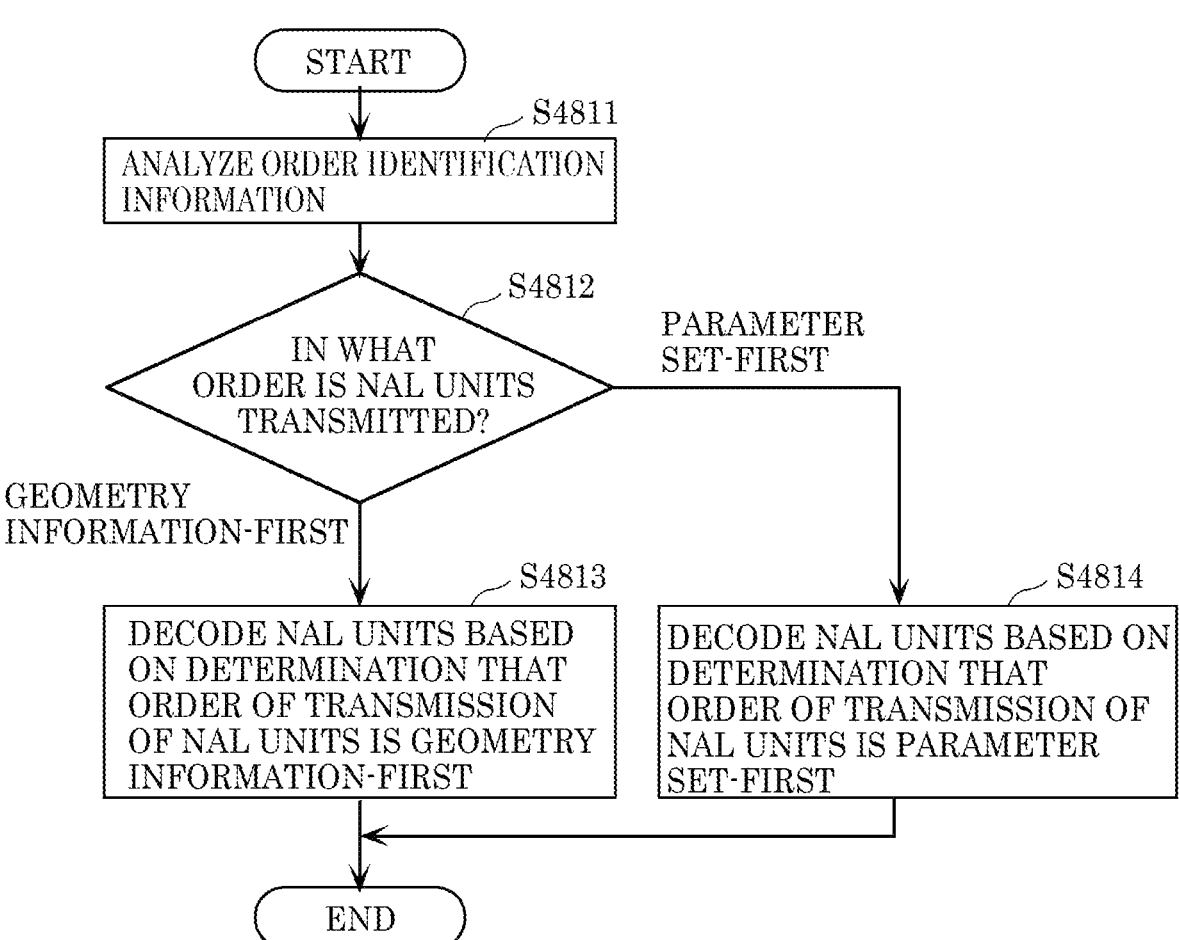
FIG. 67 is a flowchart of processing performed by a three-dimensional data decoding device according to Embodiment 7.

FIG. 67 is a flowchart showing a process performed by the three-dimensional data decoding device that involves the order of transmission of NAL units. First, the three-dimensional data decoding device analyzes the order identification information included in the stream PS (S4811).

If the order of transmission indicated by the order identification information is geometry information-first of "geometry information-first" in S4812), the three-dimensional data decoding device decodes the NAL units based on the determination that the order of transmission of the NAL units is geometry information-first (S4813).

On the other hand, if the order of transmission indicated by the order identification information is parameter set-first (if "parameter set-first" in S4812), the three-dimensional data decoding device decodes the NAL units based on the determination that the order of transmission of the NAL units is parameter set-first (S4814).

For example, if the three-dimensional data decoding device does not decode attribute information, in step S4813, the three-dimensional data decoding device does not obtain the entire NAL units but can obtain a part of a NAL unit relating to the geometry information and decode the obtained NAL unit to obtain the geometry information.

Figure 68:
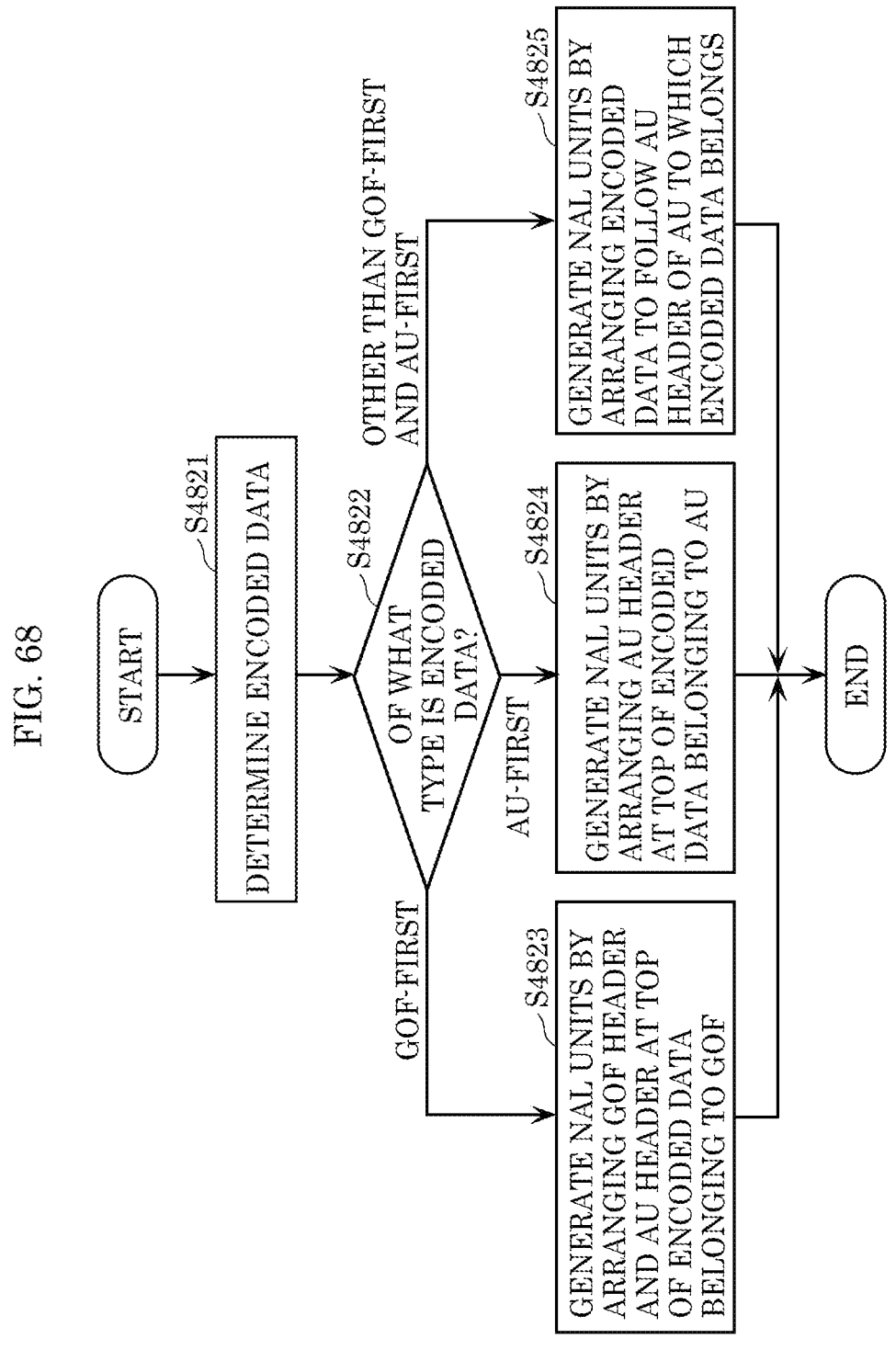
FIG. 68 is a flowchart of multiplexing processing according to Embodiment 7.

Next, a process relating to generation of an AU and a GOF will be described. FIG. 68 is a flowchart showing a process performed by the three-dimensional data encoding device (multiplexer 4802) that relates to generation of an AU and a GOF in multiplexing of NAL units.

First, the three-dimensional data encoding device determines the type of the encoded data (S4821). Specifically, the three-dimensional data encoding device determines whether the encoded data to be processed is AU-first data, GOF-first data, or other data.

If the encoded data is GOF-first data (if "GOF-first" in S4822), the three-dimensional data encoding device generates NAL units by arranging a GOF header and an AU header at the top of the encoded data belonging to the GOF (S4823).

If the encoded data is AU-first data (if "AU-first" in S4822), the three-dimensional data encoding device generates NAL units by arranging an AU header at the top of the encoded data belonging to the AU (S4824).

If the encoded data is neither GOF-first data nor AU-first data (if "other than GOF-first and AU-first" in S4822), the three-dimensional data encoding device generates NAL units by arranging the encoded data to follow the AU header of the AU to which the encoded data belongs (S4825).

Figure 69:
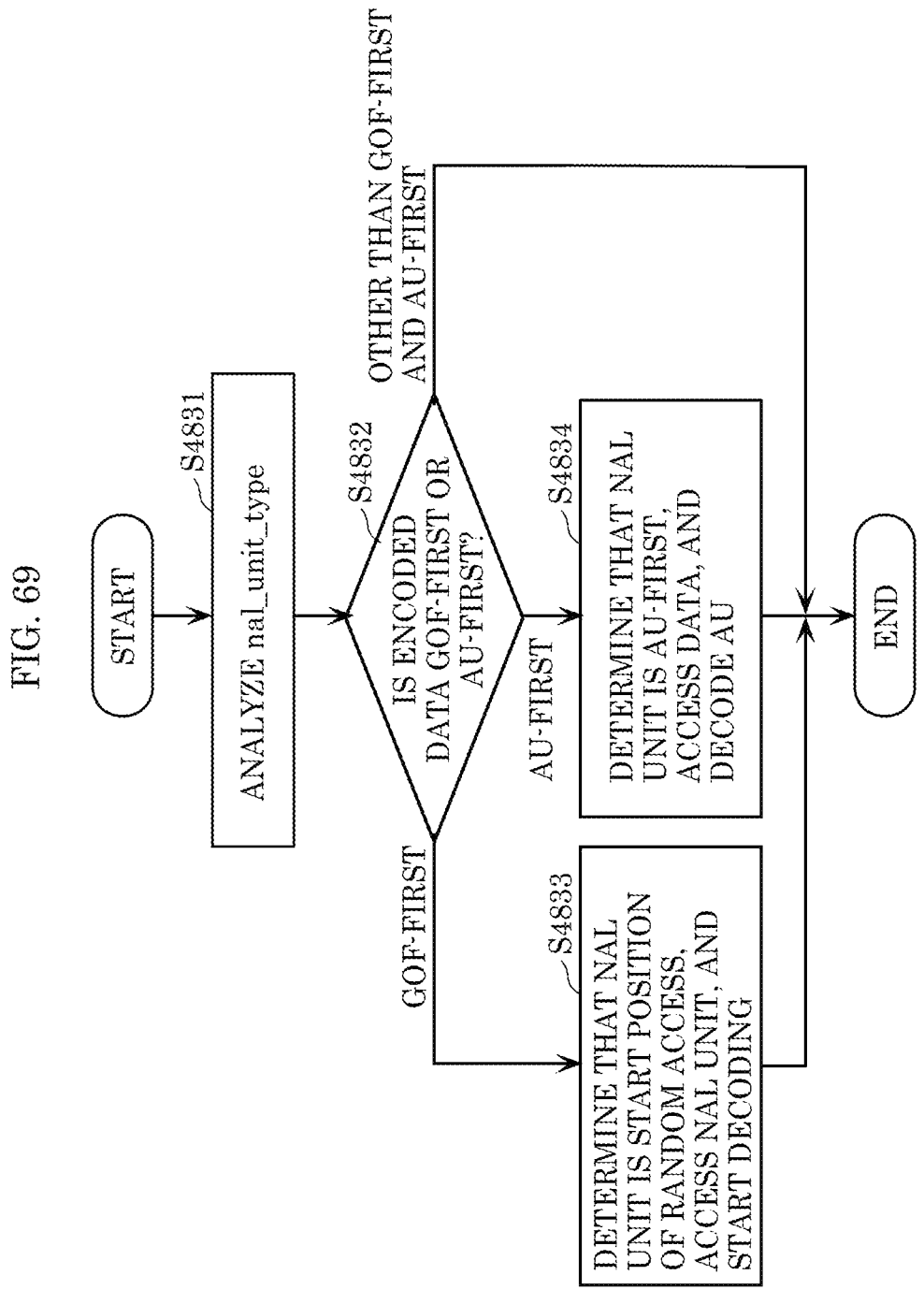
FIG. 69 is a flowchart of demultiplexing processing according to Embodiment 7.

Next, a process relating to access to an AU and a GOF will be described. FIG. 69 is a flowchart showing a process performed by the three-dimensional data decoding device that involves accessing to an AU and a GOF in demultiplexing of a NAL unit.

First, the three-dimensional data decoding device determines the type of the encoded data included in the NAL unit by analyzing nal_unit_type in the NAL unit (S4831). Specifically, the three-dimensional data decoding device determines whether the encoded data included in the NAL unit is AU-first data, GOF-first data, or other data.

If the encoded data included in the NAL unit is GOF-first data (if "GOF-first" in S4832), the three-dimensional data decoding device determines that the NAL unit is a start position of random access, accesses the NAL unit, and starts the decoding process (S4833).

If the encoded data included in the NAL unit is AU-first data (if "AU-first" in S4832), the three-dimensional data decoding device determines that the NAL unit is AU-first, accesses the data included in the NAL unit, and decodes the AU (54834).

If the encoded data included in the NAL unit is neither GOF-first data nor AU-first data (if "other than GOF-first and AU-first" in S4832), the three-dimensional data decoding device does not process the NAL unit.

As described above, the three-dimensional data encoding device performs the process shown in FIG. 70. The three-dimensional data encoding device encodes time-series three-dimensional data (point cloud data on a dynamic object, for example). The three-dimensional data includes geometry information and attribute information associated with each time point.

First, the three-dimensional data encoding device encodes the geometry information (S4841). The three-dimensional data encoding device then encodes the attribute information to be processed by referring to the geometry information associated with the same time point as the attribute information to be processed (S4842). Here, as shown in FIG. 62, the geometry information and the attribute information associated with the same time point form an access unit (AU). That is, the three-dimensional data encoding device encodes the attribute information to be processed by referring to the geometry information included in the same access unit as the attribute information to be processed.

In this way, the three-dimensional data encoding device can take advantage of the access unit to facilitate control of reference in encoding. Therefore, the three-dimensional data encoding device can reduce the processing amount of the encoding process.

For example, the three-dimensional data encoding device generates a bitstream including the encoded geometry information (encoded geometry data), the encoded attribute information (encoded attribute data), and information indicating the geometry information of the entity to be referred to when encoding the attribute information to be processed.

For example, the bitstream includes a geometry parameter set (geometry PS) that includes control information for the geometry information associated with each time point and an attribute parameter set (attribute PS) that includes control information for the attribute information associated with each time point.

For example, the bitstream includes a geometry sequence parameter set (geometry SPS) that includes control information that is common to a plurality of pieces of geometry information associated with different time points and attribute sequence parameter set (attribute SPS) that includes control information that is common to a plurality of pieces of attribute information associated with different time points.

For example, the bitstream includes a stream parameter set (stream PS) that includes control information that is common to a plurality of pieces of geometry information associated with different time points and a plurality of pieces of attribute information associated with different time points.

For example, the bitstream includes an access unit header (AU header) that includes control information that is common in an access unit.

For example, the three-dimensional data encoding device performs encoding in such a manner that groups of frames (GOFs) formed by one or more access units can be independently decoded. That is, the GOF is a random access unit.

For example, the bitstream includes a GOF header that includes control information that is common in a GOF.

For example, the three-dimensional data encoding device includes a processor and a memory, and the processor performs the processes described above using the memory.

As described above, the three-dimensional data decoding device performs the process shown in FIG. 71. The three-dimensional data decoding device decodes time-series three-dimensional data (point cloud data on a dynamic object, for example). The three-dimensional data includes geometry information and attribute information associated with each time point. The geometry information and the attribute information associated with the same time point forms an access unit (AU).

First, the three-dimensional data decoding device decodes the bitstream to obtain the geometry information (S4851). That is, the three-dimensional data decoding device generates the geometry information by decoding the encoded geometry information (encoded geometry data) included in the bitstream.

The three-dimensional data decoding device then decodes the bitstream to obtain the attribute information to be processed by referring to the geometry information associated with the same time point as the attribute information to be processed (S4852). That is, the three-dimensional data decoding device generates the attribute information by decoding the encoded attribute information (encoded attribute data) included in the bitstream. In this process, the three-dimensional data decoding device refers to the decoded geometry information included in the access unit as the attribute information.

In this way, the three-dimensional data decoding device can take advantage of the access unit to facilitate control of reference in decoding. Therefore, the three-dimensional data decoding device can reduce the processing amount of the decoding process.

For example, the three-dimensional data decoding device obtains, from the bitstream, information indicating the geometry information of the entity to be referred to when decoding the attribute information to be processed, and decodes the attribute information to be processed by referring to the geometry information of the entity to be referred to indicated by the obtained information. For example, the bitstream includes a geometry parameter set (geometry PS) that includes control information for the geometry information associated with each time point and an attribute parameter set (attribute PS) that includes control information for the attribute information associated with each time point. That is, the three-dimensional data decoding device uses the control information included in the geometry parameter set associated with the time point to be intended for processing to decode the geometry information associated with the time point intended for processing, and uses the control information included in the attribute parameter set associated with the time point intended for processing to decode the attribute information associated with the time point intended for processing.

For example, the bitstream includes a geometry sequence parameter set (geometry SPS) that includes control information that is common to a plurality of pieces of geometry information associated with different time points and an attribute sequence parameter set (attribute SPS) that includes control information that is common to a plurality of pieces of attribute information associated with different time points. That is, the three-dimensional data decoding device uses the control information included in the geometry sequence parameter set to decode a plurality of pieces of geometry information associated with different time points, and uses the control information included in the attribute sequence parameter set to decode a plurality of pieces of attribute information associated with different time points.

For example, the bitstream includes a stream parameter set (stream PS) that includes control information that is common to a plurality of pieces of geometry information associated with different time points and a plurality of pieces of attribute information associated with different time points. That is, the three-dimensional data decoding device uses the control information included in the stream parameter set to decode a plurality of pieces of geometry information associated with different time points and a plurality of pieces of attribute information associated with different time points.

For example, the bitstream includes an access unit header (AU header) that includes control information that is common in an access unit. That is, the three-dimensional data decoding device uses the control information included in the access unit header to decode the geometry information and the attribute information included in the access unit.

For example, the three-dimensional data decoding device independently decodes groups of frames (GOFs) formed by one or more access units. That is, the GOF is a random access unit.

For example, the bitstream includes a GOF header that includes control information that is common in a GOF. That is, the three-dimensional data decoding device decodes the geometry information and the attribute information included in the GOF using the control information included in the GOF header.

For example, the three-dimensional data decoding device includes a processor and a memory, and the processor performs the processes described above using the memory.

Embodiment 8

Next, with reference to FIG. 72, a method of indicating a relationship between attribute information described in SPS, APS, and Attribute_header (header of attribute information) by using attribute_component_id will be described. FIG. 72 is a diagram showing a relationship between SPS, APS, and a header of attribute information. Note that the destination of the arrows in FIG. 72 indicates the reference destination.

SPS includes information concerning the types of a plurality of pieces of attribute information. That is, SPS may correspond to a plurality of pieces of attribute information and include a plurality of pieces of information attribute_type each of which indicates a different kind of attribute information. SPS also includes, for each type of attribute information, attribute_component_id that indicates a number that allows identification of the type of attribute information. Note that SPS is an example of control information. attribute_type is an example of type information. attribute_component_id included in SPS is an example of first identification information that indicates that first attribute control information is associated with one of a plurality of pieces of type information.

APS or Attribute_header includes attribute_component_id that corresponds to attribute_component_id included in SPS. Note that APS is an example of second attribute control information. Attribute_header is an example of first attribute control information. attribute_component_id included in APS is an example of second identification information that indicates that first attribute control information is associated with one of a plurality of pieces of type information.

The three-dimensional data decoding device refers to SPS indicated by sps_idx included in APS or Attribute_header. The three-dimensional data decoding device then obtains the type of attribute information corresponding to attribute_component_id included in the APS or Attribute_header from the referred SPS as the type of attribute information to which the information included in the APS or Attribute_header corresponds. Note that one APS corresponds to one type of attribute information. The header of one piece of attribute information corresponds to one type of attribute information. Each of a plurality of APSs corresponds to the header(s) of one or more pieces of attribute information. That is, one APS corresponds to the header(s) of one or more pieces of attribute information other than the header(s) of one or more pieces of attribute information that correspond to another APS.

When attribute_component_id=0, for example, the three-dimensional data decoding device can obtain attribute information (such as attribute_type) that corresponds to attribute_component_id having the same value, that is, a value of 0, from SPS.

Note that, instead of attribute_component_id, the sequence of the pieces of attribute information described in SPS may be described in SPS. That is, type information that indicates a plurality of kinds of attribute information may be stored (described) in SPS in a predetermined sequence. In that case, attribute_component_id included in APS or Attribute_header indicates that the APS or Attribute_header including attribute_component_id is associated with type information at a position in the predetermined sequence.

Alternatively, the sequence of transmitted APSs or attribute information may be made to agree with the sequence of attribute information described in SPS, thereby allowing the three-dimensional data decoding device to derive the sequence of arrival of APSs or attribute information and refer to attribute information corresponding to the sequence of arrival. When point cloud data includes both attribute information whose APS or Attribute_header may or may not be present depending on the frame and attribute information whose APS or Attribute_header is always present regardless of the frame, the attribute information whose APS or Attribute_header is always present regardless of the frame may be first transmitted, and then the attribute information whose APS or Attribute_header may or may not be present depending on the frame may be transmitted.

Note that, although a plurality of APSs each of which corresponds to a plurality of pieces of attribute information is shown in one frame in FIG. 72, one APS may be used, instead of the plurality of APSs. In that case, one APS includes attribute information-related information that corresponds to a plurality of pieces of attribute information.

aps_idx may include a sequence number that corresponds to a frame number. A correspondence between APS and Attribute_header may be indicated in this way. Note that aps_idx may have a function of attribute_component_id. This allows information on the whole sequence concerning one or more kinds of APSs or attribute information to be stored in SPS and to be referred to from each APS or Attribute_header.

Note that in order to allow determination of the kind (attribute_type) of the attribute information of APS or Attribute_header, attribute_type may be directly included in APS or Attribute_header, or may be included in a NAL unit header as a kind of the NAL unit.

In any case, the attribute information of APS or Attribute_header can be obtained, and the kind of the attribute of the attribute information can be determined.

As stated above, the three-dimensional data encoding device according to the present embodiment performs the process shown by FIG. 73. First, the three-dimensional data encoding device encodes pieces of attribute information of respective three-dimensional points, using parameters (S6701). The three-dimensional data encoding device generates a bitstream including the pieces of attribute information encoded, control information, and pieces of first attribute control information (S6702). The control information corresponds to the pieces of attribute information and includes pieces of type information each indicating a type of different attribute information. Moreover, the pieces of first attribute control information correspond one-to-one with the pieces of attribute information. Each of the pieces of first attribute control information includes first identification information indicating that the first attribute control information is associated with one of the pieces of type information.

With such a configuration, since a bitstream including the first identification information for identifying the type of the attribute information to which the first attribute control information corresponds is generated, the three-dimensional data decoding device having received the bitstream can correctly and efficiently decode attribute information on a three-dimensional point.

For example, the pieces of type information are stored in the control information in a predetermined sequence. The first identification information indicates that first attribute control information including the first identification information is associated with one of the pieces of type information that has an order in the predetermined sequence.

With such a configuration, since type information is indicated in a predetermined sequence without information indicating the type information, the amount of data of the bitstream can be reduced, and the amount of the transmitted bitstream can be reduced.

For example, the bitstream further includes pieces of second attribute control information corresponding to the pieces of attribute information. Each of the pieces of second attribute control information includes a reference value of a parameter used for encoding a corresponding one of the pieces of attribute information.

With such a configuration, since each of a plurality of pieces of second attribute control information includes a reference value of a parameter, the attribute information to which the second attribute control information corresponds can be encoded using the reference value. With such a configuration, since the three-dimensional data decoding device having received the bitstream can identify the type of the second attribute information using the second identification information, the three-dimensional data decoding device can correctly and efficiently decode attribute information on a three-dimensional point.

For example, each of the pieces of first attribute control information includes difference information that is a difference from the reference value of the parameter. With such a configuration, the coding efficiency can be improved.

For example, the bitstream further includes pieces of second attribute control information corresponding to the pieces of attribute information. Each of the pieces of second attribute control information includes second identification information indicating that the second attribute control information is associated with one of the pieces of type information.

With such a configuration, since a bitstream including the second identification information for identifying the type of the attribute information to which the second attribute control information corresponds is generated, it is possible to generate the bitstream that can correctly and efficiently decode attribute information on a three-dimensional point.

For example, each of the pieces of first attribute control information includes N fields in which N parameters are stored, N being greater than or equal to 2. In specific first attribute control information among the pieces of first attribute control information, one of the N fields includes a value indicating invalidity, the specific first attribute control information corresponding to a specific type of an attribute.

With such a configuration, since the three-dimensional data decoding device having received the bitstream can identify the type of the first attribute information using the first identification information and omit the decoding process in the case of specific first attribute control information, the three-dimensional data decoding device can correctly and efficiently decode attribute information on a three-dimensional point.

For example, in the encoding, the pieces of attribute information are quantized using quantization parameters as the parameters.

With such a configuration, since a parameter is expressed using a difference from a reference value, it is possible to improve coding efficiency for quantization.

For example, the three-dimensional data encoding device includes a processor and memory, and the processor performs the above process using the memory.

The three-dimensional data decoding device according to the present embodiment performs the process shown by FIG. 74. First, the three-dimensional data decoding device obtains pieces of attribute information encoded and parameters from a bitstream (S6711). The three-dimensional data decoding device decodes the pieces of attribute information encoded using the parameters, to generate pieces of attribute information of respective three-dimensional points (S6712). The bitstream includes control information and pieces of first attribute control information. The control information corresponds to the pieces of attribute information and includes pieces of type information each indicating a type of different attribute information. The pieces of first attribute control information correspond one-to-one with the pieces of attribute information. Each of the pieces of first attribute control information includes first identification information indicating that the first attribute control information is associated with one of the pieces of type information.

With such a configuration, since the three-dimensional data decoding device can identify the type of the attribute information corresponding to the first attribute control information using the first identification information, the three-dimensional data decoding device can correctly and efficiently decode attribute information on a three-dimensional point.

For example, the pieces of type information are stored in the control information in a predetermined sequence. The first identification information indicates that first attribute control information including the first identification information is associated with one of the pieces of type information that has an order in the predetermined sequence.

With such a configuration, since type information is indicated in a predetermined sequence without information indicating the type information, the amount of data of the bitstream can be reduced, and the amount of the transmitted bitstream can be reduced.

For example, the bitstream further includes pieces of second attribute control information corresponding to the pieces of attribute information. Each of the pieces of second attribute control information includes a reference value of a parameter used for encoding a corresponding one of the pieces of attribute information.

With such a configuration, since the three-dimensional data decoding device can decode the attribute information corresponding to the second attribute control information using a reference value, the three-dimensional data decoding device can correctly and efficiently decode attribute information on a three-dimensional point.

For example, each of the pieces of first attribute control information includes difference information that is a difference from the reference value of the parameter. With such a configuration, since it is possible to decode attribute information using a reference value and difference information, it is possible to correctly and efficiently decode attribute information on a three-dimensional point.

For example, the bitstream further includes pieces of second attribute control information corresponding to the pieces of attribute information. Each of the pieces of second attribute control information includes second identification information indicating that the second attribute control information is associated with one of the pieces of type information. With such a configuration, since it is possible to identify the type of the attribute information corresponding to the second attribute control information using the second identification information, it is possible to correctly and efficiently decode attribute information on a three-dimensional point.

Each of the pieces of first attribute control information includes fields in which parameters are stored. In the decoding, a parameter stored in a specific field among the fields of specific first attribute control information among the pieces of first attribute control information is ignored, the specific first attribute control information corresponding to a specific type of an attribute.

With such a configuration, since the three-dimensional data decoding device can identify the type of the first attribute information using the first identification information, the three-dimensional data decoding device can correctly and efficiently decode attribute information on a three-dimensional point.

For example, in the decoding, the pieces of attribute information encoded are inverse quantized using quantization parameters as the parameters.

With such a configuration, it is possible to correctly decode attribute information on a three-dimensional point.

For example, the three-dimensional data decoding device includes a processor and memory, and the processor performs the above process using the memory.

Embodiment 9

The following describes a manner in which attribute information numbers (attribute_component_id) are used to indicate information described (stored) in a sequence parameter set (SPS); the information relates to attribute information (Attribute) and indicates the relationship between attribute parameter sets (APSs) and attribute information headers (Attribute_header).

The SPS includes, for example, information on multiple items of attribute information. For example, a processing device (first processing device) such as a three-dimensional data encoding device assigns, to the information on each item of attribute information, an attribute information number indicating the number of the information on the item of attribute information. The processing device stores information indicating the attribute information number in the corresponding APS and in the corresponding attribute information header.

In this case, for example, a processing device (second processing device) such as a three-dimensional data decoding device refers to the SPS indicated by sps_idx in the APS and in the attribute information header, and further obtains the attribute information corresponding to the attribute information number. For example, for attribute_component_id=0, the three-dimensional data decoding device can obtain, from the SPS, information on the attribute information corresponding to attribute_component_id=0 (e.g., attribute type information (attribute_type) indicating the type of the attribute information).

Note that the order of the information items on the attribute information stored in the SPS may be the same as the order of attribute_component_id, in which case the relevant field does not need to be included.

As another example, the three-dimensional data encoding device may send the APSs and the items of attribute information in the order of the items of attribute information stored in the SPS. The three-dimensional data decoding device may then derive the order of arrival of the APSs or the items of attribute information and refer to the items of attribute information in the order of arrival.

Point cloud data may include attribute information that lacks the APS or the attribute information header for some frames, and attribute information having the APS or the attribute information header for every frame. In such a case, the three-dimensional data encoding device may send the attribute information (a bitstream including the attribute information) to the three-dimensional data decoding device in the following manner. The attribute information having the APS or the attribute information header for every frame may be sent first, followed by the attribute information that may occasionally lack the APS or the attribute information header (i.e., the attribute information that lacks the APS or the attribute information header for some frames).

Here, aps_idx is information indicating a sequence number corresponding to a frame number. This information indicates the correspondence between an APS and an attribute information header.

Note that aps_idx may also have the function of attirubte_component_id.

In the above manner, the SPS stores information on the entire sequence related to one or more types of APSs or attribute information. This enables information to be referred to by each APS and each attribute information header.

To allow the determination of the attribute type of each APS or attribute information header, the attribute type information may be stored directly in the APS or the attribute information header or may be stored in the NAL unit header as the type of the NAL unit.

In either manner, the attribute information of the APS or the attribute information header can be obtained, and the attribute type can be determined.

The following illustrates an example in which multiple attribute slices (e.g., different attribute slices) are associated with the same APS so that the different attribute slices refer to the same APS. The following manner enables associating different attribute slices with the same APS to reduce the amount of information on metadata to be transmitted.

For example, for each attribute in the stream, the SPS includes: attribute type information serving as the identifier of the attribute; and attribute-information metadata (attribute_info).

Each attribute information header, which is the header of each attribute slice, includes the identifier of an SPS to which the attribute slice refers (id, or more specifically, SPS_idx), and an attribute information number serving as the identifier of the corresponding attribute information.

For example, an item of the attribute-information metadata in the SPS having an ordinal number that matches the attribute information number is referred to.

An APS and an attribute information header (attribute slice header) are associated with each other with aps_idx.

An attribute slice is decoded with coding-related metadata by referring to an APS that includes the same aps_idx as aps_idx in the attribute information header.

FIG. 75 is a diagram for describing the relationship among a bitstream, an SPS, APSs, and attribute information headers according to the present embodiment. The example illustrated in FIG. 75 shows a bitstream that includes three types of attribute information (two types of color information and one type of reflectance information).

The SPS includes three types of attribute information or attribute type information, and attribute slices of the three types are associated with their respective attribute information headers.

In the example here, an attribute information header including attribute_component_id=1 and an attribute information header including attribute_component_id=2 are assigned the same aps_idx, thereby being associated with the same APS. That is, for example, the three-dimensional data decoding device refers to the same APS in referring to the attribute information header including attribute_component_id=1 and the attribute information header including attribute_component_id=2.

Thus, for example, FIG. 75 illustrates an attribute slice including color (more specifically, color2) as an exemplary type of attribute information, and an attribute slice including reflectance as another exemplary type of attribute information. When such attribute slices of different attribute types are to be referred to, the attribute information headers may be associated with the same APS so that they both refer to that APS. In this manner, an APS may be shared.

Attribute slices that can refer to the same APS may be those of the same attribute type but of different attribute subtypes (e.g., color1 and color2, which are of the same attribute type "color" but of different subtypes (in other words, components)), or may be those of different attribute types (e.g., color and reflectance (also denoted as reflec.)).

Two or more attribute types may refer to the same APS. For example, multiple attribute information headers including different attribute type information may each include information for referring to the same APS.

Instance_id indicates an identifier for identifying each of components (elements) of the same attribute type. For example, for color1, attribute_type=color and instance_id=0. For color2, attribute_type=color and instance_id=1. color1 and color2 may each be attribute information indicating a color, and may represent different colors (hues) such as red and blue, for example.

The following describes a new definition of data units.

A data unit may herein also be called, although not limited to, pcc_nal_unit or a NAL unit (or a PCC NAL Unit). A data unit may adopt various formats, such as those described above with respect to the definition or data structure of a NAL unit.

A data unit is a data structure serving as an interface between the coding layer and the system layer.

The payload of a data unit stores encoded data or a parameter set. The data unit header indicates information such as identification information and size information on the encoded data.

FIG. 76 is a diagram illustrating a structure example of a bitstream according to the present embodiment. FIG. 77 is a diagram illustrating an example of semantics of pcc_nal_unit_type according to the present embodiment. Hatched portions in FIG. 76 are the headers of geometry information and attribute information.

The identification information in each data unit header may be configured to allow the recognition of the type of data in the payload, such as encoded data or metadata (such as a parameter set). This enables, for example, the three-dimensional data decoding device that has obtained a bit-stream having information stored on a data unit basis to identify the type of data in the bitstream without analyzing the payload. The device can then process the data, such as by separating the data, partially extracting the data, or converting the format of the data.

For different attribute slices to share the same APS, i.e., refer to the same APS, a new way of defining data units is needed.

The following describes a data format for different attribute slices to share the same APS.

The following manners may be used for pcc_nal_unit_type in the data unit header so that the attribute type is appropriately determined.

In a first exemplary manner, if attribute slices including attribute information of different attribute types refer to the same APS, pcc_nal_unit_type indicating an APS indicates an attribute type-independent identifier. For example, pcc_nal_unit_type indicates an identifier indicating that the parameter set of the attribute information is common to all attribute types (e.g., Attri.PS shown in FIG. 77), rather than an attribute type-dependent identifier (e.g., AttrX.PS or AttrY.PS shown in FIG. 77).

pcc_nal_unit_type may also be defined to accept both of; the identifier indicating that the parameter set of the attribute information is common to all attribute types; and attribute type-dependent identifiers.

In a second exemplary manner, if attribute slices including attribute information of different attribute types refer to the same APS, pcc_nal_unit_type may explicitly indicate that the APS is referred to by two attribute slices including attribute information of different attribute types. For example, pcc_nal_unit_type may indicate an identifier (not shown) indicating that the parameter set is referred to by the attribute slices AttrX and AttrY.

Note that three or more attribute slices may refer to the same APS. That is, in the second manner, if multiple attribute slices including attribute information of different attribute types refer to the same APS, pcc_nal_unit_type may explicitly indicate that the APS is referred to by multiple attribute slices including attribute information of different attribute types.

In a third exemplary manner, pcc_nal_unit_type indicates an attribute type-independent identifier as in the above first manner. Further, if pcc_nal_unit_type is a parameter set of attribute information, a field for indicating the referring attribute types may be provided in nal_unit_header to indicate the attribute types in the field.

FIG. 78 is a diagram illustrating a first example of a syntax in a case where pcc_nal_unit_type in pcc_nal_unit_header is a parameter set of attribute information, according to the present embodiment. Specifically, in the example illustrated in FIG. 78, attribute types are indicated in a case where pcc_nal_unit_type is a parameter set of attribute information.

Attribute types may be defined for individual attribute types, such as color and reflectance (e.g., 0: color, 1: reflectance, and 2: frameindex, as shown in FIG. 78) or may be defined for combinations of attribute types such as color and reflectance (e.g., 3: color+reflectance, as shown in FIG. 78). The definition of attribute types is not limited to the above but may have an expansion area (e.g., 4: reserved for future use, as shown in FIG. 78) to allow future expansion.

FIG. 79 is a diagram illustrating a second example of a syntax in a case where pcc_nal_unit_type in pcc_nal_unit_header is a parameter set of attribute information, according to the present embodiment. Specifically, in the example illustrated in FIG. 79, attribute types are indicated by flags (e.g., 1-bit flags) in a case where pcc_nal_unit_type is a parameter set of attribute information. For example, if pcc_nal_unit_type indicates color and reflectance, color_flag and reflectance_flag are set to 1, and other flags (e.g., frame_index_flag) are set to 0. The types of flags are not limited to the above and may include expansion flags (e.g., reserved for future use) to allow future expansion.

In the above manners, attribute types are indicated in the data unit header. For a parameter set referred to by attribute slices that include attribute information of different attribute types, the attribute types can be determined from the data unit header. This enables determining the attribute types of the attribute information in the attribute slices that refer to the parameter set included in the data unit header.

The attribute types indicated by pcc_nal_unit_type may be either one or both of: attribute types for a parameter set common to multiple attribute slices; and attribute types for individual parameter sets for the respective attribute slices.

The above has described pcc_nal_unit_type of a parameter set of attribute information (APS). pcc_nal_unit_type may also be pcc_nal_unit_type (=PS/parameter set) shared with a parameter set of geometry information (GPS) and further configured to indicate the type of the parameter set.

A manner similar to the above may be used to identify data in an attribute slice including attribute information.

For example, for any slice (slice data) including attribute information indicating color, pcc_nal_unit_type may include Code1 Attribute, indicating that the slice is an attribute slice. Further, in this case, information (attribute_type) indicating the attribute type may be included.

The following describes a partial extraction method for shared APSs. Specifically, for example, a method will be described in which a processing device such as a three-dimensional data decoding device analyzes the data structure in the data unit layer, extracts (partially extracts) specific data, and decodes the data or converts the format of the data.

FIG. 80 is a diagram for describing a first example of the partial extraction method according to the present embodiment.

For example, assume that pcc_nal_unit_type of the APSs or the attribute information headers is defined on an attribute type basis. If it is desired to extract only data related to the attribute information color1, the processing device may extract the SPS, GPS, APS color1, Geometry, and color1 while not extracting other items. In this manner, the processing device can extract only necessary data on an attribute type basis.

FIG. 81 is a diagram for describing a second example of the partial extraction method according to the present embodiment.

For example, assume that pcc_nal_unit_type of APSs common to different attribute types is defined. If it is desired to extract only data related to the attribute information color1, the processing device may extract the SPS, GPS, shared APSs, Geometry, and color1 while not extracting other items.

In the above exemplary manner, the shared APSs may include an APS that may not necessarily required for decoding color1.

FIG. 82 is a diagram for describing a third example of the partial extraction method according to the present embodiment.

For example, assume that pcc_nal_unit_type of APSs common to different attribute types is defined. If it is desired to extract only data related to the attribute information color1, the processing device may extract the SPS, GPS, PSs that include color as the attribute type (in this example, APS color+reflec. and APS color), Geometry, and color1 while not extracting other items.

FIG. 83 is a block diagram illustrating an example of the configuration of a processing device according to the present embodiment.

In the example illustrated in FIG. 83, the processing device includes header analyzer 10200, partial extractor 10210, and decoder 10220, for example.

Header analyzer 10200 is a processor that analyzes data unit headers. For example, header analyzer 10200 obtains a bitstream having geometry information and attribute information stored on a data unit basis, and analyzes the data unit headers in the bitstream obtained.

Partial extractor 10210 is a processor that extracts at least one item of attribute information from one or more items of attribute information in the bitstream based on a predetermined condition. For example, if the bitstream includes three items of attribute information color1, color2, and reflec. as shown in FIG. 82, partial extractor 10210 may extract color1 based on a predetermined condition. It is to be understood that partial extractor 10210 may extract multiple items of attribute information, such as color1 and color2, based on a predetermined condition.

The predetermined condition may be any condition. For example, a user may designate any specific item of attribute information as the predetermined condition.

Decoder 10220 is a processor that decodes one or more items of attribute information and geometry information extracted by partial extractor 10210. Thus, one or more items of attribute information and geometry information may be encoded information.

As above, for example, the processing device firstly obtains point-cloud encoded data (a bitstream) including designated specific attribute information. The processing device analyzes the headers and extracts (that is, partially extracts) the designated specific attribute information. In extracting, the processing device may also extract PSs corresponding to the attribute information extracted.

If, for example, the processing device extracts multiple items of attribute information and needs to calculate the same APS for two or more items of attribute information, the processing device refers to the same APS for different attribute slices (items of attribute information).

Then, for example, the processing device decodes, using the APSs referred to, the designated specific attribute information and geometry information extracted from the point-cloud encoded data.

Alternatively, the processing device may extract (that is, partially extract) the designated specific attribute information from the point-cloud encoded data including the designated specific attribute information, and convert the format of the resulting point-cloud encoded data including the designated specific attribute information and geometry information extracted.

FIG. 84 is a block diagram illustrating another example of the configuration of the processing device according to the present embodiment.

In the example illustrated in FIG. 84, the processing device includes header analyzer 10200, partial extractor 10210, and format converter 10230, for example.

Format converter 10230 is a processor that converts the file format of information items in the bitstream including one or more items of attribute information and geometry information extracted by partial extractor 10210. For example, format converter 10230 converts the file format into a predetermined format such as ISOBBFM.

It is to be understood that the processing device may include both of decoder 10220 and format converter 10230.

FIG. 85 is a flowchart illustrating an example of a process in which the processing device according to the present embodiment partially extracts designated specific attribute information from point-cloud encoded data including the designated specific attribute information.

First, for example, in response to obtaining (receiving) a bitstream having information stored on data unit basis, the processing device analyzes the data unit headers (e.g., pcc_nal_unit_header) in the bitstream obtained (S10201).

Based on the result of analyzing the data unit headers, the processing device determines whether the bitstream includes designated specific attribute information (S10202). For example, based on the result of analyzing the data unit headers, the processing device determines whether information to be extracted is included in the information in the bitstream, such as the SPS, GPS, Geometry (geometry information), parameter set (APS) of the designated specific type of attribute (attribute type), or designated specific attribute information.

If the processing device determines that the bitstream includes the designated specific attribute information (Yes at S10202), the processing device partially extracts the designated specific attribute information from the bitstream (S10203).

By contrast, if the processing device determines that the bitstream does not include the designated specific attribute information (No at S10202), the processing device does not perform partial extraction, for example.

After step S10202 or S10203, the processing device performs processing such as the above-described decoding or format conversion, for example.

Note that, for example, in the partial extraction at step S10203, the processing device may determine which item of attribute information (attribute slice) refer to which APS, and may extract an APS based on the result of the determination.

With the above method, the type of the attribute information is indicated in each data unit header. If a parameter set is referred to by different types of attribute information, the processing device can determine, based on information in the data unit header, the types of attribute information included in the bitstream, thereby determining the types of the attribute information that refer to the parameter set included in the data unit header.

A data unit is a layer (data structure) serving as an interface connecting the coding layer and the system layer.

Because each data unit header includes the attribute type information, the processing device can analyze the data unit header in the system layer to determine the type of the attribute information without analyzing the data structure in the coding layer, which is located inside the system layer in the data structure. The processing device can then partially extract data (e.g., encoded data, such as encoded attribute information).

This enables multiple attribute slices of different attribute types to share the same APS (or refer to the same APS), thereby reducing the data amount of APSs.

The above illustrates the example in which an APS is referred to by slices of different attribute types: a color slice and a reflectance slice. However, a rule may be provided that prohibits multiple attribute slices of different attribute types from referring to the same APS.

This can eliminate the need to define pcc_nal_unit_type corresponding to each of different attribute types, thereby reducing the number of bits assigned to pcc_nal_unit_type.

There may also be a rule that prohibits attribute slices of the same attribute type from sharing an APS and specifies that one type of attribute slice should correspond to one APS. For example, if attribute types include color1 and color2, the processing device may include an APS for color1 and an APS for color2 in the bitstream.

Constraints and rules related to APS sharing may be the same or different for the coding layer and the system layer.

For example, a rule in the coding layer may allow multiple attribute slices of different attribute types to refer to the same APS, whereas a rule in the system layer may specify that one type of attribute slice should correspond to one APS. In this case, for example, format converter 10230 converts the format of the data in the bitstream.

FIG. 86 is a diagram for describing an example of data format conversion performed by the processing device according to the present embodiment.

For example, the processing device generates two APSs by duplicating an APS shared (referred to) by two items of attribute information of different attribute types (e.g., color and reflectance) received from the coding layer.

As another example, for an APS referred to by multiple items of attribute information of different attribute types, the processing device converts the APS into an APS (identifier) referred to by any one of the attribute types. In the example illustrated in FIG. 86, an APS (APS color2+reflec.) is referred to by attribute information (color2) indicating color and attribute information (reflec.) indicating reflectance in the coding layer. This APS is duplicated to generate two APSs: an APS (APS color2) referred to by the attribute information (color2) indicating color, and an APS (APS reflec.) referred to by the attribute information (reflec.) indicating reflectance. The APSs generated are stored in a file format (more specifically, in a data location such as "moov" or "moof" in which parameter sets based on a predetermined file format are stored). For example, the processing device sets (stores) the generated APSs in headers in the system layer (e.g., data unit headers) as APSs corresponding to the respective attribute types.

If, for example, parameter sets are to be included in data in the file format, the processing device stores, in a data component ("mdat"), the duplicate APSs and information indicating their corresponding attribute types.

A similar manner may be used for sharing an APS by the same attribute types. For example, a similar manner may be used to generate individual APSs for different information items (elements) of the same attribute types, such as color1 and color2.

For example, instance_id (instance identification information) may be included in data unit headers.

pcc_nal_unit_header of each data unit that stores an item such as an APS or attribute type information indicating the attribute type of an attribute slice may include instance_id, in addition to the attribute type information.

instance_id is information for identifying each of elements of the same attribute type representing different information items.

FIG. 87 is a diagram for describing instance_id. FIG. 88 is a diagram illustrating a syntax example of pcc_nal_unit_header according to the present embodiment.

In the example illustrated in FIG. 87, a bitstream includes attribute slices (ASlice) of the same attribute type (color) with different instance_id (0 or 1). In this case, a new syntax may be provided that describes attribute_type and instance_id, for example as illustrated in FIG. 88. Alternatively, attribute_type and instance_id may be included in the types of pcc_nal_unit_type.

attribute_type and instance_id may also be indicated by flags.

For example, attribute_type indicates (defines) a type in order to support color, reflectance, or frameindex. In addition, if the bitstream includes an APS referred to by multiple attribute slices, attribute_type defines an attribute type that combines multiple attribute types (that is, an attribute type that indicates multiple attribute types).

For example, in the example illustrated in FIG. 88, attribute_type=3 indicates an attribute type that combines two attribute types: color and reflectance.

Note that an attribute type that combines multiple attribute types is valid only if it is indicated by an APS. For example, if an attribute slice indicates multiple attribute types, the processing device may determine that the attribute slice is invalid or violates a rule.

The processing device thus can identify elements (components) of the same type but having different attributes (e.g., color1 and color2) by analyzing data unit headers, which enables partial extraction of specific elements.

In an example, an element with instance_id=0 may be defined as a default component, and a component having the highest priority in decoding or display may be assigned instance_id=0. In this case, for example, a three-dimensional data decoding device, or an application that obtains geometry information and attribute information decoded by a three-dimensional data decoding device and causes a display device to display the information obtained, may extract one of elements of the same attribute type and decode the element extracted, or may extract an element having instance_id=0 and cause the display device to display the element extracted.

For example, multiple orders of priority in decoding or display may be set for the intended uses of an application (e.g., priority for default display and priority for low-latency display). A processing device such as a three-dimensional data encoding device may send a bitstream including encoded data to a processing device such as a three-dimensional data decoding device. This bitstream may include metadata (SEI) having a table of priority corresponding to instance_id, or a table of supplemental information on attribute slices. In response to receiving the bitstream, the application may obtain desired instance_id based on the SEI and partially extract elements.

FIG. 89 is a flowchart illustrating the process executed by the three-dimensional data encoding device according to the present embodiment. The three-dimensional data encoding device that executes the flowchart illustrated in FIG. 89 is a processing device (first processing device) that transmits a bitstream including data such as encoded data to a processing device (second processing device) such as a three-dimensional data decoding device, for example.

First, the three-dimensional data encoding device obtains an item of geometry information and items of attribute information of each of encoded three-dimensional points (S10211). The items of attribute information include, for example, attribute information of mutually different attribute types.

Next, the three-dimensional data encoding device stores an item of control information and any one of the item of geometry information and the items of attribute information of the encoded three-dimensional points into each of data units (S10212). The three-dimensional data encoding device, for example, stores, into each of the data units, mutually different information such as the control information and any one of the item of geometry information and the items of attribute information of each of the encoded three-dimensional points.

The item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

The data units, which may be PCC NAL UNITs for example, are specific positions in a structure that stores data items in the specific positions. For example, the data units are units indicated by rectangular frames in FIG. 76 in which items such as NAL_Unit_header, SPSs, and Y1 are located. For example, as described above, a PCC NAL UNIT includes NAL_Unit_header and Nal_Unit_payload. The geometry information and the items of attribute information on each of encoded three-dimensional points are stored in, for example, the payload in the coding layer, which is lower than Nal_Unit_payload (the system layer). The control information is stored in NAL_Unit_header. Alternatively, the control information may be stored in a data unit that stores a parameter set such as an SPS described above. The classification information is nal_unit_type, for example. The attribute type information is above-described attribute_type, for example.

For example, the three-dimensional data encoding device generates a bitstream in which items of geometry information and items of attribute information of encoded three-dimensional points, and an item of control information are stored in data units.

According to the above, checking the control information enables determining whether a data unit stores geometry information or attribute information on an encoded three-dimensional point without the need for processing such as decoding the encoded three-dimensional point. Further, if the data unit stores attribute information on the encoded three-dimensional point, checking the control information enables determining the type of the attribute information without the need for processing such as decoding the encoded three-dimensional point. Thus, the processing amount for identifying the information stored in the data unit can be reduced.

Furthermore, for example, the three-dimensional data encoding device further stores, into any one of the data units, attribute information identifiers which are numerical values indicating the items of attribute information of the encoded three-dimensional points. In this case, for example, in the storing of the item of control information and any one of the item of geometry information and the items of attribute information of the encoded three-dimensional points in each of the data units (S10212), the three-dimensional data encoding device stores the items of attribute information of the encoded three-dimensional points into each of the data units in an order corresponding to the numerical values of the attribute information identifiers.

The attribute information identifiers are above-described attribute_component_id, for example. The attribute information identifiers are stored in data units that store parameter sets such as the SPS and APSs, for example.

According to the above, which item of attribute information is indicated by each attribute information identifier can be determined without information associating the items of attribute information with the attribute information identifiers.

Furthermore, for example, the data units into which the item of control information is stored belong to a system layer. The system layer herein is a layer in which NAL_Unit_Header and NAL_unit_payload are located. Specifically, the control information is stored in NAL_Unit_Header, for example.

That is, the control information is stored in the system layer, which is higher than a coding layer in which encoded data is stored. According to the above, it is possible to determine whether a data unit belonging to the system layer stores geometry information or attribute information on an encoded three-dimensional point without the need for processing such as decoding the encoded three-dimensional point belonging to the coding layer. Thus, the processing amount for identifying the information stored in the data unit can be further reduced.

Furthermore, for example, when a first type and a second type different from the first type are included among attribute types of the items of attribute information of the encoded three-dimensional points, the item of control information includes an item of attribute type information indicating any one of a first identifier indicating the first type, a second identifier indicating the second type, and a third identifier indicating both the first type and the second type. With reference to the above-described example, the first type is color information, for example, and the first identifier is 0 (0: color), for example. With reference to the above-described example, the second type is reflectance information, for example, and the second identifier is 1 (1: reflectance), for example. With reference to the above-described example, the third identifier is 3 (3: color+reflectance), for example.

According to the above, the third identifier can be used to indicate attribute information that does not need to be differentiated between the first type or the second type. For example, this may allow multiple items of attribute information to be designated with only the third identifier in extracting and using only some of the items of attribute information in the bitstream. In such a case, the data amount in extracting some of the items of attribute information can be reduced.

Furthermore, for example, when the items of attribute information of the encoded three-dimensional points include items of attribute information having a same attribute type, the item of control information includes an item of instance identification information for identifying each of the items of attribute information having the same attribute type.

The instance identification information is above-described instance_id, for example. For example, the instance identification information is information for distinguishing between "color1" and "color2" when multiple items of attribute information on one of the encoded three-dimensional points are of the same attribute type "color" and are different elements such as "color1" and "color2" (e.g., different colors such as red and blue).

According to the above, checking the control information enables obtaining the details of attribute information on an encoded three-dimensional point without the need for processing such as decoding the attribute information.

Furthermore, for example, the three-dimensional data encoding device includes a processor and memory, and the processor performs the above-described process using the memory. The memory may store a control program for performing the above-described process.

It should be noted that, it is sufficient that the three-dimensional data encoding device is capable of executing the above-described processes, and the three-dimensional data encoding device need not necessarily execute data encoding.

FIG. 90 is a flowchart illustrating the process executed by the three-dimensional data decoding device according to the present embodiment. The three-dimensional data decoding device that executes the flowchart illustrated in FIG. 90 is a device (second processing device) that obtains a including data such as encoded data from a processing device (first processing device) such as a three-dimensional data encoding device, for example.

First, the three-dimensional decoding device obtains a bitstream in which an item of control information and any one of an item of geometry information and items of attribute information of each of encoded three-dimensional points are stored in each of data units (S10221).

Next, the three-dimensional decoding device obtains the item of geometry information and the items of attribute information of each of the encoded three-dimensional points from the bitstream (S10222).

The item of control information includes (i) an item of classification information indicating whether information stored in the data unit is an item of geometry information or an item of attribute information of the encoded three-dimensional point, and, (ii) when the information stored in the data unit is an item of attribute information, an item of attribute type information indicating a type of the item of attribute information.

According to the above, checking the control information enables determining whether a data unit stores geometry information or attribute information on an encoded three-dimensional point without the need for processing such as decoding the encoded three-dimensional point. Further, if the data unit stores attribute information on the encoded three-dimensional point, checking the control information enables determining the type of the attribute information without the need for processing such as decoding the encoded three-dimensional point. Thus, the processing amount for identifying the information stored in the data unit can be reduced.

Furthermore, for example, in the obtaining of the item of geometry information and the items of attribute information of each of the encoded three-dimensional points (S10222), the three-dimensional decoding device obtains at least one item of attribute information of an encoded three-dimensional point among the items of attribute information of each of the encoded three-dimensional points, the at least one item of attribute information satisfying a predetermined condition based on the item of control information.

According to the above, checking the control information enables extracting any appropriate one of the items of attribute information without the need for processing such as decoding an encoded three-dimensional point.

Furthermore, for example, attribute information identifiers are stored into any one of the data units, the attribute information identifiers being numerical values indicating the items of attribute information of the encoded three-dimensional points. In this case, for example, each of the attribute information identifiers indicates an order of a corresponding one of the items of attribute information of the encoded three-dimensional points in the data units and the item of attribute information with which the numerical value of the attribute information identifier matches.

According to the above, which item of attribute information is indicated by each attribute information identifier can be determined without information associating the items of attribute information with the attribute information identifiers.

Furthermore, for example, the data units into which the item of control information is stored belong to a system layer.

That is, the control information is stored in the system layer, which is higher than a coding layer in which encoded data is stored. According to the above, it is possible to determine whether a data unit belonging to the system layer stores geometry information or attribute information on an encoded three-dimensional point without the need for processing such as decoding the encoded three-dimensional point belonging to the coding layer. Thus, the processing amount for identifying the information stored in the data unit can be further reduced.

Furthermore, for example, when a first type and a second type different from the first type are included among attribute types of the items of attribute information of the encoded three-dimensional points, the item of control information includes an item of attribute type information indicating any one of a first identifier indicating the first type, a second identifier indicating the second type, and a third identifier indicating both the first type and the second type.

According to the above, the third identifier can be used to indicate attribute information that does not need to be differentiated between the first type or the second type. For example, this may allow multiple items of attribute information to be designated with only the third identifier in extracting and using only some of the items of attribute information in the bitstream. In such a case, the data amount in extracting some of the items of attribute information can be reduced.

Furthermore, for example, when the items of attribute information of the encoded three-dimensional points include items of attribute information having a same attribute type, the item of control information includes an item of instance identification information for identifying each of the items of attribute information having the same attribute type.

According to the above, checking the control information enables obtaining the details of attribute information on an encoded three-dimensional point without the need for processing such as decoding the attribute information.

Furthermore, for example, the three-dimensional data decoding device includes a processor and memory, and the processor performs the above-described processes using the memory. The memory may store a control program for performing the above-described processes.

It should be noted that, it is sufficient that the three-dimensional data decoding device is capable of executing the above-described processes, and the three-dimensional data encoding device need not necessarily execute data decoding.

Embodiment 10

The following describes the structure of three-dimensional data creation device 810 according to the present embodiment. FIG. 91 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

The following describes the steps performed by three-dimensional data creation device 810 of transmitting three-dimensional data to a following vehicle. FIG. 92 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space on the road ahead of the own vehicle (S801). More specifically, three-dimensional data creation device 810 synthesizes three-dimensional data 834 created on the basis of sensor information 833 of the own vehicle with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change. Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of the own vehicle by distance L (S804).

The processes of step S801 through step S804 are repeated, for example at a predetermined time interval.

When three-dimensional data 835 of the current space to be transmitted includes no difference from the three-dimensional map, three-dimensional data creation device 810 may not transmit three-dimensional data 837 of the space.

In the present embodiment, a client device transmits sensor information obtained through a sensor to a server or another client device.

A structure of a system according to the present embodiment will first be described. FIG. 93 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

FIG. 94 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g., transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 1015 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

A structure of server 901 will be described next. FIG. 95 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g., transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when the received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

An operational flow of client device 902 will be described next. FIG. 96 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

FIG. 97 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

An operational flow of server 901 will be described next. FIG. 98 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

FIG. 99 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

The following describes variations of the present embodiment.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using the obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Server 901 is not limited to only being a server such as a cloud-based traffic monitoring system, and may also be another (vehicle-mounted) client device. FIG. 100 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

FIG. 101 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits the obtained sensor information 1033 to server 901 or another client device 902.

This enables client device 902 to transmit sensor information 1033 to server 901 or the like. This makes it possible to further reduce the amount of transmission data compared to when transmitting the three-dimensional data. Since there is no need for client device 902 to perform processes, such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1033 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another client device 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using the received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes, such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses the received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

The following will describe a variation of the present embodiment. FIG. 102 is a diagram illustrating a configuration of a system according to the present embodiment. The system illustrated in FIG. 102 includes server 2001, client device 2002A, and client device 2002B.

Client device 2002A and client device 2002B are each provided in a mobile object such as a vehicle, and transmit sensor information to server 2001. Server 2001 transmits a three-dimensional map (a point cloud) to client device 2002A and client device 2002B.

Client device 2002A includes sensor information obtainer 2011, storage 2012, and data transmission possibility determiner 2013. It should be noted that client device 2002B has the same configuration. Additionally, when client device 2002A and client device 2002B are not particularly distinguished below, client device 2002A and client device 2002B are also referred to as client device 2002.

FIG. 103 is a flowchart illustrating operation of client device 2002 according to the present embodiment.

Sensor information obtainer 2011 obtains a variety of sensor information using sensors (a group of sensors) provided in a mobile object. In other words, sensor information obtainer 2011 obtains sensor information obtained by the sensors (the group of sensors) provided in the mobile object and indicating a surrounding state of the mobile object. Sensor information obtainer 2011 also stores the obtained sensor information into storage 2012. This sensor information includes at least one of information obtained by LiDAR, a visible light image, an infrared image, or a depth image. Additionally, the sensor information may include at least one of sensor position information, speed information, obtainment time information, or obtainment location information. Sensor position information indicates a position of a sensor that has obtained sensor information. Speed information indicates a speed of the mobile object when a sensor obtained sensor information. Obtainment time information indicates a time when a sensor obtained sensor information. Obtainment location information indicates a position of the mobile object or a sensor when the sensor obtained sensor information.

Next, data transmission possibility determiner 2013 determines whether the mobile object (client device 2002) is in an environment in which the mobile object can transmit sensor information to server 2001 (S2002). For example, data transmission possibility determiner 2013 may specify a location and a time at which client device 2002 is present using GPS information etc., and may determine whether data can be transmitted. Additionally, data transmission possibility determiner 2013 may determine whether data can be transmitted, depending on whether it is possible to connect to a specific access point.

When client device 2002 determines that the mobile object is in the environment in which the mobile object can transmit the sensor information to server 2001 (YES in S2002), client device 2002 transmits the sensor information to server 2001 (S2003). In other words, when client device 2002 becomes capable of transmitting sensor information to server 2001, client device 2002 transmits the sensor information held by client device 2002 to server 2001. For example, an access point that enables high-speed communication using millimeter waves is provided in an intersection or the like. When client device 2002 enters the intersection, client device 2002 transmits the sensor information held by client device 2002 to server 2001 at high speed using the millimeter-wave communication.

Next, client device 2002 deletes from storage 2012 the sensor information that has been transmitted to server 2001 (S2004). It should be noted that when sensor information that has not been transmitted to server 2001 meets predetermined conditions, client device 2002 may delete the sensor information. For example, when an obtainment time of sensor information held by client device 2002 precedes a current time by a certain time, client device 2002 may delete the sensor information from storage 2012. In other words, when a difference between the current time and a time when a sensor obtained sensor information exceeds a predetermined time, client device 2002 may delete the sensor information from storage 2012. Besides, when an obtainment location of sensor information held by client device 2002 is separated from a current location by a certain distance, client device 2002 may delete the sensor information from storage 2012. In other words, when a difference between a current position of the mobile object or a sensor and a position of the mobile object or the sensor when the sensor obtained sensor information exceeds a predetermined distance, client device 2002 may delete the sensor information from storage 2012. Accordingly, it is possible to reduce the capacity of storage 2012 of client device 2002.

When client device 2002 does not finish obtaining sensor information (NO in S2005), client device 2002 performs step S2001 and the subsequent steps again. Further, when client device 2002 finishes obtaining sensor information (YES in S2005), client device 2002 completes the process.

Client device 2002 may select sensor information to be transmitted to server 2001, in accordance with communication conditions. For example, when high-speed communication is available, client device 2002 preferentially transmits sensor information (e.g., information obtained by LiDAR) of which the data size held in storage 2012 is large. Additionally, when high-speed communication is not readily available, client device 2002 transmits sensor information (e.g., a visible light image) which has high priority and of which the data size held in storage 2012 is small. Accordingly, client device 2002 can efficiently transmit sensor information held in storage 2012, in accordance with network conditions Client device 2002 may obtain, from server 2001, time information indicating a current time and location information indicating a current location. Moreover, client device 2002 may determine an obtainment time and an obtainment location of sensor information based on the obtained time information and location information. In other words, client device 2002 may obtain time information from server 2001 and generate obtainment time information using the obtained time information. Client device 2002 may also obtain location information from server 2001 and generate obtainment location information using the obtained location information.

For example, regarding time information, server 2001 and client device 2002 perform clock synchronization using a means such as the Network Time Protocol (NTP) or the Precision Time Protocol (PTP). This enables client device 2002 to obtain accurate time information. What's more, since it is possible to synchronize clocks between server 2001 and client devices 2002, it is possible to synchronize times included in pieces of sensor information obtained by separate client devices 2002. As a result, server 2001 can handle sensor information indicating a synchronized time. It should be noted that a means of synchronizing clocks may be any means other than the NTP or PTP. In addition, GPS information may be used as the time information and the location information.

Server 2001 may specify a time or a location and obtain pieces of sensor information from client devices 2002. For example, when an accident occurs, in order to search for a client device in the vicinity of the accident, server 2001 specifies an accident occurrence time and an accident occurrence location and broadcasts sensor information transmission requests to client devices 2002. Then, client device 2002 having sensor information obtained at the corresponding time and location transmits the sensor information to server 2001. In other words, client device 2002 receives, from server 2001, a sensor information transmission request including specification information specifying a location and a time. When sensor information obtained at a location and a time indicated by the specification information is stored in storage 2012, and client device 2002 determines that the mobile object is present in the environment in which the mobile object can transmit the sensor information to server 2001, client device 2002 transmits, to server 2001, the sensor information obtained at the location and the time indicated by the specification information. Consequently, server 2001 can obtain the pieces of sensor information pertaining to the occurrence of the accident from client devices 2002, and use the pieces of sensor information for accident analysis etc.

It should be noted that when client device 2002 receives a sensor information transmission request from server 2001, client device 2002 may refuse to transmit sensor information. Additionally, client device 2002 may set in advance which pieces of sensor information can be transmitted. Alternatively, server 2001 may inquire of client device 2002 each time whether sensor information can be transmitted.

A point may be given to client device 2002 that has transmitted sensor information to server 2001. This point can be used in payment for, for example, gasoline expenses, electric vehicle (EV) charging expenses, a highway toll, or rental car expenses. After obtaining sensor information, server 2001 may delete information for specifying client device 2002 that has transmitted the sensor information. For example, this information is a network address of client device 2002. Since this enables the anonymization of sensor information, a user of client device 2002 can securely transmit sensor information from client device 2002 to server 2001. Server 2001 may include servers. For example, by servers sharing sensor information, even when one of the servers breaks down, the other servers can communicate with client device 2002. Accordingly, it is possible to avoid service outage due to a server breakdown.

A specified location specified by a sensor information transmission request indicates an accident occurrence location etc., and may be different from a position of client device 2002 at a specified time specified by the sensor information transmission request. For this reason, for example, by specifying, as a specified location, a range such as within XX meters of a surrounding area, server 2001 can request information from client device 2002 within the range. Similarly, server 2001 may also specify, as a specified time, a range such as within N seconds before and after a certain time. As a result, server 2001 can obtain sensor information from client device 2002 present for a time from t−N to t+N and in a location within XX meters from absolute position S. When client device 2002 transmits three-dimensional data such as LiDAR, client device 2002 may transmit data created immediately after time t.

Server 2001 may separately specify information indicating, as a specified location, a location of client device 2002 from which sensor information is to be obtained, and a location at which sensor information is desirably obtained. For example, server 2001 specifies that sensor information including at least a range within YY meters from absolute position S is to be obtained from client device 2002 present within XX meters from absolute position S. When client device 2002 selects three-dimensional data to be transmitted, client device 2002 selects one or more pieces of three-dimensional data so that the one or more pieces of three-dimensional data include at least the sensor information including the specified range. Each of the one or more pieces of three-dimensional data is a random-accessible unit of data. In addition, when client device 2002 transmits a visible light image, client device 2002 may transmit pieces of temporally continuous image data including at least a frame immediately before or immediately after time t.

When client device 2002 can use physical networks such as 5G, Wi-Fi, or modes in 5G for transmitting sensor information, client device 2002 may select a network to be used according to the order of priority notified by server 2001. Alternatively, client device 2002 may select a network that enables client device 2002 to ensure an appropriate bandwidth based on the size of transmit data. Alternatively, client device 2002 may select a network to be used, based on data transmission expenses etc. A transmission request from server 2001 may include information indicating a transmission deadline, for example, performing transmission when client device 2002 can start transmission by time t. When server 2001 cannot obtain sufficient sensor information within a time limit, server 2001 may issue a transmission request again.

Sensor information may include header information indicating characteristics of sensor data along with compressed or uncompressed sensor data. Client device 2002 may transmit header information to server 2001 via a physical network or a communication protocol that is different from a physical network or a communication protocol used for sensor data. For example, client device 2002 transmits header information to server 2001 prior to transmitting sensor data. Server 2001 determines whether to obtain the sensor data of client device 2002, based on a result of analysis of the header information. For example, header information may include information indicating a point cloud obtainment density, an elevation angle, or a frame rate of LiDAR, or information indicating, for example, a resolution, an SN ratio, or a frame rate of a visible light image. Accordingly, server 2001 can obtain the sensor information from client device 2002 having the sensor data of determined quality.

As stated above, client device 2002 is provided in the mobile object, obtains sensor information that has been obtained by a sensor provided in the mobile object and indicates a surrounding state of the mobile object, and stores the sensor information into storage 2012. Client device 2002 determines whether the mobile object is present in an environment in which the mobile object is capable of transmitting the sensor information to server 2001, and transmits the sensor information to server 2001 when the mobile object is determined to be present in the environment in which the mobile object is capable of transmitting the sensor information to server 2001.

Additionally, client device 2002 further creates, from the sensor information, three-dimensional data of a surrounding area of the mobile object, and estimates a self-location of the mobile object using the three-dimensional data created.

Besides, client device 2002 further transmits a transmission request for a three-dimensional map to server 2001, and receives the three-dimensional map from server 2001. In the estimating, client device 2002 estimates the self-location using the three-dimensional data and the three-dimensional map.

It should be noted that the above process performed by client device 2002 may be realized as an information transmission method for use in client device 2002.

In addition, client device 2002 may include a processor and memory. Using the memory, the processor may perform the above process.

Next, a sensor information collection system according to the present embodiment will be described. FIG. 104 is a diagram illustrating a configuration of the sensor information collection system according to the present embodiment. As illustrated in FIG. 104, the sensor information collection system according to the present embodiment includes terminal 2021A, terminal 2021B, communication device 2022A, communication device 2022B, network 2023, data collection server 2024, map server 2025, and client device 2026. It should be noted that when terminal 2021A and terminal 2021B are not particularly distinguished, terminal 2021A and terminal 2021B are also referred to as terminal 2021. Additionally, when communication device 2022A and communication device 2022B are not particularly distinguished, communication device 2022A and communication device 2022B are also referred to as communication device 2022.

Data collection server 2024 collects data such as sensor data obtained by a sensor included in terminal 2021 as position-related data in which the data is associated with a position in a three-dimensional space.

Sensor data is data obtained by, for example, detecting a surrounding state of terminal 2021 or an internal state of terminal 2021 using a sensor included in terminal 2021. Terminal 2021 transmits, to data collection server 2024, one or more pieces of sensor data collected from one or more sensor devices in locations at which direct communication with terminal 2021 is possible or at which communication with terminal 2021 is possible by the same communication system or via one or more relay devices.

Data included in position-related data may include, for example, information indicating an operating state, an operating log, a service use state, etc. of a terminal or a device included in the terminal. In addition, the data include in the position-related data may include, for example, information in which an identifier of terminal 2021 is associated with a position or a movement path etc. of terminal 2021.

Information indicating a position included in position-related data is associated with, for example, information indicating a position in three-dimensional data such as three-dimensional map data. The details of information indicating a position will be described later.

Position-related data may include at least one of the above-described time information or information indicating an attribute of data included in the position-related data or a type (e.g., a model number) of a sensor that has created the data, in addition to position information that is information indicating a position. The position information and the time information may be stored in a header area of the position-related data or a header area of a frame that stores the position-related data. Further, the position information and the time information may be transmitted and/or stored as metadata associated with the position-related data, separately from the position-related data.

Map server 2025 is connected to, for example, network 2023, and transmits three-dimensional data such as three-dimensional map data in response to a request from another device such as terminal 2021. Besides, as described in the aforementioned embodiments, map server 2025 may have, for example, a function of updating three-dimensional data using sensor information transmitted from terminal 2021.

Data collection server 2024 is connected to, for example, network 2023, collects position-related data from another device such as terminal 2021, and stores the collected position-related data into a storage of data collection server 2024 or a storage of another server. In addition, data collection server 2024 transmits, for example, metadata of collected position-related data or three-dimensional data generated based on the position-related data, to terminal 2021 in response to a request from terminal 2021.

Network 2023 is, for example, a communication network such as the Internet. Terminal 2021 is connected to network 2023 via communication device 2022. Communication device 2022 communicates with terminal 2021 using one communication system or switching between communication systems.

Communication device 2022 is a communication satellite that performs communication using, for example, (1) a base station compliant with Long-Term Evolution (LTE) etc., (2) an access point (AP) for Wi-Fi or millimeter-wave communication etc., (3) a low-power wide-area (LPWA) network gateway such as SIGFOX, LoRaWAN, or Wi-SUN, or (4) a satellite communication system such as DVB-S2.

It should be noted that a base station may communicate with terminal 2021 using a system classified as an LPWA network such as Narrowband Internet of Things (NB IoT) or LTE-M, or switching between these systems.

Here, although, in the example given, terminal 2021 has a function of communicating with communication device 2022 that uses two types of communication systems, and communicates with map server 2025 or data collection server 2024 using one of the communication systems or switching between the communication systems and between communication devices 2022 to be a direct communication partner; a configuration of the sensor information collection system and terminal 2021 is not limited to this. For example, terminal 2021 need not have a function of performing communication using communication systems, and may have a function of performing communication using one of the communication systems. Terminal 2021 may also support three or more communication systems. Additionally, each terminal 2021 may support a different communication system.

Terminal 2021 includes, for example, the configuration of client device 902 illustrated in FIG. 94. Terminal 2021 estimates a self-location etc. using received three-dimensional data. Besides, terminal 2021 associates sensor data obtained from a sensor and position information obtained by self-location estimation to generate position-related data.

Position information appended to position-related data indicates, for example, a position in a coordinate system used for three-dimensional data. For example, the position information is coordinate values represented using a value of a latitude and a value of a longitude. Here, terminal 2021 may include, in the position information, a coordinate system serving as a reference for the coordinate values and information indicating three-dimensional data used for location estimation, along with the coordinate values. Coordinate values may also include altitude information.

The position information may be associated with a data unit or a space unit usable for encoding the above three-dimensional data. Such a unit is, for example, WLD, GOS, SPC, VLM, or VXL. Here, the position information is represented by, for example, an identifier for identifying a data unit such as the SPC corresponding to position-related data. It should be noted that the position information may include, for example, information indicating three-dimensional data obtained by encoding a three-dimensional space including a data unit such as the SPC or information indicating a detailed position within the SPC, in addition to the identifier for identifying the data unit such as the SPC. The information indicating the three-dimensional data is, for example, a file name of the three-dimensional data.

As stated above, by generating position-related data associated with position information based on location estimation using three-dimensional data, the system can give more accurate position information to sensor information than when the system appends position information based on a self-location of a client device (terminal 2021) obtained using a GPS to sensor information. As a result, even when another device uses the position-related data in another service, there is a possibility of more accurately determining a position corresponding to the position-related data in an actual space, by performing location estimation based on the same three-dimensional data.

It should be noted that although the data transmitted from terminal 2021 is the position-related data in the example given in the present embodiment, the data transmitted from terminal 2021 may be data unassociated with position information. In other words, the transmission and reception of three-dimensional data or sensor data described in the other embodiments may be performed via network 2023 described in the present embodiment.

Next, a different example of position information indicating a position in a three-dimensional or two-dimensional actual space or in a map space will be described. The position information appended to position-related data may be information indicating a relative position relative to a keypoint in three-dimensional data. Here, the keypoint serving as a reference for the position information is encoded as, for example, SWLD, and notified to terminal 2021 as three-dimensional data.

The information indicating the relative position relative to the keypoint may be, for example, information that is represented by a vector from the keypoint to the point indicated by the position information, and indicates a direction and a distance from the keypoint to the point indicated by the position information. Alternatively, the information indicating the relative position relative to the keypoint may be information indicating an amount of displacement from the keypoint to the point indicated by the position information along each of the x axis, the y axis, and the z axis. Additionally, the information indicating the relative position relative to the keypoint may be information indicating a distance from each of three or more keypoints to the point indicated by the position information. It should be noted that the relative position need not be a relative position of the point indicated by the position information represented using each keypoint as a reference, and may be a relative position of each keypoint represented with respect to the point indicated by the position information. Examples of position information based on a relative position relative to a keypoint include information for identifying a keypoint to be a reference, and information indicating the relative position of the point indicated by the position information and relative to the keypoint. When the information indicating the relative position relative to the keypoint is provided separately from three-dimensional data, the information indicating the relative position relative to the keypoint may include, for example, coordinate axes used in deriving the relative position, information indicating a type of the three-dimensional data, and/or information indicating a magnitude per unit amount (e.g., a scale) of a value of the information indicating the relative position.

The position information may include, for each keypoint, information indicating a relative position relative to the keypoint. When the position information is represented by relative positions relative to keypoints, terminal 2021 that intends to identify a position in an actual space indicated by the position information may calculate candidate points of the position indicated by the position information from positions of the keypoints each estimated from sensor data, and may determine that a point obtained by averaging the calculated candidate points is the point indicated by the position information. Since this configuration reduces the effects of errors when the positions of the keypoints are estimated from the sensor data, it is possible to improve the estimation accuracy for the point in the actual space indicated by the position information. Besides, when the position information includes information indicating relative positions relative to keypoints, if it is possible to detect any one of the keypoints regardless of the presence of keypoints undetectable due to a limitation such as a type or performance of a sensor included in terminal 2021, it is possible to estimate a value of the point indicated by the position information.

A point identifiable from sensor data can be used as a keypoint. Examples of the point identifiable from the sensor data include a point or a point within a region that satisfies a predetermined keypoint detection condition, such as the above-described three-dimensional feature or feature of visible light data is greater than or equal to a threshold value.

Moreover, a marker etc. placed in an actual space may be used as a keypoint. In this case, the maker may be detected and located from data obtained using a sensor such as LiDAR or a camera. For example, the marker may be represented by a change in color or luminance value (degree of reflection), or a three-dimensional shape (e.g., unevenness). Coordinate values indicating a position of the marker, or a two-dimensional bar code or a bar code etc. generated from an identifier of the marker may be also used.

Furthermore, a light source that transmits an optical signal may be used as a marker. When a light source of an optical signal is used as a marker, not only information for obtaining a position such as coordinate values or an identifier but also other data may be transmitted using an optical signal. For example, an optical signal may include contents of service corresponding to the position of the marker, an address for obtaining contents such as a URL, or an identifier of a wireless communication device for receiving service, and information indicating a wireless communication system etc. for connecting to the wireless communication device. The use of an optical communication device (a light source) as a marker not only facilitates the transmission of data other than information indicating a position but also makes it possible to dynamically change the data.

Terminal 2021 finds out a correspondence relationship of keypoints between mutually different data using, for example, a common identifier used for the data, or information or a table indicating the correspondence relationship of the keypoints between the data. When there is no information indicating a correspondence relationship between keypoints, terminal 2021 may also determine that when coordinates of a keypoint in three-dimensional data are converted into a position in a space of another three-dimensional data, a keypoint closest to the position is a corresponding keypoint.

When the position information based on the relative position described above is used, terminal 2021 that uses mutually different three-dimensional data or services can identify or estimate a position indicated by the position information with respect to a common keypoint included in or associated with each three-dimensional data. As a result, terminal 2021 that uses the mutually different three-dimensional data or the services can identify or estimate the same position with higher accuracy.

Even when map data or three-dimensional data represented using mutually different coordinate systems are used, since it is possible to reduce the effects of errors caused by the conversion of a coordinate system, it is possible to coordinate services based on more accurate position information.

Hereinafter, an example of functions provided by data collection server 2024 will be described. Data collection server 2024 may transfer received position-related data to another data server. When there are data servers, data collection server 2024 determines to which data server received position-related data is to be transferred, and transfers the position-related data to a data server determined as a transfer destination.

Data collection server 2024 determines a transfer destination based on, for example, transfer destination server determination rules preset to data collection server 2024. The transfer destination server determination rules are set by, for example, a transfer destination table in which identifiers respectively associated with terminals 2021 are associated with transfer destination data servers.

Terminal 2021 appends an identifier associated with terminal 2021 to position-related data to be transmitted, and transmits the position-related data to data collection server 2024. Data collection server 2024 determines a transfer destination data server corresponding to the identifier appended to the position-related data, based on the transfer destination server determination rules set out using the transfer destination table etc.; and transmits the position-related data to the determined data server. The transfer destination server determination rules may be specified based on a determination condition set using a time, a place, etc. at which position-related data is obtained. Here, examples of the identifier associated with transmission source terminal 2021 include an identifier unique to each terminal 2021 or an identifier indicating a group to which terminal 2021 belongs.

The transfer destination table need not be a table in which identifiers associated with transmission source terminals are directly associated with transfer destination data servers. For example, data collection server 2024 holds a management table that stores tag information assigned to each identifier unique to terminal 2021, and a transfer destination table in which the pieces of tag information are associated with transfer destination data servers. Data collection server 2024 may determine a transfer destination data server based on tag information, using the management table and the transfer destination table. Here, the tag information is, for example, control information for management or control information for providing service assigned to a type, a model number, an owner of terminal 2021 corresponding to the identifier, a group to which terminal 2021 belongs, or another identifier. Moreover, in the transfer destination able, identifiers unique to respective sensors may be used instead of the identifiers associated with transmission source terminals 2021. Furthermore, the transfer destination server determination rules may be set by client device 2026.

Data collection server 2024 may determine data servers as transfer destinations, and transfer received position-related data to the data servers. According to this configuration, for example, when position-related data is automatically backed up or when, in order that position-related data is commonly used by different services, there is a need to transmit the position-related data to a data server for providing each service, it is possible to achieve data transfer as intended by changing a setting of data collection server 2024. As a result, it is possible to reduce the number of steps necessary for building and changing a system, compared to when a transmission destination of position-related data is set for each terminal 2021.

Data collection server 2024 may register, as a new transfer destination, a data server specified by a transfer request signal received from a data server; and transmit position-related data subsequently received to the data server, in response to the transfer request signal.

Data collection server 2024 may store position-related data received from terminal 2021 into a recording device, and transmit position-related data specified by a transmission request signal received from terminal 2021 or a data server to request source terminal 2021 or the data server in response to the transmission request signal.

Data collection server 2024 may determine whether position-related data is suppliable to a request source data server or terminal 2021, and transfer or transmit the position-related data to the request source data server or terminal 2021 when determining that the position-related data is suppliable.

When data collection server 2024 receives a request for current position-related data from client device 2026, even if it is not a timing for transmitting position-related data by terminal 2021, data collection server 2024 may send a transmission request for the current position-related data to terminal 2021, and terminal 2021 may transmit the current position-related data in response to the transmission request.

Although terminal 2021 transmits position information data to data collection server 2024 in the above description, data collection server 2024 may have a function of managing terminal 2021 such as a function necessary for collecting position-related data from terminal 2021 or a function used when collecting position-related data from terminal 2021.

Data collection server 2024 may have a function of transmitting, to terminal 2021, a data request signal for requesting transmission of position information data, and collecting position-related data.

Management information such as an address for communicating with terminal 2021 from which data is to be collected or an identifier unique to terminal 2021 is registered in advance in data collection server 2024. Data collection server 2024 collects position-related data from terminal 2021 based on the registered management information. Management information may include information such as types of sensors included in terminal 2021, the number of sensors included in terminal 2021, and communication systems supported by terminal 2021.

Data collection server 2024 may collect information such as an operating state or a current position of terminal 2021 from terminal 2021.

Registration of management information may be instructed by client device 2026, or a process for the registration may be started by terminal 2021 transmitting a registration request to data collection server 2024. Data collection server 2024 may have a function of controlling communication between data collection server 2024 and terminal 2021.

Communication between data collection server 2024 and terminal 2021 may be established using a dedicated line provided by a service provider such as a mobile network operator (MNO) or a mobile virtual network operator (MVNO), or a virtual dedicated line based on a virtual private network (VPN). According to this configuration, it is possible to perform secure communication between terminal 2021 and data collection server 2024.

Data collection server 2024 may have a function of authenticating terminal 2021 or a function of encrypting data to be transmitted and received between data collection server 2024 and terminal 2021. Here, the authentication of terminal 2021 or the encryption of data is performed using, for example, an identifier unique to terminal 2021 or an identifier unique to a terminal group including terminals 2021, which is shared in advance between data collection server 2024 and terminal 2021. Examples of the identifier include an international mobile subscriber identity (IMSI) that is a unique number stored in a subscriber identity module (SIM) card. An identifier for use in authentication and an identifier for use in encryption of data may be identical or different.

The authentication or the encryption of data between data collection server 2024 and terminal 2021 is feasible when both data collection server 2024 and terminal 2021 have a function of performing the process. The process does not depend on a communication system used by communication device 2022 that performs relay. Accordingly, since it is possible to perform the common authentication or encryption without considering whether terminal 2021 uses a communication system, the user's convenience of system architecture is increased. However, the expression "does not depend on a communication system used by communication device 2022 that performs relay" means a change according to a communication system is not essential. In other words, in order to improve the transfer efficiency or ensure security, the authentication or the encryption of data between data collection server 2024 and terminal 2021 may be changed according to a communication system used by a relay device.

Data collection server 2024 may provide client device 2026 with a User Interface (UI) that manages data collection rules such as types of position-related data collected from terminal 2021 and data collection schedules. Accordingly, a user can specify, for example, terminal 2021 from which data is to be collected using client device 2026, a data collection time, and a data collection frequency. Additionally, data collection server 2024 may specify, for example, a region on a map from which data is to be desirably collected, and collect position-related data from terminal 2021 included in the region.

When the data collection rules are managed on a per terminal 2021 basis, client device 2026 presents, on a screen, a list of terminals 2021 or sensors to be managed. The user sets, for example, a necessity for data collection or a collection schedule for each item in the list.

When a region on a map from which data is to be desirably collected is specified, client device 2026 presents, on a screen, a two-dimensional or three-dimensional map of a region to be managed. The user selects the region from which data is to be collected on the displayed map. Examples of the region selected on the map include a circular or rectangular region having a point specified on the map as the center, or a circular or rectangular region specifiable by a drag operation. Client device 2026 may also select a region in a preset unit such as a city, an area or a block in a city, or a main road, etc. Instead of specifying a region using a map, a region may be set by inputting values of a latitude and a longitude, or a region may be selected from a list of candidate regions derived based on inputted text information. Text information is, for example, a name of a region, a city, or a landmark.

Moreover, data may be collected while the user dynamically changes a specified region by specifying one or more terminals 2021 and setting a condition such as within 100 meters of one or more terminals 2021.

When client device 2026 includes a sensor such as a camera, a region on a map may be specified based on a position of client device 2026 in an actual space obtained from sensor data. For example, client device 2026 may estimate a self-location using sensor data, and specify, as a region from which data is to be collected, a region within a predetermined distance from a point on a map corresponding to the estimated location or a region within a distance specified by the user. Client device 2026 may also specify, as the region from which the data is to be collected, a sensing region of the sensor, that is, a region corresponding to obtained sensor data. Alternatively, client device 2026 may specify, as the region from which the data is to be collected, a region based on a location corresponding to sensor data specified by the user. Either client device 2026 or data collection server 2024 may estimate a region on a map or a location corresponding to sensor data.

When a region on a map is specified, data collection server 2024 may specify terminal 2021 within the specified region by collecting current position information of each terminal 2021, and may send a transmission request for position-related data to specified terminal 2021. When data collection server 2024 transmits information indicating a specified region to terminal 2021, determines whether terminal 2021 is present within the specified region, and determines that terminal 2021 is present within the specified region, rather than specifying terminal 2021 within the region, terminal 2021 may transmit position-related data.

Data collection server 2024 transmits, to client device 2026, data such as a list or a map for providing the above-described User Interface (UI) in an application executed by client device 2026. Data collection server 2024 may transmit, to client device 2026, not only the data such as the list or the map but also an application program. Additionally, the above UI may be provided as contents created using HTML displayable by a browser. It should be noted that part of data such as map data may be supplied from a server, such as map server 2025, other than data collection server 2024.

When client device 2026 receives an input for notifying the completion of an input such as pressing of a setup key by the user, client device 2026 transmits the inputted information as configuration information to data collection server 2024. Data collection server 2024 transmits, to each terminal 2021, a signal for requesting position-related data or notifying position-related data collection rules, based on the configuration information received from client device 2026, and collects the position-related data.

Next, an example of controlling operation of terminal 2021 based on additional information added to three-dimensional or two-dimensional map data will be described.

In the present configuration, object information that indicates a position of a power feeding part such as a feeder antenna or a feeder coil for wireless power feeding buried under a road or a parking lot is included in or associated with three-dimensional data, and such object information is provided to terminal 2021 that is a vehicle or a drone.

A vehicle or a drone that has obtained the object information to get charged automatically moves so that a position of a charging part such as a charging antenna or a charging coil included in the vehicle or the drone becomes opposite to a region indicated by the object information, and such vehicle or a drone starts to charge itself. It should be noted that when a vehicle or a drone has no automatic driving function, a direction to move in or an operation to perform is presented to a driver or an operator by using an image displayed on a screen, audio, etc. When a position of a charging part calculated based on an estimated self-location is determined to fall within the region indicated by the object information or a predetermined distance from the region, an image or audio to be presented is changed to a content that puts a stop to driving or operating, and the charging is started.

Object information need not be information indicating a position of a power feeding part, and may be information indicating a region within which placement of a charging part results in a charging efficiency greater than or equal to a predetermined threshold value. A position indicated by object information may be represented by, for example, the central point of a region indicated by the object information, a region or a line within a two-dimensional plane, or a region, a line, or a plane within a three-dimensional space.

According to this configuration, since it is possible to identify the position of the power feeding antenna unidentifiable by sensing data of LiDAR or an image captured by the camera, it is possible to highly accurately align a wireless charging antenna included in terminal 2021 such as a vehicle with a wireless power feeding antenna buried under a road. As a result, it is possible to increase a charging speed at the time of wireless charging and improve the charging efficiency.

Object information may be an object other than a power feeding antenna. For example, three-dimensional data includes, for example, a position of an AP for millimeter-wave wireless communication as object information. Accordingly, since terminal 2021 can identify the position of the AP in advance, terminal 2021 can steer a directivity of beam to a direction of the object information and start communication. As a result, it is possible to improve communication quality such as increasing transmission rates, reducing the duration of time before starting communication, and extending a communicable period.

Object information may include information indicating a type of an object corresponding to the object information. In addition, when terminal 2021 is present within a region in an actual space corresponding to a position in three-dimensional data of the object information or within a predetermined distance from the region, the object information may include information indicating a process to be performed by terminal 2021.

Object information may be provided by a server different from a server that provides three-dimensional data. When object information is provided separately from three-dimensional data, object groups in which object information used by the same service is stored may be each provided as separate data according to a type of a target service or a target device.

Three-dimensional data used in combination with object information may be point cloud data of WLD or keypoint data of SWLD.

In the three-dimensional data encoding device, when attribute information of a current three-dimensional point to be encoded is layer-encoded using Levels of Detail (LoDs), the three-dimensional data decoding device may decode the attribute information in layers down to LoD required by the three-dimensional data decoding device and need not decode the attribute information in layers not required. For example, when the total number of LoDs for the attribute information in a bitstream generated by the three-dimensional data encoding device is N, the three-dimensional data decoding device may decode M LoDs (M<N), i.e., layers from the uppermost layer LoD0 to LoD(M−1), and need not decode the remaining LoDs, i.e., layers down to LoD(N−1). With this, while reducing the processing load, the three-dimensional data decoding device can decode the attribute information in layers from LoD0 to LoD(M−1) required by the three-dimensional data decoding device.

FIG. 105 is a diagram illustrating the foregoing use case. In the example shown in FIG. 105, a server stores a three-dimensional map obtained by encoding three-dimensional geometry information and attribute information. The server (the three-dimensional data encoding device) broadcasts the three-dimensional map to client devices (the three-dimensional data decoding devices: for example, vehicles, drones, etc.) in an area managed by the server, and each client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure or the like. Then, the sever layer-encodes the attribute information of the three-dimensional map using N LoDs established based on the geometry information. The server stores a bitstream of the three-dimensional map obtained by the layer-encoding.

Next, in response to a send request for the map information from the client device in the area managed by the server, the server sends the bitstream of the encoded three-dimensional map to the client device.

The client device receives the bitstream of the three-dimensional map sent from the server, and decodes the geometry information and the attribute information of the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and decodes all the information in the bitstream.

Moreover, when the client device displays the three-dimensional map information to a user or the like, the client device determines that a decoding result to the sparse three-dimensional points is necessary as the attribute information, and decodes the geometry information and the attribute information in M LoDs (M<N) starting from an upper layer LoD0.

In this way, the processing load of the client device can be reduced by changing LoDs for the attribute information to be decoded in accordance with the intended use of the client device.

In the example shown in FIG. 105, for example, the three-dimensional map includes geometry information and attribute information. The geometry information is encoded using the octree. The attribute information is encoded using N LoDs.

Client device A performs highly accurate estimation of the self-position. In this case, client device A determines that all the geometry information and all the attribute information are necessary, and decodes all the geometry information and all the attribute information constructed from N LoDs in the bitstream.

Client device B displays the three-dimensional map to a user. In this case, client device B determines that the geometry information and the attribute information in M LoDs (M<N) are necessary, and decodes the geometry information and the attribute information constructed from M LoDs in the bitstream.

It is to be noted that the server may broadcast the three-dimensional map to the client devices, or multicast or unicast the three-dimensional map to the client devices.

The following describes a variation of the system according to the present embodiment. In the three-dimensional data encoding device, when attribute information of a current three-dimensional point to be encoded is layer-encoded using LoDs, the three-dimensional data encoding device may encode the attribute information in layers down to LoD required by the three-dimensional data decoding device and need not encode the attribute information in layers not required. For example, when the total number of LoDs is N, the three-dimensional data encoding device may generate a bitstream by encoding M LoDs (M<N), i.e., layers from the uppermost layer LoD0 to LoD(M−1), and not encoding the remaining LoDs, i.e., layers down to LoD(N−1). With this, in response to a request from the three-dimensional data decoding device, the three-dimensional data encoding device can provide a bitstream in which the attribute information from LoD0 to LoD(M−1) required by the three-dimensional data decoding device is encoded.

FIG. 106 is a diagram illustrating the foregoing use case. In the example shown in FIG. 106, a server stores a three-dimensional map obtained by encoding three-dimensional geometry information and attribute information. The server (the three-dimensional data encoding device) unicasts, in response to a request from the client device, the three-dimensional map to a client device (the three-dimensional data decoding device: for example, a vehicle, a drone, etc.) in an area managed by the server, and the client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure, or the like. Then, the sever generates a bitstream of three-dimensional map A by layer-encoding the attribute information of the three-dimensional map using N LoDs established based on the geometry information, and stores the generated bitstream in the server. The sever also generates a bitstream of three-dimensional map B by layer-encoding the attribute information of the three-dimensional map using M LoDs (M<N) established based on the geometry information, and stores the generated bitstream in the server.

Next, the client device requests the server to send the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and requests the server to send bitstream of three-dimensional map A. Moreover, when the client device displays the three-dimensional map information to a user or the like, the client device determines that a decoding result to the sparse three-dimensional points is necessary as the attribute information, and requests the server to send the bitstream of three-dimensional map B including the geometry information and the attribute information in M LoDs (M<N) starting from an upper layer LoD0. Then, in response to the send request for the map information from the client device, the server sends the bitstream of encoded three-dimensional map A or B to the client device.

The client device receives the bitstream of three-dimensional map A or B sent from the server in accordance with the intended use of the client device, and decodes the received bitstream. In this way, the server changes a bitstream to be sent, in accordance with the intended use of the client device. With this, it is possible to reduce the processing load of the client device.

In the example shown in FIG. 106, the server stores three-dimensional map A and three-dimensional map B. The server generates three-dimensional map A by encoding the geometry information of the three-dimensional map using, for example, an octree structure, and encoding the attribute information of the three-dimensional map using N LoDs. In other words, NumLoD included in the bitstream of three-dimensional map A indicates N.

The server also generates three-dimensional map B by encoding the geometry information of the three-dimensional map using, for example, an octree structure, and encoding the attribute information of the three-dimensional map using M LoDs. In other words, NumLoD included in the bitstream of three-dimensional map B indicates M.

Client device A performs highly accurate estimation of the self-position. In this case, client device A determines that all the geometry information and all the attribute information are necessary, and requests the server to send three-dimensional map A including all the geometry information and the attribute information constructed from N LoDs. Client device A receives three-dimensional map A, and decodes all the geometry information and the attribute information constructed from N LoDs.

Client device B displays the three-dimensional map to a user. In this case, client device B determines that all the geometry information and the attribute information in M LoDs (M<N) are necessary, and requests the server to send three-dimensional map B including all the geometry information and the attribute information constructed from M LoDs. Client device B receives three-dimensional map B, and decodes all the geometry information and the attribute information constructed from M LoDs.

It is to be noted that in addition to three-dimensional map B, the server (the three-dimensional data encoding device) may generate three-dimensional map C in which attribute information in the remaining N-M LoDs is encoded, and send three-dimensional map C to client device B in response to the request from client device B. Moreover, client device B may obtain the decoding result of N LoDs using the bitstreams of three-dimensional maps B and C.

Hereinafter, an example of an application process will be described. FIG. 107 is a flowchart illustrating an example of the application process. When an application operation is started, a three-dimensional data demultiplexing device obtains an ISOBMFF file including point cloud data and a plurality of pieces of encoded data (S7301). For example, the three-dimensional data demultiplexing device may obtain the ISOBMFF file through communication, or may read the ISOBMFF file from the accumulated data.

Next, the three-dimensional data demultiplexing device analyzes the general configuration information in the ISOBMFF file, and specifies the data to be used for the application (S7302). For example, the three-dimensional data demultiplexing device obtains data that is used for processing, and does not obtain data that is not used for processing.

Next, the three-dimensional data demultiplexing device extracts one or more pieces of data to be used for the application, and analyzes the configuration information on the data (S7303).

When the type of the data is encoded data (encoded data in S7304), the three-dimensional data demultiplexing device converts the ISOBMFF to an encoded stream, and extracts a timestamp (S7305). Additionally, the three-dimensional data demultiplexing device refers to, for example, the flag indicating whether or not the synchronization between data is aligned to determine whether or not the synchronization between data is aligned, and may perform a synchronization process when not aligned.

Next, the three-dimensional data demultiplexing device decodes the data with a predetermined method according to the timestamp and the other instructions, and processes the decoded data (S7306).

On the other hand, when the type of the data is RAW data (RAW data in S7304), the three-dimensional data demultiplexing device extracts the data and timestamp (S7307). Additionally, the three-dimensional data demultiplexing device may refer to, for example, the flag indicating whether or not the synchronization between data is aligned to determine whether or not the synchronization between data is aligned, and may perform a synchronization process when not aligned. Next, the three-dimensional data demultiplexing device processes the data according to the timestamp and the other instructions (S7308).

For example, an example will be described in which the sensor signals obtained by a beam LiDAR, a FLASH LiDAR, and a camera are encoded and multiplexed with respective different encoding schemes. FIG. 108 is a diagram illustrating examples of the sensor ranges of a beam LiDAR, a FLASH LiDAR, and a camera. For example, the beam LiDAR detects all directions in the periphery of a vehicle (sensor), and the FLASH LiDAR and the camera detect the range in one direction (for example, the front) of the vehicle.

In the case of an application that integrally handles a LiDAR point cloud, the three-dimensional data demultiplexing device refers to the general configuration information, and extracts and decodes the encoded data of the beam LiDAR and the FLASH LiDAR. Additionally, the three-dimensional data demultiplexing device does not extract camera images.

According to the timestamps of the beam LiDAR and the FLASH LiDAR, the three-dimensional data demultiplexing device simultaneously processes the respective encoded data of the time of the same timestamp.

For example, the three-dimensional data demultiplexing device may present the processed data with a presentation device, may synthesize the point cloud data of the beam LiDAR and the FLASH LiDAR, or may perform a process such as rendering.

Additionally, in the case of an application that performs calibration between data, the three-dimensional data demultiplexing device may extract sensor geometry information, and use the sensor geometry information in the application.

For example, the three-dimensional data demultiplexing device may select whether to use beam LiDAR information or FLASH LiDAR information in the application, and may switch the process according to the selection result.

In this manner, since it is possible to adaptively change the obtaining of data and the encoding process according to the process of the application, the processing amount and the power consumption can be reduced.

Hereinafter, a use case in automated driving will be described. FIG. 109 is a diagram illustrating a configuration example of an automated driving system. This automated driving system includes cloud server 7350, and edge 7360 such as an in-vehicle device or a mobile device. Cloud server 7350 includes demultiplexer 7351, decoders 7352A, 7352B, and 7355, point cloud data synthesizer 7353, large data accumulator 7354, comparator 7356, and encoder 7357. Edge 7360 includes sensors 7361A and 7361B, point cloud data generators 7362A and 7362B, synchronizer 7363, encoders 7364A and 7364B, multiplexer 7365, update data accumulator 7366, demultiplexer 7367, decoder 7368, filter 7369, self-position estimator 7370, and driving controller 7371.

In this system, edge 7360 downloads large data, which is large point-cloud map data accumulated in cloud server 7350. Edge 7360 performs a self-position estimation process of edge 7360 (a vehicle or a terminal) by matching the large data with the sensor information obtained by edge 7360. Additionally, edge 7360 uploads the obtained sensor information to cloud server 7350, and updates the large data to the latest map data.

Additionally, in various applications that handle point cloud data in the system, point cloud data with different encoding methods are handled.

Cloud server 7350 encodes and multiplexes large data. Specifically, encoder 7357 performs encoding by using a third encoding method suitable for encoding a large point cloud. Additionally, encoder 7357 multiplexes encoded data. Large data accumulator 7354 accumulates the data encoded and multiplexed by encoder 7357.

Edge 7360 performs sensing. Specifically, point cloud data generator 7362A generates first point cloud data (geometry information (geometry) and attribute information) by using the sensing information obtained by sensor 7361A. Point cloud data generator 7362B generates second point cloud data (geometry information and attribute information) by using the sensing information obtained by sensor 7361B. The generated first point cloud data and second point cloud data are used for the self-position estimation or vehicle control of automated driving, or for map updating. In each process, a part of information of the first point cloud data and the second point cloud data may be used.

Edge 7360 performs the self-position estimation. Specifically, edge 7360 downloads large data from cloud server 7350. Demultiplexer 7367 obtains encoded data by demultiplexing the large data in a file format. Decoder 7368 obtains large data, which is large point-cloud map data, by decoding the obtained encoded data.

Self-position estimator 7370 estimates the self-position in the map of a vehicle by matching the obtained large data with the first point cloud data and the second point cloud data generated by point cloud data generators 7362A and 7362B. Additionally, driving controller 7371 uses the matching result or the self-position estimation result for driving control.

Note that self-position estimator 7370 and driving controller 7371 may extract specific information, such as geometry information, of the large data, and may perform processes by using the extracted information. Additionally, filter 7369 performs a process such as correction or decimation on the first point cloud data and the second point cloud data. Self-position estimator 7370 and driving controller 7371 may use the first point cloud data and second point cloud data on which the process has been performed. Additionally, self-position estimator 7370 and driving controller 7371 may use the sensor signals obtained by sensors 7361A and 7361B.

Synchronizer 7363 performs time synchronization and geometry correction between a plurality of sensor signals or the pieces of data of a plurality of pieces of point cloud data. Additionally, synchronizer 7363 may correct the geometry information on the sensor signal or point cloud data to match the large data, based on geometry correction information on the large data and sensor data generated by the self-position estimation process.

Note that synchronization and geometry correction may be performed not by edge 7360, but by cloud server 7350. In this case, edge 7360 may multiplex the synchronization information and the geometry information to transmit the synchronization information and the geometry information to cloud server 7350.

Edge 7360 encodes and multiplexes the sensor signal or point cloud data. Specifically, the sensor signal or point cloud data is encoded by using a first encoding method or a second encoding method suitable for encoding each signal. For example, encoder 7364A generates first encoded data by encoding first point cloud data by using the first encoding method. Encoder 7364B generates second encoded data by encoding second point cloud data by using the second encoding method.

Multiplexer 7365 generates a multiplexed signal by multiplexing the first encoded data, the second encoded data, the synchronization information, and the like. Update data accumulator 7366 accumulates the generated multiplexed signal. Additionally, update data accumulator 7366 uploads the multiplexed signal to cloud server 7350.

Cloud server 7350 synthesizes the point cloud data. Specifically, demultiplexer 7351 obtains the first encoded data and the second encoded data by demultiplexing the multiplexed signal uploaded to cloud server 7350. Decoder 7352A obtains the first point cloud data (or sensor signal) by decoding the first encoded data. Decoder 7352B obtains the second point cloud data (or sensor signal) by decoding the second encoded data.

Point cloud data synthesizer 7353 synthesizes the first point cloud data and the second point cloud data with a predetermined method. When the synchronization information and the geometry correction information are multiplexed in the multiplexed signal, point cloud data synthesizer 7353 may perform synthesis by using these pieces of information.

Decoder 7355 demultiplexes and decodes the large data accumulated in large data accumulator 7354. Comparator 7356 compares the point cloud data generated based on the sensor signal obtained by edge 7360 with the large data held by cloud server 7350, and determines the point cloud data that needs to be updated. Comparator 7356 updates the point cloud data that is determined to need to be updated of the large data to the point cloud data obtained from edge 7360.

Encoder 7357 encodes and multiplexes the updated large data, and accumulates the obtained data in large data accumulator 7354.

As described above, the signals to be handled may be different, and the signals to be multiplexed or encoding methods may be different, according to the usage or applications to be used. Even in such a case, flexible decoding and application processes are enabled by multiplexing data of various encoding schemes by using the present embodiment. Additionally, even in a case where the encoding schemes of signals are different, by conversion to an encoding scheme suitable for demultiplexing, decoding, data conversion, encoding, and multiplexing processing, it becomes possible to build various applications and systems, and to offer of flexible services.

Hereinafter, an example of decoding and application of divided data will be described. First, the information on divided data will be described. FIG. 110 is a diagram illustrating a configuration example of a bitstream. The general information of divided data indicates, for each divided data, the sensor ID (sensor_id) and data ID (data_id) of the divided data. Note that the data ID is also indicated in the header of each encoded data.

Note that the general information of divided data illustrated in FIG. 110 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

The general information of divided data may be stored in SPS, GPS, or APS, which is the metadata, or may be stored in SEI, which is the metadata not required for encoding. Additionally, at the time of multiplexing, the three-dimensional data encoding device stores the SEI in a file of ISOBMFF. The three-dimensional data decoding device can obtain desired divided data based on the metadata.

In FIG. 110, SPS is the metadata of the entire encoded data, GPS is the metadata of the geometry information, APS is the metadata for each attribute information, G is encoded data of the geometry information for each divided data, and A1, etc. are encoded data of the attribute information for each divided data.

Next, an application example of divided data will be described. An example of application will be described in which an arbitrary point cloud is selected, and the selected point cloud is presented. FIG. 111 is a flowchart of a point cloud selection process performed by this application. FIG. 112 to FIG. 114 are diagrams illustrating screen examples of the point cloud selection process.

As illustrated in FIG. 112, the three-dimensional data decoding device that performs the application includes, for example, a UI unit that displays an input UI (user interface) 8661 for selecting an arbitrary point cloud. Input UI 8661 includes presenter 8662 that presents the selected point cloud, and an operation unit (buttons 8663 and 8664) that receives operations by a user. After a point cloud is selected in UI 8661, the three-dimensional data decoding device obtains desired data from accumulator 8665.

First, based on an operation by the user on input UI 8661, the point cloud information that the user wants to display is selected (S8631). Specifically, by selecting button 8663, the point cloud based on sensor 1 is selected. By selecting button 8664, the point cloud based on sensor 2 is selected. Alternatively, by selecting both button 8663 and button 8664, the point cloud based on sensor 1 and the point cloud based on sensor 2 are selected. Note that it is an example of the selection method of point cloud, and it is not limited to this.

Next, the three-dimensional data decoding device analyzes the general information of divided data included in the multiplexed signal (bitstream) or encoded data, and specifies the data ID (data_id) of the divided data constituting the selected point cloud from the sensor ID (sensor_id) of the selected sensor (S8632). Next, the three-dimensional data decoding device extracts, from the multiplexed signal, the encoded data including the specified and desired data ID, and decodes the extracted encoded data to decode the point cloud based on the selected sensor (S8633). Note that the three-dimensional data decoding device does not decode the other encoded data.

Lastly, the three-dimensional data decoding device presents (for example, displays) the decoded point cloud (S8634). FIG. 113 illustrates an example in the case where button 8663 for sensor 1 is pressed, and the point cloud of sensor 1 is presented. FIG. 114 illustrates an example in the case where both button 8663 for sensor 1 and button 8664 for sensor 2 are pressed, and the point clouds of sensor 1 and sensor 2 are presented.

Although a three-dimensional data encoding device, a three-dimensional data decoding device, and the like, according to the embodiments of the present disclosure have been described above, the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the foregoing embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method comprising:
obtaining an item of geometry information and one or more items of attribute information of each of one or more encoded three-dimensional points; and
storing an item of control information and any one of the item of geometry information and the one or more items of attribute information of the one or more encoded three-dimensional points into each of one or more data units, wherein
the item of control information includes (i) an item of classification information indicating whether information stored in the data unit is an item of geometry information or an item of attribute information of the encoded three-dimensional point, and (ii) when the information stored in the data unit is an item of attribute information, an item of attribute type information indicating a type of the item of attribute information, and
when a first type and a second type different from the first type are included among attribute types of the one or more items of attribute information of the one or more encoded three-dimensional points, the item of control information includes an item of attribute type information indicating any one of a first identifier indicating the first type, a second identifier indicating the second type, and a third identifier indicating both the first type and the second type.

2. The three-dimensional data encoding method according to claim 1, further comprising:
storing, into any one of the one or more data units, one or more attribute information identifiers which are numerical values indicating the one or more items of attribute information of the one or more encoded three-dimensional points, wherein
in the storing of the item of control information and any one of the item of geometry information and the one or more items of attribute information of the one or more encoded three-dimensional points in each of the one or more data units, the one or more items of attribute information of the one or more encoded three-dimensional points are stored into each of the one or more data units in an order corresponding to the numerical values of the one or more attribute information identifiers.

3. The three-dimensional data encoding method according to claim 1, wherein
when the one or more items of attribute information of the one or more encoded three-dimensional points include items of attribute information having a same attribute type, the item of control information includes an item of instance identification information for identifying each of the items of attribute information having the same attribute type.

4. A three-dimensional data decoding method comprising:
obtaining a bitstream in which an item of control information and any one of an item of geometry information and one or more items of attribute information of each of one or more encoded three-dimensional points are stored in each of one or more data units; and obtaining the item of geometry information and the one or more items of attribute information of each of the one or more encoded three-dimensional points from the bitstream, wherein the item of control information includes (i) an item of classification information indicating whether information stored in the data unit is an item of geometry information or an item of attribute information of the encoded three-dimensional point, and (ii) when the information stored in the data unit is an item of attribute information, an item of attribute type information indicating a type of the item of attribute information, and when a first type and a second type different from the first type are included among attribute types of the one or more items of attribute information of the one or more encoded three-dimensional points, the item of control information includes an item of attribute type information indicating any one of a first identifier indicating the first type, a second identifier indicating the second type, and a third identifier indicating both the first type and the second type.

5. The three-dimensional data decoding method according to claim 4, wherein in the obtaining of the item of geometry information and the one or more items of attribute information of each of the one or more encoded three-dimensional points, at least one item of attribute information of an encoded three-dimensional point among the one or more items of attribute information of each of the one or more encoded three-dimensional points is obtained, the at least one item of attribute information satisfying a predetermined condition based on the item of control information.

6. The three-dimensional data decoding method according to claim 4, wherein one or more attribute information identifiers are stored into any one of the one or more data units, the one or more attribute information identifiers being numerical values indicating the one or more items of attribute information of the one or more encoded three-dimensional points, and each of the one or more attribute information identifiers indicates an order of a corresponding one of the one or more items of attribute information of the one or more encoded three-dimensional points in the one or more data units and the item of attribute information with which the numerical value of the attribute information identifier matches.

7. The three-dimensional data decoding method according to claim 4, wherein when the one or more items of attribute information of the one or more encoded three-dimensional points include items of attribute information having a same attribute type, the item of control information includes an item of instance identification information for identifying each of the items of attribute information having the same attribute type.

8. A three-dimensional data encoding device comprising:
a processor; and
memory, wherein
using the memory, the processor:

obtains an item of geometry information and one or more items of attribute information of each of one or more encoded three-dimensional points; and stores an item of control information and any one of the item of geometry information and the one or more items of attribute information of the one or more encoded three-dimensional points into each of one or more data units, the item of control information includes (i) an item of classification information indicating whether information stored in the data unit is an item of geometry information or an item of attribute information of the encoded three-dimensional point, and (ii) when the information stored in the data unit is an item of attribute information, an item of attribute type information indicating a type of the item of attribute information, and when a first type and a second type different from the first type are included among attribute types of the one or more items of attribute information of the one or more encoded three-dimensional points, the item of control information includes an item of attribute type information indicating any one of a first identifier indicating the first type, a second identifier indicating the second type, and a third identifier indicating both the first type and the second type.

9. A three-dimensional data decoding device comprising:
a processor; and
memory, wherein
using the memory, the processor:

obtains a bitstream in which an item of control information and any one of an item of geometry information and one or more items of attribute information of each of one or more encoded three-dimensional points are stored in each of one or more data units; and obtains the item of geometry information and the one or more items of attribute information of each of the one or more encoded three-dimensional points from the bitstream, the item of control information includes (i) an item of classification information indicating whether information stored in the data unit is an item of geometry information or an item of attribute information of the encoded three-dimensional point, and (ii) when the information stored in the data unit is an item of attribute information, an item of attribute type information indicating a type of the item of attribute information, and when a first type and a second type different from the first type are included among attribute types of the one or more items of attribute information of the one or more encoded three-dimensional points, the item of control information includes an item of attribute type information indicating any one of a first identifier indicating the first type, a second identifier indicating the second type, and a third identifier indicating both the first type and the second type.

* * * * *